United States Patent
Buer et al.

(10) Patent No.: US 10,084,532 B2
(45) Date of Patent: Sep. 25, 2018

(54) ACCESS NODE FARM FOR END-TO-END BEAMFORMING

(71) Applicant: ViaSat, Inc., Carlsbad, CA (US)

(72) Inventors: Kenneth V. Buer, Gilbert, AZ (US); Mark J. Miller, Vista, CA (US); Christopher J. Cronin, Monrovia, MD (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 15/719,249

(22) Filed: Sep. 28, 2017

(65) Prior Publication Data
US 2018/0019805 A1    Jan. 18, 2018

Related U.S. Application Data

(63) Continuation-in-part of application No. PCT/US2016/026813, filed on Apr. 8, 2016, and a
(Continued)

(51) Int. Cl.
*H04B 10/00* (2013.01)
*H04B 7/185* (2006.01)
(Continued)

(52) U.S. Cl.
CPC ..... *H04B 7/18513* (2013.01); *H04B 7/18517* (2013.01); *H04B 7/18586* (2013.01); *H04B 10/118* (2013.01); *H04W 16/28* (2013.01)

(58) Field of Classification Search
CPC ............ H04B 7/18513; H04B 7/18517; H04B 7/18586; H04B 10/118
(Continued)

(56) References Cited

U.S. PATENT DOCUMENTS

| 3,835,469 A | 9/1974 | Chen et al. |
|---|---|---|
| 4,232,266 A | 11/1980 | Acampora |

(Continued)

FOREIGN PATENT DOCUMENTS

| EP | 1168672 A2 | 1/2002 |
|---|---|---|
| EP | 1352485 B1 | 7/2007 |

(Continued)

OTHER PUBLICATIONS

Non-Final Office Action mailed in U.S. Appl. No. 15/719,307 dated Jan. 9, 2018, 9 pgs.
(Continued)

*Primary Examiner* — Oommen Jacob
(74) *Attorney, Agent, or Firm* — Kilpatrick Townsend & Stockton LLP

(57) ABSTRACT

Methods and systems are described for providing end-to-end beamforming. For example, end-to-end beamforming systems include end-to-end relays and ground networks to provide communications to user terminals located in user beam coverage areas. The ground segment can include geographically distributed access nodes and a central processing system. Return uplink signals, transmitted from the user terminals, have multipath induced by a plurality of receive/transmit signal paths in the end to end relay and are relayed to the ground network. The ground network, using beamformers, recovers user data streams transmitted by the user terminals from return downlink signals. The ground network, using beamformers generates forward uplink signals from appropriately weighted combinations of user data streams that, after relay by the end-end-end relay, produce forward downlink signals that combine to form user beams.

27 Claims, 90 Drawing Sheets

Related U.S. Application Data continuation-in-part of application No. PCT/US2016/026815, filed on Apr. 8, 2016, and a continuation of application No. PCT/US2017/013518, filed on Jan. 13, 2017, which is a continuation-in-part of application No. PCT/US2016/026815.

(60) Provisional application No. 62/145,804, filed on Apr. 10, 2015, provisional application No. 62/145,810, filed on Apr. 10, 2015, provisional application No. 62/164,456, filed on May 20, 2015, provisional application No. 62/278,368, filed on Jan. 13, 2016, provisional application No. 62/298,911, filed on Feb. 23, 2016, provisional application No. 62/312,342, filed on Mar. 23, 2016, provisional application No. 62/314,921, filed on Mar. 29, 2016, provisional application No. 62/431,416, filed on Dec. 7, 2016.

(51) Int. Cl.
 *H04W 16/28* (2009.01)
 *H04B 10/118* (2013.01)

(58) Field of Classification Search
 USPC .......................... 398/115, 116; 370/307, 329
 See application file for complete search history.

(56) References Cited

U.S. PATENT DOCUMENTS

| | | | |
|---|---|---|---|
| 4,825,216 A | 4/1989 | Dufort | |
| 4,931,802 A | 6/1990 | Assal et al. | |
| 5,592,175 A * | 1/1997 | Tayloe | G01S 5/12 342/352 |
| 5,619,503 A | 4/1997 | Dent | |
| 5,625,624 A * | 4/1997 | Rosen | H04B 7/18523 370/307 |
| 5,734,345 A | 5/1998 | Chen et al. | |
| 6,014,372 A | 1/2000 | Kent et al. | |
| 6,016,124 A | 1/2000 | Lo et al. | |
| 6,240,072 B1 | 5/2001 | Lo et al. | |
| 6,307,507 B1 | 10/2001 | Gross et al. | |
| 6,671,227 B2 | 12/2003 | Gilbert et al. | |
| 6,788,661 B1 | 9/2004 | Ylitalo et al. | |
| 6,795,413 B1 | 9/2004 | Uhlik | |
| 6,895,217 B1 * | 5/2005 | Chang | H04B 7/18504 342/354 |
| 6,941,138 B1 | 9/2005 | Chang et al. | |
| 6,965,753 B1 * | 11/2005 | Miller | H04B 7/01 367/90 |
| 7,016,649 B1 | 3/2006 | Narasimhan et al. | |
| 7,068,974 B1 | 6/2006 | Linsky et al. | |
| 7,257,418 B1 | 8/2007 | Chang et al. | |
| 7,305,211 B2 | 12/2007 | Dent | |
| 7,426,386 B1 | 9/2008 | Yousefi et al. | |
| 7,634,229 B2 | 12/2009 | Karabinis | |
| 7,706,748 B2 | 4/2010 | Dutta | |
| 7,728,766 B2 | 6/2010 | Draganov et al. | |
| 7,777,674 B1 | 8/2010 | Haddadin et al. | |
| 7,787,819 B2 | 8/2010 | Walker et al. | |
| 7,831,202 B2 | 11/2010 | Karabinis | |
| 7,869,759 B2 | 1/2011 | Pateros et al. | |
| 7,911,372 B2 | 3/2011 | Nelson | |
| 7,925,232 B2 | 4/2011 | Barak et al. | |
| 8,130,140 B2 | 3/2012 | Draganov et al. | |
| 8,144,643 B2 | 3/2012 | Miller et al. | |
| 8,218,476 B2 | 7/2012 | Miller | |
| 8,265,646 B2 | 9/2012 | Agarwal | |
| 8,270,899 B2 | 9/2012 | Walker et al. | |
| 8,331,329 B2 | 12/2012 | Sayegh | |
| 8,385,817 B2 | 2/2013 | Dankberg et al. | |
| 8,427,368 B1 | 4/2013 | Freedman et al. | |
| 8,547,897 B2 | 10/2013 | Chang | |
| 8,660,481 B2 | 2/2014 | Miller | |
| 8,744,360 B2 | 6/2014 | Zheng et al. | |
| 8,767,615 B2 | 7/2014 | Chang | |
| 8,855,552 B2 | 10/2014 | Dankberg et al. | |
| 8,923,756 B1 | 12/2014 | Freedman et al. | |
| 9,954,601 B2 | 4/2018 | Buer et al. | |
| 2004/0234018 A1 | 11/2004 | Ram | |
| 2004/0259497 A1 | 12/2004 | Dent | |
| 2005/0282542 A1 * | 12/2005 | Karabinis | H04B 7/18543 455/429 |
| 2006/0155840 A1 * | 7/2006 | Giffin | H04B 7/18578 709/224 |
| 2006/0211419 A1 * | 9/2006 | Karabinis | H04B 7/2041 455/427 |
| 2007/0037514 A1 * | 2/2007 | Karabinis | H04B 7/18521 455/13.3 |
| 2007/0155318 A1 * | 7/2007 | Monte | H04B 7/195 455/12.1 |
| 2007/0248044 A1 * | 10/2007 | Vogety | H04W 72/02 370/329 |
| 2007/0281612 A1 * | 12/2007 | Benjamin | H04B 7/18515 455/13.3 |
| 2008/0051080 A1 * | 2/2008 | Walker | H04B 7/2041 455/427 |
| 2008/0165720 A1 | 7/2008 | Hu et al. | |
| 2009/0034448 A1 | 2/2009 | Miller et al. | |
| 2010/0214964 A1 | 8/2010 | Larsson et al. | |
| 2010/0329369 A1 | 12/2010 | Hou et al. | |
| 2011/0069633 A1 | 3/2011 | Schmidt et al. | |
| 2011/0076956 A1 | 3/2011 | Tronc et al. | |
| 2012/0001791 A1 | 1/2012 | Wintermantel | |
| 2012/0218141 A1 | 8/2012 | Vasavada et al. | |
| 2012/0274507 A1 | 11/2012 | Cherkaoui et al. | |
| 2012/0307720 A1 | 12/2012 | Madsen et al. | |
| 2013/0328691 A1 * | 12/2013 | Coble | H04B 10/25 340/850 |
| 2014/0022979 A1 | 1/2014 | Chen et al. | |
| 2014/0065950 A1 | 3/2014 | Mendelsohn et al. | |
| 2014/0099881 A1 | 4/2014 | Boudreau et al. | |
| 2014/0104106 A1 | 4/2014 | Corman et al. | |
| 2014/0105054 A1 | 4/2014 | Sægrov et al. | |
| 2014/0307664 A1 | 10/2014 | Chen et al. | |
| 2015/0087299 A1 | 3/2015 | Veysoglu et al. | |
| 2016/0156409 A1 * | 6/2016 | Chang | H04W 4/90 370/315 |
| 2016/0192383 A1 | 6/2016 | Hwang et al. | |
| 2016/0277990 A1 | 9/2016 | Chan | |
| 2018/0019800 A1 | 1/2018 | Buer et al. | |
| 2018/0019804 A1 | 1/2018 | Buer et al. | |
| 2018/0019806 A1 | 1/2018 | Buer et al. | |
| 2018/0019811 A1 | 1/2018 | Buer et al. | |
| 2018/0026709 A1 | 1/2018 | Buer et al. | |
| 2018/0026710 A1 | 1/2018 | Buer et al. | |
| 2018/0034539 A1 | 2/2018 | Buer et al. | |
| 2018/0034540 A1 | 2/2018 | Buer et al. | |
| 2018/0041269 A1 | 2/2018 | Buer et al. | |
| 2018/0041270 A1 | 2/2018 | Buer et al. | |

FOREIGN PATENT DOCUMENTS

| | | |
|---|---|---|
| WO | WO-1995/028015 A1 | 10/1995 |
| WO | WO-1997/024884 A2 | 7/1997 |
| WO | WO-2014/170663 A1 | 10/2014 |
| WO | WO-2015/161040 A1 | 10/2015 |
| WO | WO-2016/195813 A9 | 12/2016 |
| WO | WO-2016/209332 A2 | 12/2016 |
| WO | WO-2017/124004 A1 | 7/2017 |

OTHER PUBLICATIONS

Non-Final Office Action mailed in U.S. Appl. No. 15/714,047 dated Feb. 28, 2018, 12 pgs.

Non-Final Office Action mailed in U.S. Appl. No. 15/719,186 dated Feb. 8, 2018, 22 pgs.

Non-Final Office Action mailed in U.S. Appl. No. 15/715,475 dated Jan. 18, 2018, 17 pgs.

Restriction Requirement mailed in U.S. Appl. No. 15/714,129 dated Jan. 24, 2018, 7 pgs.

(56) References Cited

OTHER PUBLICATIONS

Response to Restriction Requirement filed in U.S. Appl. No. 15/714,129 dated Mar. 23, 2018, 10 pgs.
Restriction Requirement mailed in U.S. Appl. No. 15/715,497 dated Feb. 7, 2018, 11 pgs.
Non-Final Office Action mailed in U.S. Appl. No. 15/719,209 dated Feb. 5, 2018, 9 pgs.
Non-Final Office Action mailed in U.S. Appl. No. 15/715,537 dated Feb. 27, 2018, 46 pgs.
Notice of Allowance mailed in U.S. Appl. No. 15/719,272 dated Jan. 30, 2018, 11 pgs.
Amendment after Allowance filed in U.S. Appl. 15/719,272 on Mar. 2, 2018, 8 pgs.
Response to Amendment under Rule 312 mailed in U.S. Appl. No. 15/719,272 dated Mar. 21, 2018, 2 pgs.
U.S. Appl. No. 15/919,664, filed Mar. 13, 2018, 233 pgs.
Response to Non-Final Office Action filed in U.S. Appl. No. 15/719,307 on Apr. 6, 2018, 12 pgs.
Applicant-Initiated Interview Summary mailed in U.S. Appl. No. 15/714,047 dated Dec. 11, 2017, 2 pgs.
Restriction Requirement mailed in U.S. Appl. No. 15/714,047 dated Dec. 15, 2017, 7 pgs.
Interview Summary filed in U.S. Appl. No. 15/714,047 on Dec. 19, 2017, 1 pg.
Response to Restriction Requirement filed in U.S. Appl. No. 15/714,047 on Jan. 4, 2018, 8 pgs.
Interview Summary filed in U.S. Appl. No. 15/719,186 on Dec. 21, 2017, 1 pg.
Non-Final Office Action mailed in U.S. Appl. No. 15/714,203 dated Dec. 1, 2017, 18 pgs.
Response to Non-Final Office Action filed in U.S. Appl. No. 15/714,203 on Jan. 4, 2018, 9 pgs.
Interview Summary filed in U.S. Appl. No. 15/719,209 on Dec. 21, 2017, 1 pg.
Interview Summary filed in U.S. Appl. No. 15/719,272 on Dec. 21, 2017, 1 pg.
Interview Summary filed in U.S. Appl. No. 15/719,307 on Dec. 21, 2017, 1 pg.
Angeletti et al. "Beam Hopping in Multi-Beam Broadband Satellite Systems: System Performance and Payload Architecture Analysis", Proceedings of the AIAA, San Diego, California, Jun. 11-14, 2006, 10 pgs.
Angeletti et al., "Hybrid Space/Ground Beamforming Techniques for Satellite Telecommunications", 32nd ESA Antenna Workshop on Antennas for Space Applications, 2001, 6 pgs.
Angeletti et al., "On-Ground Digital Beamforming Techniques for Satellite Smart Antennas", Proc. 19th AIAA, Toulouse, France, 2001, 8 pgs.
Angeletti et al., "Space/Ground Beamforming Techniques for Satellite Communications", IEEE Antennas and Propagation Society International Symposium (APSURSI), Jul. 11-17, 2010, 4 pgs.
Anzalchi et al., "Beam Hopping in Multi-Beam Broadband Satellite Systems: System Simulation and Performance Comparison with Non-Hopped Systems", IEEE, 5th Advanced Satellite Multimedia Systems Conference (ASMA) and the 11th Signal Processing for Space Communications Workshop (SPSC), Sep. 13-15, 2010, pp. 248-255.
Arapoglou et al., "MIMO over Satellite: A Review", IEEE Communications Surveys & Tutorials, vol. 13, No. 1, 2011, pp. 27-51.
Arnau et al., "Performance study of multiuser interference mitigation schemes for hybrid broadband multibeam satellite architectures", EURASIP Journal on Wireless Communications and Networking, Dec. 2012, 19 pgs.
Bjornson et al., "Optimal Multiuser Transmit Beamforming: A Difficult Problem with a Simple Solution Structure [lecture notes]", IEEE Signal Processing Magazine, vol. 31, No. 4, Jul. 2014, pp. 142-148.
Chiavacci, "Limited Scan Antenna Systems Using Phased-Array Feeds (versus Direct Radiating Array Apertures) Require Fewer Array Elements; Or Do They?", IEEE International Conference on Phased Array Systems and Technology, May 21-25, 2000, 7 pgs.
Christopoulos et al., "Coordinated Multibeam Satellite Co-location: The Dual Satellite Paradigm", Submitted to the IEEE Wirless. Comms. Magazine, Mar. 25, 2015, 16 pgs.
Da Costa et al., "Cooperative Dual-Hop Relaying Systems with Beamforming Over Nakagami-M Fading Channels", IEEE Transactions on Wireless Communications, vol. 8, No. 8, Aug. 2009, pp. 3950-3954.
DeVillers et al., "Joint Linear Precoding and Beamforming for the Forward Link of Multi-Beam Broadband Satellite Systems", IEEE Global Telecommunications Conference, Dec. 5-9, 2011, 6 pgs.
Döttling, "Assessment of advanced beamforming and MIMO technologies", European Commission, Project Deliverable IST-2003-507581 Winner, Information Society Technologies, Feb. 28, 2005, pp. 1-190.
ESA/ESTEC, Proceedings, 32nd ESA Antenna Workshop on Antennas for Space Applications, From Technologies to Architectures, Noordwijk, The Netherlands, Oct. 5-8, 2010, 18 pgs.
Fan et al., "MIMO Configurations for Relay Channels: Theory and Practice", IEEE Transactions on Wireless Communications, vol. 6, No. 5, May 2007, pp. 1774-1786.
Fonseca et al., "Multi-Beam Reflector Antenna System Combining Beam Hopping and Size Reduction of Effectively Used Spots", IEEE Antennas and Propagation Magazine, vol. 54, No. 2, Apr. 2012, pp. 88-99.
Gao et al., "Distributed Ground-based Beamforming", 31st AIAA International Communications Satellite Systems Conference, Oct. 14-17, 2013, 8 pgs.
Greda et al., "A Satellite Multiple-Beam Antenna for High-Rate Data Relays", Progress in Electromagnetics Research, vol. 149, 2014, pp. 133-145.
Heath Jr. et al., "Multiuser MIMO in Distributed Antenna Systems", 2010 Conference Record of the Forty Fourth Asilomar Conference on Signals, Systems and Computers (ASILOMAR), Nov. 7-10, 2010, 5 pgs.
Howell, "Limited Scan Antennas", Antennas and Propagation Society International Symposium, IEEE, Jun. 10-12, 1974, pp. 117-120.
Ingram et al., "LEO Download Capacity Analysis for a Network of Adaptive Array Ground Stations", Georgia Institute of Technology, 2005, 7 pgs.
Ingram et al., "Optimizing Satellite Communication With Adaptive and Phased Array Antennas", Georgia Institute of Technology, 2004, 7 pgs.
Khan et al., "Ground Based and Onboard Based Beamforming for Hybrid Terrestrial-Satellite Mobile System", 28th AIAA International Communications Satellite Systems Conference, Aug. 30, 2010, pp. 1-10.
Kolawole, "Satellite Communication Engineering", Second Edition, CRC Press, ISBN 9781138075351, Nov. 23, 2013, pp. 49-59.
Lee et al., "Optimal Beamforming Schemes and its Capacity Behavior for Downlink Distributed Antenna Systems", IEEE Transactions on Wireless Communications vol. 12, No. 6, Jun. 6, 2013, pp. 2578-2587.
Lemme, "Beam Hopping, Beam Forming, Frequency Reuse, and the Quest for Maximizing Satellite Throughput", Satcom Guru, Feb. 28, 2016, 4 pgs.
Liang et al., "Cooperative Amplify-and-Forward Beamforming with Multiple Multi-Antenna Relays", IEEE Transactions on Communications, vol. 59, No. 9, Sep. 2011, pp. 2605-2615.
Madhow, "Distributed Massive MIMO", 2014 Information Theory and Applications Workshop, Feb. 9-14, 2014, Catamaran Resort, San Diego, 29 pgs.
Madhow et al., "Distributed massive MIMO: algorithms, architectures and concept systems", Information Theory and Applications Workshop (ITA), IEEE, Feb. 9-14, 2014, 7 pgs.
M.K., "A Novel Beamforming and Combining Scheme for Two-Way AF Satellite Systems", IEEE Transactions on Vehicular Technology, vol. 66, No. 2, Feb. 2017, pp. 1248-1256.
Montesinos et al., "Adaptive beamforming for large arrays in satellite communications systems with dispersed coverage", IET Communications, vol. 5, No. 3, Feb. 11, 2011, pp. 350-361.

(56) References Cited

OTHER PUBLICATIONS

Mudumbai et al., "Distributed Transmit Beamforming: Challenges and Recent Progress", IEEE Communications Magazine, vol. 47, No. 2, Feb. 2009, pp. 102-110.
Ramanujam et al., "Recent Developments on Multi-beam Antennas At Boeing", 8th European Conference on Antennas and Propagation (EuCAP), Apr. 6-11, 2014, pp. 405-409.
Sharma et al., "Cognitive Beamhopping for Spectral Coexistence of Multibeam Satellites", Poster Paper, Future Network and Mobile Summit 2013 Conference Proceedings, 2013, 10 pgs.
Shi et al., "Extendable Carrier Synchronization for Distributed Beamforming in Wireless Sensor Networks", International Wireless Communications and Mobile Computing Conference, Sep. 5-9, 2016, 6 pgs.
Spilker, "Digital Communications by Satellite", Prentice-Hall, Inc., Englewood Cliffs, N.J., 1977, 15 pgs.
Thibault, "Advanced Beamforming for Distributed and Multi-Beam Networks", Doctoral Dissertation Thesis, 2013, 175 pgs.
Thibault et al., "Coarse Beamforming Techniques for Multi-Beam Satellite Networks", IEEE International Conference on Communications, Jun. 10-15, 2012, pp. 3270-3274.
Thibault et al., "Design and Analysis of Deterministic Distributed Beamforming Algorithms in the Presence of Noise", IEEE Transactions on Communications, vol. 61, No. 4, Apr. 2013, pp. 1595-1607.
Thibault et al., "Phase Synchronization Algorithms for Distributed Beamforming with Time Varying Channels in Wireless Sensor Networks", 7th International Wireless Communications and Mobile Computing Conference, Jul. 4-8, 2011, pp. 77-82.
Thibault et al., "Random, Deterministic, and Hybrid Algorithms for Distributed Beamforming", Proc. 5th Advanced Satellite and Multimedia Systems Conference and 11th Signal Processing for Space Communications Workshop, Sep. 13-15, 2010, pp. 1-40.
Thibault et al, "Random, Deterministic, and Hybrid Algorithms for Distributed Beamforming", 2010 5th Advanced Satellite and Multimedia Systems Conference and 11th Signal Processing for Space Communications Workshop, Sep. 13-15, 2010, pp. 221-225.
Thompson et al., "Concepts and Technologies for a Terabit/s Satellite", SPACOMM 2011: The Third International Conference on Advances in Satellite and Space Communications, 2011, pp. 12-19.
Vázquez et al., "Hybrid Analog-Digital Transmit Beamforming for Spectrum Sharing Satellite-Terrestrial Systems", IEEE, 17th International Workshop on Signal Processing Advances in Wireless Communications, Jul. 3-6, 2016, 5 pgs.
Vouyioukas, "A Survey on Beamforming Techniques for Wireless MIMO Relay Networks", International Journal of Antennas and Propagation, 2013, 22 pgs.
Walker et al., "Architecture, Implementation and Performance of Ground-Based Beam Forming in the DBSD G1 Mobile Satellite System", Aug. 30, 2010, 29 pgs.
Yan et al, "Joint Beamforming and Jamming Design for Secure Cooperative Hybrid Satellite-Terrestrial Relay Network", 25th Wireless and Optical Communication Conference (WOCC), May 21-23, 2016, 5 pgs.
Yanez et al., "Hybrid Space-Ground Processing for High Capacity Multi-beam Satellite Systems", Global Telecommunications Conference (GLOBECOM 2011), IEEE, Dec. 2011, 6 pgs.
Yu et al., "Virtual Multi-beamforming for Distributed Satellite Clusters in Space Information Networks", IEEE Wireless Communications, vol. 23, No. 1, Feb. 2016, pp. 95-101.

Zheng et al, "Adaptive Beam-Forming with Interference Suppression and Multi-User Detection in Satellite Systems with Terrestrial Reuse of Frequencies", IEEE Vehicular Technology Conference, vol. 62, No. 4, 2005, pp. 1-5.
International Search Report and Written Opinion mailed in International (PCT) Application No. PCT/US2016/026813 dated Jan. 16, 2017, 10 pgs.
International Preliminary Report on Patentability mailed in International (PCT) Application No. PCT/US2016/026813 dated Oct. 10, 2017, 8 pgs.
International Search Report and Written Opinion mailed in International (PCT) Application No. PCT/US2016/026815 dated Jan. 16, 2017, 10 pgs.
International Preliminary Report on Patentability mailed in International (PCT) Application No. PCT/US2016/026815 dated Oct. 10, 2017, 8 pgs.
International Search Report and Written Opinion mailed in International (PCT) Application No. PCT/US2017/013518 dated Apr. 13, 2017, 10 pgs.
U.S. Appl. No. 15/714,047, filed Sep. 25, 2017, 234 pgs.
U.S. Appl. No. 15/719,186, filed Sep. 28, 2017, 236 pgs.
U.S. Appl. No. 15/715,475, filed Sep. 26, 2017, 235 pgs.
U.S. Appl. No. 15/714,129, filed Sep. 25, 2017, 237 pgs.
U.S. Appl. No. 15/714,203, filed Sep. 25, 2017, 233 pgs.
U.S. Appl. No. 15/715,497, filed Sep. 26, 2017, 236 pgs.
U.S. Appl. No. 15/719,209, filed Sep. 28, 2017, 238 pgs.
U.S. Appl. No. 15/715,537, filed Sep. 26, 2017, 236 pgs.
U.S. Appl. No. 15/719,272, filed Sep. 28, 2017, 235 pgs.
U.S. Appl. No. 15/719,307, filed Sep. 28, 2017, 236 pgs.
Response to Non-Final Office Action filed in U.S. Appl. No. 15/714,047 on May 25, 2018, 12 pgs.
Non-Final Office Action mailed in U.S. Appl. No. 15/714,047 dated Jul. 3, 2018, 12 pgs.
Response to Non-Final Office Action filed in U.S. Appl. No. 15/719,186 on May 7, 2018, 19 pgs.
Notice of Allowance mailed in U.S. Appl. No. 15/719,186 dated Jun. 28, 2018, 8 pgs.
Response to Non-Final Office Action filed in U.S. Appl. No. 15/715,475 on Apr. 18, 2018, 15 pgs.
Final Office Action mailed in U.S. Appl. No. 15/715,475 dated May 23, 2018, 17 pgs.
Non-Final Office Action mailed in U.S. Appl. No. 15/714,203 dated May 1, 2018, 23 pgs.
Applicant-Initiated Interview Summary mailed in U.S. Appl. No. 15/714,203 dated Jun. 26, 2018, 4 pgs.
Response to Restriction Requirement filed in U.S. Appl. No. 15/715,497 on Apr. 6, 2018, 10 pgs.
Response to Non-Final Office Action filed in U.S. Appl. No. 15/719,209 on May 4, 2018, 13 pgs.
Response to Non-Final Office Action filed in U.S. Appl. No. 15/715,537 on May 25, 2018, 28 pgs.
Notice of Allowance mailed in U.S. Appl. No. 15/919,664 dated May 21, 2018, 9 pgs.
Notice of Allowance mailed in U.S. Appl. No. 15/719,307 dated May 11, 2018, 8 pgs.
Supplemental Notice of Allowability mailed in U.S. Appl. No. 15/715,475 dated Jul. 18, 2018, 5 pgs.
Notice of Allowance mailed in U.S. Appl. No. 15/715,475 dated Jul. 6, 2018, 21 pgs.
Non-Final Office Action mailed in U.S. Appl. No. 15/715,497 dated Jul. 13, 2018, 59 pgs.
Search Report and Written Opinion dated Jul. 30, 2018, in Singapore Patent Application No. 11201708179X, 11 pages.

* cited by examiner

| Transponder | RX ELEMENT 4204 | DIRECT MAPPING TX ELEMENT 4206 | INTERLEAVED MAPPING TX ELEMENT 4208 |
|---|---|---|---|
| 1 | 1 | 1 | 10 |
| 2 | 2 | 2 | 9 |
| 3 | 3 | 3 | 4 |
| 4 | 4 | 4 | 16 |
| 5 | 5 | 5 | 1 |
| 6 | 6 | 6 | 14 |
| 7 | 7 | 7 | 3 |
| 8 | 8 | 8 | 12 |
| 9 | 9 | 9 | 13 |
| 10 | 10 | 10 | 15 |
| 11 | 11 | 11 | 8 |
| 12 | 12 | 12 | 5 |
| 13 | 13 | 13 | 11 |
| 14 | 14 | 14 | 6 |
| 15 | 15 | 15 | 2 |
| 16 | 16 | 16 | 7 |

FIG. 22

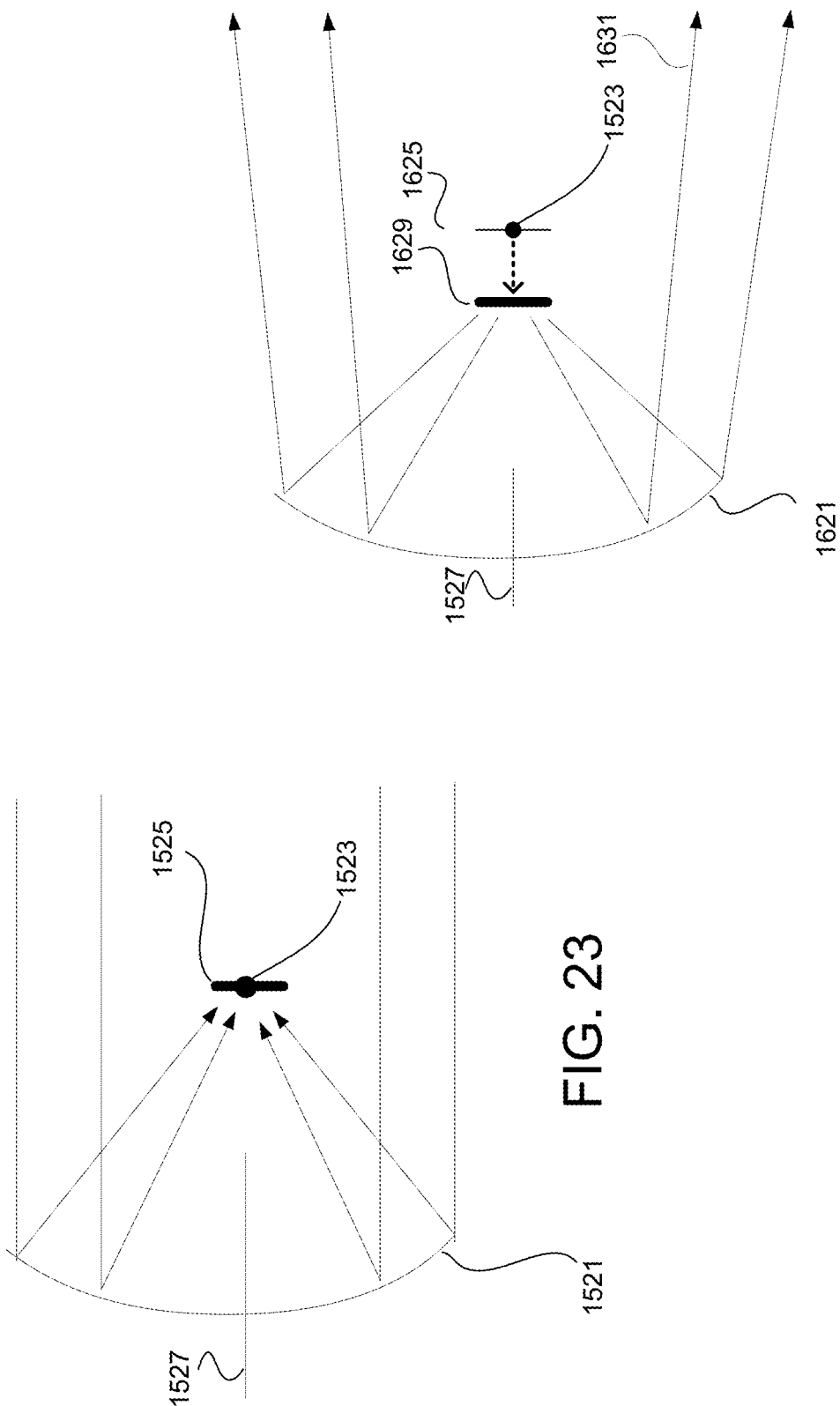

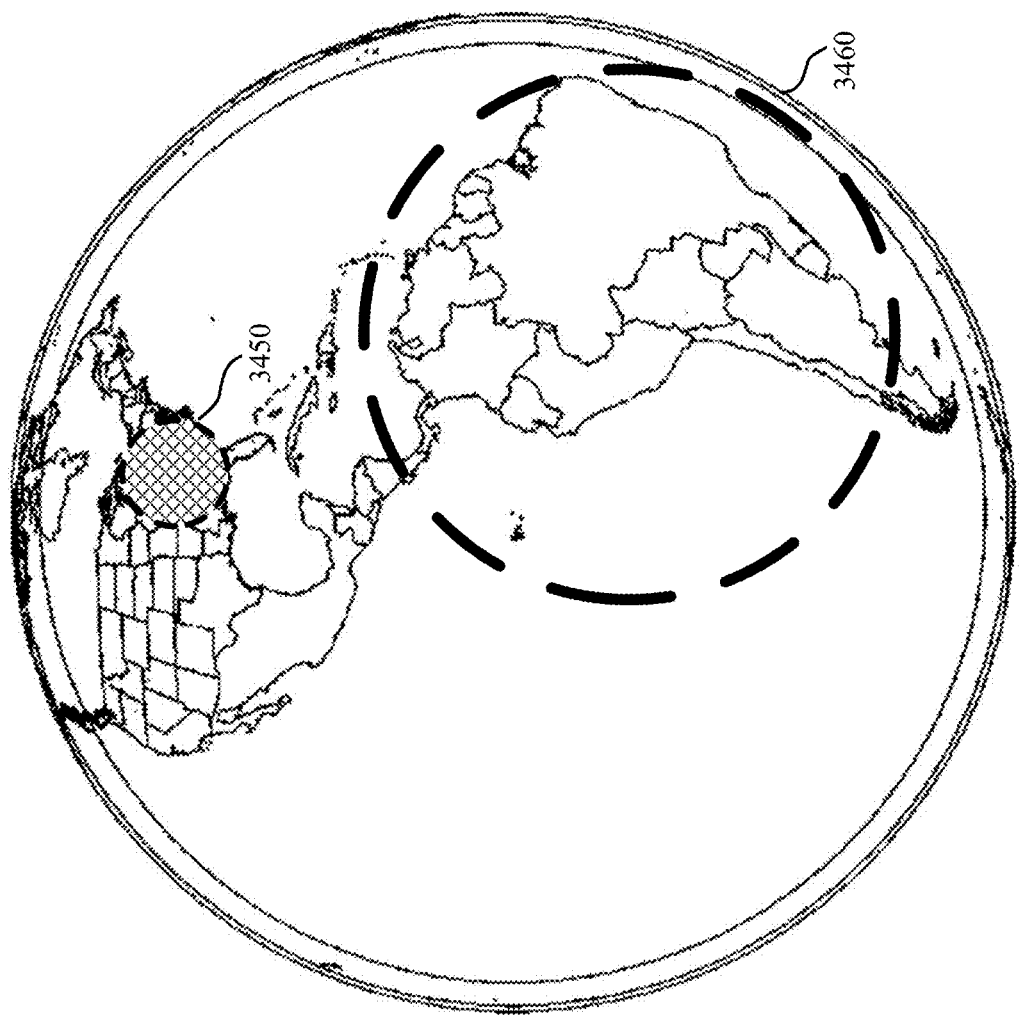

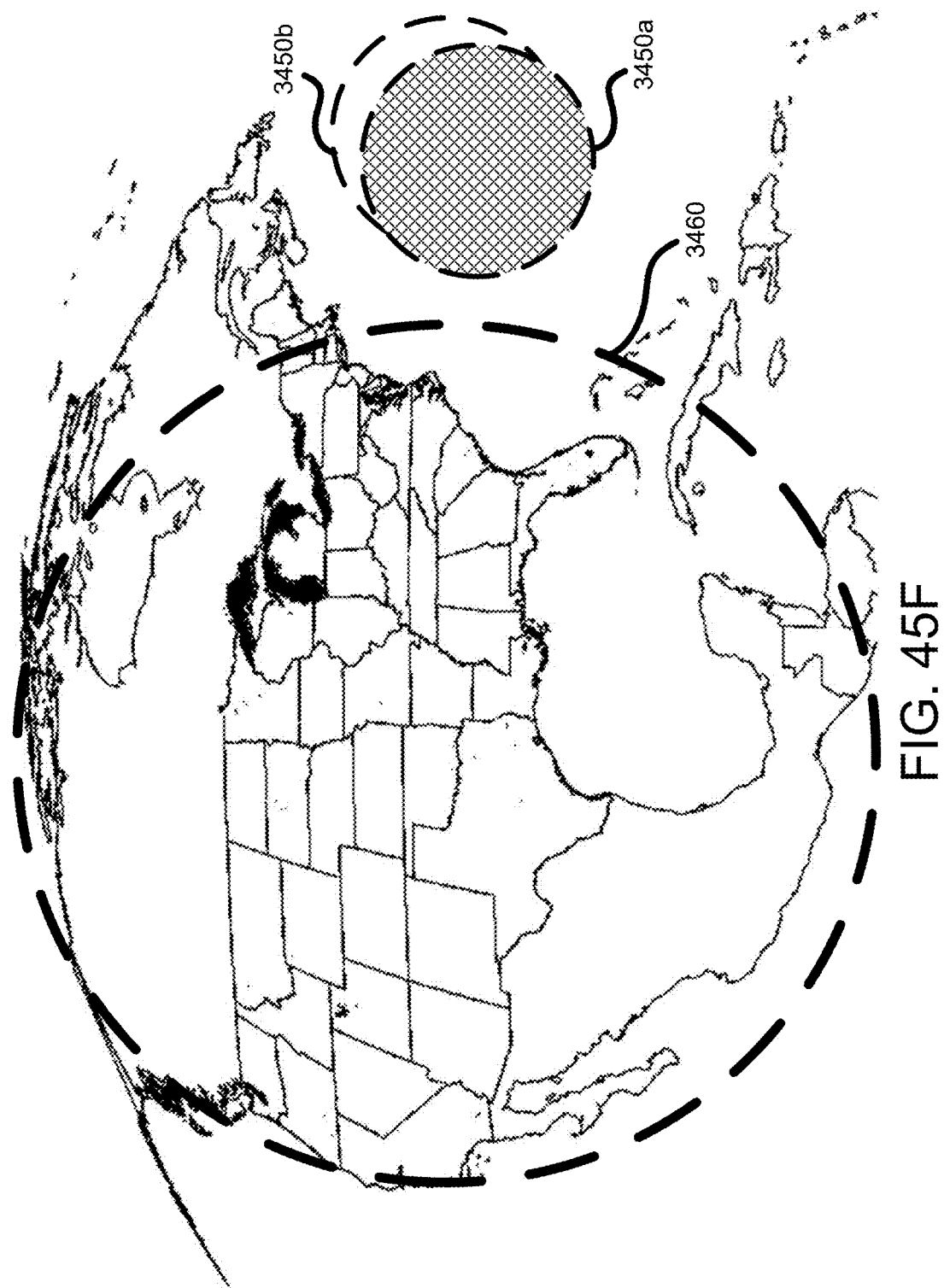

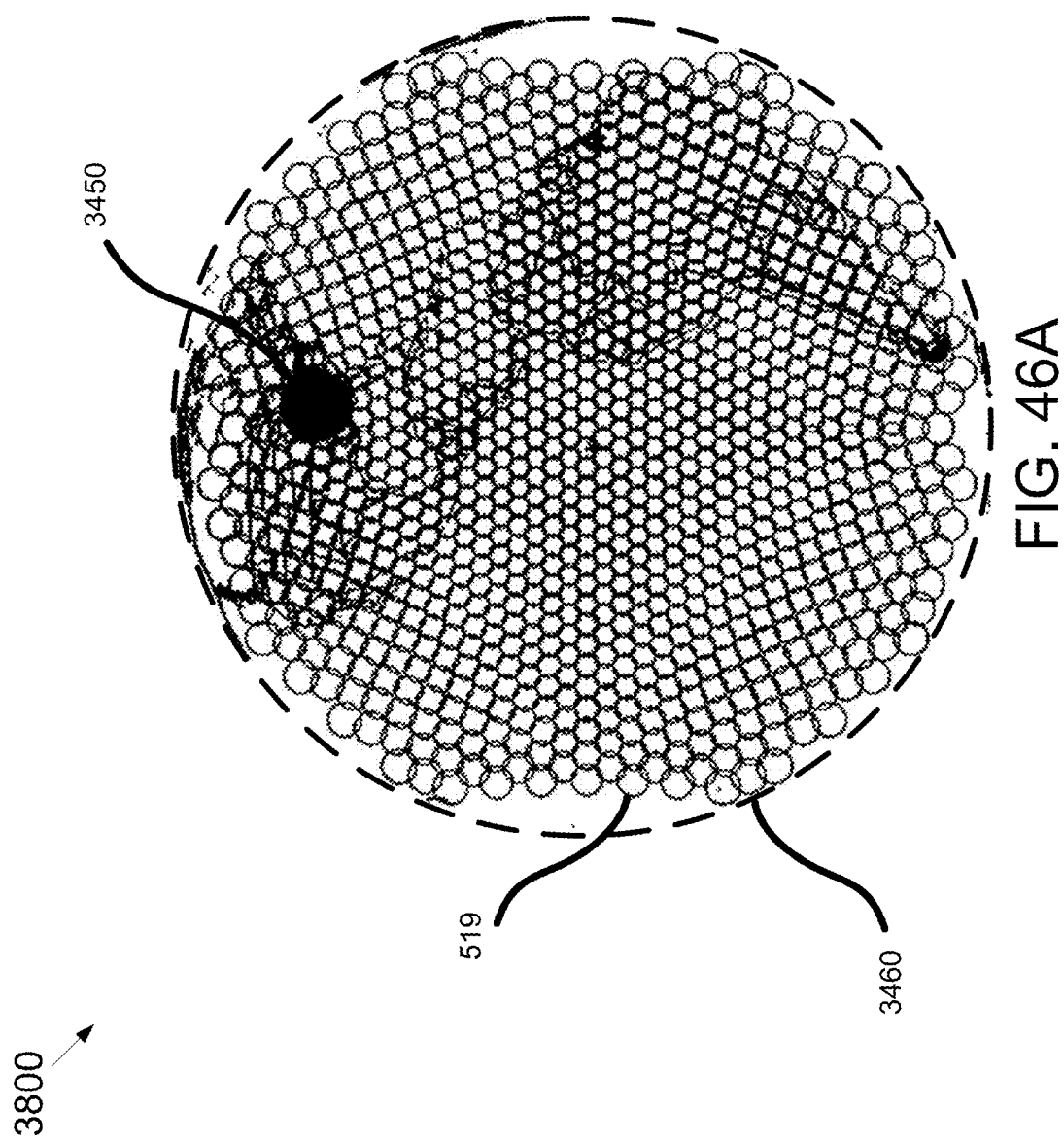

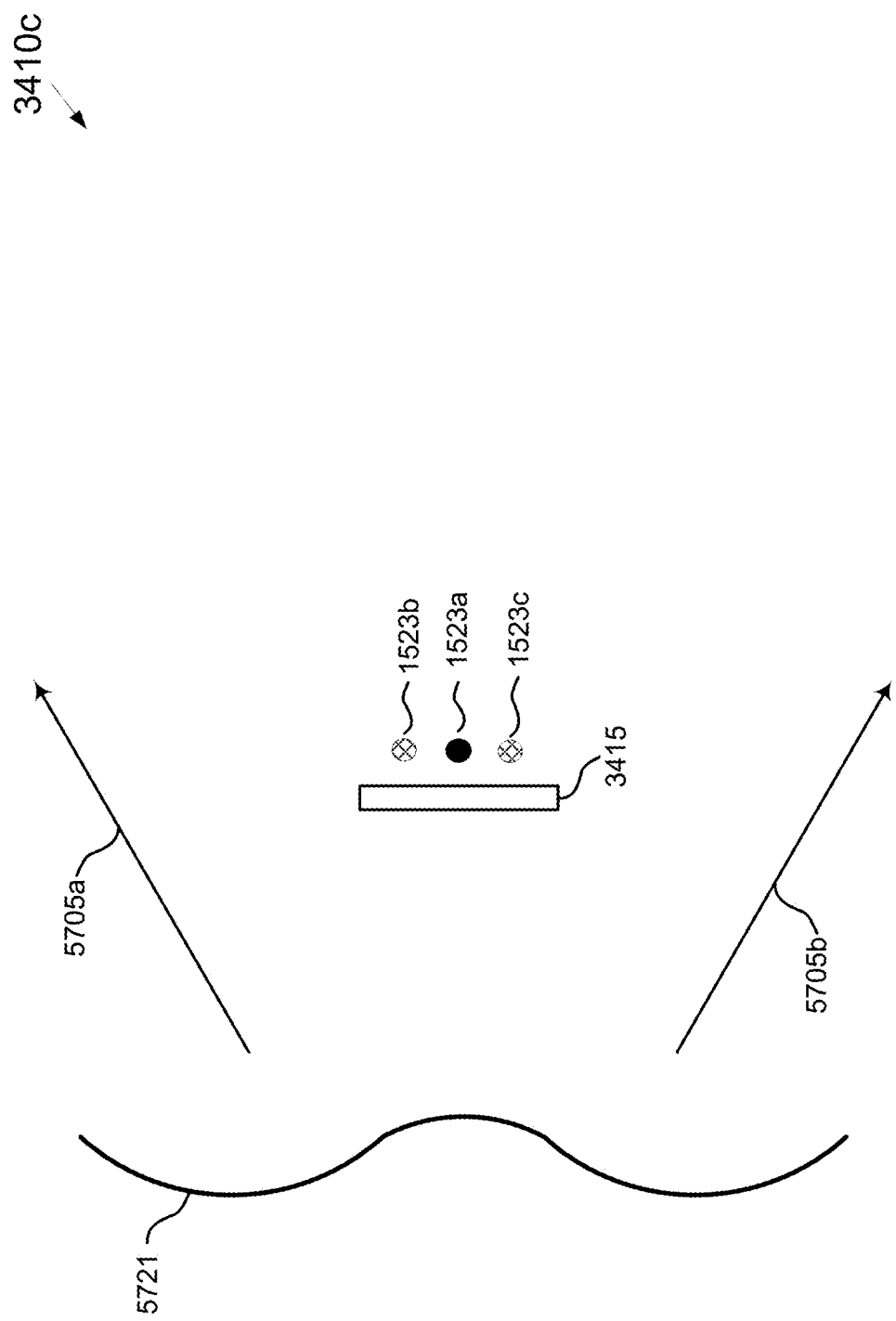

US 10,084,532 B2

ACCESS NODE FARM FOR END-TO-END BEAMFORMING

TECHNICAL FIELD

The disclosed systems, methods, and apparatuses relate to end-to-end beamforming in a system using an end-to-end relay.

BACKGROUND

Wireless communication systems, such as satellite communication systems, provide a means by which data, including audio, video, and various other sorts of data, may be communicated from one location to another. Information originates at a first station, such as a first ground-based station, and is transmitted to a wireless relay, such as a communication satellite. Information received by the wireless relay is retransmitted to a second station, such as a second ground-based station. In some wireless relay communication systems, either the first or second station (or both) are mounted on a craft, such as an aircraft, watercraft, or landcraft. Information may be transmitted in just one direction (e.g., from a first ground-based station to a second ground-based station only) or may be transmitted in both directions (e.g., also from the second ground-based station to the first ground-based station).

In a wireless relay communication system in which the wireless relay is a satellite, the satellite may be a geostationary satellite, in which case the satellite's orbit is synchronized to the rotation of the Earth, keeping the coverage area of the satellite essentially stationary with respect to the Earth. In other cases, the satellite is in an orbit about the Earth that causes the coverage area of the satellite to move over the surface of the Earth as the satellite traverses its orbital path.

The signals that are directed to or from a first station may be directed by using an antenna that is shaped to focus the signal into a narrow beam. Such antennas typically have a paraboloid shaped reflector to focus the beam.

In some cases, a beam may be formed electronically by adjusting the gain and phase (or time delay) of signals that are transmitted, received, or both from several elements of a phased array antenna. By properly selecting the relative phase and gain transmitted and/or received by each element of a phased array antenna, the beam may be directed. In most cases, all of the energy being transmitted from a ground-based station is intended to be received by one wireless relay. Similarly, information received by the second station is typically received from one wireless relay at a time. Therefore, it is typical that a transmit beam that is formed to transmit information to the wireless relay (whether by use of electronic beamforming or by use of an antenna with a shaped reflector) is relatively narrow to allow as much of the transmitted energy as possible to be directed to the wireless relay. Likewise, a receive beam that is formed to receive information from the wireless relay is typically narrow to gather energy from the direction of the wireless relay with minimal interference from other sources.

In many cases of interest, the signals that are transmitted from the wireless relay to the first and second stations are not directed to a single station. Rather, the wireless relay is able to transmit signals over a relatively large geographic area. For example, in one satellite communication system, a satellite may service the entire continental United States. In such a case, the satellite is said to have a satellite coverage area that includes the entire continental United States. Nonetheless, in order to increase the amount of data that may be transmitted through a satellite, the energy transmitted by the satellite is focused into beams. The beams may be directed to geographic areas on the Earth.

BRIEF DESCRIPTION OF THE FIGURES

The drawings are provided for purposes of illustration only and merely depict examples. These drawings are provided to facilitate the reader's understanding of the disclosed method and apparatus. They do not limit the breadth, scope, or applicability of the claimed invention. For clarity and ease of illustration, these drawings are not necessarily made to scale.

FIG. 22 is a table showing example mappings of receive antenna elements to transmit antenna elements through 16 transponders.

FIG. 23 is an illustration of a cross-section of a paraboloid antenna reflector and an array of elements centered at the focal point of the parabola.

FIG. 24 is an illustration of a cross-section of a paraboloid antenna reflector and an array of elements placed away from the focal point of the parabola.

FIGS. 45A, 45B, 45C, 45D, 45E, 45F, and 45G are illustrations of examples of an end-to-end relay visible coverage areas.

FIGS. 46A and 46B are an illustration of an example of an end-to-end relay Earth coverage area and North American coverage area, respectively.

FIG. 57 illustrates an antenna subsystem that includes a compound reflector.

Reference designators (e.g., 100) are used herein to refer to aspects of the drawings. Similar or like aspects are typically shown using like numbers. A group of similar or like elements may be referred to collectively by a single reference designator (e.g., 200), while individual elements of the group may be referred to by the reference designator with an appended letter (e.g., 200*a*, 200*b*).

The figures are not intended to be exhaustive or to limit the claimed invention to the precise form disclosed. The disclosed method and apparatus may be practiced with modification and alteration, and that the invention is limited only by the claims and the equivalents thereof.

DETAILED DESCRIPTION

This detailed description is organized as follows. First, an introduction to wireless relay communication systems using satellite communication and beamforming are described. Second, end-to-end beamforming is described generally and at the system level using satellite end-to-end beamforming as an example, although application of end-to-end beamforming is not limited to satellite communications. Third, operation of forward and return data is described in context of end-to-end beamforming. Fourth, end-to-end relays and their antennas are described using a communication satellite as an example. Next, ground networks to form the end-to-end beams are described, including related aspects, such as delay equalization, feeder-link impairment removal, and beam weight computation. Finally, end-to-end beamforming with distinct user-link and feeder-link coverage areas is described, as well as systems with multiple coverage areas.

Satellite Communication

Figure 1:
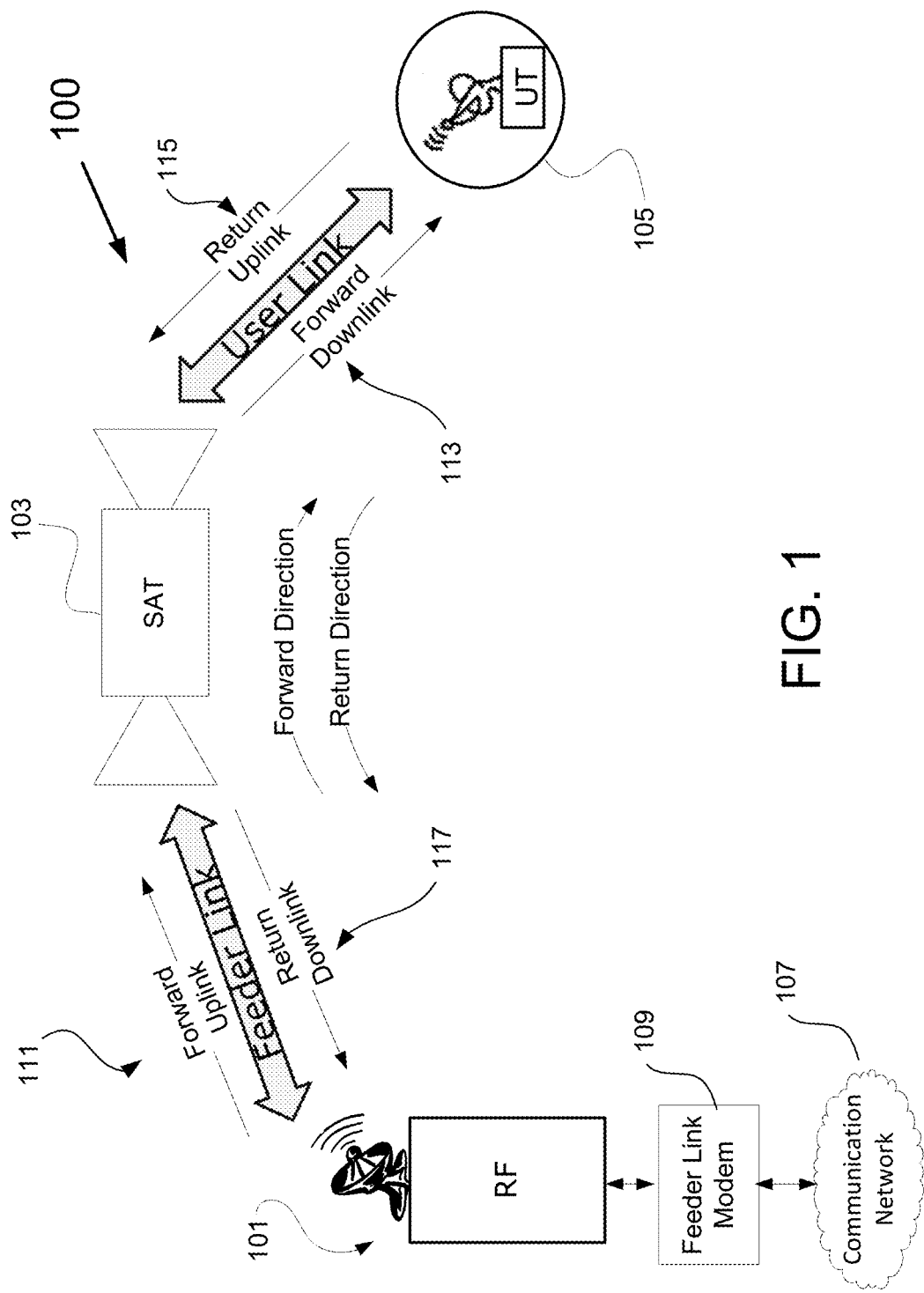
FIG. 1 is an illustration of an example of a satellite communication system.

FIG. 1 is an illustration of an example of a hub and spoke satellite communication system 100. The satellite serves as an example of a wireless relay. Though many examples are described throughout this disclosure in context of a satellite or satellite communication system, such examples are not intended to be limited to satellite; any other suitable wireless relay may be used and operate in a similar fashion. The system 100 comprises a ground-based Earth station 101, a communication satellite 103, and an Earth transmission source, such as a user terminal 105. A satellite coverage area may be broadly defined as that area from which, and/or to which, either an Earth transmission source, or an Earth receiver, such as a ground-based Earth station or a user terminal, can communicate through the satellite. In some systems, the coverage area for each link (e.g., forward uplink coverage area, forward downlink coverage area, return uplink coverage area, and return downlink coverage area) can be different. The forward uplink coverage area and return uplink coverage area are collectively referred to as the uplink satellite coverage area. Similarly, the forward downlink coverage area and the return downlink coverage area are collectively referred to as the downlink satellite coverage area. While the satellite coverage area is only active for a satellite that is in service (e.g., in a service orbit), the satellite can be considered as having (e.g., can be designed to have) a satellite antenna pattern that is independent of the relative location of the satellite with respect to the Earth. That is, the satellite antenna pattern is a pattern of distribution of energy transmitted from an antenna of a satellite (either transmitted from or received by the antenna of the satellite). The satellite antenna pattern illuminates (transmits to, or receives from) a particular satellite coverage area when the satellite is in a service orbit. The satellite coverage area is defined by the satellite antenna pattern, an orbital position and attitude for which the satellite is designed, and a given antenna gain threshold. In general, the intersection of an antenna pattern (at a particular effective antenna gain, e.g. 3 dB, 4 dB, 6 dB 10 dB from peak gain) with a particular physical region of interest (e.g., an area on or near the earth surface) defines the coverage area for the antenna. Antennas can be designed to provide a particular antenna pattern (and/or coverage area) and such antenna patterns can be determined computationally (e.g., by analysis or simulation) and/or measured experimentally (e.g., on an antenna test range or in actual use).

While only one user terminal 105 is shown in the figure for the sake of simplicity, there are typically many user terminals 105 in the system. The satellite communication system 100 operates as a point to multi-point system. That is, the Earth station 101 within the satellite coverage area can send information to, and receive information from, any of the user terminals 105 within the satellite coverage area. However, the user terminals 105 only communicate with the Earth station 101. The Earth station 101 receives forward data from a communication network 107, modulates the data using a feeder link modem 109 and transmits the data to the satellite 103 on a forward feeder uplink 111. The satellite 103 relays this forward data to user terminals 105 on the forward user downlink (sometimes called a forward service downlink) 113. In some cases, the forward direction communication from the Earth station 101 is intended for several of the user terminals 105 (e.g., information is multicast to the user terminals 105). In some cases, the forward communication from the Earth station 101 is intended for only one user terminal 105 (e.g., unicast to a particular user terminal 105). The user terminals 105 transmit return data to the satellite 103 on a return user uplink (sometimes called a return service uplink) 115. The satellite 103 relays the return data to the Earth station 101 on a return feeder downlink 117. A feeder-link modem 109 demodulates the return data, which is forwarded to the communication network 107. This return-link capability is generally shared by a number of user terminals 105.

Figure 2:
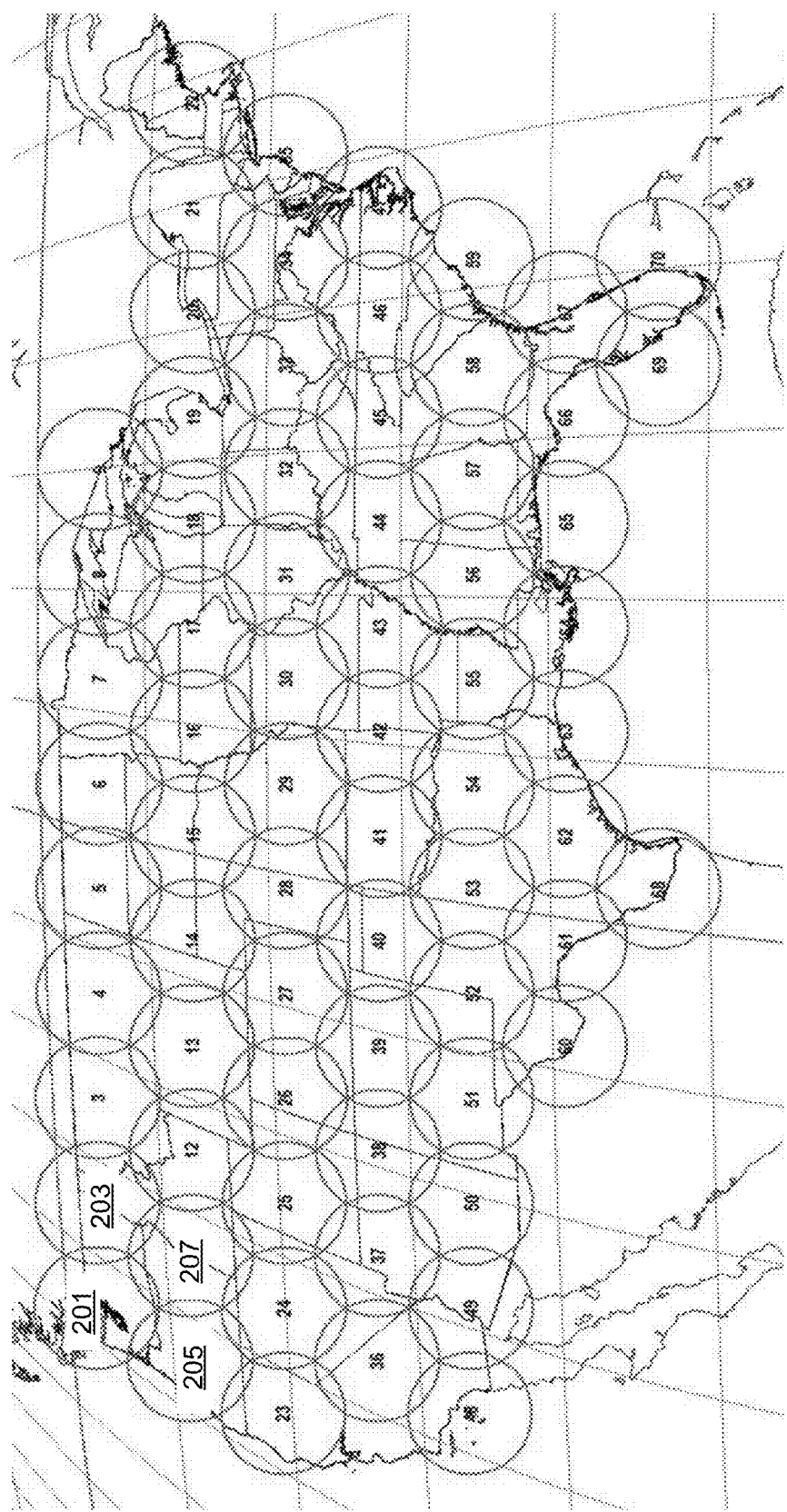
FIG. 2 is a diagram showing an example pattern of beams that covers the continental United States.

FIG. 2 is a diagram showing an example of one configuration of beam coverage areas of a satellite to service the continental United States. Seventy beams are shown in the example configuration. A first beam 201 covers approximately two thirds of the state of Washington. A second beam 203 adjacent to the first beam 201 covers an area immediately to the east of the first beam 201. A third beam 205 approximately covers Oregon to the south of the first beam 201. A fourth beam 207 covers an area roughly southeast of the first beam 201. Typically, there is some overlap between adjacent beams. In some cases, a multi-color (e.g., two, three or four-color re-use pattern) is used. In an example of a four-color pattern, the beams 201, 203, 205, 207 are individually allocated a unique combination of frequency (e.g., a frequency range or ranges or one or more channels) and/or antenna polarization (e.g., in some cases an antenna may be configured to transmit signals with a right-hand circular polarization (RHCP) or a left-hand circular polarization (LHCP); other polarization techniques are available). Accordingly, there may be relatively little mutual interference between signals transmitted on different beams 201, 203, 205, 207. These combinations of frequency and antenna polarization may then be re-used in the repeating non-overlapping "four-color" re-use pattern. In some situations, a desired communication capacity may be achieved by using a single color. In some cases, time sharing among beams and/or other interference mitigation techniques can be used.

Within some limits, focusing beams into smaller areas and thus increasing the number of beams, increases the data capacity of the satellite by allowing greater opportunity for frequency re-use. However, increasing the number of beams can increase the complexity of the system, and in many cases, the complexity of the satellite.

Complexity in the design of a satellite typically results in larger size, more weight, and greater power consumption. Satellites are expensive to launch into orbit. The cost of launching a satellite is determined in part by the weight and size of the satellite. In addition, there are absolute limits on the weight and size of a satellite if the satellite is to be launched using presently available rocket technology. This leads to tradeoffs between features that may be designed into a satellite. Furthermore, the amount of power that may be provided to components of a satellite is limited. Therefore, weight, size, and power consumption are parameters to be considered in the design of a satellite.

Throughout this disclosure, the term receive antenna element refers to a physical transducer that converts an electro-magnetic signal to an electrical signal, and the term transmit antenna element refers to a physical transducer that launches an electro-magnetic signal when excited by an electrical signal. The antenna element can include a horn, septum polarized horn (e.g., which may function as two combined elements with different polarizations), multi-port multi-band horn (e.g., dual-band 20 GHz/30 GHz with dual polarization LHCP/RHCP), cavity-backed slot, inverted-F, slotted waveguide, Vivaldi, Helical, loop, patch, or any other configuration of antenna element or combination of interconnected sub-elements. An antenna element has a corresponding antenna pattern, which describes how the antenna gain varies as a function of direction (or angle). An antenna element also has a coverage area which corresponds to an area (e.g., a portion of the Earth surface) or volume (e.g., a portion of the Earth surface plus airspace above the surface) over which the antenna element provides a desired level of gain (e.g., within 3 dB, 6 dB, 10 dB, or other value relative to a peak gain of the antenna element). The coverage area of the antenna element may be modified by various structures such as a reflector, frequency selective surface, lens, radome, and the like. Some satellites, including those described herein, can have several transponders, each able to independently receive and transmit signals. Each transponder is coupled to antenna elements (e.g., a receive element and a transmit element) to form a receive/transmit signal path that has a different radiation pattern (antenna pattern) from the other receive/transmit signal paths to create unique beams that may be allocated to different beam coverage areas. It is common for a single receive/transmit signal path to be shared across multiple beams using input and/or output multiplexers. In both cases, the number of simultaneous beams that may be formed is generally limited by the number of receive/transmit signal paths that are deployed on the satellite.

Beamforming

Beamforming for a communication link may be performed by adjusting the signal phase (or time delay), and sometimes signal amplitude, of signals transmitted and/or received by multiple elements of one or more antenna arrays with overlapping coverage areas. In some cases, some or all antenna elements are arranged as an array of constituent receive and/or transmit elements that cooperate to enable end-to-end beamforming, as described below. For transmissions (from transmit elements of the one or more antenna arrays), the relative phases, and sometimes amplitudes, of the transmitted signals are adjusted, so that the energy transmitted by transmit antenna elements will constructively superpose at a desired location. This phase/amplitude adjustment is commonly referred to as "applying beam weights" to the transmitted signals. For reception (by receive elements of the one or more antenna arrays), the relative phases, and sometimes amplitudes, of the received signals are adjusted (i.e., the same or different beam weights are applied) so that the energy received from a desired location by receive antenna elements will constructively superpose at those receive antenna elements. In some cases, the beamformer computes the desired antenna element beam weights. The term beamforming may refer in some cases to the application of the beam weights. Adaptive beamformers include the function of dynamically computing the beam weights. Computing the beam weights may require direct or indirect discovery of the communication channel characteristics. The processes of beam weight computation and beam weight application may be performed in the same or different system elements.

The antenna beams may be steered, selectively formed, and/or otherwise reconfigured by applying different beam weights. For example, the number of active beams, coverage area of beams, size of beams, relative gain of beams, and other parameters may be varied over time. Such versatility is desirable in certain situations. Beamforming antennas can generally form relatively narrow beams. Narrow beams may allow the signals transmitted on one beam to be distinguished from signals transmitted on the other beams (e.g., to avoid interference). Accordingly, narrow beams can allow frequency and polarization to be re-used to a greater extent than when larger beams are formed. For example, beams that are narrowly formed can service two discontiguous coverage areas that are non-overlapping. Each beam can use both a right hand polarization and a left hand polarization. Greater reuse can increase the amount of data transmitted and/or received.

Figure 3:
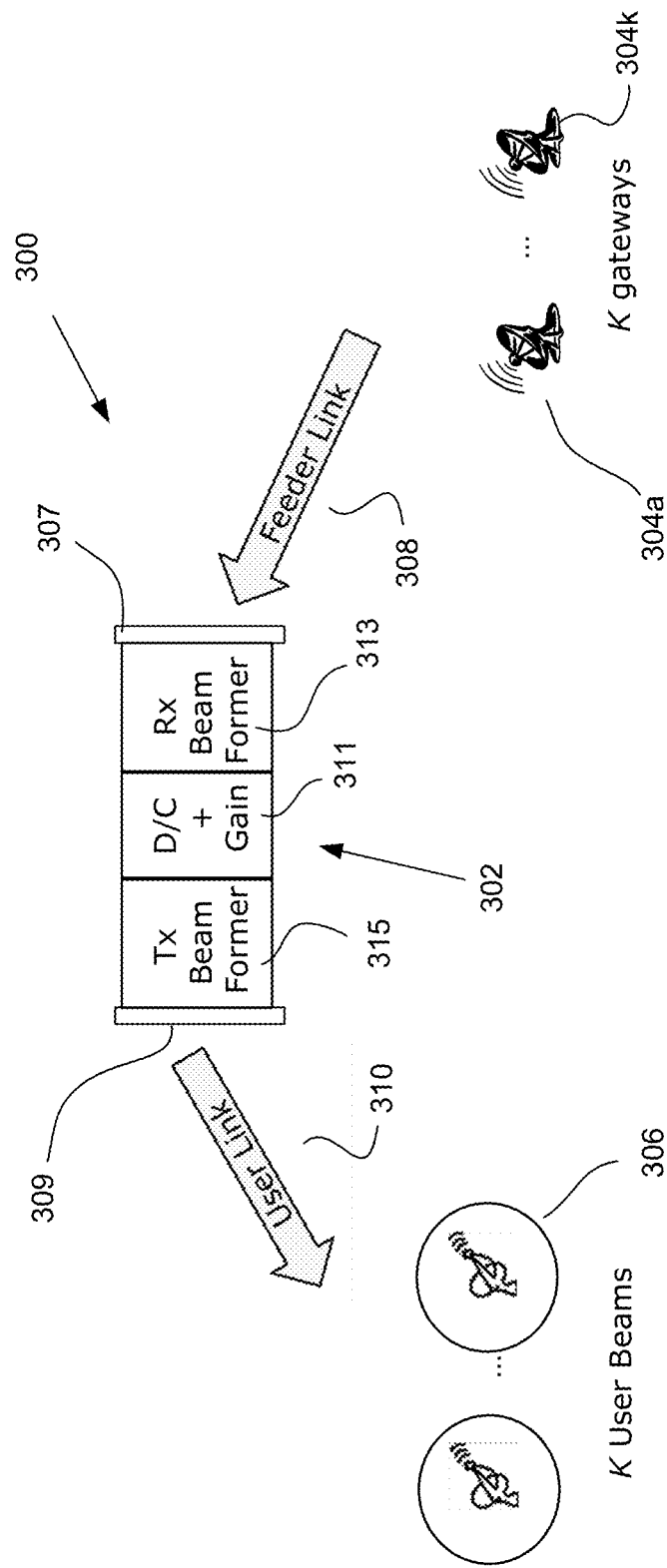
FIG. 3 is an illustration of an example of the forward link of a satellite communication system in which the satellite has a phased array multi-feed per beam on-board beamforming capability.

Some satellites use on-board beamforming (OBBF) to electronically steer an array of antenna elements. FIG. 3 is an illustration of a satellite system 300 in which the satellite 302 has phased array multi-feed per beam (MFPB) on-board beamforming capability. In this example, the beam weights are computed at a ground based computation center and then transmitted to the satellite or pre-stored in the satellite for application (not shown). The forward link is shown in FIG. 3, although this architecture may be used for forward links, return links, or both forward and return links. Beamforming may be employed on the user link, the feeder link, or both. The illustrated forward link is the signal path from one of a plurality of gateways (GWs) 304 to one or more of a plurality of user terminals within one or more spot beam coverage areas 306. The satellite 302 has a receive antenna array 307, a transmit antenna array 309, a down-converter (D/C) and gain module 311, a receive beamformer 313, and a transmit beamformer 315. The satellite 302 can form beams on both the feeder link 308 and the user link 310. Each of the L elements of the receive array 307 receives K signals from the K GWs 304. For each of the K feeder link beams that are to be created (e.g., one beam per GW 304), a different beam weight is applied (e.g., a phase/amplitude adjustment is made) by the receive beamformer 313 to each signal received by each of the L receive antenna array elements (of receive antenna array 307). Accordingly, for K beams to be formed using a receive antenna array 307 having L receive antenna elements, K different beam weight vectors of length L are applied to the L signals received by the L receive antenna array elements. The receive beamformer 313 within the satellite 302 adjusts the phase/amplitude of the signals received by the L receive antenna array elements to create K receive beam signals. Each of the K receive beams are focused to receive a signal from one GW 304. Accordingly, the receive beamformer 313 outputs K receive beam signals to the D/C and gain module 311. One such receive beam signal is formed for the signal received from each transmitting GW 304.

The D/C and gain module 311 down-converts each of the K receive beam signals and adjusts the gain appropriately. K signals are output from the D/C and gain module 311 and coupled to the transmit beamformer 315. The transmit beamformer 315 applies a vector of L weights to each of the K signals for a total of L×K transmit beam weights to form K beams on the user downlink 310.

In some cases, significant processing capability may be needed within the satellite to control the phase and gain of each antenna element that is used to form the beams. Such processing power increases the complexity of the satellite. In some cases, satellites may operate with ground-based beamforming (GBBF) to reduce the complexity of the satellite while still providing the advantage of electronically forming narrow beams.

Figure 4:
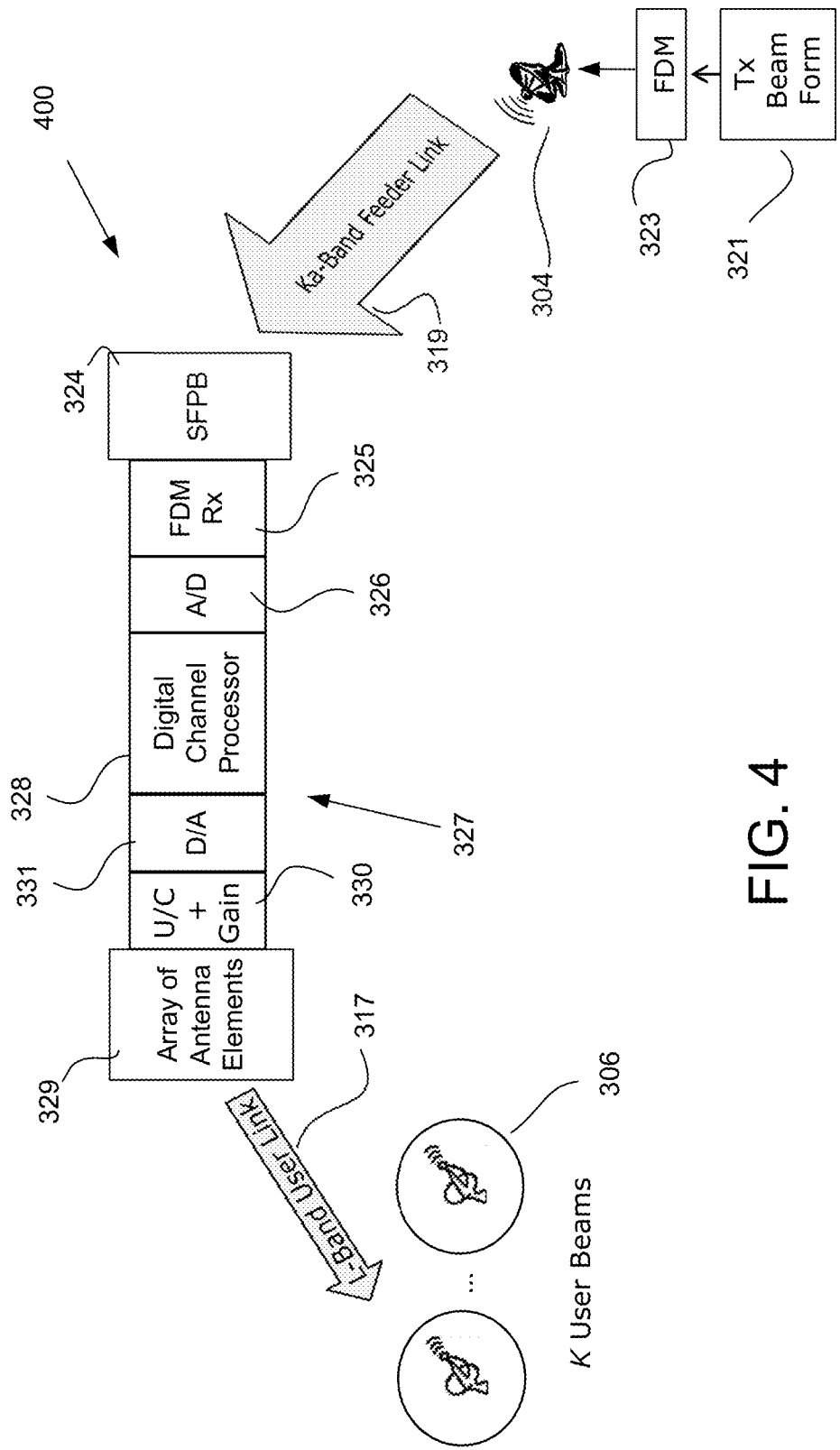
FIG. 4 is an illustration of an example of the forward link of a satellite communication system having ground-based beamforming.

FIG. 4 is an illustration of one example of a satellite communication system 400 having forward GBBF. GBBF is performed on the forward user link 317 via an L element array similar to that described above. The phases/amplitudes of the signals transmitted on the user link 317 are weighted such that beams are formed. The feeder link 319 uses a Single Feed per Beam (SFPB) scheme in which each receive and transmit antenna element of an antenna 324 is dedicated to one feeder link beam.

Prior to transmission from a GW or GWs 304, for each of the K forward feeder link beams, a transmit beamformer 321 applies a respective one of K beam weight vectors, each of length L, to each of K signals to be transmitted. Determining the K vectors of L weights and applying them to the signals enables K forward beams to be formed on the ground for the forward user downlink 317. On the feeder uplink 319, each of the L different signals is multiplexed into a frequency division multiplexed (FDM) signal by a multiplexer 323 (or the like). Each FDM signal is transmitted by the GWs 304 to one of the receive antenna elements in the antenna 324 on the feeder link 319. An FDM receiver 325 on the satellite 327 receives the signals from the antenna 324. An analog to digital converter (A/D) 326 converts the received analog signals to digital signals. A digital channel processor 328 demultiplexes the FDM signals, each of which was appropriately weighted by the beamformer 321 for transmission through one of the L elements of an array of transmit antenna elements of a transmit antenna 329. The digital channel processor 328 outputs the signals to a digital to analog converter (D/A) 331 to be converted back to analog form. The analog outputs of the D/A 331 are up-converted and amplified by an up-converter (U/C) and gain stage 330 and transmitted by the associated element of the transmit antenna 329. A complimentary process occurs in reverse for the return feeder beams. Note that in this type of system the FDM feeder link requires L times as much bandwidth as the user beams making it impractical for systems with wide data bandwidths or systems that have a large number of elements L.

End-to-End Beamforming Systems

The end-to-end beamforming systems described herein form end-to-end beams through an end-to-end relay. An end-to-end beamforming system can connect user terminals with data sources/sinks. In contrast to the beamforming systems discussed above, in an end-to-end beamforming system, beam weights are computed at a central processing system (CPS) and end-to-end beam weights are applied within the ground network (rather than at a satellite). The signals within the end-to-end beams are transmitted and received at an array of access nodes (ANs), which may be satellite access node (SANs). As described above, any suitable type of end-to-end relays can be used in an end-to-end beamforming system, and different types of ANs may be used to communicate with different types of end-to-end relays. The term "central" refers to the fact that the CPS is accessible to the ANs that are involved in signal transmission and/or reception, and does not refer to a particular geographic location at which the CPS resides. A beamformer within a CPS computes one set of end-to-end beam weights that accounts for: (1) the wireless signal uplink paths up to the end-to-end relay; (2) the receive/transmit signal paths through the end-to-end relay; and (3) the wireless signal downlink paths down from the end-to-end relay. The beam weights can be represented mathematically as a matrix. As discussed above, OBBF and GBBF satellite systems have beam weight vector dimensions set by the number of antenna elements on the satellite. In contrast, end-to-end beam weight vectors have dimensions set by the number of ANs, not the number of elements on the end-to-end relay. In general, the number of ANs is not the same as the number of antenna elements on the end-to-end relay. Further, the formed end-to-end beams are not terminated at either transmit or receive antenna elements of the end-to-end relay. Rather, the formed end-to-end beams are effectively relayed, since the end-to-end beams have uplink signal paths, relay signal paths (via a satellite or other suitable end-to-end relay), and downlink signal paths.

Because the end-to-end beamforming takes into account both the user link and the feeder link (as well as the end-to-end relay) only a single set of beam weights is needed to form the desired end-to-end user beams in a particular direction (e.g., forward user beams or return user beams). Thus, one set of end-to-end forward beam weights (hereafter referred to simply as forward beam weights) results in the signals transmitted from the ANs, through the forward uplink, through the end-to-end relay, and through the forward downlink to combine to form the end-to-end forward user beams (hereafter referred to as forward user beams). Conversely, signals transmitted from return users through the return uplink, through the end-to-end relay, and the return downlink have end-to-end return beam weights (hereafter referred to as return beam weights) applied to form the end-to-end return user beams (hereafter referred to as return user beams). Under some conditions, it may be very difficult or impossible to distinguish between the characteristics of the uplink and the downlink. Accordingly, formed feeder link beams, formed user beam directivity, and individual uplink and downlink carrier to interference ratio (C/I) may no longer have their traditional role in the system design, while concepts of uplink and downlink signal-to-noise ratio (Es/No) and end-to-end C/I may still be relevant.

Figure 5:
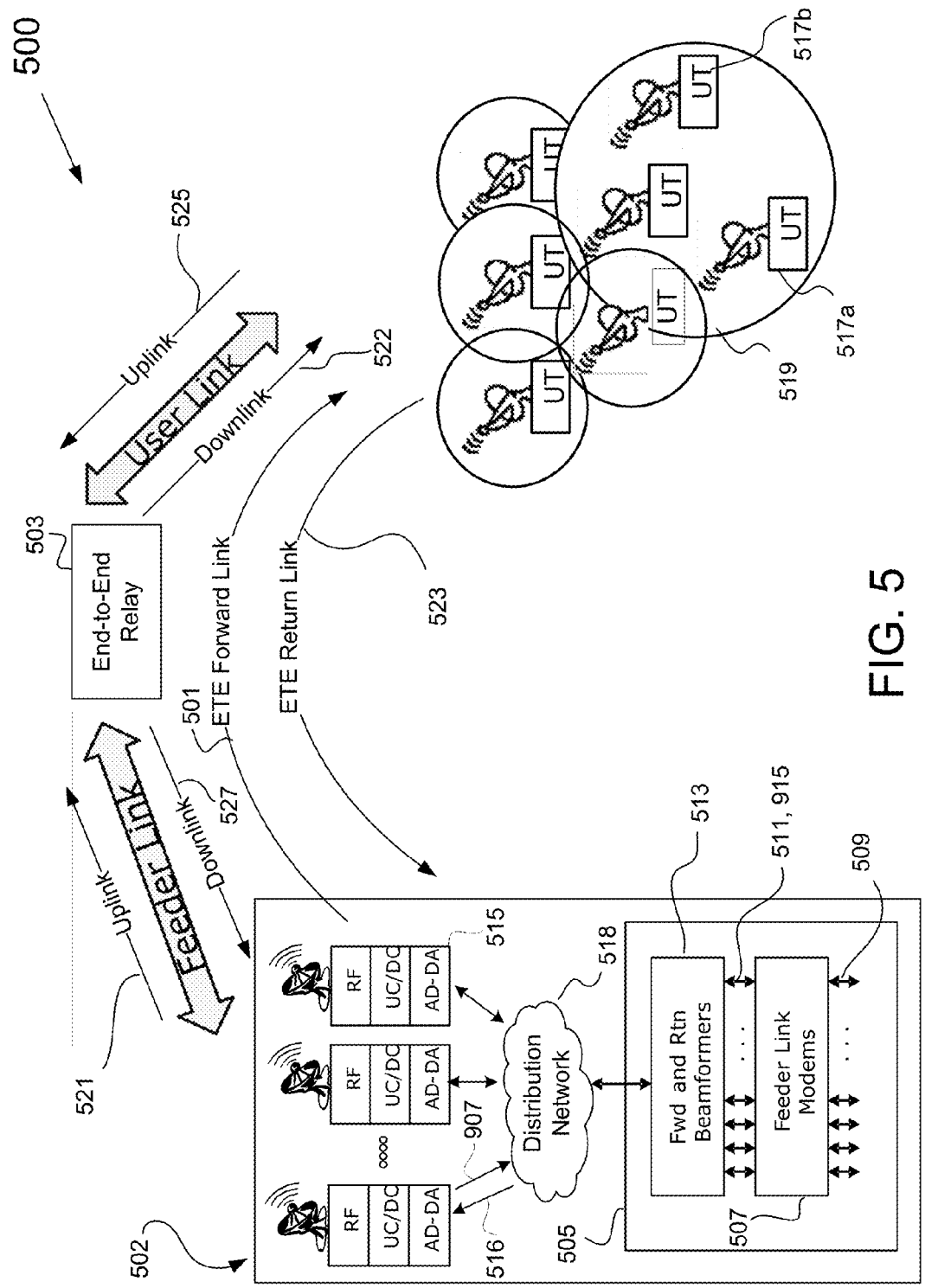
FIG. 5 is an illustration of an example end-to-end beamforming system.

FIG. 5 is an illustration of an example end-to-end beamforming system 500. The system 500 includes: a ground segment 502; an end-to-end relay 503; and a plurality of user terminals 517. The ground segment 502 comprises M ANs 515, spread geographically over an AN area. The ANs 515 cooperate in transmitting forward uplink signals 521 to form user beams 519 and return downlink signals 527 are collectively processed to recover return uplink transmissions 525. A set of ANs 515 that are within a distinct (e.g., geographically separated or otherwise orthogonally configured) AN area and cooperate to perform end-to-end beamforming for forward and/or return user beams is referred to herein as an "AN cluster." In some examples, multiple AN clusters in different AN areas may also cooperate. AN clusters may also be referred to as "AN farms" or "SAN farms." ANs 515 and user terminals 517 can be collectively referred to as Earth receivers, Earth transmitters, or Earth transceivers, depending upon the particular functionality at issue, since they are located on, or near, the Earth and both transmit and receive signals. In some cases, user terminals 517 and/or ANs 515 can be located in aircraft, watercraft or mounted on landcraft, etc. In some cases, the user terminals 517 can be geographically distributed. The ANs 515 can be geographically distributed. The ANs 515 exchange signals with a CPS 505 within the ground segment 502 via a distribution network 518. The CPS 505 is connected to a data source (not shown), such as, for example, the internet, a video headend or other such entity.

User terminals 517 may be grouped with other nearby user terminals 517 (e.g., as illustrated by user terminals 517a and 517b). In some cases, such groups of user terminals 517 are serviced by the same user beam and so reside within the same geographic forward and/or return user beam coverage area 519. A user terminal 517 is within a user beam if the user terminal 517 is within the coverage area serviced by that user beam. While only one such user beam coverage area 519 is shown in FIG. 5 to have more than one user terminal 517, in some cases, a user beam coverage area 519 can have any suitable number of user terminals 517. Furthermore, the depiction in FIG. 5 is not intended to indicate the relative size of different user beam coverage areas 519. That is, the user beam coverage areas 519 may all be approximately the same size. Alternatively, the user beam coverage areas 519 may be of varying sizes, with some user beam coverage areas 519 much larger than others. In some cases, the number of ANs 515 is not equal to the number of user beam coverage areas 519.

The end-to-end relay 503 relays signals wirelessly between the user terminals 517 and a number of network access nodes, such as the ANs 515 shown in FIG. 5. The end-to-end relay 503 has a plurality of signal paths. For example, each signal path can include at least one receive antenna element, at least one transmit antenna element, and at least one transponder (as is discussed in detail below). In some cases, the plurality of receive antenna elements are arranged to receive signals reflected by a receive reflector to form a receive antenna array. In some cases, the plurality of transmit antenna elements is arranged to transmit signals and thus to form a transmit antenna array.

In some cases, the end-to-end relay 503 is provided on a satellite. In other cases, the end-to-end relay 503 is provided on an aircraft, blimp, tower, underwater structure or any other suitable structure or vehicle in which an end-to-end relay 503 can reside. In some cases, the system uses different frequency ranges (in the same or different frequency bands) for the uplinks and downlinks. In some cases, the feeder links and user links are in different frequency ranges. In some cases, the end-to-end relay 503 acts as a passive or active reflector.

As described herein, various features of the end-to-end relay 503 enable end-to-end beamforming. One feature is that the end-to-end relay 503 includes multiple transponders that, in the context of end-to-end beamforming systems, induce multipath between the ANs 515 and the user terminals 517. Another feature is that the antennas (e.g., one or more antenna subsystems) of the end-to-end relay 503 contribute to end-to-end beamforming, so that forward and/or return user beams are formed when properly beam-weighted signals are communicated through the multipath induced by the end-to-end relay 503. For example, during forward communications, each of multiple transponders receives a respective superposed composite of (beam weighted) forward uplink signals 521 from multiple (e.g., all) of the ANs 515 (referred to herein as composite input forward signals), and the transponders output corresponding composite signals (referred to herein as forward downlink signals). Each of the forward downlink signals can be a unique composite of the beam-weighted forward uplink signals 521, which, when transmitted by the transmit antenna elements of the end-to-end relay 503, superpose to form the user beams 519 in desired locations (e.g., recovery locations within forward user beams, in this case). Return end-to-end beamforming is similarly enabled. Thus, the end-to-end relay 503 can cause multiple superpositions to occur, thereby enabling end-to-end beamforming over induced multipath channels.

Return Data

Figure 6:
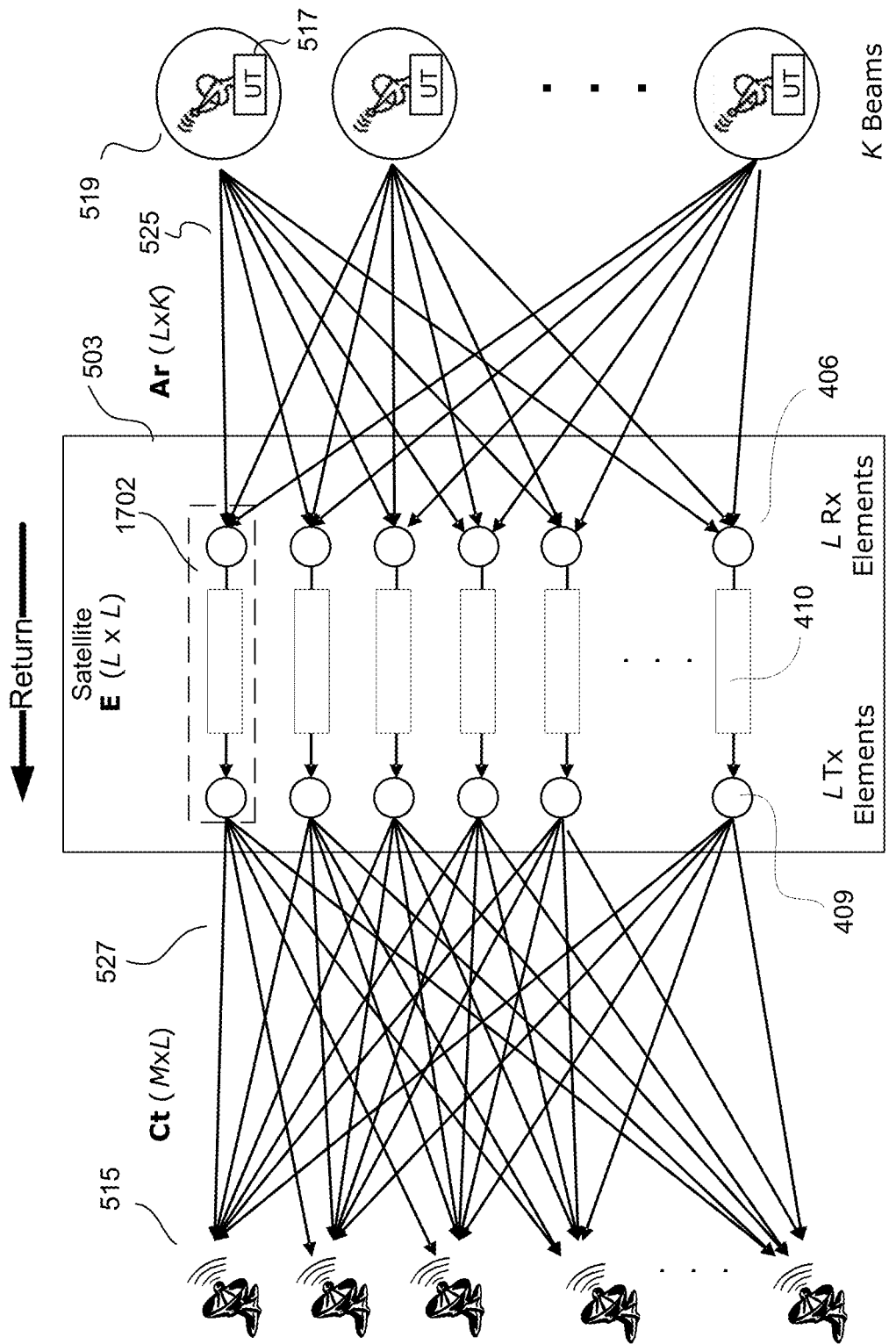
FIG. 6 is an illustration of example signal paths for signals in the return direction.

FIG. 6 is an illustration of an example model of signal paths for signals carrying return data on the end-to-end return link. Return data is the data that flows from user terminals 517 to the ANs 515. Signals in FIG. 6 flow from right to left. The signals originate with user terminals 517. The user terminals 517 transmit return uplink signals 525 (which have return user data streams) up to the end-to-end relay 503. Return uplink signals 525 from user terminals 517 in K user beam coverage areas 519 are received by an array of L receive/transmit signal paths 1702. In some cases, an uplink coverage area for the end-to-end relay 503 is defined by that set of points from which all of the L receive antenna elements 406 can receive signals. In other cases, the relay coverage area is defined by that set of points from which a subset (e.g., a desired number more than 1, but less than all) of the L receive antenna elements 406 can receive signals. Similarly, in some cases, the downlink coverage area is defined by the set of points to which all of the L transmit antenna elements 409 can reliably send signals. In other cases, the downlink coverage area for the end-to-end relay 503 is defined as that set of points to which a subset of the transmit antenna elements 409 can reliably send signals. In some cases, the size of the subset of either receive antenna elements 406 or transmit antenna elements 409 is at least four. In other cases, the size of the subset is 6, 10, 20, 100, or any other number that provides the desired system performance.

For the sake of simplicity, some examples are described and/or illustrated as all L receive antenna elements 406 receiving signals from all points in the uplink coverage area and/or all L transmit antenna elements 409 transmitting to all points in the downlink coverage area. Such descriptions are not intended to require that all L elements receive and/or transmit signals at a significant signal level. For example, in some cases, a subset of the L receive antenna elements 406 receives an uplink signal (e.g., a return uplink signal 525 from a user terminal 517, or a forward uplink signal 521 from an AN 515), such that the subset of receive antenna elements 406 receives the uplink signal at a signal level that is close to a peak received signal level of the uplink signal (e.g., not substantially less than the signal level corresponding to the uplink signal having the highest signal level); others of the L receive antenna elements 406 that are not in the subset receive the uplink signal at an appreciably lower level (e.g., far below the peak received signal level of the uplink signal). In some cases, the uplink signal received by each receive antenna element of a subset is at a signal level within 10 dB of a maximum signal level received by any of the receive antenna elements 406. In some cases, the subset includes at least 10% of the receive antenna elements 406. In some cases, the subset includes at least 10 receive antenna elements 406.

Similarly, on the transmit side, a subset of the L transmit antenna elements 409 transmits a downlink signal to an Earth receiver (e.g., a return downlink signal 527 to an AN 515, or a forward downlink signal 522 to a user terminal 517), such that the subset of transmit antenna elements 409 transmits the downlink signal to the receiver with a received signal level that is close to a peak transmitted signal level of the downlink signal (e.g., not substantially less than the signal level corresponding to the downlink signal having the highest received signal level); others of the L transmit antenna elements 409 that are not in the subset transmit the downlink signal such that it is received at an appreciably lower level (e.g., far below the peak transmitted signal level of the downlink signal). In some cases, the signal level is within 3 dB of a signal level corresponding to a peak gain of the transmit antenna element 409. In other cases, the signal level is within 6 dB of the signal level corresponding to a peak gain of the transmit antenna element 409. In yet other cases, the signal level is within 10 dB of the signal level corresponding to a peak gain of the transmit antenna element 409.

In some cases, the signal received by each receive antenna element 406 originates at the same source (e.g., one of the user terminals 517) due to overlap in the receive antenna pattern of each receive antenna element. However, in some cases, there may be points within the end-to-end relay coverage area at which a user terminal is located and from which not all of the receive antenna elements can receive the signal. In some such cases, there may be a significant number of receive antenna elements that do not (or cannot) receive the signal from user terminals that are within the end-to-end relay coverage area. However, as described herein, inducing multipath by the end-to-end relay 503 can rely on receiving the signal by at least two receive elements.

As shown in FIG. 6 and discussed in greater detail below, in some cases, a receive/transmit signal path 1702 comprises a receive antenna element 406, a transponder 410, and a transmit antenna element 409. In such cases, the return uplink signals 525 are received by each of a plurality of transponders 410 via a respective receive antenna element 406. The output of each receive/transmit signal path 1702 is a return downlink signal 527 corresponding to a respective composite of received return uplink signals. The return downlink signal is created by the receive/transmit signal path 1702. The return downlink signal 527 is transmitted to the array of M ANs 515. In some cases, the ANs 515 are placed at geographically distributed locations (e.g., reception or recovery locations) throughout the end-to-end relay coverage area. In some cases, each transponder 410 couples a respective one of the receive antenna elements 406 with a respective one of the transmit antenna elements 409. Accordingly, there are L different ways for a signal to get from a user terminal 517 located in a user beam coverage area 519 to a particular AN 515. This creates L paths between a user terminal 517 and an AN 515. The L paths between one user terminal 517 and one AN 515 are referred to collectively as an end-to-end return multipath channel 1908 (see FIG. 8). Accordingly receiving the return uplink signal 525 from a transmission location within a user beam coverage area 519, through the L transponders 410, creates L return downlink signals 527, each transmitted from one of the transponders 410 (i.e., through L collocated communication paths). Each end-to-end return multipath channel 1908 is associated with a vector in the uplink radiation matrix $A_r$, the payload matrix E, and a vector in downlink radiation matrix $C_r$. Note that due to antenna element coverage patterns, in some cases, some of the L paths may have relatively little energy (e.g., 6 dB, 10 dB, 20 dB, 30 dB, or any other suitable power ratio less than other paths). A superposition 1706 of return downlink 527 signal is received at each of the ANs 515 (e.g., at M geographically distributed reception or recovery locations). Each return downlink signal 527 comprises a superposition of a plurality of the transmitted return downlink signals 527, resulting in a respective composite return signal. The respective composite return signals are coupled to the return beamformer 531 (see FIGS. 5 and 29).

Figure 7:
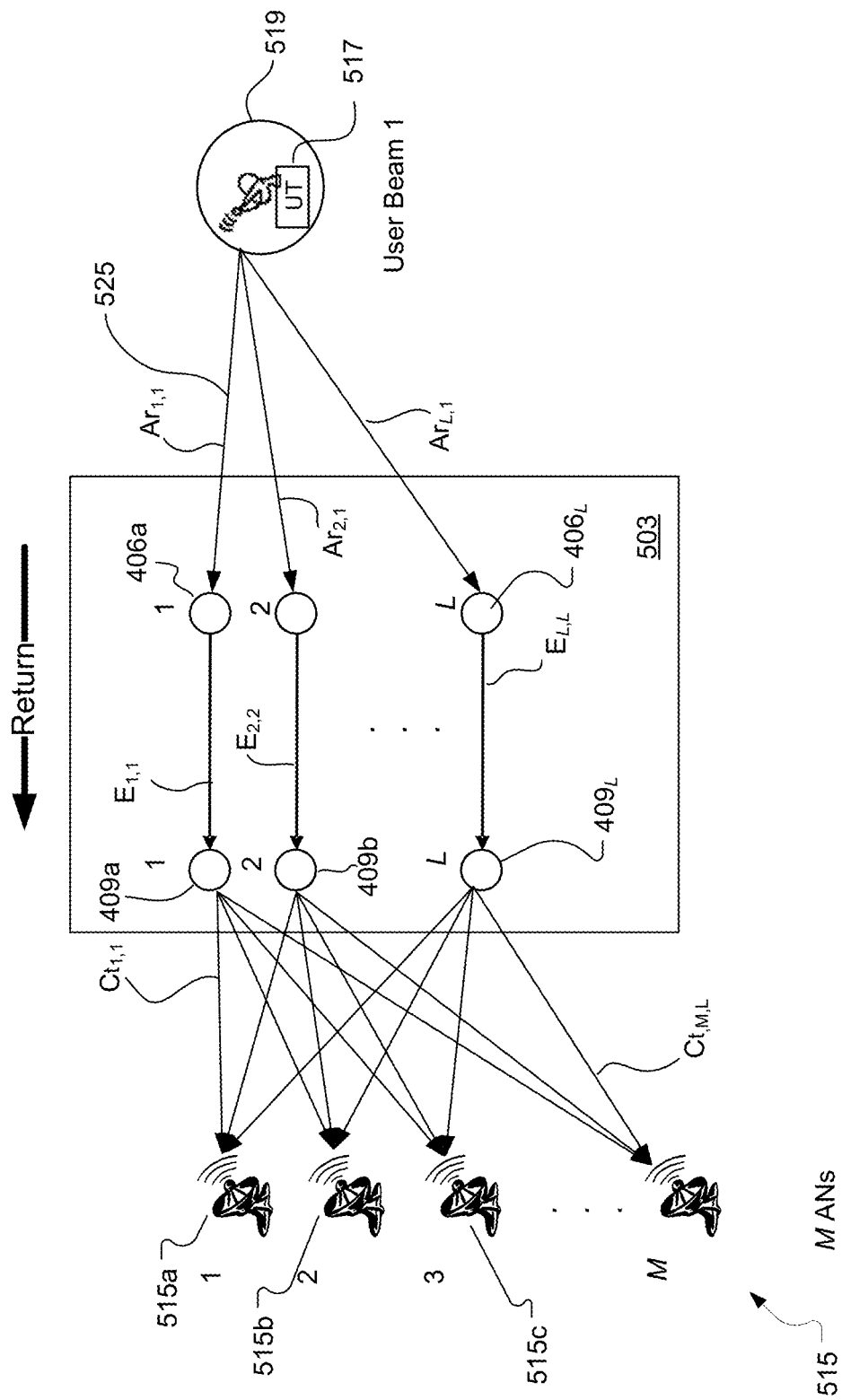
FIG. 7 is an illustration of example signal paths in the return direction from a user terminal.

FIG. 7 illustrates an example end-to-end return link 523 from one user terminal 517 located within a user beam coverage area 519 to the ANs 515. The return uplink signal 525 transmitted from the user terminal 517 is received by the array of L receive antenna elements 406 on the end-to-end relay 503 (e.g., or received by a subset of the L receive antenna elements 406).

Ar is the L×K return uplink radiation matrix. The values of the return uplink radiation matrix model the signal path from a reference location in the user beam coverage area 519 to the end-to-end relay receive antenna elements 406. For example, $Ar_{L,1}$ is the value of one element of the return uplink radiation matrix (i.e. the amplitude and phase of the path) from a reference location in the $1^{st}$ user beam coverage area 519 to the $L^{th}$ receive antenna element. In some cases, all of the values in the return uplink radiation matrix Ar may be non-zero (e.g., there is a significant signal path from the reference location to each of the receive antenna elements of the receive antenna array).

E (dimension L×L) is the payload matrix and provides the model (amplitude and phase) of the paths from the receive antenna elements 406 to the transmit antenna elements 409. A "payload" of an end-to-end relay 503, as used herein, generally includes the set of components of the end-to-end relay 503 that affect, and/or are affected by, signal communications as they are received by, relayed through, and transmitted from the end-to-end relay 503. For example, an end-to-end relay payload can include antenna elements, reflectors, transponders, etc.; but the end-to-end relay can further include batteries, solar cells, sensors, and/or other components not considered herein as part of the payload (since they do not affect signals when operating normally). Consideration of the set of components as a payload can enable mathematically modeling the overall impact of the end-to-end relay as a single payload matrix E). The predominant path from each receive antenna element 406 to each corresponding transmit antenna element 409 is modeled by the value that lies on the diagonal of the payload matrix E. Assuming there is no crosstalk between receive/transmit signal paths, the off-diagonal values of the payload matrix are zero. In some cases, the crosstalk may not be zero. Isolating the signal paths from each other will minimize crosstalk. In some cases, since the crosstalk is negligible, the payload matrix E can be estimated by a diagonal matrix. In some cases, the off-diagonal values (or any other suitable values) of the payload matrix can be treated as zero, even where there is some signal impact corresponding to those values, to reduce mathematical complexity and/or for other reasons.

Ct is the M×L return downlink radiation matrix. The values of the return downlink radiation matrix model the signal paths from the transmit antenna elements 409 to the ANs 515. For example, $Ct_{3,2}$ is the value of the return downlink radiation matrix (e.g., the gain and phase of the path) from the second transmit antenna element 409b to the third AN 515c. In some cases, all of the values of the downlink radiation matrix Ct may be non-zero. In some cases, some of the values of the downlink radiation matrix Ct are essentially zero (e.g., the antenna pattern established by a corresponding transmit antenna elements 409 of the transmit antenna array is such that the transmit antenna element 409 does not transmit useful signals to some of the ANs 515).

As can be seen in FIG. 7, the end-to-end return multipath channel from a user terminal 517 in a particular user beam coverage area 519 to a particular AN 515 is the sum of the L different paths. The end-to-end return multipath channel has multipath induced by the L unique paths through the transponders 410 in the end-to-end relay. As with many multipath channels, the paths' amplitudes and phases can add up favorably (constructively) to produce a large end-to-end channel gain or unfavorably (destructively) to produce a low end-to-end channel gain. When the number of different paths, L, between a user terminal and an AN is large, the end-to-end channel gain can have a Rayleigh distribution of the amplitude. With such a distribution, it is not uncommon to see some end-to-end channel gains from a particular user terminal 517 to a particular AN 515 that are 20 dB or more below the average level of the channel gain from a user terminal 517 to an AN 515. This end-to-end beamforming system intentionally induces a multipath environment for the end-to-end path from any user terminal to any AN.

Figure 8:
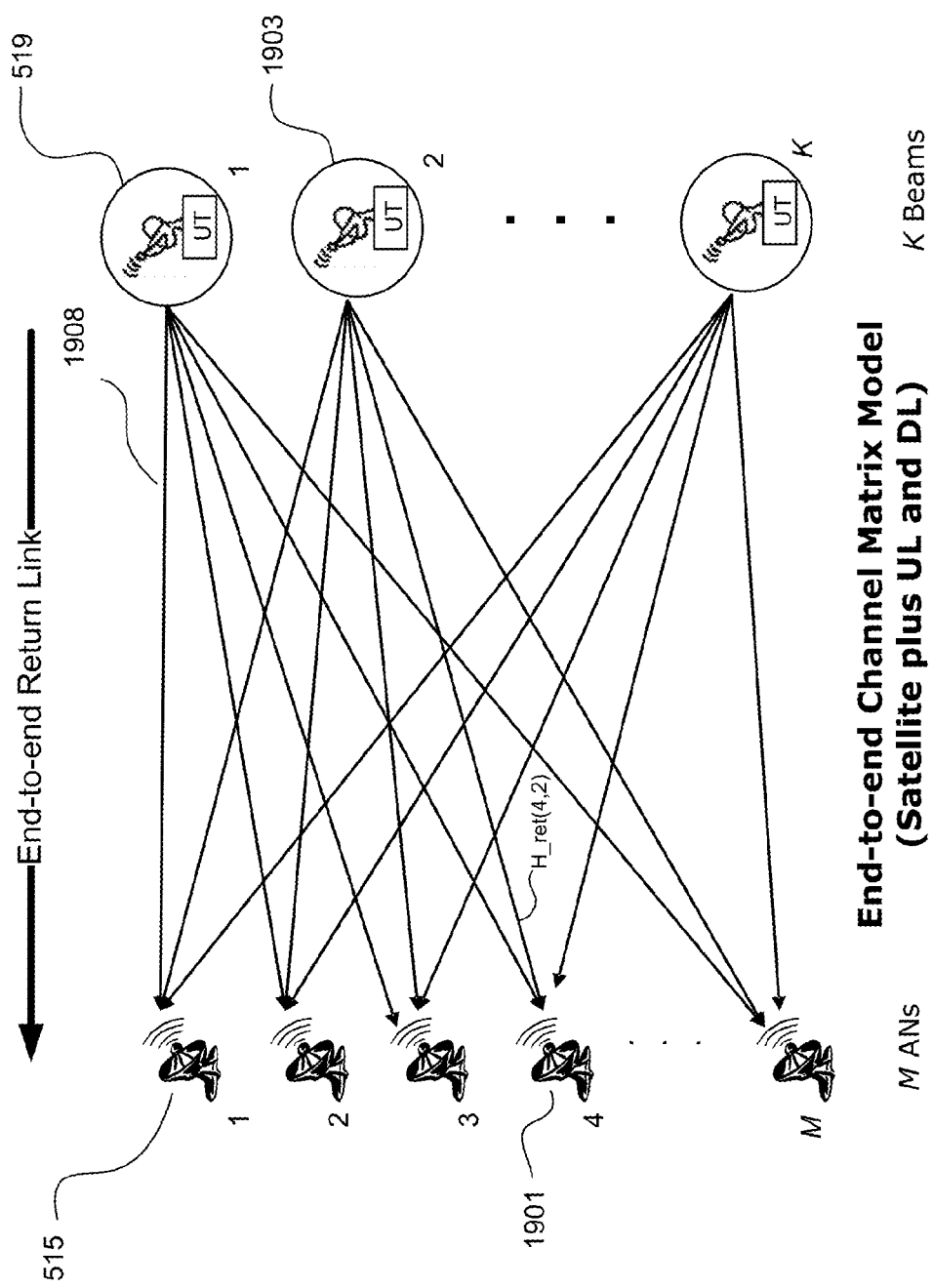
FIG. 8 is a simplified illustration of an example end-to-end return channel matrix model.

FIG. 8 is a simplified illustration of an example model of all the end-to-end return multipath channels from user beam coverage areas 519 to ANs 515. There are M×K such end-to-end return multipath channels in the end-to-end return link (i.e., M from each of the K user beam coverage areas 519). Channels 1908 connect user terminals in one user beam coverage area 519 to one AN 515 over L different receive/transmit signal paths 1702, each path going through a different one of the L receive/transmit signal paths (and associated transponders) of the relay. While this effect is referred to as "multipath" herein, this multipath differs from conventional multipath (e.g., in a mobile radio or multiple-input multiple-output (MIMO) system), as the multiple paths herein are intentionally induced (and, as described herein, affected) by the L receive/transmit signal paths. Each of the M×K end-to-end return multipath channels that originate from a user terminal 517 within a particular user beam coverage area 519 can be modeled by an end-to-end return multipath channel. Each such end-to-end return multipath channel is from a reference (or recovery) location within the user beam coverage area 519 to one of the ANs 515.

Each of the M×K end-to-end return multipath channels 1908 may be individually modeled to compute a corresponding element of an M×K return channel matrix Hret. The return channel matrix Hret has K vectors, each having dimensionality equal to M, such that each vector models the end-to-end return channel gains for multipath communications between a reference location in one of a respective K user beam coverage areas and the M ANs 515. Each end-to-end return multipath channel couples one of the M ANs 515 with a reference location within one of K return user beams via L transponders 410 (see FIG. 7). In some cases, only a subset of the L transponders 410 on the end-to-end relay 503 is used to create the end-to-end return multipath channel (e.g., only a subset is considered to be in the signal path by contributing significant energy to the end-to-end return multipath channel). In some cases, the number of user beams K is greater than the number of transponders L that is in the signal path of the end-to-end return multipath channel. Furthermore, in some cases, the number of ANs M is greater than the number of transponders L that is in the signal path of the end-to-end return multipath channel 1908. In an example, the element $Hret_{4,2}$ of the return channel matrix Hret is associated with the channel from a reference location in the second user beam coverage area 1903 to the fourth AN 1901. The matrix Hret models the end-to-end channel as the product of the matrices Ct×E×Ar (see FIG. 6).

Each element in Hret models the end-to-end gain of one end-to-end return multipath channel 1908. Due to the multipath nature of the channel, the channel can be subject to a deep fade. Return user beams may be formed by the CPS 505. The CPS 505 computes return beam weights based on the model of these M×K signal paths and forms the return user beams by applying the return beam weights to the plurality of composite return signals, each weight being computed for each end-to-end return multipath channel that couples the user terminals 517 in one user beam coverage area with one of the plurality of ANs 515. In some cases, the return beam weights are computed before receiving the composite return signal. There is one end-to-end return link from each of the K user beam coverage areas 519 to the M ANs 515. The weighting (i.e., the complex relative phase/amplitude) of each of the signals received by the M ANs 515 allows those signals to be combined to form a return user beam using the beamforming capability of the CPS 505 within the ground segment 502. The computation of the beam weight matrix is used to determine how to weight each end-to-end return multipath channel 1908, to form the plurality of return user beams, as described in more detail below. User beams are not formed by directly adjusting the relative phase and amplitude of the signals transmitted by one end-to-end relay antenna element with respect to the phase and amplitude of the signals transmitted by the other end-to-end relay antenna elements. Rather, user beams are formed by applying the weights associated with the M×K channel matrix to the M AN signals. It is the plurality of ANs that provide the receive path diversity, single transmitter (user terminal) to multiple receivers (ANs), to enable the successful transmission of information from any user terminal in the presence of the intentionally induced multipath channel.

Forward Data

Figure 9:
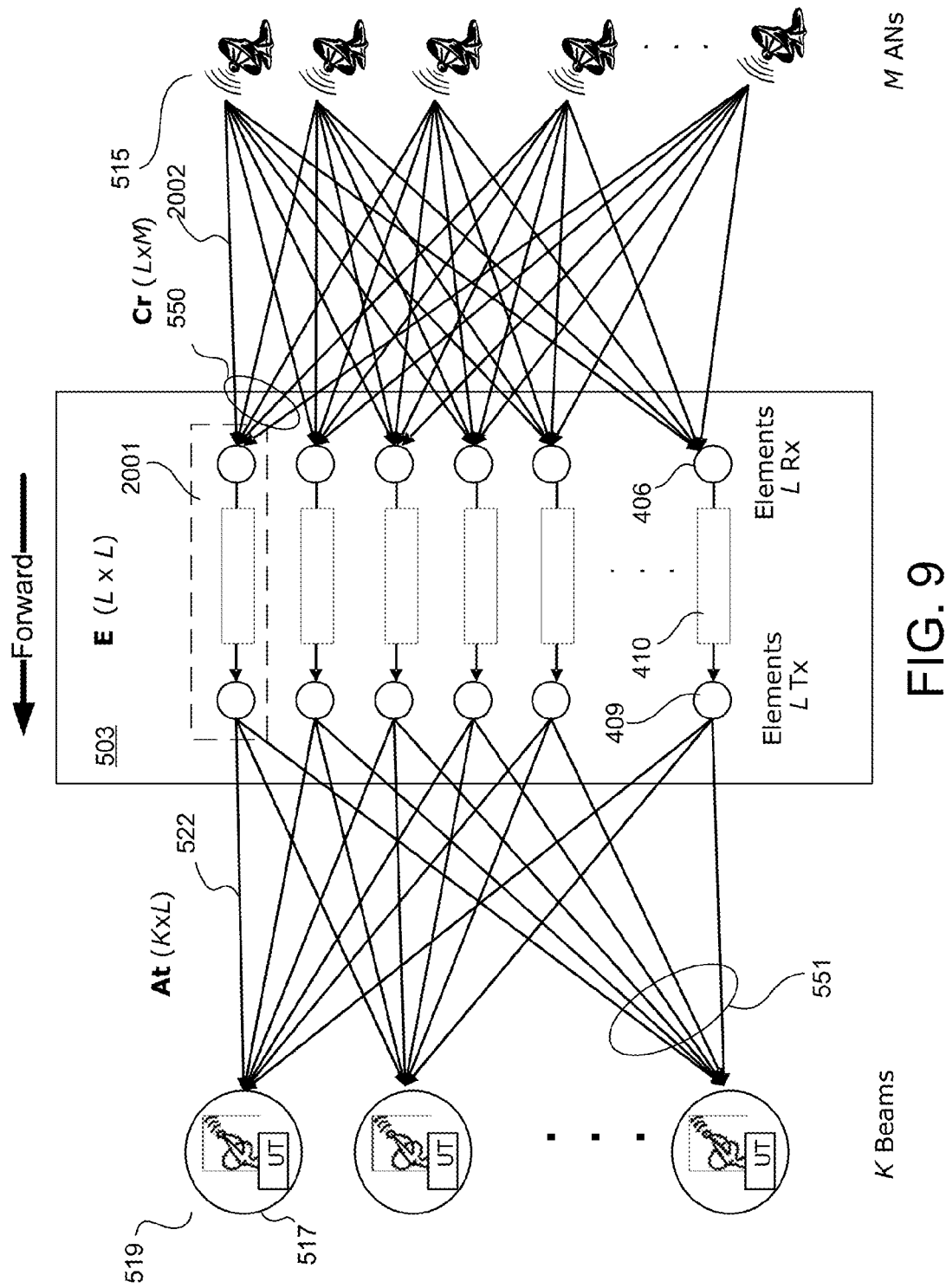
FIG. 9 is an illustration of example signal paths in the forward direction.

FIG. 9 is an illustration of an example model of signal paths for signals carrying forward data on the end-to-end forward link 501. Forward data is the data that flows from ANs 515 to user terminals 517. Signals in this figure flow from right to left. The signals originate with M ANs 515, which are located in the footprint of the end-to-end relay 503. There are K user beam coverage areas 519. Signals from each AN 515 are relayed by L receive/transmit signal paths 2001.

The receive/transmit signal paths 2001 transmit a relayed signal to user terminals 517 in user beam coverage areas 519. Accordingly, there may be L different ways for a signal to get from a particular AN 515 to a user terminal 517 located in a user beam coverage area 519. This creates L paths between each AN 515 and each user terminal 517. Note that due to antenna element coverage patterns, some of the L paths may have less energy than other paths.

Figure 10:
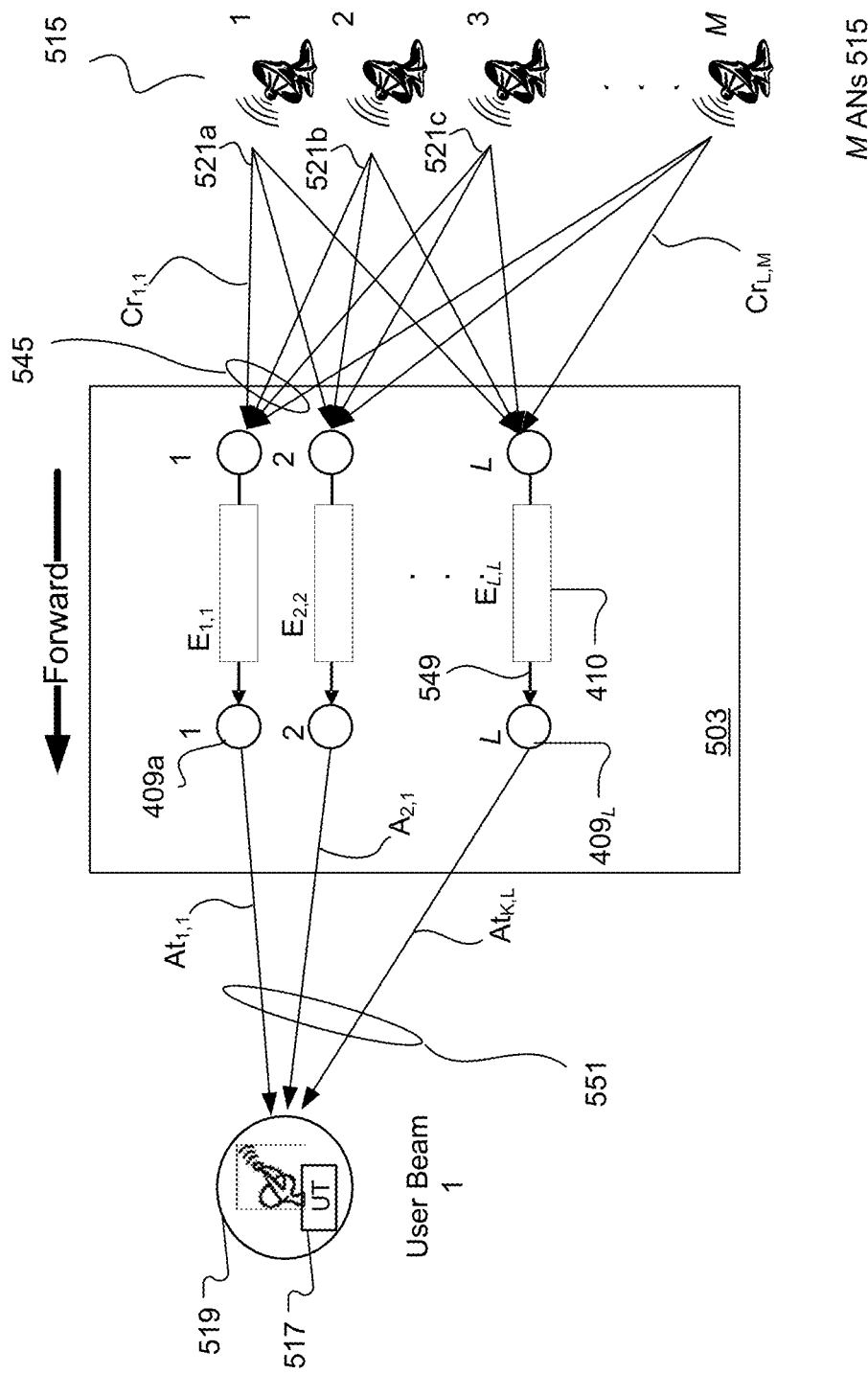
FIG. 10 is an illustration of example signal paths in the forward direction to a user terminal located within a user beam coverage area.

FIG. 10 illustrates an example end-to-end forward link 501 that couples a plurality of access nodes at geographically distributed locations with a user terminal 517 in a user beam (e.g., located at a recovery location within a user beam coverage area 519) via an end-to-end relay 503. In some cases, the forward data signal is received at a beamformer prior to generating forward uplink signals. A plurality of forward uplink signals is generated at the beamformer and communicated to the plurality of ANs 515. For example, each AN 515 receives a unique (beam weighted) forward uplink signal generated according to beam weights corresponding to that AN 515. Each AN 515 has an output that transmits a forward uplink signal via one of M uplinks. Each forward uplink signal comprises a forward data signal associated with the forward user beam. The forward data signal is "associated with" the forward user beam, since it is intended to be received by user terminals 517 serviced by the user beam. In some cases, the forward data signal comprises two or more user data streams. The user data streams can be multiplexed together by time-division or frequency-division multiplexing, etc. In some cases, each user data stream is for transmission to one or more of a plurality of user terminals within the same forward user beam.

As is discussed in greater detail below, each forward uplink signal is transmitted in a time-synchronized manner by its respective transmitting AN 515. The forward uplink signals 521 transmitted from the ANs 515 are received by a plurality of transponders 410 on the end-to-end relay 503 via receive antenna elements 406 on the end-to-end relay 503. The superposition 550 of the forward uplink signals 521 received from geographically distributed locations creates a composite input forward signal 545. Each transponder 410 concurrently receives a composite input forward signal 545. However, each transponder 410 will receive the signals with slightly different timing due to the differences in the location of the receive antenna element 406 associated with each transponder 401.

Cr is the L×M forward uplink radiation matrix. The values of the forward uplink radiation matrix model the signal path (amplitude and phase) from the ANs 515 to the receive antenna elements 406. E is the L×L payload matrix and provides the model of the transponder signal paths from the receive antenna elements 406 to the transmit antenna elements 409. The direct path gain from each receive antenna element 406 through a corresponding one of a plurality of transponders to each corresponding transmit antenna element 409 is modeled by the diagonal values of the payload matrix. As noted above with respect to the return link, assuming there is no cross-talk between antenna elements, the off-diagonal elements of the payload matrix are zero. In some cases, the crosstalk may not be zero. Isolating the signal paths from each other will minimize crosstalk. In this example, each of the transponders 410 couples a respective one of the receive antenna elements 406 with a respective one of the transmit antenna elements 409. Accordingly, a forward downlink signal 522 output from each of the transponders 410 is transmitted by each of the plurality of transponders 410 (see FIG. 9) via the transmit antenna elements 409, such that the forward downlink signals 522 form a forward user beam (by constructively and destructively superposing in desired geographic recovery locations to form the beam). In some cases, a plurality of user beams is formed, each corresponding to a geographic user beam coverage area 519 that services a respective set of user terminals 517 within the user beam coverage area 519. The path from the first transmit antenna element 409a (see FIG. 10) to a reference (or recovery) location in the first user beam coverage area 519 is given in the $At_{11}$ value of the forward downlink radiation matrix. As noted with regard to the return link, this end-to-end beamforming system intentionally induces a multipath environment for the end-to-end path from any AN 515 to any user terminal 517. In some cases, a subset of the transmit antenna elements 409 transmits forward downlink signals 522 with significant energy to a user terminal 517. The user terminal 517 (or, more generally, a reference or recovery location in the user beam coverage area 519 for receiving and/or recovery) receives the plurality of forward downlink signals 522 and recovers at least a portion of the forward data signal from the received plurality of forward downlink signals 522. The transmitted forward downlink signals 522 may be received by the user terminal 517 at a signal level that is within 10 dB of a maximum signal level from any of the other signals transmitted by the transmit antenna elements 409 within the subset. In some cases, the subset of transmit antenna elements includes at least 10% of the plurality of transmit antenna elements present in the end-to-end relay 503. In some cases, the subset of transmit antenna elements include at least 10 transmit antenna elements, regardless of how many transmit antenna elements 409 are present in the end-to-end relay 503. In one case, receiving the plurality of forward downlink signals comprises receiving a superposition 551 of the plurality of forward downlink signals.

Figure 11:
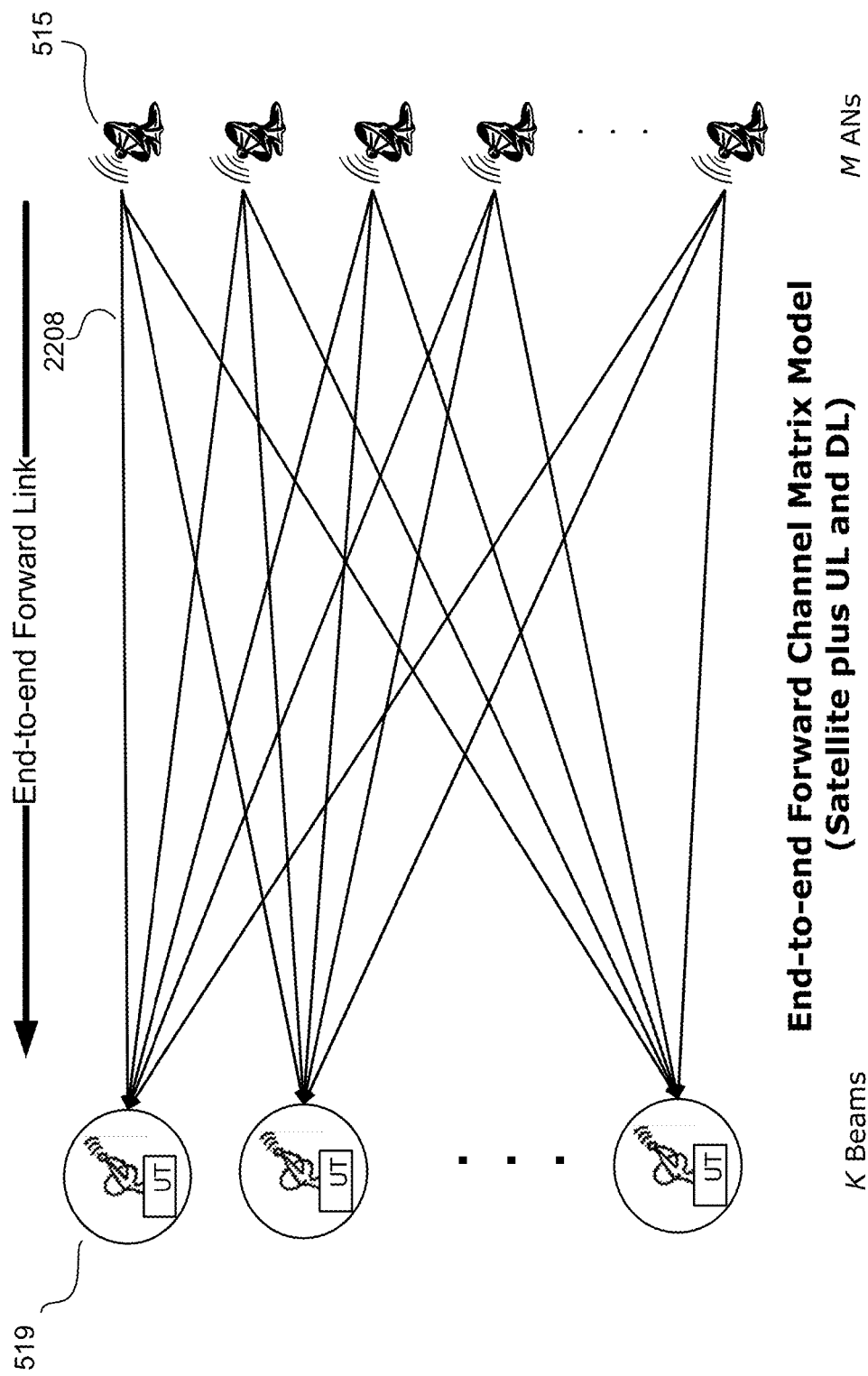
FIG. 11 is a simplified illustration of an example end-to-end forward channel matrix model.

FIG. 11 is a simplified illustration of a model of all the end-to-end forward multipath channels 2208 from the M ANs 515 to the K user beam coverage areas 519. As shown in FIG. 11, there is an end-to-end forward multipath channel 2208 that couples each AN 515 to each user beam coverage area 519. Each channel 2208 from one AN 515 to one user beam coverage area 519 has multipath induced as a result of L unique paths from the AN 515 through the plurality of transponders to the user beam coverage area 519. As such, the K×M multipath channels 2208 may be individually modeled and the model of each serves as an element of a K×M forward channel matrix Hfwd. The forward channel matrix Hfwd has M vectors, each having dimensionality equal to K, such that each vector models the end-to-end forward gains for multipath communications between a respective one of the M ANs 515 and reference (or recovery) locations in K forward user beam coverage areas. Each end-to-end forward multipath channel couples one of the M ANs 515 with user terminals 517 serviced by one of K forward user beams via L transponders 410 (see FIG. 10). In some cases, only a subset of the L transponders 410 on the end-to-end relay 503 are used to create the end-to-end forward multipath channel (i.e., are in the signal path of the end-to-end forward multipath channel). In some cases, the number of user beams K is greater than the number of transponders L that are in the signal path of the end-to-end forward multipath channel. Furthermore, in some cases, the number of ANs M is greater than the number of transponders L that are in the signal path of the end-to-end forward multipath channel.

Hfwd may represent the end-to-end forward link as the product of matrices At×E×Cr. Each element in Hfwd is the end-to-end forward gain due to the multipath nature of the path and can be subject to a deep fade. An appropriate beam weight may be computed for each of the plurality of end-to-end forward multipath channels 2208 by the CPS 505 within the ground segment 502 to form forward user beams from the set of M ANs 515 to each user beam coverage area 519. The plurality of ANs 515 provide transmit path diversity, by using multiple transmitters (ANs) to a single receiver (user terminal), to enable the successful transmission of information to any user terminal 517 in the presence of the intentionally induced multipath channel.

Combined Forward and Return Data

Figure 12:
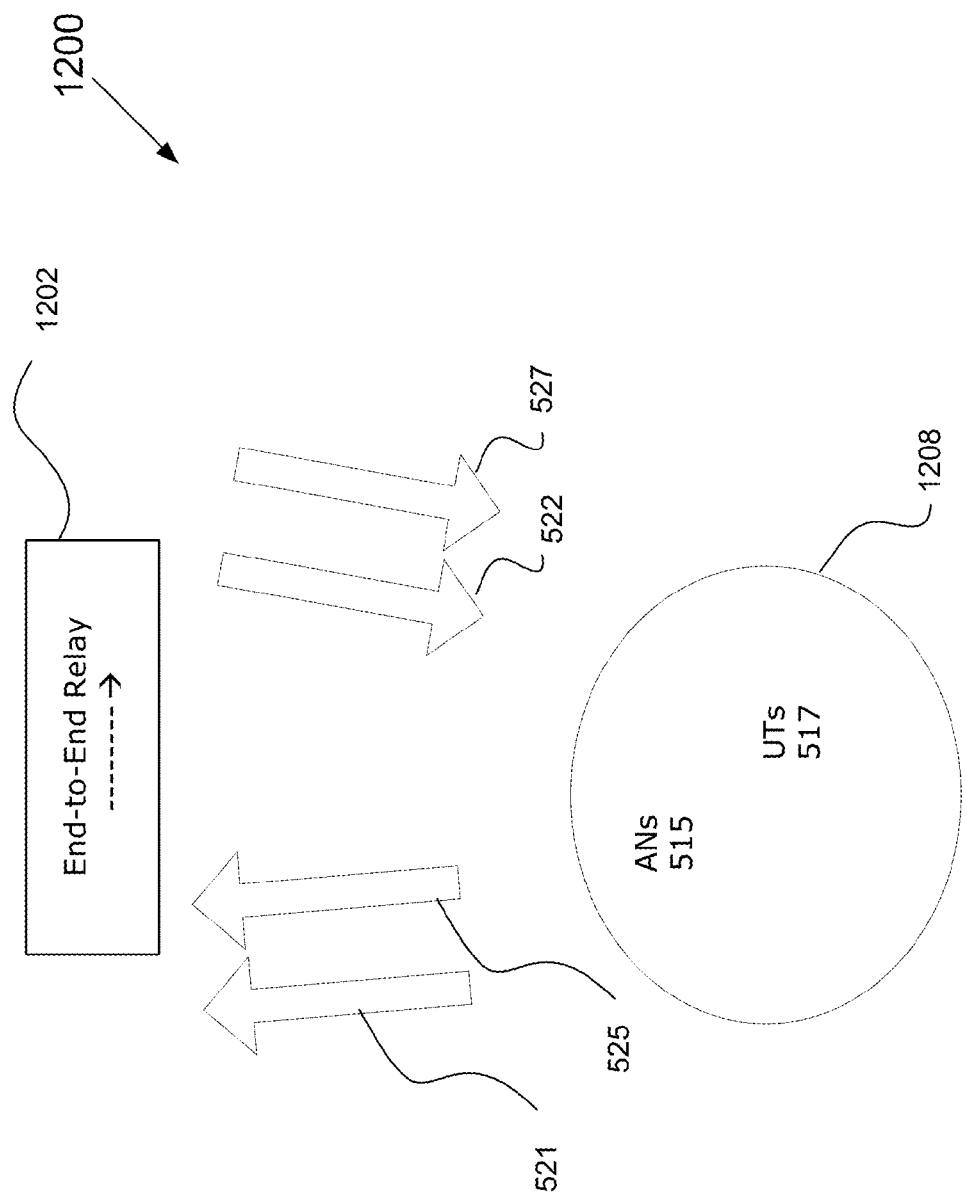
FIG. 12 is an illustration of an example end-to-end relay satellite supporting forward and return data.

FIG. 12 illustrates an example end-to-end relay supporting both forward and return communications. In some cases, the same end-to-end relay signal paths (e.g., set of receive antenna elements, transponders, and transmit antenna elements) may be used for both the end-to-end forward link 501 and the end-to-end return link 523. Some other cases include forward link transponders and return link transponders, which may or may not share receive and transmit antenna elements. In some cases, the system 1200 has a plurality of ANs and user terminals that are located in the same general geographic region 1208 (which may be, for example, a particular state, an entire country, a region, an entire visible area, or any other suitable geographic region 1208). A single end-to-end relay 1202 (disposed on a satellite or any other suitable end-to-end relay) receives forward uplink signals 521 from ANs and transmits forward downlink signals 522 to user terminals. At alternate times, or on alternate frequencies, the end-to-end relay 1202 also receives return uplink signals 525 from the user terminals and transmits return downlink signals 527 to the ANs. In some cases, the end-to-end relay 1202 is shared between forward and return data using techniques such as time domain duplexing, frequency domain duplexing, and the like. In some cases, time domain duplexing between forward and return data uses the same frequency range: forward data is transmitted during different (non-overlapping) time intervals than those used for transmitting return data. In some cases, with frequency domain duplexing, different frequencies are used for forward data and return data, thereby permitting concurrent, non-interfering transmission of forward and return data.

Figure 13:
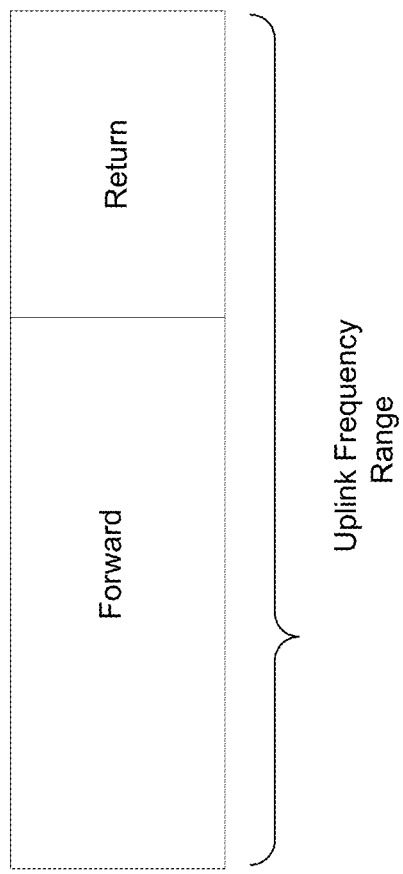
FIG. 13 is an illustration of an example of an uplink frequency range being divided into two portions.

FIG. 13 is an illustration of an uplink frequency range being divided into two portions. The lower-frequency (left) portion of the range is allocated to the forward uplink and the upper-frequency (right) portion of the range is allocated to the return uplink. The uplink range may be divided into multiple portions of either forward or return data.

Figure 14:
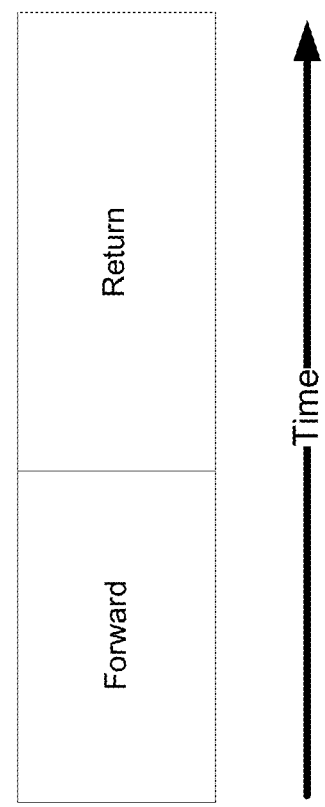
FIG. 14 is an illustration of an example end-to-end relay being time multiplexed between forward data and return data.

FIG. 14 is an illustration of the forward data and return data being time division multiplexed. A data frame period is shown in which forward data is transported during the first time interval of the frame, while return data is transported during the last time interval of the frame. The end-to-end relay receives from one or more access nodes during a first (forward) receive time interval and from one or more user terminals during a second (return) receive time interval that doesn't overlap the first receive time interval. The end-to-end relay transmits to one or more user terminals during a first (forward) transmit time interval and to one or more access nodes during a second (return) transmit time interval that doesn't overlap the first receive time interval. The data frame may be repeated or may change dynamically. The frame may be divided into multiple (e.g., non-contiguous) portions for forward and return data.

End-to-End Beamforming Satellites

In some cases, the end-to-end relay 503 is implemented on a satellite, so that the satellite is used to relay the signals from the ANs (which can be referred to as satellite access nodes (SANs) in such cases) to the user terminals and vice versa. In some cases, the satellite is in geostationary orbit. An example satellite operating as an end-to-end relay has an array of receive antenna elements, an array of transmit antenna elements, and a number of transponders that connect the receive antenna elements to the transmit antenna elements. The arrays have a large number of antenna elements with overlapping antenna element coverage areas, similar to traditional single link phased array antennas. It is the overlapping antenna element coverage areas on both the transmit antenna elements and receive antenna elements that create the multipath environment previously described. In some cases, the antenna patterns established by the corresponding antenna elements, and those that result in the overlapping antenna element coverage areas (e.g., overlapping component beam antenna patterns), are identical. For the purposes of this disclosure, the term "identical" means that they follow essentially the same distribution of power over a given set of points in space, taking the antenna element as the point of reference for locating the points in space. It is very difficult to be perfectly identical. Therefore, patterns that have relatively small deviations from one pattern to another are within the scope of "identical" patterns. In other cases, receive component beam antenna patterns may not be identical, and in fact may be significantly different. Such antenna patterns may yet result in overlapping antenna element coverage areas, however, those resulting coverage areas will not be identical.

Antenna types include, but are not limited to, array fed reflectors, confocal arrays, direct radiating arrays and other forms of antenna arrays. Each antenna can be a system including additional optical components to aid in the receipt and/or transmission of signals, such as one or more reflectors. In some cases, a satellite includes components that assist in system timing alignment and beamforming calibration.

Figure 15:
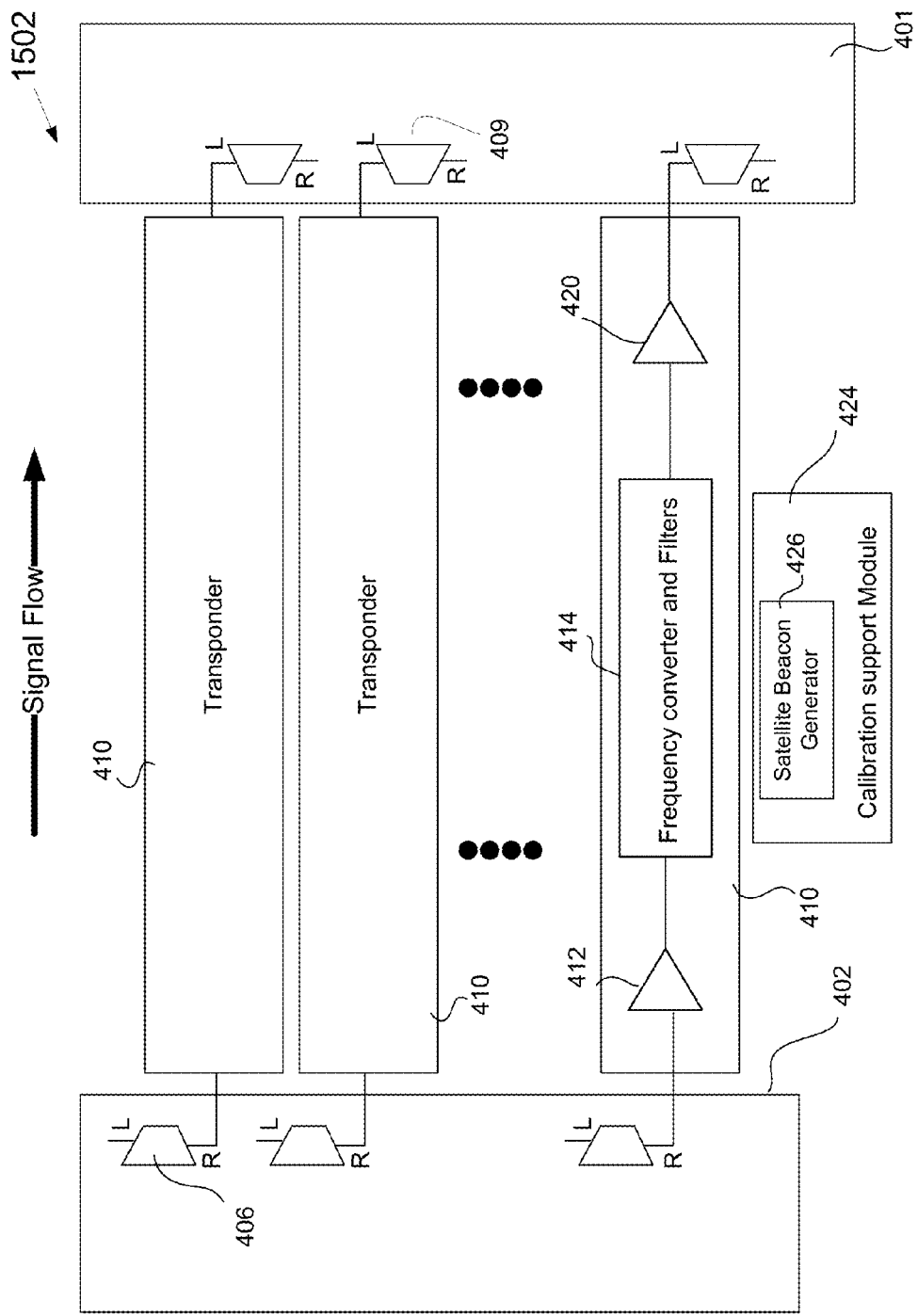
FIG. 15 is a block diagram of components of an example end-to-end relay implemented as a satellite.

FIG. 15 is a diagram of an example satellite 1502 that can be used as an end-to-end relay 503. In some cases, the satellite 1502 has an array fed reflector transmit antenna 401 and an array fed reflector receive antenna 402. The receive antenna 402 comprises a receive reflector (not shown) and an array of receive antenna elements 406. The receive antenna elements 406 are illuminated by the receive reflector. The transmit antenna 401 comprises a transmit reflector (not shown) and an array of transmit antenna elements 409. The transmit antenna elements 409 are arranged to illuminate the transmit reflector. In some cases, the same reflector is used for both receive and transmit. In some cases, one port of the antenna element is used for receiving and another port for transmission. Some antennas have the ability to distinguish between signals of different polarizations. For example, an antenna element can include four waveguide ports for right-hand circular polarization (RHCP) receive, left-hand circular polarization (LHCP) receive, RHCP transmit, and LHCP transmit, respectively. In some cases, dual polarizations may be used to increase capacity of the system; in other cases, single polarization may be used to reduce interference (e.g., with other systems using a different polarization).

The example satellite 1502 also comprises a plurality of transponders 410. A transponder 410 connects the output from one receive antenna element 406 to the input of a transmit antenna element 409. In some cases, the transponder 410 amplifies the received signal. Each receive antenna element outputs a unique received signal. In some cases, a subset of receive antenna elements 406 receive a signal from an Earth transmitter, such as either a user terminal 517 in the case of a return link signal or an AN 515 in the case of a forward link signal. In some of these cases, the gain of each receive antenna element in the subset for the received signal is within a relatively small range. In some cases, the range is 3 dB. In other cases, the range is 6 dB. In yet other cases, the range is 10 dB. Accordingly, the satellite will receive a signal at each of a plurality of receive antenna elements 406 of the satellite, the communication signal originating from an Earth transmitter, such that a subset of the receive antenna elements 406 receives the communication signal at a signal level that is not substantially less than a signal level corresponding to a peak gain of the receive antenna element 406.

In some cases, at least 10 transponders 410 are provided within the satellite 1502. In another case, at least 100 transponders 410 are provided in the satellite 1502. In yet another case, the number of transponders per polarity may be in the range of 2, 4, 8, 16, 32, 64, 128, 256, 512, 1024 or numbers in-between or greater. In some cases, the transponder 410 includes a low noise amplifier (LNA) 412, a frequency converter and associated filters 414 and a power amplifier (PA) 420. In some cases in which the uplink frequency and downlink frequency are the same, the transponder does not include a frequency converter. In other cases, the plurality of receive antenna elements operate at a first frequency. Each receive antenna element 406 is associated with one transponder 410. The receive antenna element 406 is coupled to the input of the LNA 412. Accordingly, the LNA independently amplifies the unique received signal provided by the receive antenna element associated with the transponder 410. In some cases, the output of the LNA 412 is coupled to the frequency converter 414. The frequency converter 414 converts the amplified signal to a second frequency.

The output of the transponder is coupled to an associated one of the transmit antenna elements. In these examples, there is a one to one relationship between a transponder 410, an associated receive antenna element 406, and an associated transmit antenna element 409, such that the output of each receive antenna element 406 is connected to the input of one and only one transponder and the output of that transponder is connected to the input of one and only one transmit antenna element.

Figure 16:
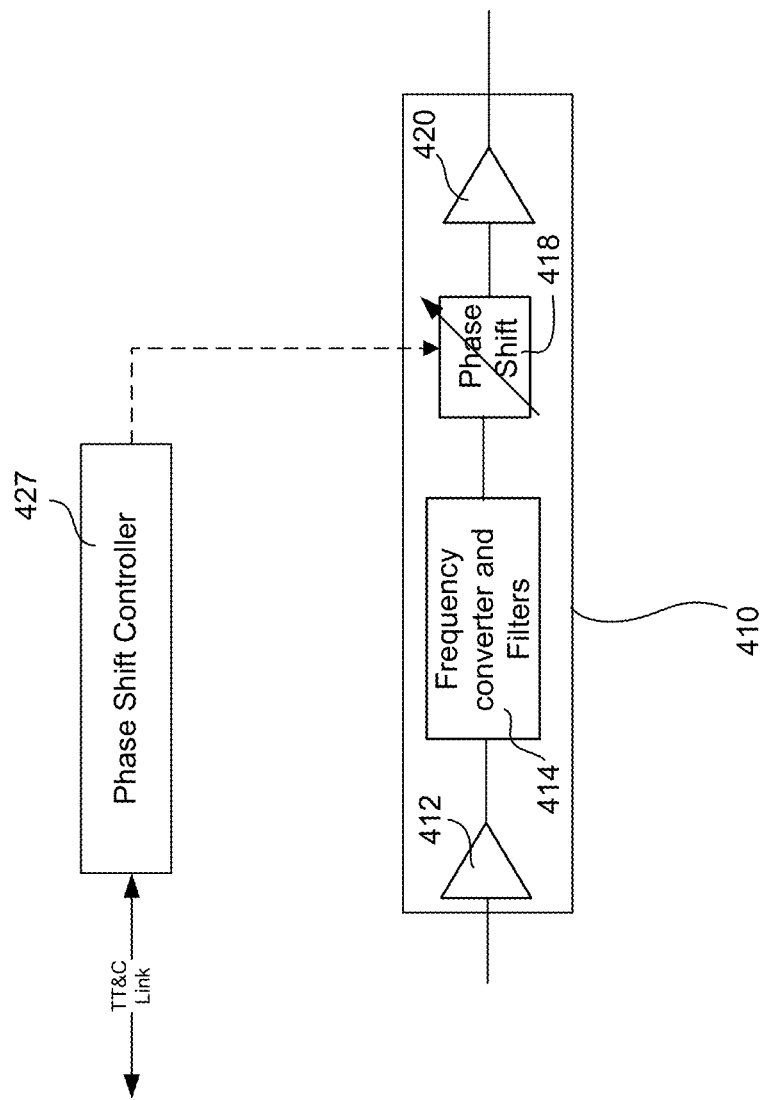
FIG. 16 is a block diagram of an example transponder including a phase shifter.

FIG. 16 is an illustration of an example transponder 410. The transponder 410 can be an example of a transponder of an end-to-end relay 503, as described above (e.g., the satellite 1502 of FIG. 15). In this example, the transponder includes a phase shifter 418 in addition to the LNA 412, frequency converter and associated filters 414, and power amplifier (PA) of transponder 410. As illustrated in FIG. 16, the example transponder 410 can also be coupled with a phase shift controller 427. For example, the phase shift controller 427 can be coupled (directly or indirectly) with each of some or all of the transponders of an end-to-end relay 503, so that the phase shift controller 427 can individually set the phases for each transponder. The phase shifters may be helpful for calibration, for example, as discussed below.

Antennas

To create the multipath environment, antenna element coverage areas can overlap with antenna element coverage areas of at least one other antenna element of the same polarity, frequency, and type (transmit or receive, respectively). In some cases, a plurality of receive component beam antenna patterns, operable at the same receive polarization and receive frequency (e.g., having at least a portion of the receive frequency in common), overlap with one another. For example, in some cases, at least 25% of the receive component beam antenna patterns, operable at the same receive polarization and receive frequency (e.g., having at least a portion of the receive frequency in common), overlap with at least five other receive component beam antenna patterns of the receive antenna elements. Similarly, in some cases, at least 25% of the transmit component beam antenna patterns, operable at the same transmit polarization and transmit frequency (e.g., having at least a portion of the transmit frequency in common), overlap with at least five other transmit component beam antenna patterns. The amount of overlap will vary from system to system. In some cases, at least one of the receive antenna elements 406 has component beam antenna patterns that overlap with the antenna patterns of other receive antenna elements 406 operable at the same receive frequency (e.g., having at least a portion of the receive frequency in common) and same receive polarization. Therefore, at least some of the plurality of receive antenna elements are capable of receiving the same signals from the same source. Similarly, at least one of the transmit antenna elements 409 has a component beam antenna pattern that overlaps with the antenna patterns of other transmit antenna elements 409 operable at the same transmit frequency (e.g., having at least a portion of the transmit frequency in common) and transmit polarization. Therefore, at least some of the plurality of transmit antenna elements are capable of transmitting signals having the same frequency at the same polarization to the same receiver. In some cases, overlapping component beam antenna patterns may have gains that differ by less than 3 dB (or any other suitable value) over a common geographic area. The antenna elements, whether receive or transmit, may have a broad component beam antenna pattern, and thus a relatively broad antenna element coverage area. In some cases, signals transmitted by an Earth transmitter, such as a user terminal 517 or access node 515, are received by all of the receive antenna elements 406 of the end-to-end relay (e.g., satellite). In some cases, a subset of the elements 406 receives the signals from an Earth transmitter. In some cases, the subset includes at least 50% of the receive antenna elements. In other cases, the subset includes at least 75% of the receive antenna elements. In still other cases, the subset includes at least 90% (e.g., up to and including all) of the receive antenna elements. Different subsets of the receive antenna elements 406 may receive signals from different Earth transmitters. Similarly, in some cases, a subset of the elements 409 transmits signals that may be received by a user terminal 517. In some cases, the subset includes at least 50% of the transmit antenna elements. In other cases, the subset includes at least 75% of the transmit antenna elements. In still other cases, the subset includes at least 90% (e.g., up to and including all) of the transmit antenna elements. Different subsets of the elements 409 may transmit signals that are received by different user terminals. Furthermore, user terminals may be within several formed user beam coverage areas 519. For the purpose of this disclosure, an antenna pattern is a pattern of distribution of energy transmitted to, or received from, an antenna. In some cases, the energy may be directly radiated from/to the antenna element. In other cases, the energy from one or more transmit antenna elements may be reflected by one or more reflectors that shape the antenna element pattern. Similarly, a receive element may receive energy directly, or after the energy has reflected off one or more reflectors. In some cases, antennas can be made up of several elements, each having a component beam antenna pattern that establishes a corresponding antenna element coverage area. Similarly, all or a subset of receive and transmit antenna elements that receive and transmit signals to ANs 515 may overlap, such that a plurality of receive antenna elements receives signals from the same AN 515 and/or a plurality of transmit antenna elements transmits signals to the same AN 515.

Figure 17:
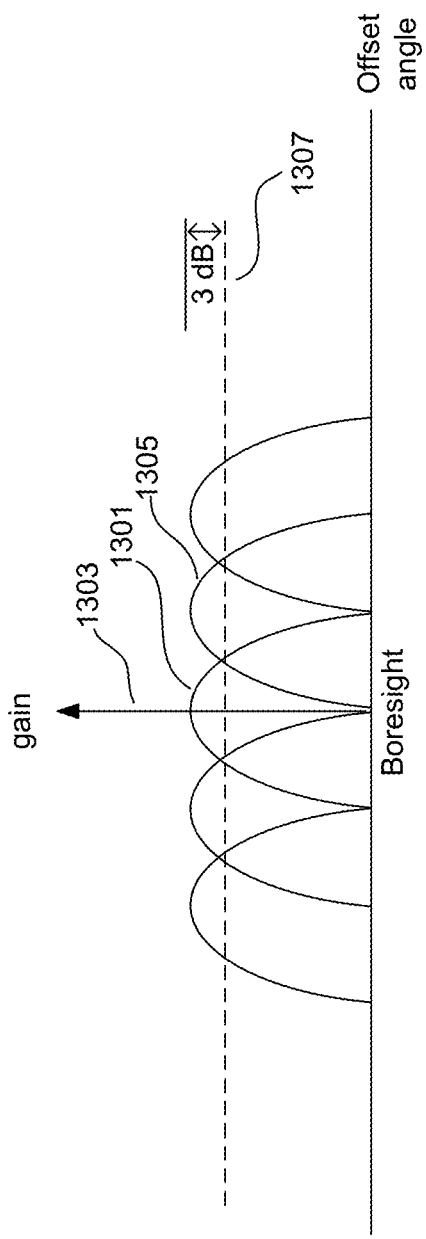
FIG. 17 is a graph of example signal strength patterns of several antenna elements.

FIG. 17 is an illustration of component beam antenna patterns produced by several antenna elements (either receive antenna elements 406, or transmit antenna elements 409) that intersect at the 3 dB points. The component beam antenna pattern 1301 of a first antenna element has peak component beam antenna gain along the boresight 1303. The component beam antenna pattern 1301 is shown to attenuate about 3 dB before it intersects with the component beam antenna pattern 1305. Since each pair of two adjacent component beam antenna patterns overlap about the 3 dB line 1307 for only a relatively small portion of the component beam antenna pattern, the antenna elements that produce these component beam antenna patterns are considered not to be overlapping.

Figure 18:
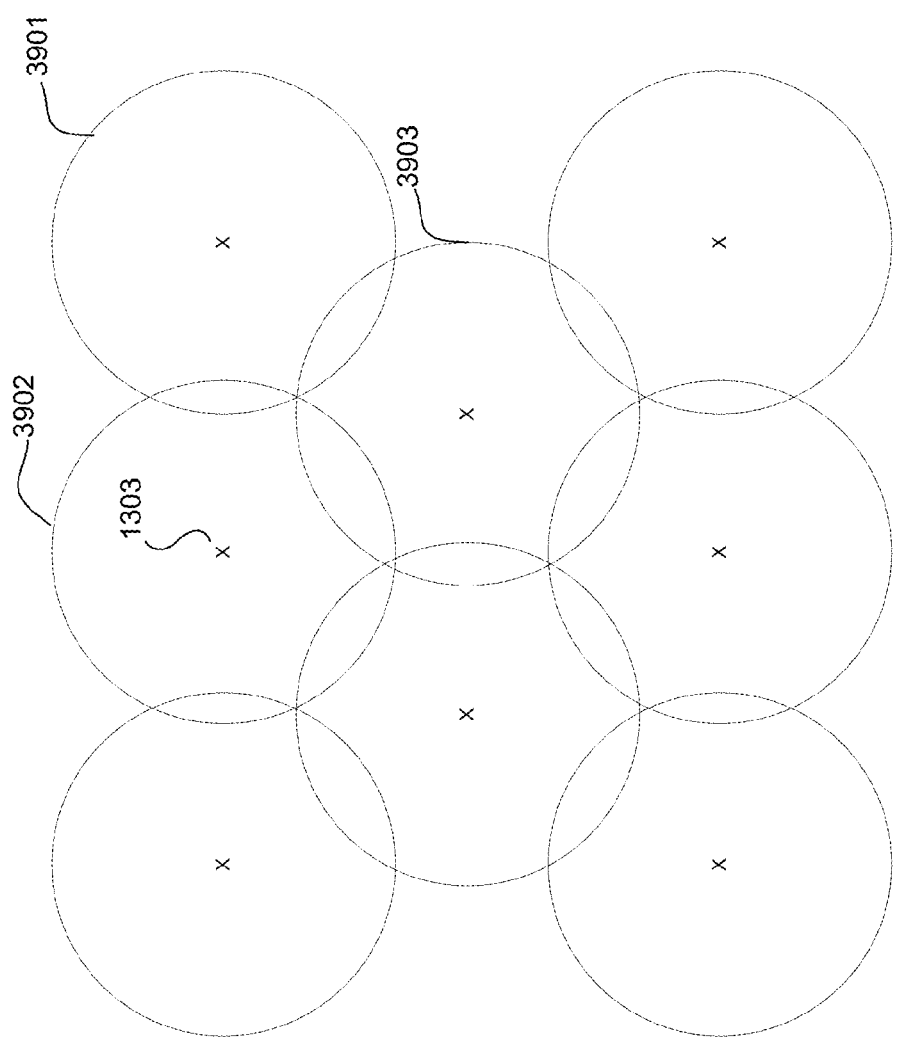
FIG. 18 is an illustration of example 3 dB signal strength contours for several antenna elements.

FIG. 18 shows idealized 3 dB antenna contours 3901, 3902, 3903 of several elements 406, 409 with the peak gain designated with the letter 'x'. The contours 3901, 3902, 3903 are referred to herein as "idealized" because the contours are shown as circular for the sake of simplicity.

However, the contours 3901, 3902, 3903 need not be circular. Each contour indicates the place at which the transmitted or received signal is 3 dB below the peak level. Outside the contour, the signal is more than 3 dB below the peak. Inside the contour, the signal is less than 3 dB below the peak (i.e., within 3 dB of the peak). In a system in which the coverage area of a receive component beam antenna pattern is all points for which the receive component beam antenna gain is within 3 dB of peak receive component beam antenna gain, the area inside the contour is referred to as the antenna element coverage area. The 3 dB antenna contour for each element 406, 409 is not overlapping. That is, only a relatively small portion of the area inside the 3 dB antenna contour 3901 overlaps with the area that is inside the adjacent 3 dB antenna patterns 3902, 3903.

Figure 19:
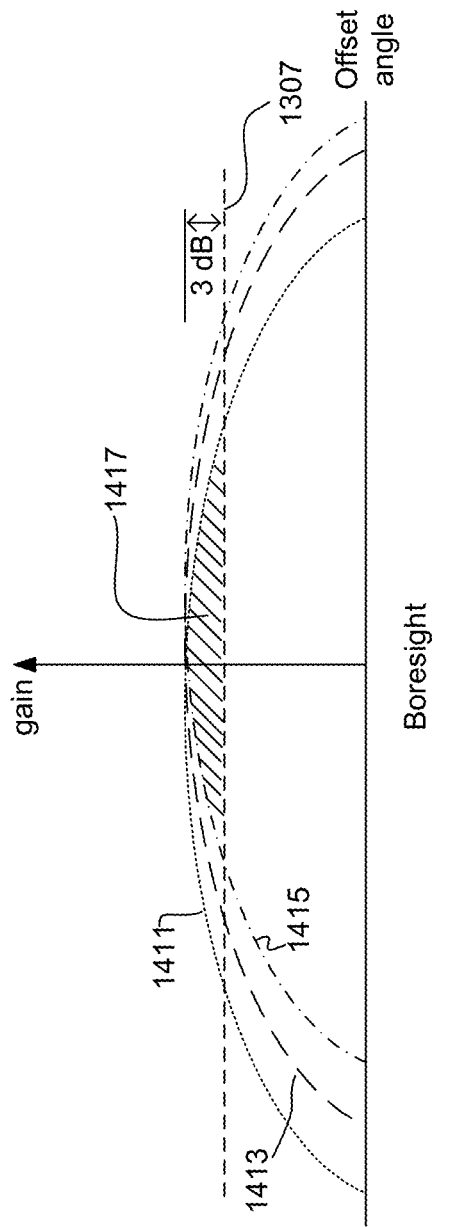
FIG. 19 is an illustration of example overlapping signal strength patterns of several antenna elements.

FIG. 19 is an illustration of the antenna patterns 1411, 1413, 1415 of several antenna elements (either receive antenna elements 406 or transmit antenna elements 409). In contrast to the component beam antenna patterns of FIG. 17, the component beam antenna patterns shown in FIG. 19 intersect 1417 above the 3 dB line 1307.

Figure 20:
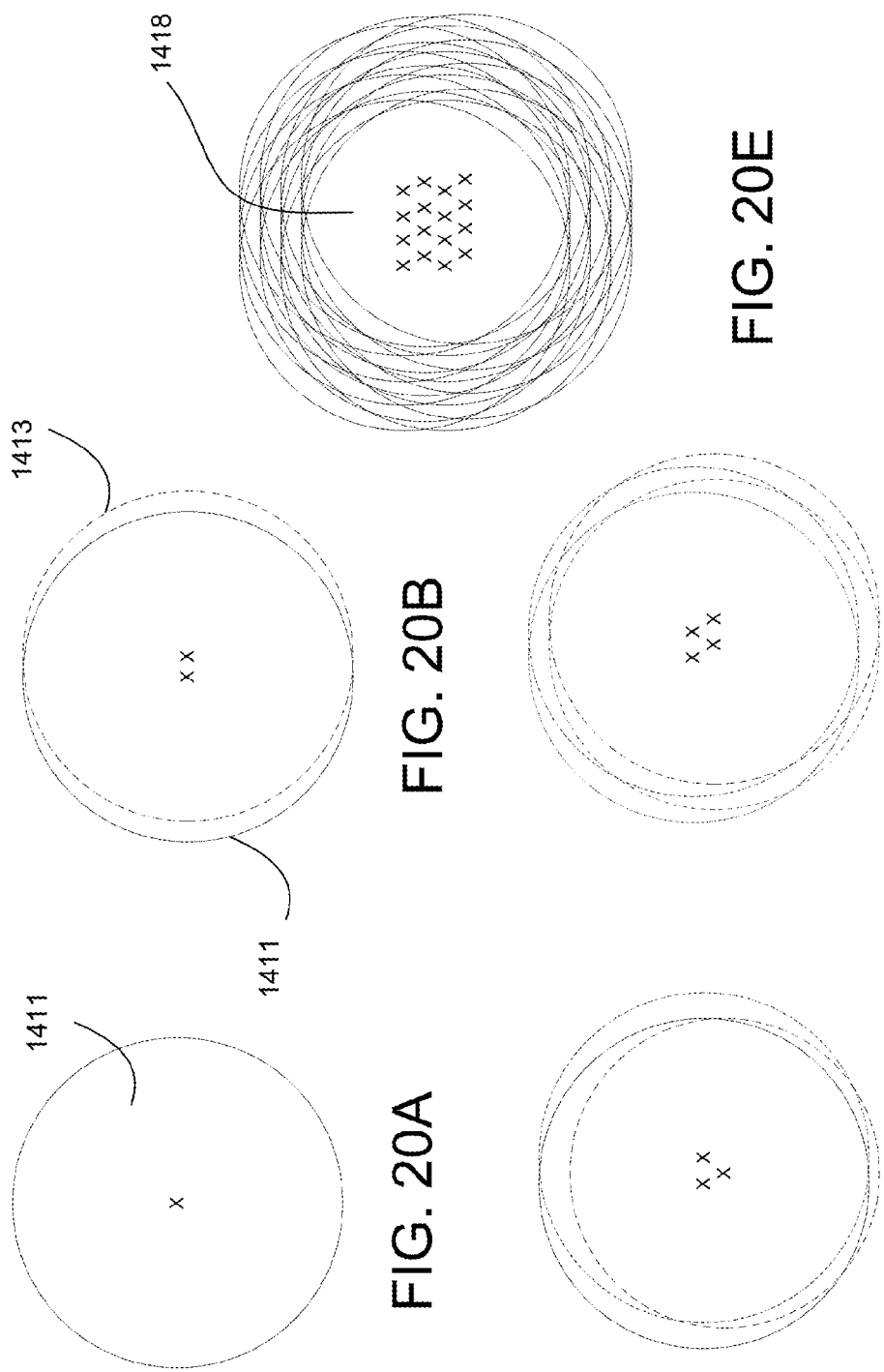
FIG. 20A-20E is an illustration of example overlapping 3 dB signal strength contours for several antenna elements.

FIG. 20A through FIG. 20E illustrate 3 dB antenna contours for several antenna elements 406, 409 with the beam center point (peak gain) designated with the letter 'x'. FIG. 20A shows the particular antenna contour 1411 of a first antenna element 406. FIG. 20B shows the 3 dB antenna contours 1411, 1413 for two particular elements 406. FIG. 20C shows the 3 dB antenna contours for three elements 406. FIG. 20D shows the 3 dB antenna contours for four antenna elements 406. FIG. 20E shows the 3 dB antenna contours for an array of 16 antenna elements 406. The 3 dB antenna contours are shown to overlap 1418 (e.g., 16 such 3 dB antenna contours are shown). The antenna elements in either the receive or transmit antenna may be arranged in any of several different configurations. For example, if elements have a generally circular feed horn, the elements may be arranged in a honeycomb configuration to tightly pack the elements in a small amount of space. In some cases, the antenna elements are aligned in horizontal rows and vertical columns.

Figure 21:
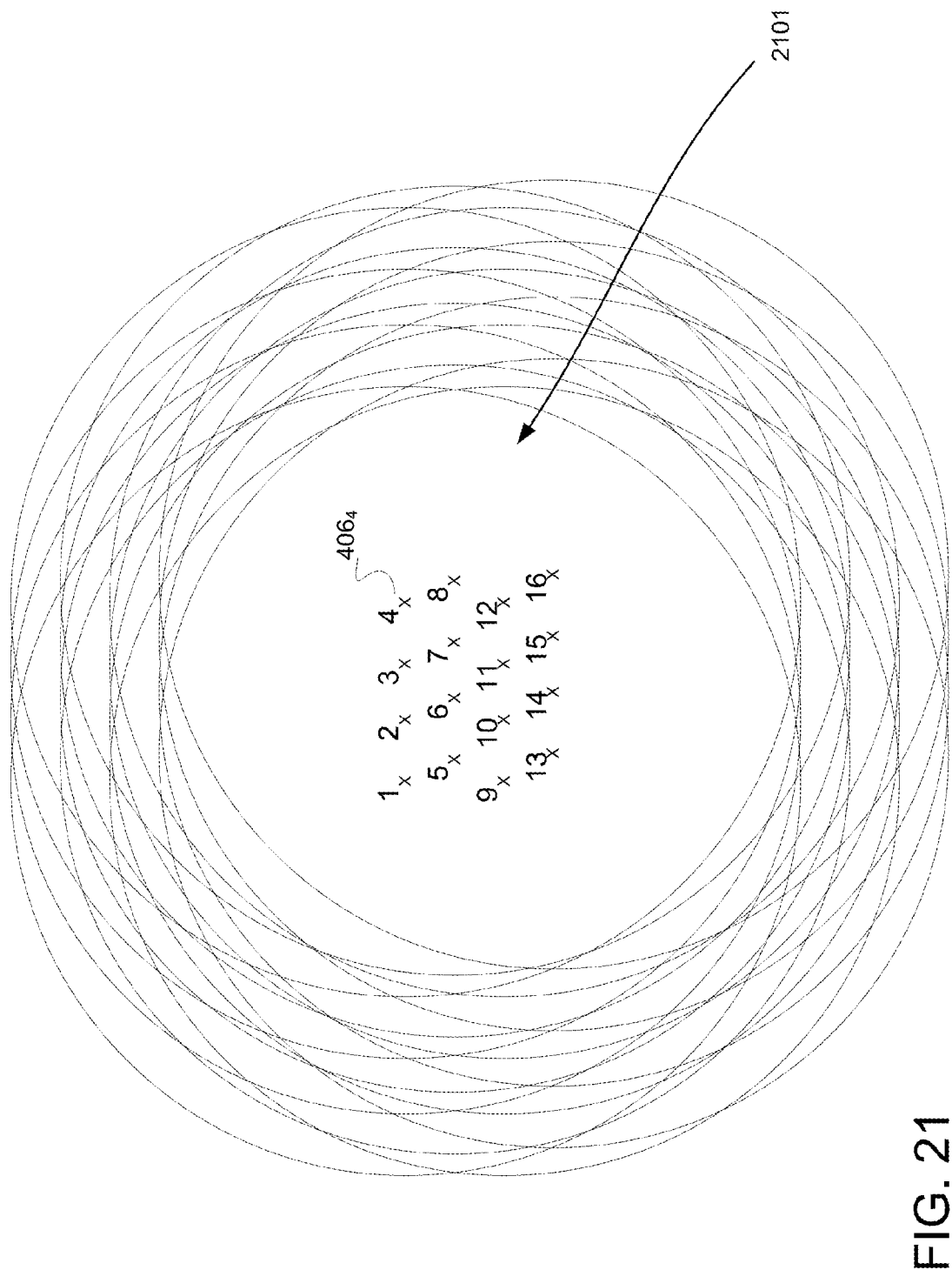
FIG. 21 is an illustration of an example enumeration of 16 antenna elements and their overlapping 3 dB signal strength contours.

FIG. 21 is an example illustration of relative positions of receive antenna 3 dB antenna contours associated with receive antenna elements 406. The element 406 beam centers are numbered 1-16, with element 4064 identified by the number '4' to the upper left of the beam center indicator 'x'. In some cases, there may be many more than 16 receive antenna elements 406. However, for the sake of simplicity, only 16 are shown in FIG. 21. A corresponding array of transmit antenna elements 409 and their associated 3 dB antenna contours will look similar to FIG. 21. Therefore, for the sake of simplicity, only the array of receive antenna elements 406 are shown. The area 2101 in the center is where all of the antenna element coverage areas overlap.

In some cases, at least one point within the relay coverage area (e.g., satellite coverage area) falls within the 3 dB antenna contour of the component beams of several antenna elements 406. In one such case, at least one point is within the 3 dB antenna contour of at least 100 different antenna elements 406. In another case, at least 10% of the relay coverage area lies within the 3 dB antenna contours of at least 30 different antenna elements. In another case, at least 20% of the relay coverage area lies within the 3 dB antenna contours of at least 20 different antenna elements. In another case, at least 30% of the relay coverage area lies within the 3 dB antenna contours of at least 10 different antenna elements. In another case, at least 40% of the relay coverage area lies within the 3 dB antenna contours of at least eight different antenna elements. In another case, at least 50% of the relay coverage area lies within the 3 dB antenna contours of at least four different antenna elements. However, in some cases, more than one of these relationships may be true.

In some cases, the end-to-end relay has a relay coverage area (e.g., satellite coverage area) in which at least 25% of the points in the uplink relay coverage area are within (e.g., span) overlapping coverage areas of at least six receive antenna elements 406. In some cases, 25% of the points within the uplink relay coverage area are within (e.g., span) overlapping coverage areas of at least four receive antenna elements 406. In some cases, the end-to-end relay has a coverage area in which at least 25% of the points in the downlink relay coverage area are within (e.g., span) overlapping coverage areas of at least six transmit antenna elements 409. In some cases, 25% of the points within the downlink relay coverage area are within (e.g., span) overlapping coverage areas of at least four transmit antenna elements 409.

In some cases, the receive antenna 402 may be pointed roughly at the same coverage area as the transmit antenna 401, so that some receive antenna element coverage areas may naturally correspond to particular transmit antenna element coverage areas. In these cases, the receive antenna elements 406 may be mapped to their corresponding transmit antenna elements 409 via the transponders 410, yielding similar transmit and receive antenna element coverage areas for each receive/transmit signal path. In some cases, however, it may be advantageous to map receive antenna elements 406 to transmit antenna elements 409 that do not correspond to the same component beam coverage area. Accordingly, the mapping of the elements 406 of the receive antenna 402 to the elements 409 of the transmit antenna 401 may be randomly (or otherwise) permuted. Such permutation includes the case that results in the receive antenna elements 406 not being mapped to the transmit antenna elements 409 in the same relative location within the array or that have the same coverage area. For example, each receive antenna element 406 within the receive antenna element array may be associated with the same transponder 410 as the transmit antenna element 409 located in the mirror location of the transmit antenna element array. Any other permutation can be used to map the receive antenna elements 406 to the transmit antenna elements 409 according to a permutation (e.g., pair each receive antenna element 406 with the same transponder to which an associated transmit antenna element 409 is coupled in accordance with a particular permutation of the receive antenna element 406 and the transmit antenna element 409).

FIG. 22 is a table 4200 showing example mappings of receive antenna elements 406 to transmit antenna elements 409 through 16 transponders 410. Each transponder 410 has an input that is exclusively coupled to an associated receive antenna element 406 and an output that is exclusively coupled to an associated transmit antenna element 409 (e.g., there is a one to one relationship between each receive antenna element 406, one transponder 410 and one transmit antenna element 409). In some cases, other receive antenna elements, transponders and transmit antenna elements may be present on the end-to-end relay (e.g., satellite) that are not configured in a one to one relationship (and do not operate as a part of the end-to-end beamforming system).

The first column 4202 of the table 4200 identifies a transponder 410. The second column 4204 identifies a receive antenna element 406 to which the transponder 410 of the first column is coupled. The third column 4206 of the table 4200 identifies an associated transmit antenna element 409 to which the output of the transponder 410 is coupled. Each receive antenna element 406 is coupled to the input of the transponder 410 identified in the same row of the table 4200. Similarly, each transmit antenna element 409 is coupled to the output of the transponder 410 identified in the same row of the table 4200. The third column of the table 4200 shows an example of direct mapping in which each receive antenna element 406 of the receive antenna array is coupled to the same transponder 410 as a transmit antenna element 409 in the same relative location within the transmit antenna array. The fourth column 4208 of table 4200 shows an example of interleaved mapping in which the first receive antenna element 406 is coupled to the first transponder 410 and to the tenth transmit antenna element 409. The second receive antenna element 406 is coupled to the second transponder 410 and to the ninth transmit antenna element 409, and so on. Some cases have other permutations, including a random mapping in which the particular pairing of the receive antenna element 406 and the transmit element 409 with a transponder 410 are randomly selected.

The direct mapping, which attempts to keep the transmit and receive antenna element coverage areas as similar as possible for each receive/transmit signal path, generally yields the highest total capacity of the system. Random and interleaved permutations generally produce slightly less capacity but provide a more robust system in the face of AN outages, fiber outages in the terrestrial network, or loss of receive/transmit signal paths due to electronic failure on the end-to-end relay (e.g., in one or more transponders). Random and interleaved permutations allow lower cost non-redundant ANs to be used. Random and interleaved permutations also provide less variation between the capacity in the best performing beam and the capacity in the worst performing beam. Random and interleaved permutations may also be more useful to initially operate the system with just a fraction of the ANs resulting in only a fraction of the total capacity being available but no loss in coverage area. An example of this is an incremental rollout of ANs, where the system was initially operated with only 50% of the ANs deployed. This may provide less than the full capacity, while still allowing operation over the entire coverage area. As the demand increases, more ANs can be deployed to increase the capacity until the full capacity is achieved with all the ANs active. In some cases, a change in the composition of the ANs results in a re-calculation of the beam weights. A change in composition may include changing the number or characteristics of one or more ANs. This may require a re-estimation of the end-to-end forward and/or return gains.

In some cases, the antenna is an array-fed reflector antenna with a paraboloid reflector. In other cases, the reflector does not have a paraboloid shape. An array of receive antenna elements 406 may be arranged to receive signals reflected by the reflector. Similarly, an array of transmit antenna elements 409 may be arranged to form an array for illuminating the reflector. One way to provide elements with overlapping component beam antenna patterns is to have the elements 406, 409 defocused (unfocused) as a consequence of the focal plane of the reflector being behind (or in front of) the array of elements 406, 409 (i.e., the receive antenna array being located outside the focal plane of the receive reflector).

FIG. 23 is an illustration of a cross-section of a center-fed paraboloid reflector 1521. A focal point 1523 lies on a focal plane 1525 that is normal to the central axis 1527 of the reflector 1521. Received signals that strike the reflector 1521 parallel to the central axis 1527 are focused onto the focal point 1523. Likewise, signals that are transmitted from an antenna element located at the focal point and that strike the reflector 1521 will be reflected in a focused beam from the reflector 1521 parallel to the central axis 1527. Such an arrangement is often used in Single Feed per Beam systems to maximize the directivity of each beam and minimize overlap with beams formed by adjacent feeds.

FIG. 24 is an illustration of another paraboloid reflector 1621. By locating antenna elements 1629 (either receive antenna elements or transmit antenna elements 406, 409, 3416, 3419, 3426, 3429,) outside the focal plane (e.g., in front of the focal plane 1625 of the reflector 1621), the path of transmitted signals 1631 that strike the reflector 1621 will not be parallel to one another as they reflect off the reflector 1621, resulting in a wider beam width than in the focused case. In some cases, reflectors that have shapes other than paraboloids are used. Such reflectors may also result in defocusing the antenna. The end-to-end beamforming system may use this type of defocused antenna to create overlap in the coverage area of adjacent antenna elements and thus provide a large number of useful receive/transmit paths for given beam locations in the relay coverage area.

Figure 25:
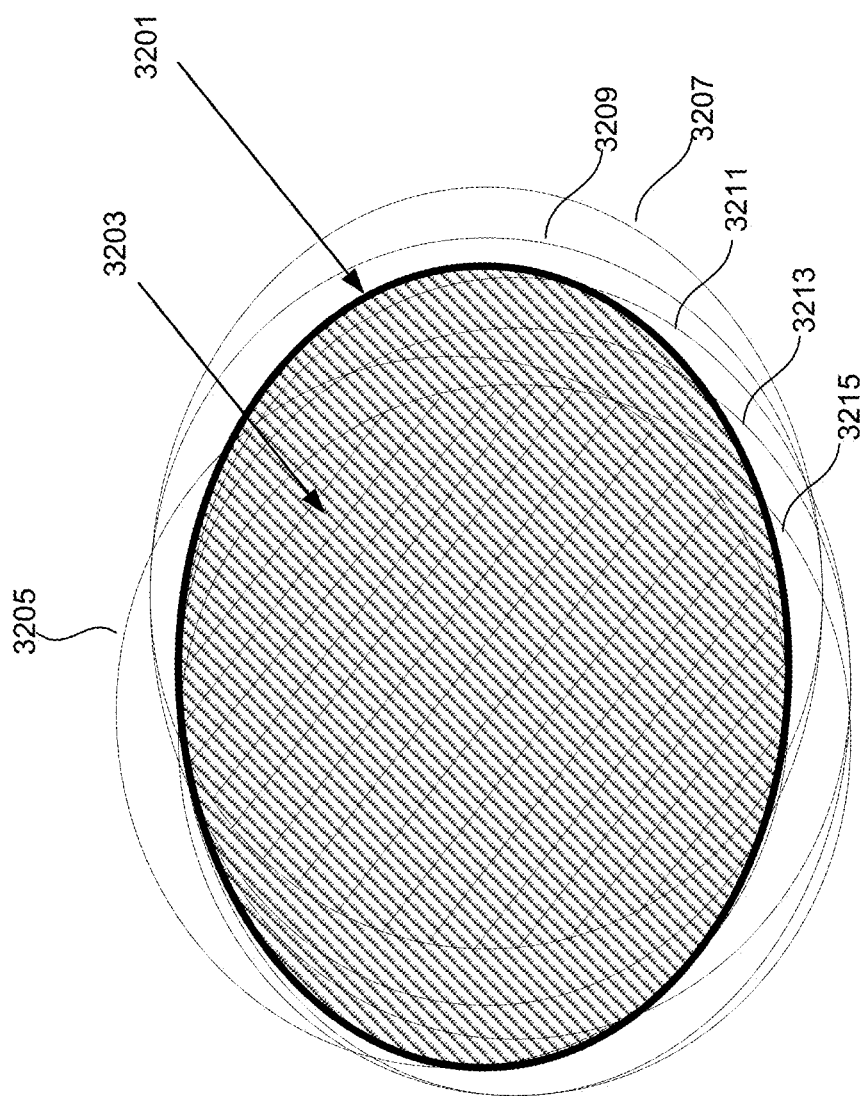
FIG. 25 is an illustration of an example relay coverage area (shown with single cross-hatching) and the area (shown with double cross-hatching) defined by the points within the relay coverage area that are also contained within six antenna element coverage areas.

In one case, a relay coverage area is established, in which 25% of the points within the relay coverage area are within the antenna element coverage areas of at least six component beam antenna patterns when the end-to-end relay is deployed (e.g., an end-to-end satellite relay is in a service orbit). Alternatively, 25% of the points within the relay coverage area are within the antenna element coverage areas of at least four receive antenna elements. FIG. 25 is an illustration of an example relay coverage area (for an end-to-end satellite relay, also referred to as satellite coverage area) 3201 (shown with single cross-hatching) and the area 3203 (shown with double cross-hatching) defined by the points within the relay coverage area 3201 that are also contained within six antenna element coverage areas 3205, 3207, 3209, 3211, 3213, 3215. The coverage area 3201 and the antenna element coverage areas 3205, 3207, 3209, 3211, 3213, 3215 may be either receive antenna element coverage areas or transmit antenna element coverage areas and may be associated with only the forward link or only the return link. The size of the antenna element coverage areas 3205, 3207, 3209, 3211, 3213, 3215 is determined by the desired performance to be provided by the system. A system that is more tolerant of errors may have antenna element coverage areas that are larger than a system that is less tolerant. In some cases, each antenna element coverage area 3205, 3207, 3209, 3211, 3213, 3215 is all points for which the component beam antenna gain is within 10 dB of the peak component beam antenna gain for the antenna element establishing the component beam antenna pattern. In other cases, each antenna element coverage area 3205, 3207, 3209, 3211, 3213, 3215 is all points for which the component beam antenna gain is within 6 dB of peak component beam antenna gain. In still other cases, each antenna element coverage area 3205, 3207, 3209, 3211, 3213, 3215 is all points for which the component beam antenna gain is within 3 dB of peak component beam antenna gain. Even when an end-to-end relay has not yet been deployed (e.g., an end-to-end satellite relay is not in a service orbit), the end-to-end relay still has component beam antenna patterns that conform to the above definition. That is, antenna element coverage areas corresponding to an end-to-end relay in orbit can be calculated from the component beam antenna patterns even when the end-to-end relay is not in a service orbit. The end-to-end relay may include additional antenna elements that do not contribute to beamforming and thus may not have the above-recited characteristics.

Figure 26:
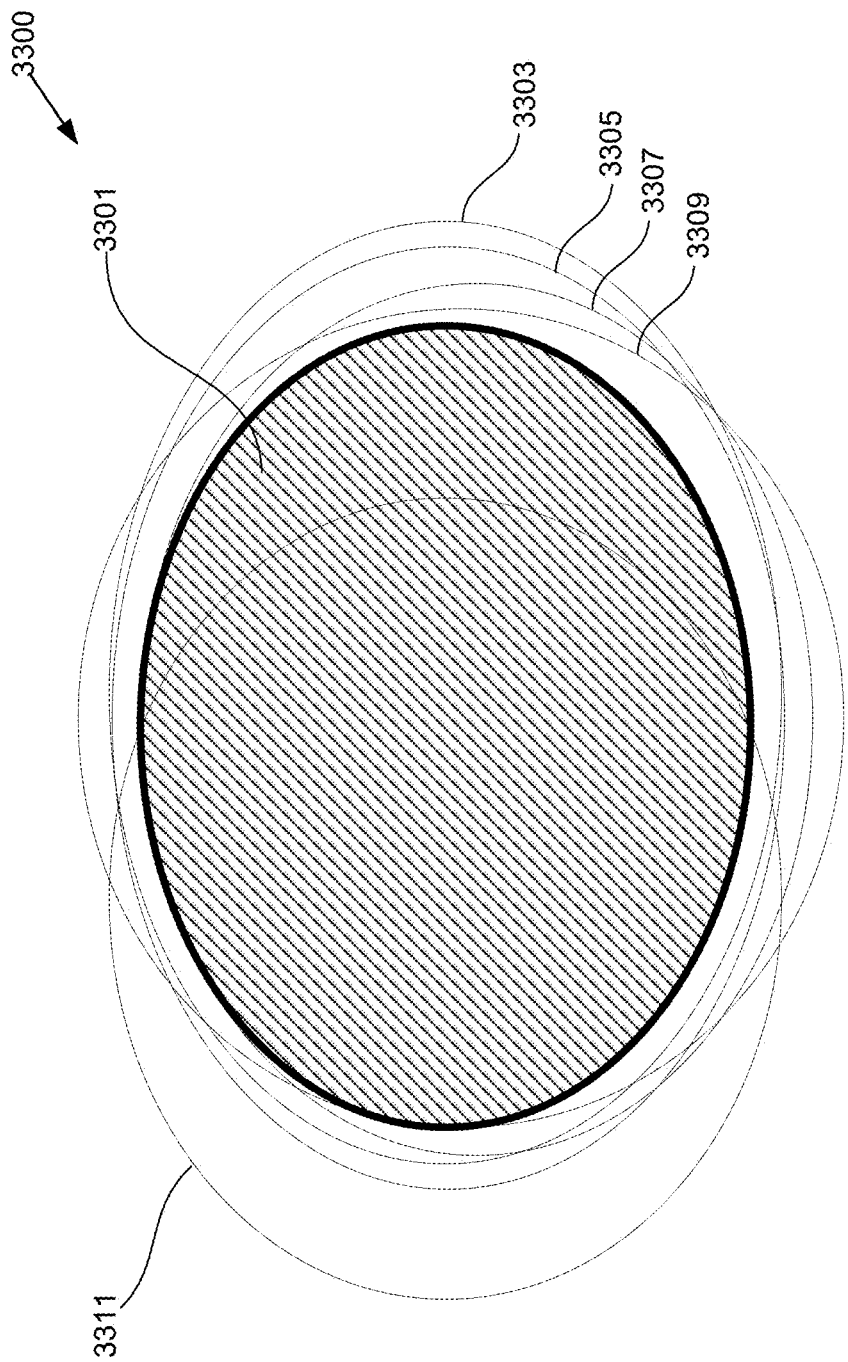
FIG. 26 is an illustration of an example relay antenna pattern in which all of the points within a relay coverage area are also contained within at least four antenna element coverage areas.

FIG. 26 is an illustration of an end-to-end relay (e.g., satellite) antenna pattern 3300 in which all of the points within a relay coverage area 3301 (e.g. satellite coverage area) are also contained within at least four antenna element coverage areas 3303, 3305, 3307, 3309. Other antenna elements may exist on the end-to-end relay and can have antenna element coverage areas 3311 that contain less than all of the points within the relay coverage area 3301.

The system may operate in any suitable spectrum. For example, an end-to-end beamforming system may operate in the C, L, S, X, V, Ka, Ku, or other suitable band or bands. In some such systems, the receive means operates in the C, L, S, X, V, Ka, Ku, or other suitable band or bands. In some cases, the forward uplink and the return uplink may operate in the same frequency range (e.g., in vicinity of 30 GHz); and the return downlink and the forward downlink may operate in a non-overlapping frequency range (e.g., in the vicinity of 20 GHz). The end-to-end system may use any suitable bandwidth (e.g., 500 MHz, 1 GHz, 2 GHz, 3.5 GHz, etc.). In some cases, the forward and return links use the same transponders.

To assist in system timing alignment, path lengths among the L transponders are set to match signal path time delays in some cases, for example through appropriate cable length selection. The end-to-end relay (e.g., satellite) in some cases has a relay beacon generator 426 (e.g. satellite beacon) within a calibration support module 424 (see FIG. 15). The beacon generator 426 generates a relay beacon signal. The end-to-end relay broadcasts the relay beacon signal to further aid in system timing alignment as well as support feeder link calibration. In some cases, the relay beacon signal is a pseudo-random (known as PN) sequence, such as a PN direct sequence spread spectrum signal that runs at a high chip rate (e.g., 100, 200, 400, or 800 million chips per second (Mcps), or any other suitable value). In some cases, a linearly polarized relay (e.g., satellite) beacon, receivable by both RHCP and LHCP antennas, is broadcast over a wide coverage area by an antenna, such as an antenna horn (not shown) or coupled into one or more of the transponders 410 for transmission through the associated transmit antenna element 409. In an example system, beams are formed in multiple 500 MHz bandwidth channels over the Ka band, and a 400 Mcps PN code is filtered or pulse-shaped to fit within a 500 MHz bandwidth channel. When multiple channels are used, the same PN code may be transmitted in each of the channels. The system may employ one beacon for each channel, or one beacon for two or more channels.

Since there may be a large number of receive/transmit signal paths in an end-to-end relay, redundancy of individual receive/transmit signal paths may not be required. Upon failure of a receive/transmit signal path, the system may still perform very close to its previous performance level, although modification of beamforming coefficients may be used to account for the loss.

Ground Networks

The ground network of an example end-to-end beamforming system contains a number of geographically distributed Access Node (AN) Earth stations pointed at a common end-to-end relay. Looking first at the forward link, a Central Processing System (CPS) computes beam weights for transmission of user data and interfaces to the ANs through a distribution network. The CPS also interfaces to the sources of data being provided to the user terminals. The distribution network may be implemented in various ways, for example using a fiber optic cable infrastructure. Timing between the CPS and SANs may be deterministic (e.g., using circuit-switched channels) or non-deterministic (e.g., using a packet-switched network). In some cases, the CPS is implemented at a single site, for example using custom application specific integrated circuits (ASICs) to handle signal processing. In some cases, the CPS is implemented in a distributed manner, for example using cloud computing techniques.

Returning to the example of FIG. 5, the CPS 505 may include a plurality of feeder link modems 507. For the forward link, the feeder link modems 507 each receive forward user data streams 509 from various data sources, such as the internet, a video headend (not shown), etc. The received forward user data streams 509 are modulated by the modems 507 into K forward beam signals 511. In some cases, K may be in the range of 1, 2, 4, 8, 16, 32, 64, 128, 256, 512, 1024 or numbers in-between or greater. Each of the K forward beam signals carries forward user data streams to be transmitted on one of K forward user beams. Accordingly, if K=400, then there are 400 forward beam signals 511, each to be transmitted over an associated one of 400 forward user beams to a forward user beam coverage area 519. The K forward beam signals 511 are coupled to a forward beamformer.

If M ANs 515 are present in the ground segment 502, then the output of the forward beamformer is M access node-specific forward signals 516, each comprising weighted forward beam signals corresponding to some or all of the K forward beam signals 511. The forward beamformer may generate the M access node-specific forward signals 516 based on a matrix product of the K×M forward beam weight matrix with the K forward data signals. A distribution network 518 distributes each of the M access node-specific forward signals to a corresponding one of the M ANs 515. Each AN 515 transmits a forward uplink signal 521 comprising a respective access node-specific forward signal 516. Each AN 515 transmits its respective forward uplink signal 521 for relay to one or more (e.g., up to and including all) of the forward user beam coverage areas via one or more (e.g., up to and including all) of the forward receive/transmit signal paths of the end-to-end relay. Transponders 410, 411 within the end-to-end relay 503 receive a composite input forward signal comprising a superposition 550 of forward uplink signals 521 transmitted by a plurality (e.g., up to and including all) of the ANs 515. Each transponder (e.g., each receive/transmit signal path through the relay) relays the composite input forward signal as a respective forward downlink signal to the user terminals 517 over the forward downlink.

Figure 27:
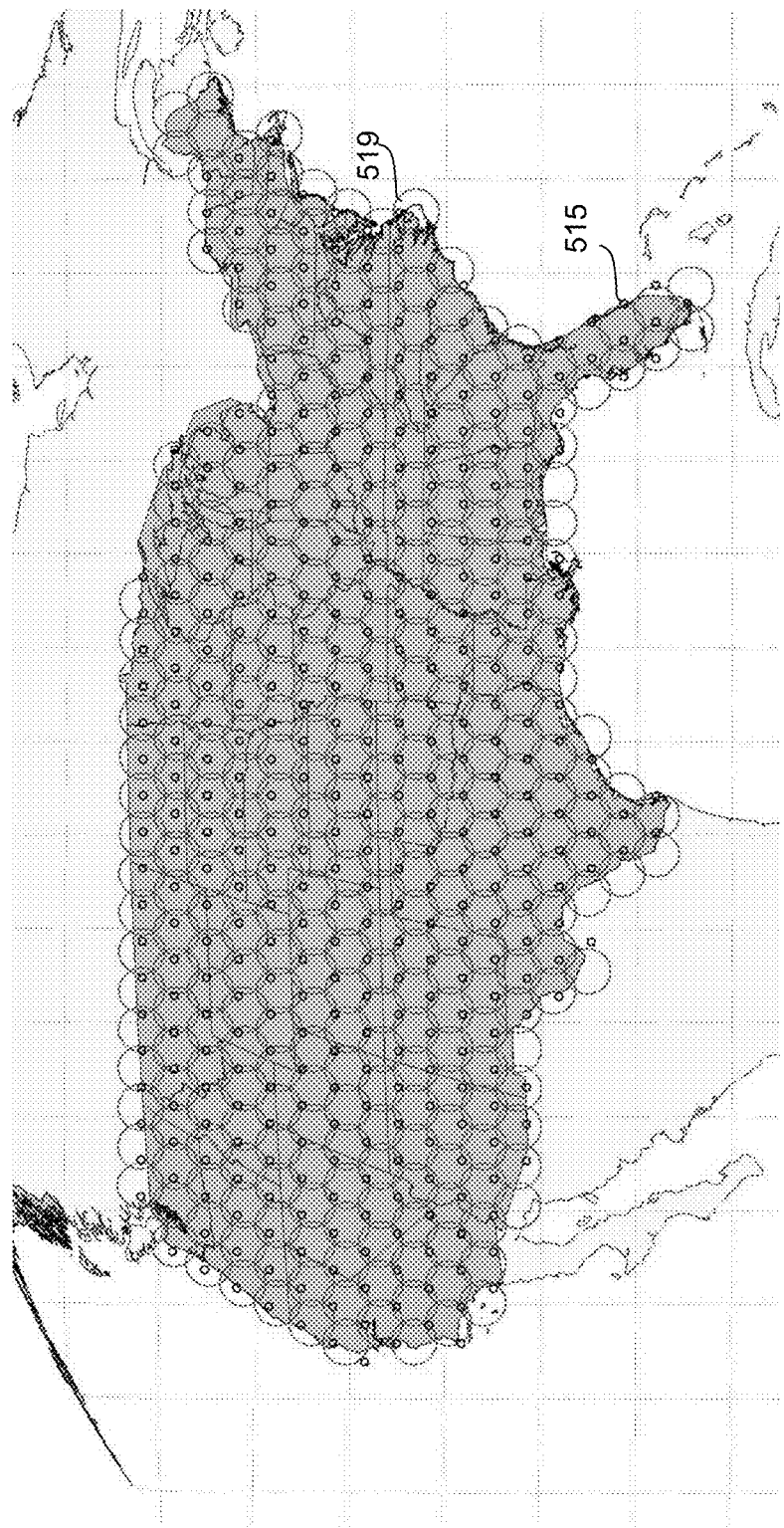
FIG. 27 is an illustration of an example distribution of access nodes (ANs) and user beam coverage areas.

FIG. 27 is an illustration of an example distribution of ANs 515. Each of the smaller numbered circles represents the location of an AN 515. Each of the larger circles indicates a user beam coverage area 519. In some cases, the ANs 515 are spaced approximately evenly over the coverage area of the end-to-end relay 503. In other cases, the ANs 515 may be distributed unevenly over the entire coverage area. In yet other cases, the ANs 515 may be distributed evenly or unevenly over one or more sub-regions of the relay coverage area. Typically, system performance is best when the ANs 515 are uniformly distributed over the entire coverage area. However, considerations may dictate compromises in the AN placement. For example, an AN 515 may be placed based on the amount of interference, rain, or other environmental conditions, cost of real estate, access to the distribution network, etc. For example, for a satellite-based end-to-end relay system that is sensitive to rain, more of the ANs 515 may be placed in areas that are less likely to experience rain-induced fading (e.g., the western United States). As another example, ANs 515 may be placed more densely in high rain regions (e.g., the southeastern United States) to provide some diversity gain to counteract the effects of rain fading. ANs 515 may be located along fiber routes to reduce distribution costs associated with the ANs 515.

Figure 28:
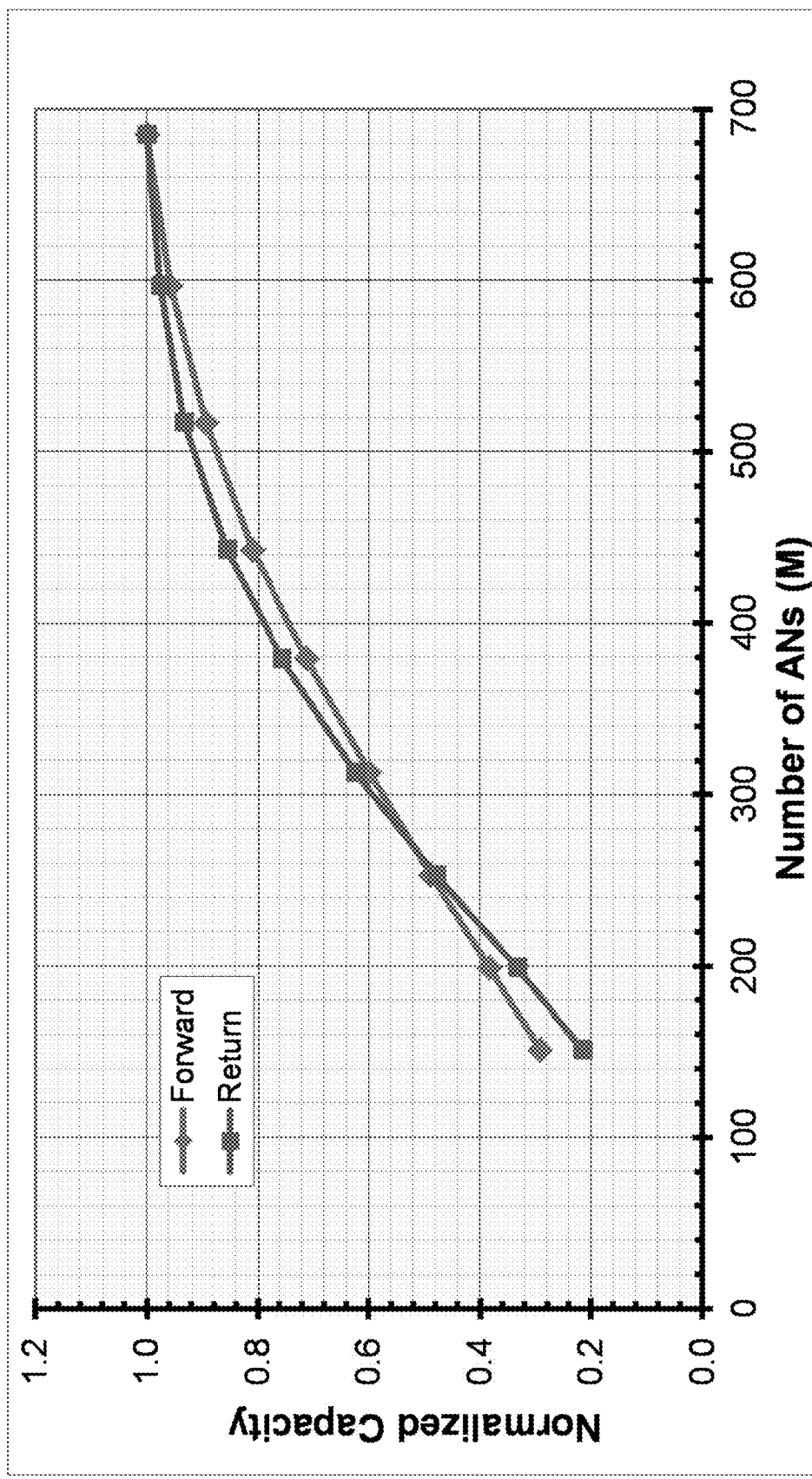
FIG. 28 is an example graph of normalized forward and return link capacity as a function of the number of ANs deployed.

The number of ANs 515, M, is a selectable parameter that can be selected based upon several criteria. Fewer ANs can result in a simpler, lower cost ground segment, and lower operational costs for the distribution network. More ANs can result in larger system capacity. FIG. 28 shows a simulation of the normalized forward and return link capacity as a function of the number of ANs deployed in an example system. Normalized capacity is the capacity with M ANs divided by the capacity obtained with the largest number of ANs in the simulation. The capacity increases as the number of ANs increases, but it does not increase without bound. Both forward link and return link capacities approach an asymptotic limit as the number of ANs is increased. This simulation was performed with L=517 transmit and receive antenna elements and with the ANs distributed uniformly over the coverage area, but this asymptotic behavior of the capacity can be seen with other values for L and other AN spatial distributions. Curves like those shown in FIG. 28 can be helpful in selection of the number of ANs, M, to be deployed and in understanding how the system capacity can be phased in as ANs are incrementally deployed, as discussed previously.

Figure 29:
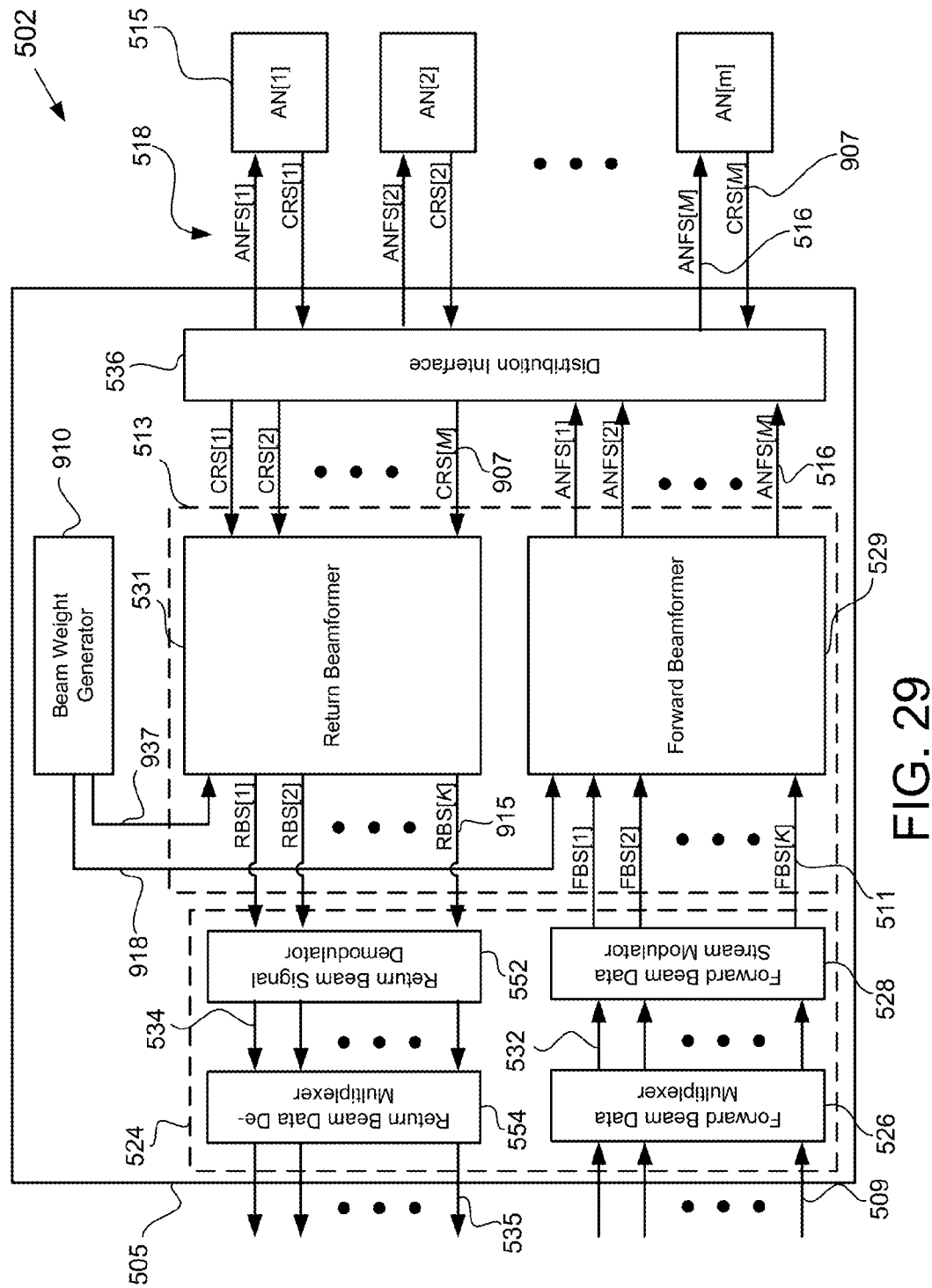
FIG. 29 is a block diagram of an example ground segment 502 for an end-to-end beamforming system.

FIG. 29 is a block diagram of an example ground segment 502 for an end-to-end beamforming system. FIG. 29 may illustrate, for example, ground segment 502 of FIG. 5. The ground segment 502 comprises CPS 505, distribution network 518, and ANs 515. CPS 505 comprises beam signal interface 524, forward/return beamformer 513, distribution interface 536, and beam weight generator 910.

For the forward link, beam signal interface 524 obtains forward beam signals (FBS) 511 associated with each of the forward user beams. Beam signal interface 524 may include forward beam data multiplexer 526 and forward beam data stream modulator 528. Forward beam data multiplexer 526 may receive forward user data streams 509 comprising forward data for transmission to user terminals 517. Forward user data streams 509 may comprise, for example, data packets (e.g., TCP packets, UDP packets, etc.) for transmission to the user terminals 517 via the end-to-end beamforming system 500 of FIG. 5. Forward beam data multiplexer 526 groups (e.g., multiplexes) the forward user data streams 509 according to their respective forward user beam coverage areas to obtain forward beam data streams 532. Forward beam data multiplexer 526 may use, for example, time-domain multiplexing, frequency-domain multiplexing, or a combination of multiplexing techniques to generate forward beam data streams 532. Forward beam data stream modulator 528 may modulate the forward beam data streams 532 according to one or more modulation schemes (e.g., mapping data bits to modulation symbols) to create the forward beam signals 511, which are passed to the forward/return beamformer 513. In some cases, the modulator 528 may frequency multiplex multiple modulated signals to create a multi-carrier beam signal 511. Beam signal interface 524 may, for example, implement the functionality of feeder link modems 507 discussed with reference to FIG. 5.

Forward/return beamformer 513 may include forward beamformer 529 and return beamformer 531. Beam weight generator 910 generates an M×K forward beam weight matrix 918. Techniques for generating the M×K forward beam weight matrix 918 are discussed in more detail below. Forward beamformer 529 may include a matrix multiplier that calculates M access-node specific forward signals 516. For example, this calculation can be based on a matrix product of the M×K forward beam weight matrix 918 and a vector of the K forward beam signals 511. In some examples, each of the K forward beam signals 511 may be associated with one of F forward frequency sub-bands. In this case, the forward beamformer 529 may generate samples for the M access-node specific forward signals 516 for each of the F forward frequency sub-bands (e.g., effectively implementing the matrix product operation for each of the F sub-bands for respective subsets of the K forward beam signals 511. Distribution interface 536 distributes (e.g., via distribution network 518) the M access node-specific forward signals 516 to the respective ANs 515.

For the return link, the distribution interface 536 obtains composite return signals 907 from ANs 515 (e.g., via distribution network 518). Each return data signal from user terminals 517 may be included in multiple (e.g., up to and including all) of the composite return signals 907. Beam weight generator 910 generates a K×M return beam weight matrix 937. Techniques for generating the K×M return beam weight matrix 937 are discussed in more detail below. Return beamformer 531 calculates K return beam signals 915 for the K return user beam coverage areas. For example, this calculation can be based on a matrix product of the return beam weight matrix 937 and a vector of the respective composite return signals 907. Beam signal interface 524 may include return beam signal demodulator 552 and return beam data de-multiplexer 554. Return beam signal demodulator 552 may demodulate each of the return beam signals to obtain K return beam data streams 534 associated with the K return user beam coverage areas. Return beam data de-multiplexer 554 may de-multiplex each of the K return beam data streams 534 into respective return user data streams 535 associated with the return data signals transmitted from user terminals 517. In some examples, each of the return user beams may be associated with one of R return frequency sub-bands. In this case, the return beamformer 531 may generate respective subsets of the return beam signals 915 associated with each of the R return frequency sub-bands (e.g., effectively implementing the matrix product operation for each of the R return frequency sub-bands to generate respective subsets of the return beam signals 915).

Figure 30:
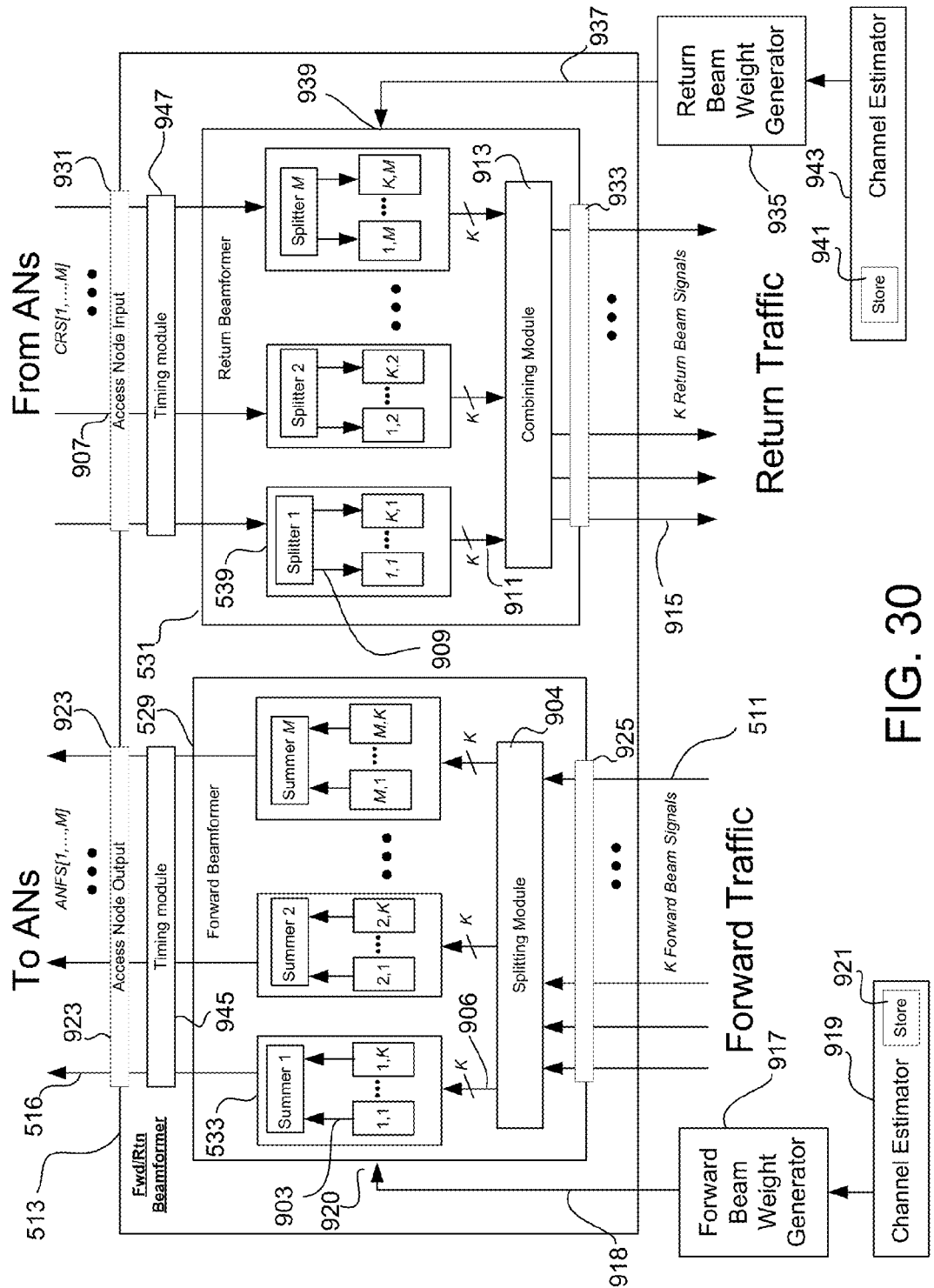
FIG. 30 is a block diagram of an example forward/return beamformer.

FIG. 30 is a block diagram of an example forward/return beamformer 513. The forward/return beamformer 513 comprises a forward beamformer 529, a forward timing module 945, a return beamformer 531, and a timing module 947. The forward timing module 945 associates each of the M access node-specific forward signals 516 with a time stamp (e.g., multiplexes the time stamp with the access node-specific forward signal in a multiplexed access node-specific forward signal) that indicates when the signal is desired to arrive at the end-to-end relay. In this way, the data of the K forward beam signals 511 that is split in a splitting module 904 within the forward beamformer 529 may be transmitted at the appropriate time by each of the ANs 515. The timing module 947 aligns the receive signals based on time stamps. Samples of the M AN composite return signals (CRS) 907 are associated with time stamps indicating when the particular samples were transmitted from the end-to-end relay. Timing considerations and generation of the time stamps are discussed in greater detail below.

The forward beamformer 529 has a data input 925, a beam weights input 920 and an access node output 923. The forward beamformer 529 applies the values of an M×K beam weight matrix to each of the K forward data signals 511 to generate M access node specific forward signals 521, each having K weighted forward beam signals. The forward beamformer 529 may include a splitting module 904 and M forward weighting and summing modules 533. The splitting module 904 splits (e.g., duplicates) each of the K forward beam signals 511 into M groups 906 of K forward beam signals, one group 906 for each of the M forward weighting and summing modules 533. Accordingly, each forward weighting and summing module 533 receives all K forward data signals 511.

A forward beam weight generator 917 generates an M×K forward beam weight matrix 918. In some cases, the forward beam weight matrix 918 is generated based on a channel matrix in which the elements are estimates of end-to-end forward gains for each of the K×M end-to-end forward multipath channels to form a forward channel matrix, as discussed further below. Estimates of the end-to-end forward gain are made in a channel estimator module 919. In some cases, the channel estimator has a channel data store 921 that stores data related to various parameters of the end-to-end multipath channels, as is discussed in further detail below. The channel estimator 919 outputs an estimated end-to-end gain signal to allow the forward beam weight generator 917 to generate the forward beam weight matrix 918. Each of the weighting and summing modules 533 are coupled to receive respective vectors of beamforming weights of the forward beam weight matrix 918 (only one such connection is show in FIG. 30 for simplicity). The first weighting and summing module 533 applies a weight equal to the value of the 1,1 element of the M×K forward beam weight matrix 918 to the first of the K forward beam signals 511 (discussed in more detail below). A weight equal to the value of the 1,2 element of the M×K forward beam weight matrix 918 is applied to the second of the K forward beam signals 511. The other weights of the matrix are applied in like fashion, on through the $K^{th}$ forward beam signal 511, which is weighted with the value equal to the 1,K element of the M×K forward beam weight matrix 918. Each of the K weighted forward beam signals 903 are then summed and output from the first weighting and summing module 533 as an access node-specific forward signal 516. The access node-specific forward signal 516 output by the first weighting and summing module 533 is then coupled to the timing module 945. The timing module 945 outputs the access node-specific forward signal 516 to the first AN 515 through a distribution network 518 (see FIG. 5). Similarly, each of the other weighting and summing modules 533 receive the K forward beam signals 511, and weight and sum the K forward beam signals 511. The outputs from each of the M weighting and summing modules 533 are coupled through the distribution network 518 to the associated M ANs 515 so that the output from the $m^{th}$ weighting and summing module is coupled to the $m^{th}$ AN 515. In some cases, jitter and uneven delay through the distribution network, as well as some other timing considerations, are handled by the timing module 945 by associating a time stamp with the data. Details of an example timing technique are provided below with regard to FIGS. 36 and 37.

As a consequence of the beam weights applied by the forward beamformers 529 at the ground segment 502, the signals that are transmitted from the ANs 515 through the end-to-end relay 503 form user beams. The size and location of the beams that are able to be formed may be a function of the number of ANs 515 that are deployed, the number and antenna patterns of relay antenna elements that the signal passes through, the location of the end-to-end relay 503, and/or the geographic spacing of the ANs 515.

Referring now to the end-to-end return link 523 shown in FIG. 5, a user terminal 517 within one of the user beam coverage areas 519 transmits signals up to the end-to-end relay 503. The signals are then relayed down to the ground segment 502. The signals are received by ANs 515.

Referring once again to FIG. 30, M return downlink signals 527 are received by the M ANs 515 and are coupled, as composite return signals 907, from the M ANs 515 through the distribution network 518 and received in an access node input 931 of the return beamformer 531. Timing module 947 aligns the composite return signals from the M ANs 515 to each other and outputs the time-aligned signals to the return beamformer 531. A return beam weight generator 935 generates the return beam weights as a K×M return beam weight matrix 937 based on information stored in a channel data store 941 within a channel estimator 943. The return beamformer 531 has a beam weights input 939 through which the return beamformer 531 receives the return beam weight matrix 937. Each of the M AN composite return signals 907 is coupled to an associated one of M splitter and weighting modules 539 within the return beamformer 531. Each splitter and weighting module 539 splits the time-aligned signal into K copies 909. The splitter and weighting modules 539 weight each of the K copies 909 using the k, m element of the K×M return beam weight matrix 937. Further details regarding the K×M return beam weight matrix are provided below. Each set of K weighted composite return signals 911 is then coupled to a combining module 913. In some cases, the combining module 913 combines the $k^{th}$ weighted composite return signal 911 output from each splitter and weighting module 539. The return beamformer 531 has a return data signal output 933 that outputs K return beam signals 915, each having the samples associated with one of the K return user beams 519 (e.g., the samples received through each of the M ANs). Each of the K return beam signals 915 may have samples from one or more user terminals 517. The K combined and aligned, beamformed return beam signals 915 are coupled to the feeder link modems 507 (see FIG. 5). Note that the return timing adjustment may be performed after the splitting and weighting. Similarly, for the forward link, the forward timing adjustment may be performed before the beamforming.

As discussed above, forward beamformer 529 may perform matrix product operations on input samples of K forward beam signals 511 to calculate M access node-specific forward signal 516 in real-time. As the beam bandwidth increases (e.g., to support shorter symbol duration) and/or K and M become large, the matrix product operation becomes computationally intensive and may exceed the capabilities of a single computing node (e.g., a single computing server, etc.). The operations of return beamformer 531 are similarly computationally intensive. Various approaches may be used to partition computing resources of multiple computing nodes in the forward/return beamformer 513. In one example, the forward beamformer 529 of FIG. 30 may be partitioned into separate weighting and summing modules 533 for each of the M ANs 515, which may be distributed into different computing nodes. Generally, the considerations for implementations include cost, power consumption, scalability relative to K, M, and bandwidth, system availability (e.g., due to node failure, etc.), upgradeability, and system latency. The example above is per row (or column). Vice versa is possible. Other manners of grouping the matrix operations may be considered (e.g., split into four with [1,1 to K/2, M/2], [ . . . ], computed individually and summed up).

Figure 31:
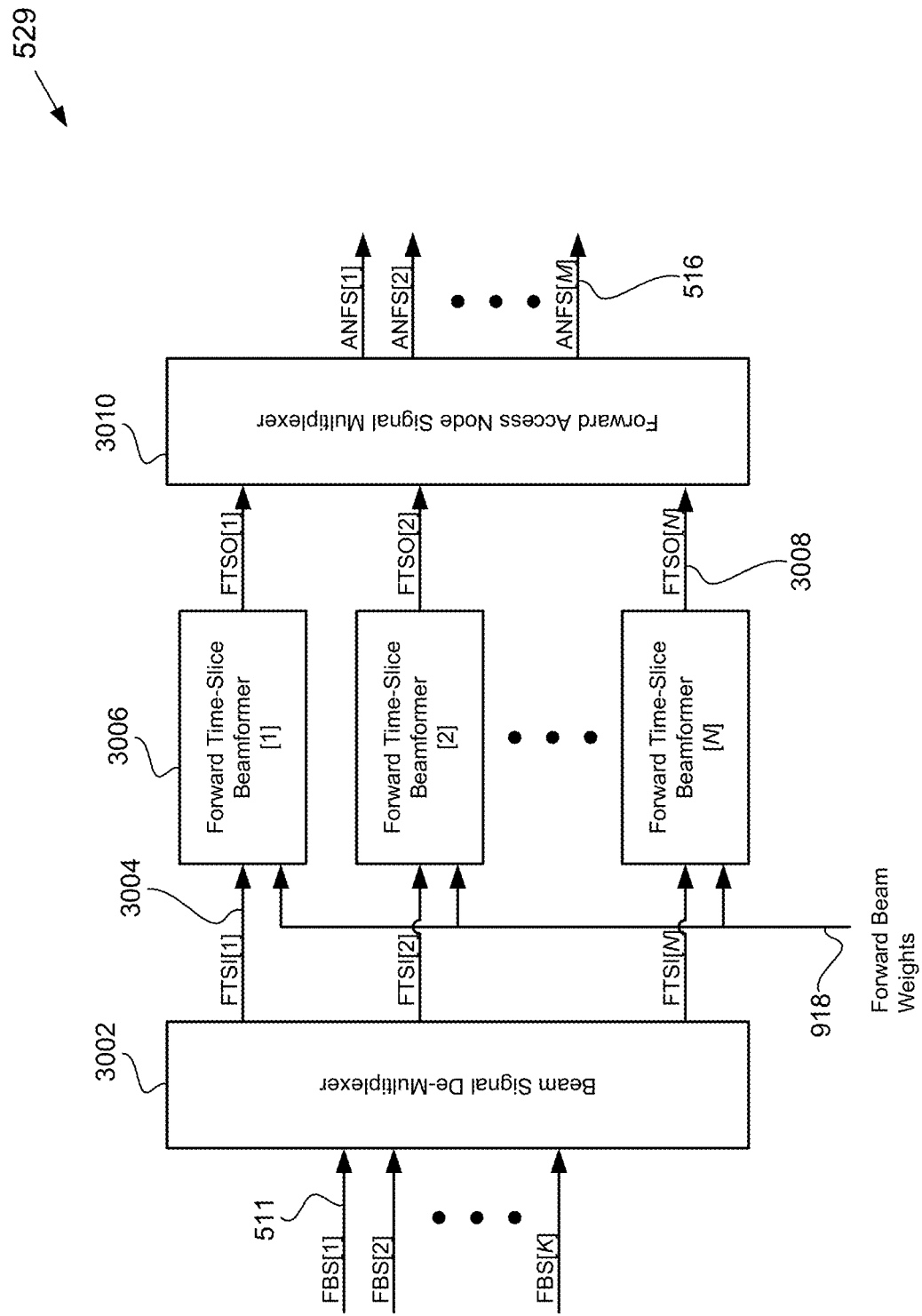
FIG. 31 is a block diagram of an example forward beamformer comprising multiple return time-slice beamformers with time-domain de-multiplexing and multiplexing.

In some cases, the forward/return beamformer 513 may include a time-domain multiplexing architecture for processing of beam weighting operations by time-slice beamformers. FIG. 31 is a block diagram of an example forward beamformer 529 comprising multiple forward time-slice beamformers with time-domain de-multiplexing and multiplexing. The forward beamformer 529 includes a forward beam signal de-multiplexer 3002, N forward time-slice beamformers 3006, and a forward access node signal multiplexer 3010.

Forward beam signal de-multiplexer 3002 receives forward beam signals 511 and de-multiplexes the K forward beam signals 511 into forward time slice inputs 3004 for input to the N forward time-slice beamformers 3006. For example, the forward beam signal de-multiplexer 3002 sends a first time-domain subset of samples for the K forward beam signals 511 to a first forward time-slice beamformer 3006, which generates samples associated with the M access node-specific forward signals corresponding to the first time-domain subset of samples. The forward time-slice beamformer 3006 outputs the samples associated with the M access node-specific forward signals for the first time-domain subset of samples via its forward time slice output 3008 to the forward access node signal multiplexer 3010. The forward time-slice beamformer 3006 may output the samples associated with each of the M access node-specific forward signals with synchronization timing information (e.g., the corresponding time-slice index, etc.) used by the access nodes to cause (e.g., by pre-correcting) the respective access node-specific forward signals to be synchronized when received by the end-to-end relay. The forward access node signal multiplexer 3010 multiplexes time-domain subsets of samples for the M access node-specific forward signals received via the N forward time slice outputs 3008 to generate the M access node-specific forward signals 516. Each of the forward time-slice beamformers 3006 may include a data buffer, a beam matrix buffer, and beam weight processor implementing the matrix product operation. That is, each of the forward time-slice beamformers 3006 may implement computations mathematically equivalent to the splitting module 904 and forward weighting and summing modules 533 shown for forward beamformer 529 of FIG. 30 during processing of the samples of one time slice-index. Updating of the beam weight matrix may be performed incrementally. For example, the beam weight matrix buffers for forward time-slice beamformers may be updated during idle time in a rotation of time-slice indices t through the N forward time-slice beamformers 3006. Alternatively, each forward time-slice beamformer may have two buffers that can be used in a ping-pong configuration (e.g., one can be updated while the other is being used). In some cases, multiple buffers can be used to store beam weights corresponding to multiple user beam patterns (e.g., multiple user coverage areas). Beam weight buffers and data buffers for forward time-slice beamformers 3006 may be implemented as any type of memory or storage including dynamic or static random access memory (RAM). Beam weight processing may be implemented in an application specific integrated circuit (ASIC) and/or a field programmable gate array (FPGA), and may include one or more processing cores (e.g., in a cloud computing environment). Additionally or alternatively, the beam weight buffer, data buffer, and beam weight processor may be integrated within one component.

Figure 32:
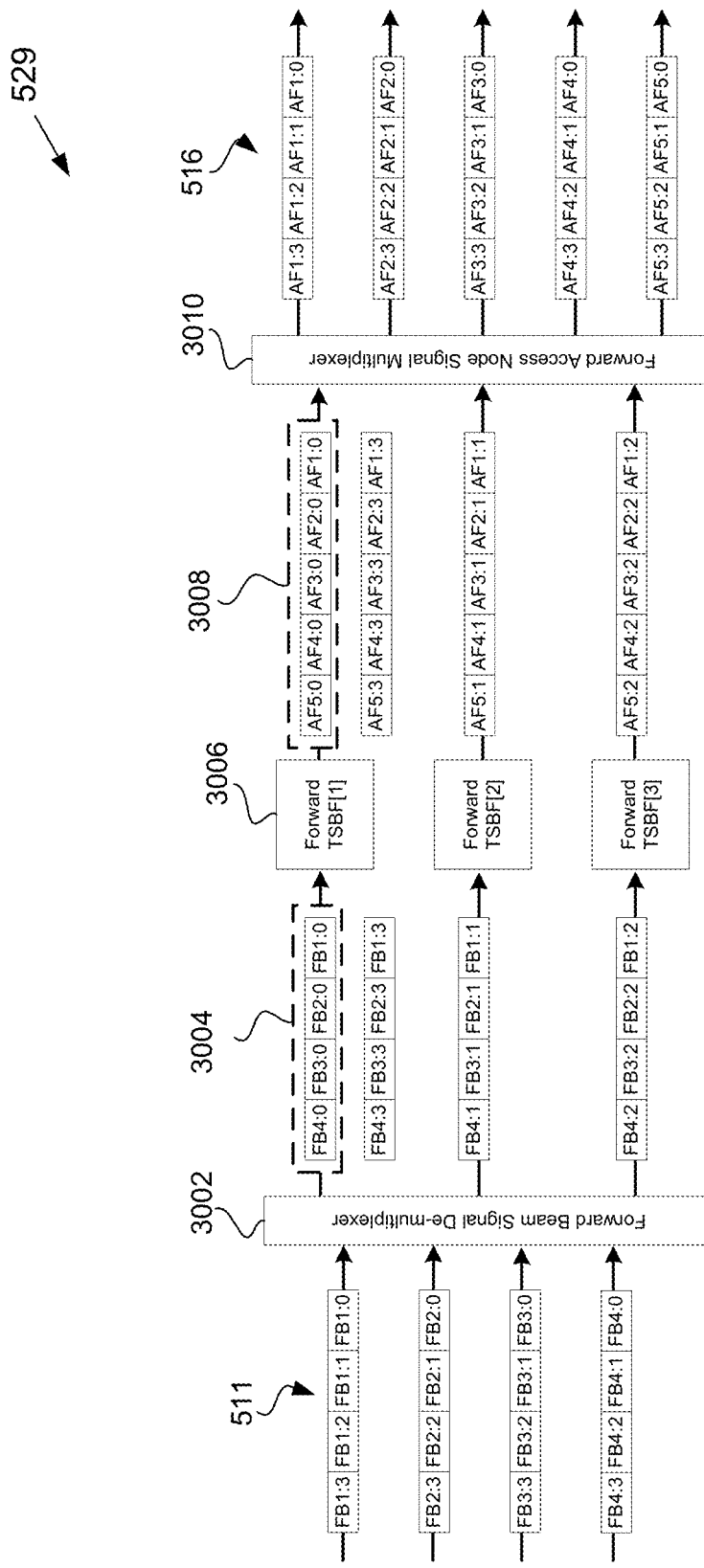
FIG. 32 is an illustration of a simplified example ground segment showing the operation of a forward time-slice beamformer.

FIG. 32 illustrates a simplified example ground segment showing the operation of a forward time-slice beamformer 529. In the example of FIG. 32, forward beamformer 529 receives four forward beam signals (e.g., K=4), generates access node-specific forward signals for five ANs (e.g., M=5), and has three forward time-slice beamformers (e.g., N=3). The forward beam signals are denoted by FBk:t, where k is the forward beam signal index and t is the time-slice index (e.g., corresponding to a time-domain subset of samples). The forward beam signal de-multiplexer 3002 receives four time-domain subsets of samples of the forward beam signals associated with four forward user beams and de-multiplexes each forward beam signal so that one forward time slice input 3004 includes, for a particular time-slice index t, the time-domain subsets of samples from each of the forward beam signals 511. For example, time-domain subsets can be a single sample, a contiguous block of samples, or a discontiguous (e.g., interleaved) block of samples as described below. The forward time-slice beamformers 3006 generate (e.g., based on the forward beam signals 511 and forward beam weight matrix 918) each of the M access-node specific forward signals for the time-slice index t, denoted by AFm:t. For example, the time-domain subsets of samples FB1:0, FB2:0, FB3:0, and FB4:0 for time-slice index t=0 are input to the first forward time-slice beam former TSBF[1] 3006, which generates corresponding samples of access node-specific forward signals AF1:0, AF2:0, AF3:0, AF4:0, and AF5:0 at a forward time slice output 3008. For subsequent time-slice index values t=1, 2, the time-domain subsets of samples of forward beam signals 511 are de-multiplexed by the forward beam signal de-multiplexer 3002 for input to second and third forward time-slice beamformers 3006, which generate access node-specific forward signals associated with the corresponding time-slice indices t at forward time slice outputs 3008. FIG. 32 also shows that at time-slice index value t=3, the first forward time-slice beamformer generates access node-specific forward signals associated with the corresponding time-slice index 3. The matrix product operation performed by each forward time-slice beamformer 3006 for one time-slice index value t may take longer than the real time of the time-domain subset of samples (e.g., the number of samples S multiplied by the sample rate $t_S$). However, each forward time-slice beamformer 3006 may only process one time-domain subset of samples every N time-slice indices t. Forward access node signal multiplexer 3010 receives forward time slice outputs 3030 from each of the forward time-slice beamformers 3006 and multiplexes the time-domain subsets of samples to generate the M access node-specific forward signals 516 for distribution to respective ANs.

Figure 33:
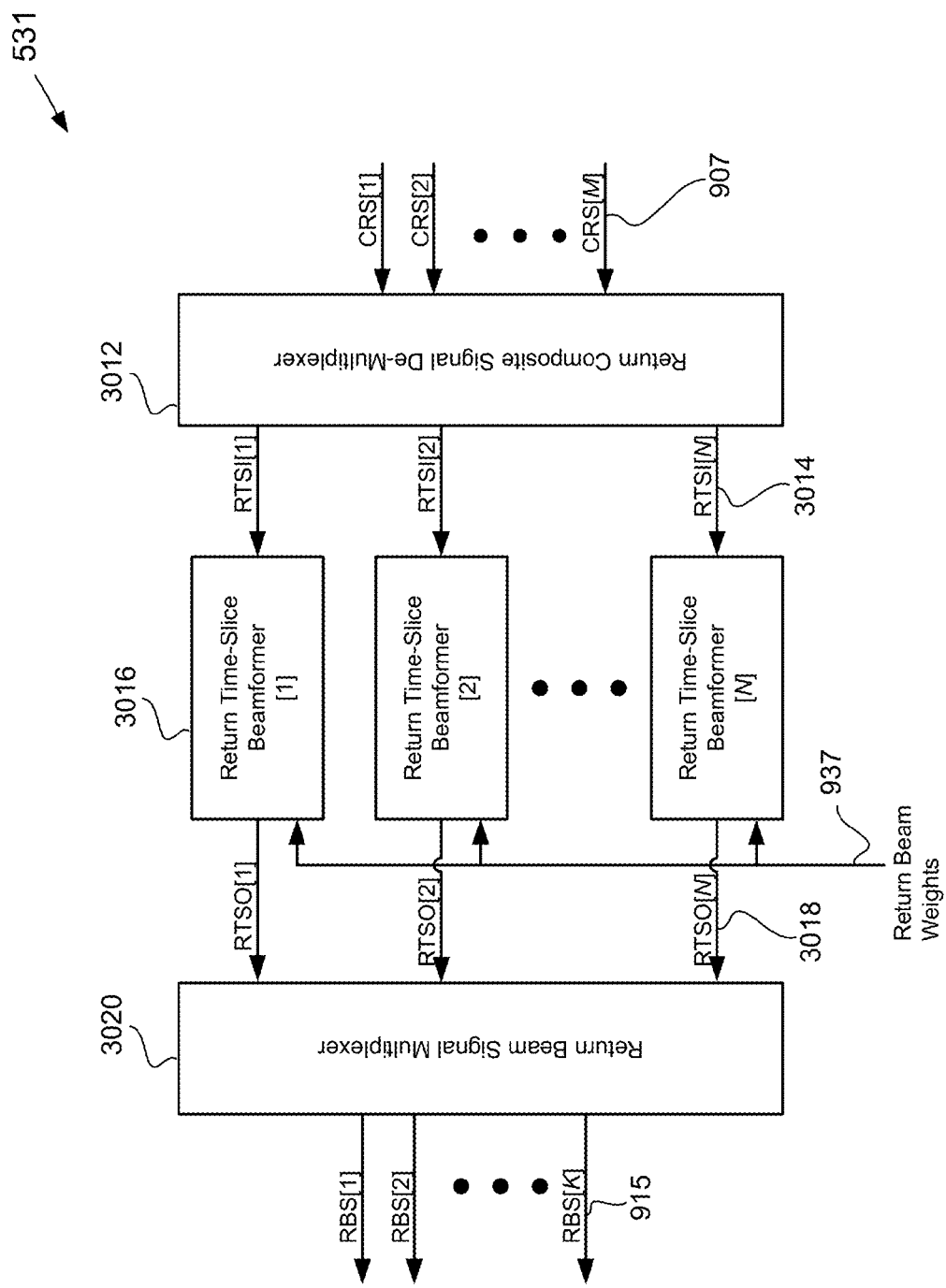
FIG. 33 is a block diagram of an example return beamformer comprising multiple return time-slice beamformers with time-domain de-multiplexing and multiplexing.

FIG. 33 is a block diagram of an example return beamformer 531 comprising multiple return time-slice beamformers with time-domain de-multiplexing and multiplexing. The return beamformer 531 includes a return composite signal de-multiplexer 3012, N return time-slice beamformers 3016, and a return beam signal multiplexer 3020. Return composite signal de-multiplexer 3012 receives M composite return signals 907 (e.g., from M ANs) and de-multiplexes the M composite return signals 907 into return time slice inputs 3014 for input to the N return time-slice beamformers 3016. Each of the return time-slice beamformers 3016 output the samples associated with the K return beam signals 915 for corresponding time-domain subsets of samples via respective return time slice outputs 3018 to the return beam signal multiplexer 3020. The return beam signal multiplexer 3020 multiplexes the time-domain subsets of samples for the K return beam signals received via the N return time slice outputs 3018 to generate the K return beam signals 915. Each of the return time-slice beamformers 3016 may include a data buffer, a beam matrix buffer, and beam weight processor implementing the matrix product operation. That is, each of the return time-slice beamformers 3016 may implement computations mathematically equivalent to the splitter and weighting modules 539 and combining module 913 shown for return beamformer 531 of FIG. 30 during processing of the samples of one time slice-index. As discussed above with the forward time-slice beamformers, updating of the beam weight matrix may be performed incrementally using a ping-pong beam weight buffer configuration (e.g., one can be updated while the other is being used). In some cases, multiple buffers can be used to store beam weights corresponding to multiple user beam patterns (e.g., multiple user coverage areas). Beam weight buffers and data buffers for return time-slice beamformers 3016 may be implemented as any type of memory or storage including dynamic or static random access memory (RAM). Beam weight processing may be implemented in an application specific integrated circuit (ASIC) and/or a field programmable gate array (FPGA), and may include one or more processing cores. Additionally or alternatively, the beam weight buffer, data buffer, and beam weight processor may be integrated within one component.

Figure 34:
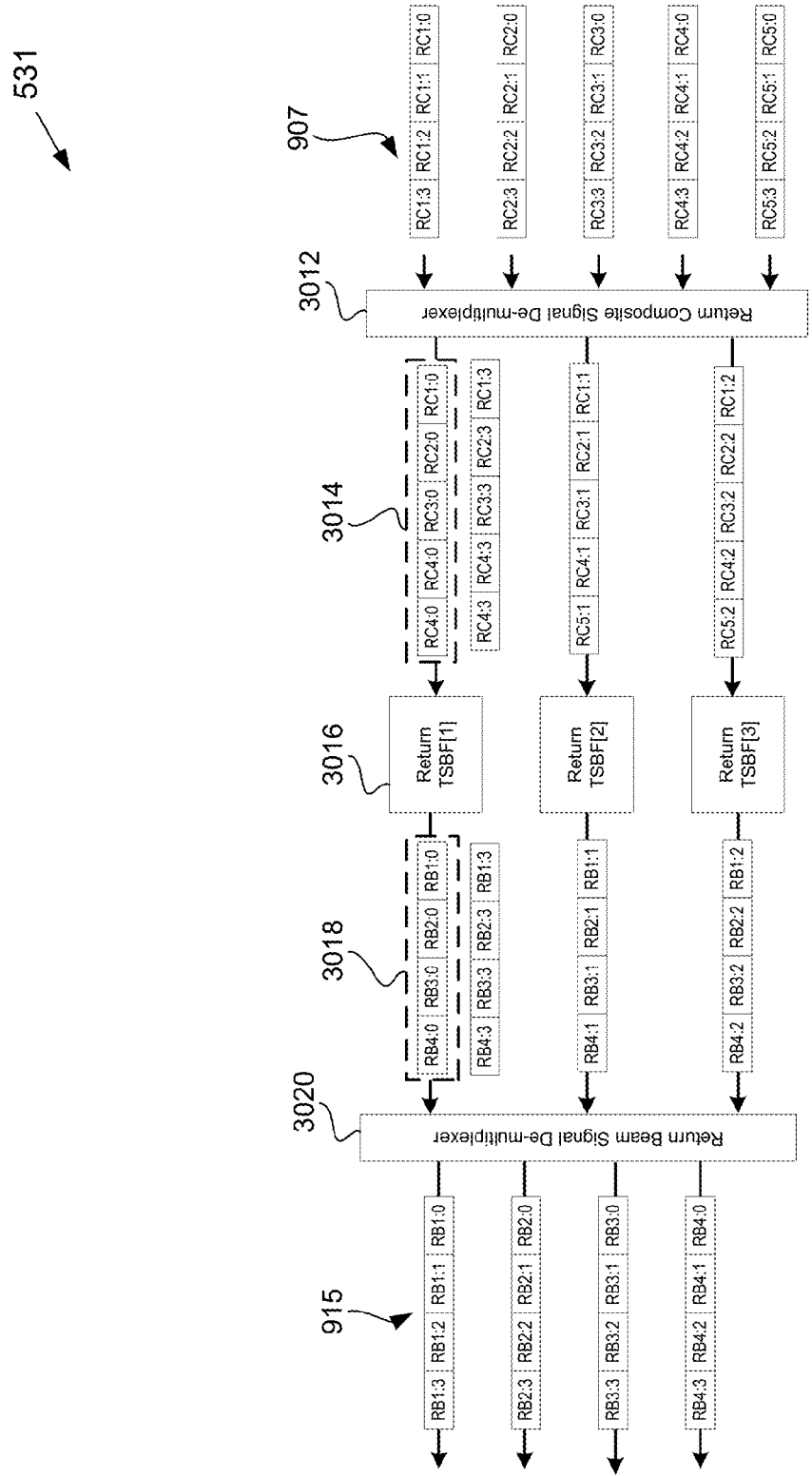
FIG. 34 is an illustration of a simplified example ground segment showing the operation of a return beamformer employing time-domain multiplexing.

FIG. 34 illustrates a simplified example ground segment showing the operation of a return beamformer 531 employing time-domain multiplexing. In the example of FIG. 33, return beamformer 531 receives five composite return signals (e.g., M=5), generates return beam signals for four return user beams (e.g., K=5), and has three time-slice beamformers (e.g., N=3). The composite return signals are denoted by RCm:t, where m is the AN index and t is the time-slice index (e.g., corresponding to a time-domain subset of samples). The return composite signal de-multiplexer 3012 receives four time-domain subsets of samples of the composite return signals from five ANs and de-multiplexes each composite return signal so that one return time slice input 3014 includes, for a particular time-slice index t, the corresponding time-domain subsets of samples from each of the composite return signals 907. For example, time-domain subsets can be a single sample, a contiguous block of samples, or a discontiguous (e.g., interleaved) block of samples as described below. The return time-slice beamformers 3016 generate (e.g., based on the composite return signals 907 and return beam weight matrix 937) each of the K return beam signals for the time-slice index t, denoted by RBk:t. For example, the time-domain subsets of samples RC1:0, RC2:0, RC3:0, RC4:0, and RC5:0 for time-slice index t=0 are input to a first return time-slice beam former 3016, which generates corresponding samples of return beam signals RB1:0, RB2:0, RB3:0, and RB4:0 at a return time slice output 3018. For subsequent time-slice index values t=1, 2, the time-domain subsets of samples of composite return signals 907 are de-multiplexed by the return composite signal de-multiplexer 3012 for input to a second and a third return time-slice beamformer 3016, respectively, which generate samples for the return beam signals associated with the corresponding time-slice indices t at return time slice outputs 3018. FIG. 34 also shows that at time-slice index value t=3, the first return time-slice beamformer generates samples of return beam signals associated with the corresponding time-slice index 3. The matrix product operation performed by each return time-slice beamformer 3016 for one time-slice index value t may take longer than the real time of the time-domain subset of samples (e.g., the number of samples S multiplied by the sample rate $t_S$). However, each return time-slice beamformer 3016 may only process one time-domain subset of samples every N time-slice indices t. Return beam signal multiplexer 3020 receives return time slice outputs 3018 from each of the return time-slice beamformers 3016 and multiplexes the time-domain subsets of samples to generate the K return beam signals 915.

Although FIGS. 31-34 illustrate the same number N of forward time-slice beamformers 3006 as return time-slice beamformers 3016, some implementations may have more or fewer forward time-slice beamformers 3006 than return time-slice beamformers 3016. In some examples, forward beamformer 529 and/or return beamformer 531 may have spare capacity for robustness to node failure. For example, if each forward time-slice beamformer 3006 takes $t_{FTS}$ to process one set of samples for a time-slice index t having a real-time time-slice duration $t_D$, where $t_{FTS}=N \cdot t_D$, the forward beamformer 529 may have N+E forward time-slice beamformers 3006. In some examples, each of the N+E forward time-slice beamformers 3006 are used in operation, with each forward time-slice beamformer 3006 having an effective extra capacity of E/N. If one forward time-slice beamformer 3006 fails, the operations may be shifted to another forward time-slice beamformer 3006 (e.g., by adjusting how time-domain samples (or groups of samples) are routed through the time-domain de-multiplexing and multiplexing.). Thus, forward beamformer 529 may be tolerant of up to E forward time-slice beamformers 3006 failing before system performance is impacted. In addition, extra capacity allows for system maintenance and upgrading of time-slice beamformers while the system is operating. For example, upgrading of time-slice beamformers may be performed incrementally because the system is tolerant of different performance between time-slice beamformers. The data samples associated with a time-slice index t may be interleaved. For example, a first time-slice index to may be associated with samples 0, P, 2P, . . . (S−1)*P, while a second time-slice index ti may be associated with samples 1, P+1, 2P+1 . . . (S−1)*P+1, etc., where S is the number of samples in each set of samples, and P is the interleaving duration. The interleaving may also make the system more robust to time-slice beamformer failures, because each time-slice beamformer block of samples are separated in time such that errors due to a missing block would be distributed in time, similarly to the advantage from interleaving in forward error correction. In fact, the distributed errors caused by time-slice beamformer failure may cause effects similar to noise and not result in any errors to user data, especially if forward error coding is employed. Although examples where N=3 have been illustrated, other values of N may be used, and N need not have any particular relationship to K or M.

Figure 35:
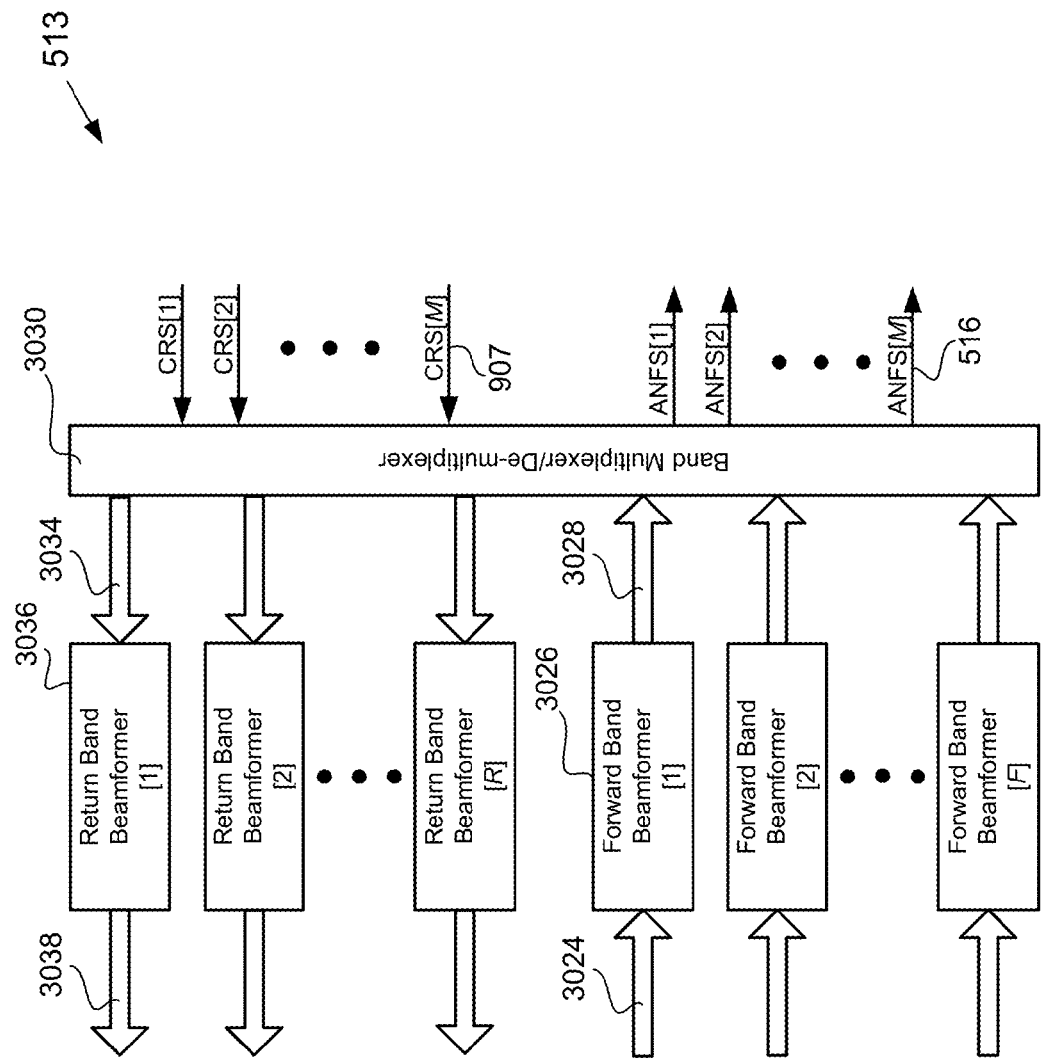
FIG. 35 is a block diagram of an example multi-band forward/return beamformer that employs sub-band de-multiplexing and multiplexing.

As discussed above, forward beamformer 529 and return beamformer 531 illustrated in FIGS. 31 and 33, respectively, may perform time-domain de-multiplexing and multiplexing for time-slice beamforming for one channel or frequency sub-band. Multiple sub-bands may be processed independently using an additional sub-band mux/demux switching layer. FIG. 35 is a block diagram of an example multi-band forward/return beamformer 513 that employs sub-band de-multiplexing and multiplexing. The multi-band forward/return beamformer 513 may support F forward sub-bands and R return sub-bands.

Multi-band forward/return beamformer 513 includes F forward sub-band beamformers 3026, R return sub-band beamformers 3036, and a sub-band multiplexer/de-multiplexer 3030. For example, the forward beam signals 511 may be split up into F forward sub-bands. Each of the F forward sub-bands may be associated with a subset of the K forward user beam coverage areas. That is, the K forward user beam coverage areas may include multiple subsets of forward user beam coverage areas associated with different (e.g., different frequency and/or polarization, etc.) frequency sub-bands, where the forward user beam coverage areas within each of the subsets may be non-overlapping (e.g., at 3 dB signal contours, etc.). Thus, each of the forward sub-band beamformer inputs 3024 may include a subset $K_1$ of the forward beam signals 511. Each of the F forward beamformers 3026 may include the functionality of forward beamformer 529, generating forward sub-band beamformer outputs 3028 that comprise the M access node-specific forward signals associated with the subset of the forward beam signals 511 (e.g., a matrix product of the $K_1$ forward beam signals with an $M \times K_1$ forward beam weight matrix). Thus, each of the ANs 515 may receive multiple access node-specific forward signals associated with different frequency sub-bands (e.g., for each of the F forward sub-bands). The ANs may combine (e.g., sum) the signals in different sub-bands in the forward uplink signals, as discussed in more detail below. Similarly, ANs 515 may generate multiple composite return signals 907 for R different return sub-bands. Each of the R return sub-bands may be associated with a subset of the K return user beam coverage areas. That is, the K return user beam coverage areas may include multiple subsets of return user beam coverage areas associated with different frequency sub-bands, where the return user beam coverage areas within each of the subsets may be non-overlapping (e.g., at 3 dB signal contours, etc.). The sub-band multiplexer/de-multiplexer 3030 may split the composite return signals 907 into the R return sub-band beamformer inputs 3034. Each of the return sub-band beamformers 3036 may then generate a return sub-band beamformer output 3038, which may include the return beam signals 915 for a subset of the return user beams (e.g., to the feeder link modems 507 or return beam signal demodulator, etc.). In some examples, the multi-band forward/return beamformer 513 may support multiple polarizations (e.g., right-hand circular polarization (RHCP), left-hand circular polarization (LHCP), etc.), which in some cases may effectively double the number of sub-bands.

In some cases, time-slice multiplexing and de-multiplexing for forward beamformer 529 and return beamformer 531 (e.g., beam signal de-multiplexer 3002, forward access node signal multiplexer 3010, return composite signal de-multiplexer 3012, return beam signal multiplexer 3020) and sub-band multiplexing/de-multiplexing (sub-band multiplexer/de-multiplexer 3030) may be performed by packet switching (e.g., Ethernet switching, etc.). In some cases, the time-slice and sub-band switching may be performed in the same switching nodes, or in a different order. For example, a fabric switching architecture may be used where each switch fabric node may be coupled with a subset of the ANs 515, forward time-slice beamformers 3006, return time-slice beamformers 3016, or feeder link modems 507. A fabric switching architecture may allow, for example, any AN to connect (e.g., via switches and/or a switch fabric interconnect) to any forward time-slice beamformer or return time-slice beamformer in a low-latency, hierarchically flat architecture. In one example, a system supporting $K \leq 600$, $M \leq 600$, and a 500 MHz bandwidth (e.g., per sub-band) with fourteen sub-bands for the forward or return links may be implemented by a commercially available interconnect switch platform with 2048 10 GigE ports.

Delay Equalization

In some cases, differences in the propagation delays on each of the paths between the end-to-end relay 503 and the CPS 505 are insignificant. For example, on the return link, when the same signal (e.g., data to or from a particular user) is received by multiple ANs 515, each instance of the signal may arrive at the CPS essentially aligned with each other instance of the signal. Likewise, when the same signal is transmitted to a user terminal 517 through several ANs 515, each instance of the signal may arrive at the user terminal 517 essentially aligned with each other instance of the signal. In other words, signals may be phase and time aligned with sufficient precision that signals will coherently combine, such that the path delays and beamforming effects are small relative to the transmitted symbol rate. As an illustrative example, if the difference in path delays is 10 microseconds, the beamforming bandwidth can be on the order of tens of kHz and one can use a narrow bandwidth signal, say ksps with a small possible degradation in performance. The 10 ksps signaling rate has a symbol duration of 100 microseconds and the 10 microsecond delay spread is only one tenth of the symbol duration. In these cases, for the purposes of the system analysis, it may be assumed that signals received by the end-to-end relay at one instant will be relayed and transmitted at essentially the same time, as described earlier.

In other cases, there may be a significant difference in the propagation delay relative to the signaling interval (transmitted symbol duration) of the signals transmitted from the transmit antenna elements 409 to the ANs 515. The path that the signals take from each AN 515 through the distribution network 518 may contain significant delay variations. In these cases, delay equalization may be employed to match the path delays.

For end-to-end return link signals received through the distribution network 518 by the CPS 505, signals may be time aligned by using a relay beacon signal transmitted from the end-to-end relay, for example a PN beacon as described earlier. Each AN 515 may time stamp the composite return signal using the relay beacon signal as a reference. Therefore, different ANs 515 may receive the same signal at different times, but the received signals in each AN 515 may be time stamped to allow the CPS 505 to time align them. The CPS 505 may buffer the signals so that beamforming is done by combining signals that have the same time stamp.

Returning to FIGS. 33 and 34, delay equalization for the return link may be performed by de-multiplexing the composite return signals to the return time-slice beamformers 3016. For example, each AN may split up the composite return signal into sets of samples associated with time-slice indices t, which may include interleaved samples of the composite return signal. The time-slice indices t may be determined based on the relay beacon signal. The ANs may send the subsets of samples multiplexed with the corresponding time-slice indices t (e.g., as a multiplexed composite return signal) to the return beamformer 531, which may serve as synchronization timing information on the return link. The subsets of samples from each AN may be de-multiplexed (e.g., via switching) and one return time-slice beamformer 3016 may receive the subsets of samples from each AN for a time-slice index t (for one of multiple sub-bands, in some cases). By performing the matrix product of the return beam weight matrix and the subsets of samples from each of the M composite return signals associated with the time-slice index t, return time-slice beamformer 3016 may align the signals relayed by the end-to-end relay at the same time for applying the return beam weight matrix.

For the forward link, the beamformer 513 within the CPS 505 may generate a time stamp that indicates when each access node-specific forward signal transmitted by the ANs 515 is desired to arrive at the end-to-end relay 503. Each AN 515 may transmit an access node beacon signal 2530, for example a loopback PN signal. Each such signal may be looped-back and transmitted back to the ANs 515 by the end-to-end relay 503. The ANs 515 may receive both the relay beacon signal and the relayed (looped-back) access node beacon signals from any or all of the ANs. The received timing of the access node beacon signal relative to receive timing of the relay beacon signal indicates when the access node beacon signal arrived at the end-to-end relay. Adjusting the timing of the access node beacon signal such that, after relay by the end-to-end relay, it arrives at the AN at the same time as the relay beacon signal arrives at the AN, forces the access node beacon signal to arrive at the end-to-end relay synchronized with the relay beacon. Having all ANs perform this function enables all access node beacon signals to arrive at the end-to-end relay synchronized with the relay beacon. The final step in the process is to have each AN transmit its access node-specific forward signals synchronized with its access node beacon signal. This can be done using timestamps as described subsequently. Alternatively, the CPS may manage delay equalization by sending the respective access node-specific forward signals offset by the respective time-domain offsets to the ANs (e.g., where the timing via the distribution network is deterministic). In some cases, the feeder-link frequency range may be different from the user-link frequency range. When the feeder-link downlink frequency range (e.g., a frequency range in V band) is non-overlapping with the user-link downlink frequency range (e.g., a frequency range in Ka band), and the ANs are within the user coverage area, the ANs may include antennas and receivers operable over the user-link downlink frequency range in order to receive the relayed access node beacon signals via the receive/transmit signal paths of the end-to-end relay. In such a case, the end-to-end relay can include a first relay beacon generator that generates a first relay beacon signal in the user-link downlink frequency range to support feeder link synchronization. The end-to-end relay can also include a second relay beacon generator that generates a second relay beacon signal in the feeder-link downlink frequency range to support removal of feeder-link impairments from the return downlink signals.

Figure 36:
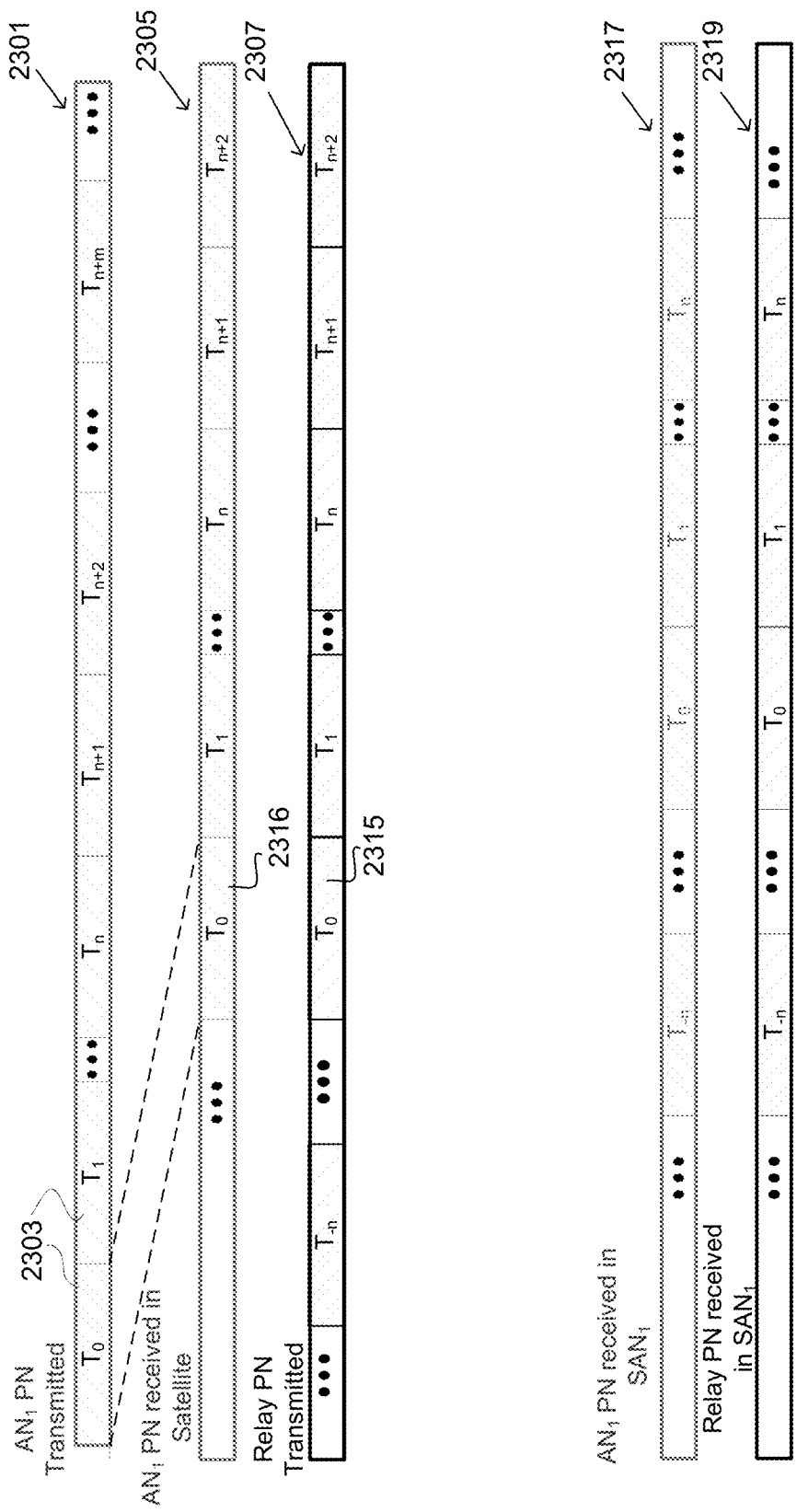
FIG. 36 and FIG. 37 is an illustration of example timing alignment for the forward link.

FIG. 36 is an illustration of PN sequences used to align the timing of the system. The horizontal axis of the figure represents time. An $AN_1$ PN sequence 2301 of chips 2303 is transmitted in the access node beacon signal from the first AN. The relative time of arrival of this sequence at the end-to-end relay is depicted by the PN sequence 2305. There is a time shift of PN sequence 2305 with respect to $AN_1$ PN sequence 2301, due to the propagation delay from the AN to the end-to-end relay. A relay PN beacon sequence 2307 is generated within, and transmitted from, the end-to-end relay in a relay beacon signal. A PN chip of the relay PN beacon sequence 2307 at time $T_0$ 2315 is aligned with a PN chip 2316 of the $AN_1$ PN received signal 2305 at time $T_0$. The PN chip 2316 of the $AN_1$ PN received signal 2305 is aligned with the PN chip 2315 of the relay PN beacon 2307 when the $AN_1$ transmit timing is adjusted by the proper amount. The PN sequence 2305 is looped back from the end-to-end relay and the PN sequence 2317 is received at $AN_1$. A PN sequence 2319 transmitted from the end-to-end relay in the relay PN beacon is received at $AN_1$. Note that the PN sequences 2317, 2319 are aligned at $AN_1$ indicating that they were aligned at the end-to-end relay.

Figure 37:
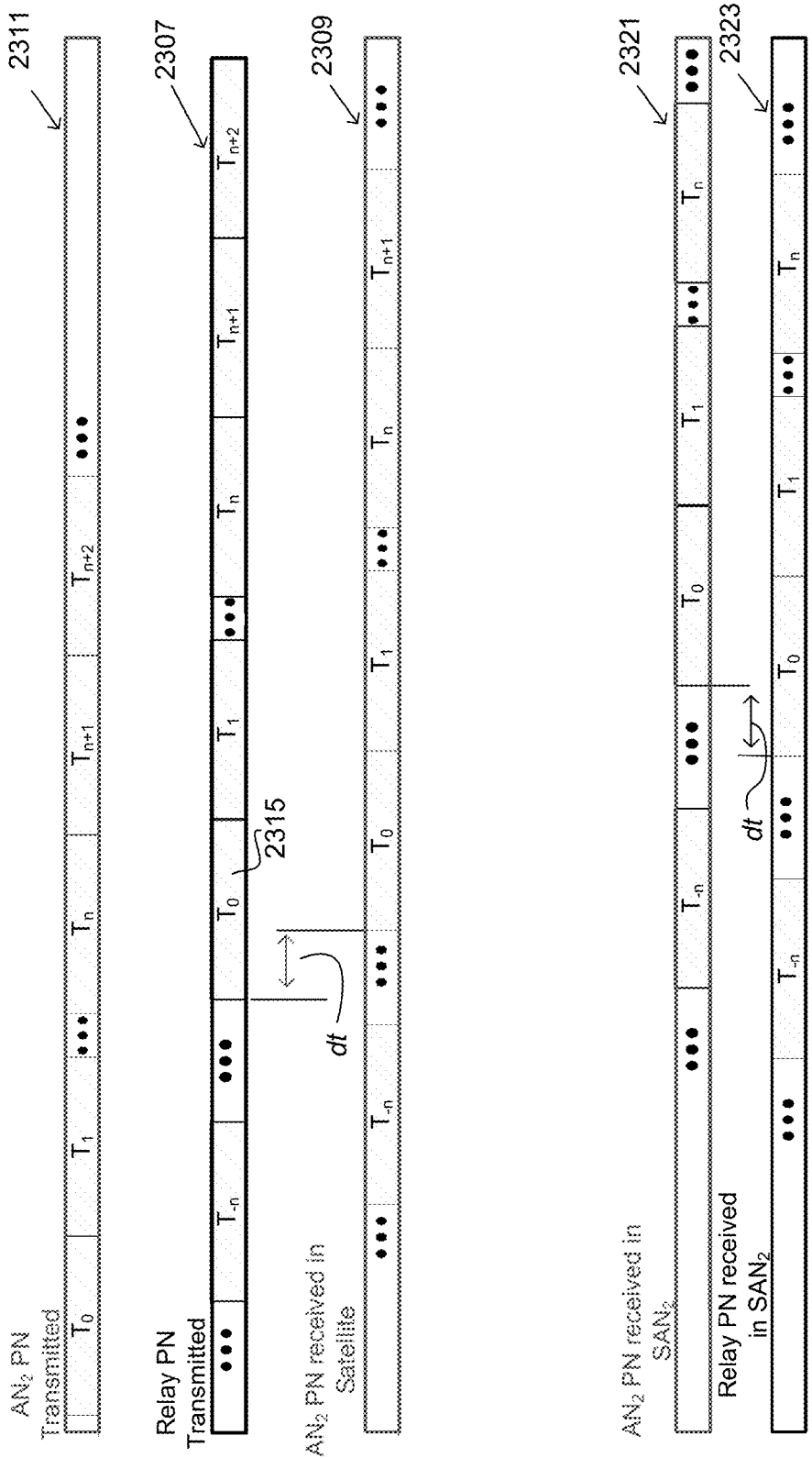

FIG. 37 shows an example of an $AN_2$ that has not properly adjusted the timing of the PN sequence generated in the $AN_2$. Notice that the PN sequence 2311 generated by the $AN_2$ is received at the end-to-end relay shown as sequence 2309 with an offset by an amount dt from the relay PN beacon PN sequence 2307. This offset is due to an error of the timing used to generate the sequence in the $AN_2$. Also, note that the arrival of the $AN_2$ PN sequence 2321 at $AN_2$ is offset from the arrival of the relay PN beacon PN sequence at $AN_2$ 2323 by the same amount dt. The signal processing in $AN_2$ will observe this error and may make a correction to the transmit timing by adjusting the timing by an amount dt to align the PN sequences 2321, 2323.

In FIGS. 36 and 37 the same PN chip rate has been used for the relay PN beacon and all of the AN (loopback) PN signals for ease of illustration of the concept. The same timing concepts can be applied with different PN chip rates. Returning to FIGS. 31 and 32, the time-slice indices t may be used for synchronizing the access node-specific forward signals received from each of the ANs at the end-to-end relay. For example, the time-slice indices t may be multiplexed with the access node-specific forward signals 516. Each AN may transmit samples of the access node-specific forward signals with a particular time-slice index t aligned with corresponding timing information in the PN sequence of chips transmitted in the respective access node beacon signals. Because the respective access node beacon signals have been adjusted to compensate for the respective path delays and phase shifts between the ANs and the end-to-end relay, the samples associated with the time-slice index t will arrive at the end-to-end relay with timing synchronized and phase aligned correctly relative to each other.

In cases where ANs receive their own access node beacon signals, it is possible to loop back the access node beacon signals using the same end-to-end relay communication hardware that is also carrying the forward direction communication data. In these cases, the relative gains and/or phases of the transponders in the end-to-end relay can be adjusted as subsequently described.

Figure 38:
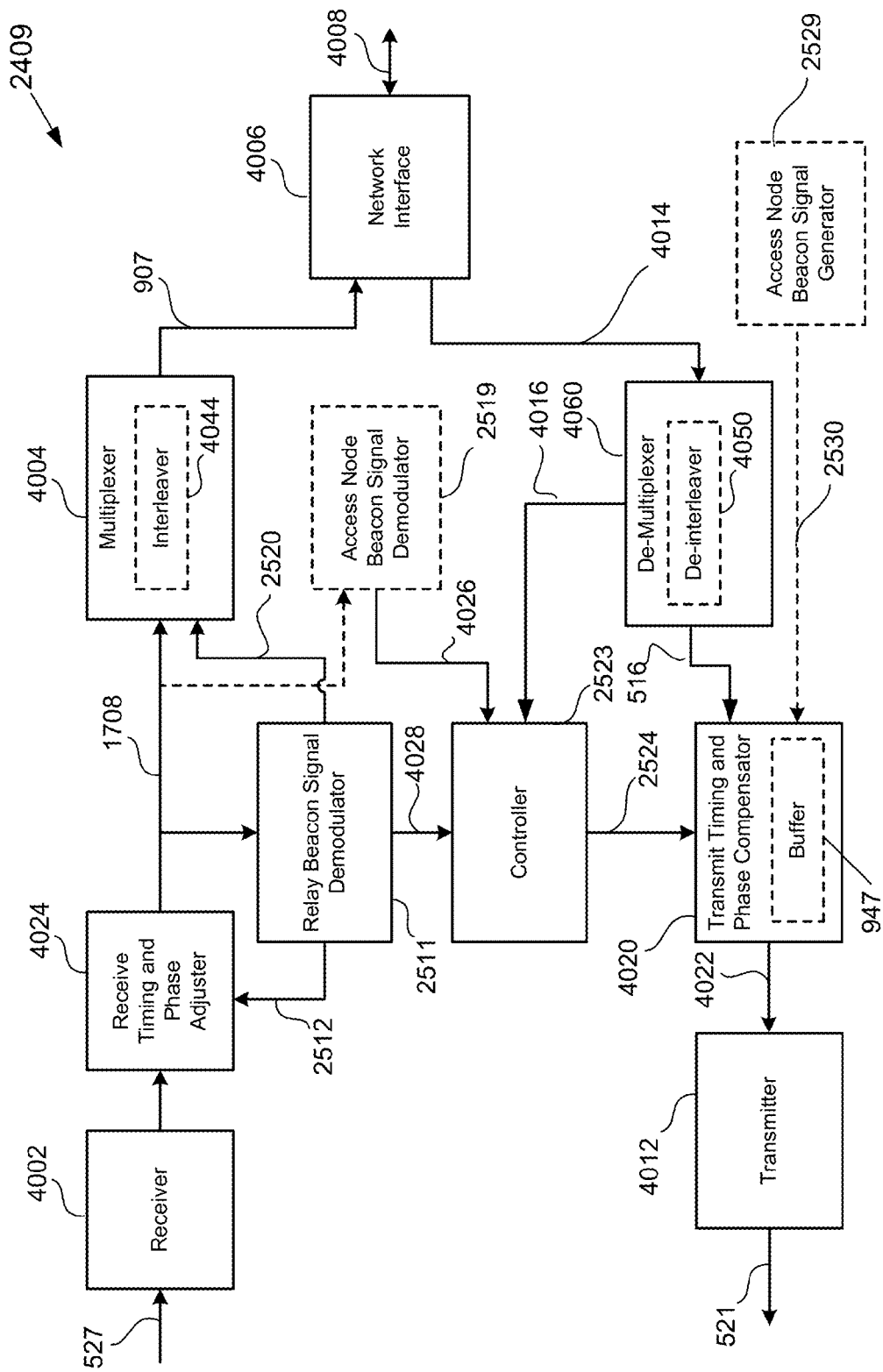
FIG. 38 is a block diagram of an example AN.

FIG. 38 is a block diagram of an example AN 515. AN 515 comprises receiver 4002, receive timing and phase adjuster 4024, relay beacon signal demodulator 2511, multiplexer 4004, network interface 4006, controller 2523, de-multiplexer 4060, transmit timing and phase compensator 4020, and transmitter 4012. Network interface 4006 may be connected to, for example, CPS 505 via network port 4008.

On the return link, receiver 4002 receives a return downlink signal 527. The return downlink signal 527 may include, for example, a composite of return uplink signals relayed by the end-to-end relay (e.g., via multiple receive/transmit signal paths, etc.) and the relay beacon signal. Receiver 4002 may perform, for example, down-conversion and sampling. Relay beacon signal demodulator 2511 may demodulate the relay beacon signal in the digitized composite return signal 907 to obtain relay timing information 2520. For example, relay beacon signal demodulator 2511 may perform demodulation to recover the chip timing associated with the relay PN code and generate time stamps corresponding to the transmission time from the end-to-end relay for samples of the digitized composite return signal 527. Multiplexer 4004 may multiplex the relay timing information 2520 with the samples of the digitized composite return signal (e.g., to form a multiplexed composite return signal) to be sent to the CPS 505 (e.g., via network interface 4006). Multiplexing the relay timing information 2520 may include generating subsets of samples corresponding to time-slice indices t for sending to the CPS 505. For example, multiplexer 4004 may output subsets of samples associated with each time slice index t for input to the return time-slice beamforming architecture described above with reference to FIGS. 33, 34, and 35. Multiplexer 4004 may include an interleaver 4044 for interleaving samples for each subset of samples, in some cases.

On the forward link, network interface 4006 may obtain AN input signal 4014 (e.g., via network port 4008). De-multiplexer 4060 may de-multiplex AN input signal 4014 to obtain access node-specific forward signal 516 and forward signal transmit timing information 4016 indicating transmission timing for the access node-specific forward signal 516. For example, the access node-specific forward signal 516 may comprise the forward signal transmit timing information (e.g., multiplexed with data samples, etc.). In one example, the access node-specific forward signal 516 comprises sets of samples (e.g., in data packets), where each set of samples is associated with a time-slice index t. For example, each set of samples may be samples of the access node-specific forward signal 516 generated according to the forward time-slice beamforming architecture discussed above with reference to FIGS. 31, 32 and 35. De-multiplexer 4060 may include a de-interleaver 4050 for de-interleaving samples associated with time-slice indices t.

Transmit timing and phase compensator 4020 may receive and buffer access node-specific forward signal 516 and output forward uplink signal samples 4022 for transmission by the transmitter 4012 at an appropriate time as forward uplink signal 521. The transmitter 4012 may perform digital-to-analog conversion and up-conversion to output the forward uplink signal 521. Forward uplink signal samples 4022 may include the access node-specific forward signal 516 and an access node beacon signal 2530 (e.g., loopback PN signal), which may include transmit timing information (e.g., PN code chip timing information, frame timing information, etc.). Transmit timing and phase compensator 4020 may multiplex the access node-specific forward signal 516 with the access node beacon signal 2530 such that the forward signal transmit timing and phase information 4016 is synchronized to corresponding transmit timing and phase information in the access node beacon signal 2530.

In some examples, generation of the access node beacon signal 2530 is performed locally at the AN 515 (e.g., in access node beacon signal generator 2529). Alternatively, generation of the access node beacon signal 2530 may be performed in a separate component (e.g., CPS 505) and sent to the AN 515 (e.g., via network interface 4006). As discussed above, the access node beacon signal 2530 may be used to compensate the forward uplink signal 521 for path differences and phase shifts between the AN and the end-to-end relay. For example, the access node beacon signal 2530 may be transmitted in the forward uplink signal 521 and relayed by the end-to-end relay to be received back at receiver 4002. The controller 2523 may compare relayed transmit timing and phase information 4026 obtained (e.g., by demodulation, etc.) from the relayed access node beacon signal with receive timing and phase information 4028 obtained (e.g., by demodulation, etc.) from the relay beacon signal. The controller 2523 may generate a timing and phase adjustment 2524 for input to the transmit timing and phase compensator 4020 to adjust the access node beacon signal 2530 to compensate for the path delay and phase shifts. For example, the access node beacon signal 2530 may include a PN code and frame timing information (e.g., one or more bits of a frame number, etc.). The transmit timing and phase compensator 4020 may, for example, adjust the frame timing information for coarse compensation for the path delay (e.g., output frame timing information in the access node beacon signal such that the relayed access node beacon signal will have the relayed transmit frame timing information coarsely aligned with corresponding frame timing information in the relay beacon signal, changing which chip of the PN code is considered to be the LSB, etc.). Additionally or alternatively, the transmit timing and phase compensator 4020 may perform timing and phase adjustments to the forward uplink signal samples 4022 to compensate for timing or phase differences between the relayed transmit timing and phase information 4026 and receive timing and phase information 4028. For example, where the access node beacon signal 2530 is generated based on a local oscillator, timing or phase differences between the local oscillator and the received relay beacon signal may be corrected by timing and phase adjustments to the forward uplink signal samples 4022. In some examples, demodulation of the access node beacon signal is performed locally at the AN 515 (e.g., in access node beacon signal demodulator 2519). Alternatively, demodulation of the access node beacon signal may be performed in a separate component (e.g., CPS 505) and the relayed transmit timing and phase information 4026 may be obtained in other signaling (e.g., via network interface 4006). For example, deep fading may make reception and demodulation of the AN's own relayed access node beacon signal difficult without transmission at higher power than other signaling, which may reduce the power budget for communication signals. Thus, combining reception of the relayed access node beacon signal from multiple ANs 515 may increase the effective received power and demodulation accuracy for the relayed access node beacon signal. Thus, demodulation of the access node beacon signal from a single AN 515 may be performed using downlink signals received at multiple ANs 515. Demodulation of the access node beacon signal may be performed at the CPS 505 based on the composite return signals 907, which may also include signal information for the access node beacon signals from most or all ANs 515. If desired, end-to-end beamforming for the access node beacon signals can be performed taking into account the access node beacon uplinks (e.g., $C_r$), relay loopback (e.g., E), and/or access node beacon downlinks (e.g., $C_t$).

Feeder Link Impairment Removal

In addition to delay equalization of the signal paths to the end-to-end relay from all the ANs, the phase shifts induced by feeder links can be removed prior to beamforming. The phase shift of each of the links between the end-to-end relay and the M ANs will be different. The causes for different phase shifts for each link include, but are not limited to, the propagation path length, atmospheric conditions such as scintillation, Doppler frequency shift, and different AN oscillator errors. These phase shifts are generally different for each AN and are time varying (due to scintillation, Doppler shift, and difference in the AN oscillator errors). By removing dynamic feeder link impairments, the rate at which beam weights adapt may be slower than an alternative where the beam weights adapt fast enough to track the dynamics of the feeder link.

In the return direction, feeder downlink impairments to an AN are common to both the relay PN beacon and user data signals (e.g., return downlink signals). In some cases, coherent demodulation of the relay PN beacon provides channel information that is used to remove most or all of these impairments from the return data signal. In some cases, the relay PN beacon signal is a known PN sequence that is continually transmitted and located in-band with the communications data. The equivalent (or effective) isotropically radiated power (EIRP) of this in-band PN signal is set such that the interference to the communications data is not larger than a maximum acceptable level. In some cases, a feeder link impairment removal process for the return link involves coherent demodulation and tracking of the received timing and phase of the relay PN beacon signal. For example, relay beacon signal demodulator 2511 may determine receive timing and phase adjustments 2512 to compensate for feeder link impairment based on comparing the relay PN beacon signal with a local reference signal (e.g., local oscillator or PLL). The recovered timing and phase differences are then removed from the return downlink signal (e.g., by receive timing and phase adjuster 4024), hence removing feeder link impairments from the communications signal (e.g., return downlink signals 527). After feeder link impairment removal, the return link signals from a beam will have a common frequency error at all ANs and thus be suitable for beamforming. The common frequency error may include, but is not limited to, contributions from the user terminal frequency error, user terminal uplink Doppler, end-to-end relay frequency translation frequency error and relay PN beacon frequency error.

In the forward direction, the access node beacon signal from each AN may be used to help remove feeder uplink impairments. The feeder uplink impairments will be imposed upon the forward link communications data (e.g., the access node-specific signal) as well as the access node beacon signal. Coherent demodulation of the access node beacon signal may be used to recover the timing and phase differences of the access node beacon signal (e.g., relative to the relay beacon signal). The recovered timing and phase differences are then removed from the transmitted access node beacon signal such that the access node beacon signal arrives in phase with the relay beacon signal.

In some cases, the forward feeder link removal process is a phase locked loop (PLL) with the path delay from the AN to the end-to-end relay and back within the loop structure. In some cases, the round-trip delay from the AN to the end-to-end relay and back to the AN can be significant. For example, a geosynchronous satellite functioning as an end-to-end relay will generate round-trip delay of approximately 250 milliseconds (ms). To keep this loop stable in the presence of the large delay, a very low loop bandwidth can be used. For a 250 ms delay, the PLL closed loop bandwidth may typically be less than one Hz. In such cases, high-stability oscillators may be used on both the satellite and the AN to maintain reliable phase lock, as indicated by block 2437 in FIG. 39 (see below).

In some cases, the access node beacon signal is a burst signal that is only transmitted during calibration intervals. During the calibration interval, communications data is not transmitted to eliminate this interference to the access node beacon signal. Since no communications data is transmitted during the calibration interval, the transmitted power of the access node beacon signal can be large, as compared to what would be required if it were broadcast during communication data. This is because there is no concern of causing interference with the communications data (the communications data is not present at this time). This technique enables a strong signal-to-noise ratio (SNR) for the access node beacon signal when it is transmitted during the calibration interval. The frequency of occurrence of the calibration intervals is the reciprocal of the elapsed time between calibration intervals. Since each calibration interval provides a sample of the phase to the PLL, this calibration frequency is the sample rate of this discrete time PLL. In some cases, the sample rate is high enough to support the closed loop bandwidth of the PLL with an insignificant amount of aliasing. The product of the calibration frequency (loop sample rate) and the calibration interval represents the fraction of time the end-to-end relay cannot be used for communications data without additional interference from the channel sounding probe signal. In some cases, values of less than 0.1 are used and in some cases, values of less than 0.01 are used.

Figure 39:
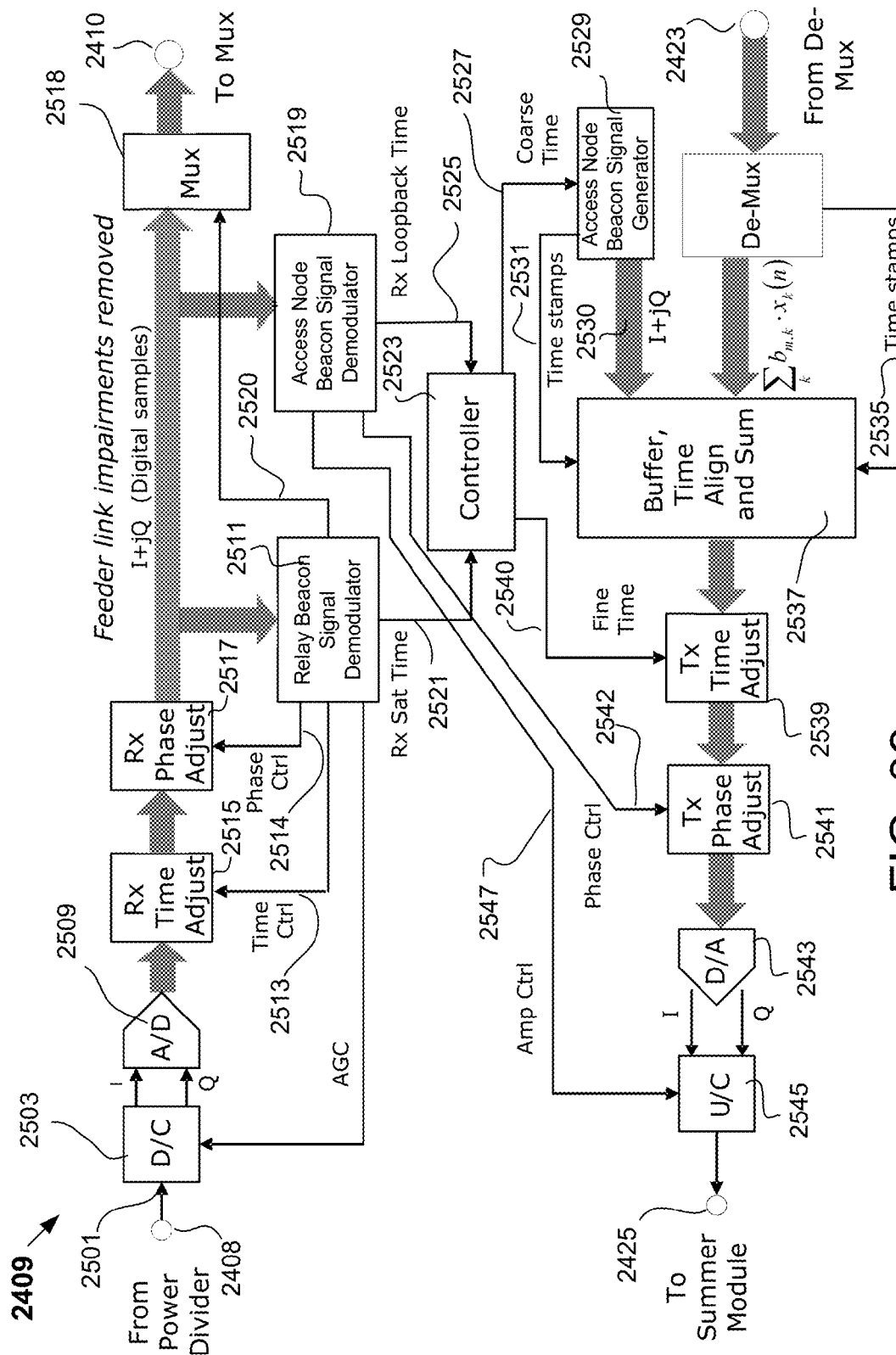
FIG. 39 is a block diagram of part of an example of an AN.

FIG. 39 is a block diagram of an example AN transceiver 2409. The input 2408 to the AN transceiver 2409 receives end-to-end return link signals received by the AN 515 (e.g., for one of a plurality of frequency sub-bands). The input 2408 is coupled to the input 2501 of a down converter (D/C) 2503. The output of the D/C 2503 is coupled to an analog to digital converter (A/D) 2509. The output of the A/D 2509 is coupled to an Rx time adjuster 2515 and/or Rx phase adjuster 2517. Rx time adjuster 2515 and Rx phase adjuster 2517 may illustrate aspects of the receive timing and phase adjuster 4024 of FIG. 38. The D/C 2503 is a quadrature down converter. Accordingly, the D/C 2503 outputs an in-phase and quadrature output to the A/D 2509. The received signals may include communications signals (e.g., a composite of return uplink signals transmitted by user terminals), access node beacon signals (e.g., transmitted from the same AN and/or other ANs) and a relay beacon signal. The digital samples are coupled to a relay beacon signal demodulator 2511. The relay beacon signal demodulator 2511 demodulates the relay beacon signal. In addition, the relay beacon signal demodulator 2511 generates a time control signal 2513 and a phase control signal 2514 to remove feeder link impairments based on the received relay beacon signal. Such impairments include Doppler, AN frequency error, scintillation effects, path length changes, etc. By performing coherent demodulation of the relay beacon signal, a phase locked loop (PLL) may be used to correct for most or all of these errors. By correcting for the errors in the relay beacon signal, corresponding errors in the communication signals and access node beacon signals on the feeder link are corrected as well (e.g., since such errors are common to the relay beacon signal, the access node beacon signals and the communications signals). After feeder link impairment removal, the end-to-end return link communication signal from a user terminal 517 nominally have the same frequency error at each of the M ANs 515. That common error includes the user terminal frequency error, the user link Doppler, the end-to-end relay frequency translation error, and the relay beacon signal frequency error.

The digital samples, with feeder link impairments removed, are coupled to a multiplexer 2518, which may be an example of the multiplexer 4004 of FIG. 38. The multiplexer 2518 associates (e.g., time stamps) the samples with the relay timing information 2520 from the relay beacon signal demodulator 2511. The output of the multiplexer 2518 is coupled to the output port 2410 of the AN transceiver 2409. The output port 2410 is coupled to the multiplexer 2413 and through the interface 2415 (see FIG. 40) to the CPS 505. The CPS 505 can then use the time stamps associated with the received digital samples to align the digital samples received from each of the ANs 515. Additionally or alternatively, feeder link impairment removal may be performed at the CPS 505. For example, digital samples of the end-to-end return link signals with the embedded relay beacon signal may be sent from the AN 515 to the CPS 505, and the CPS 505 may use the synchronization timing information (e.g., embedded relay beacon signal) in each of the composite return signals to determine respective adjustments for the respective composite return signals to compensate for downlink channel impairment.

An access node beacon signal 2530 may be generated locally by an access node beacon signal generator 2529. An access node beacon signal demodulator 2519 demodulates the access node beacon signal received by the AN 515 (e.g., after being relayed by the end-to-end relay and received at input 2408). The relay beacon signal demodulator 2511 provides a received relay timing and phase information signal 2521 to a controller 2523. The controller 2523 also receives a relayed transmit timing and phase information signal 2525 from the access node beacon signal demodulator 2519. The controller 2523 compares the received relay timing and phase information with the relayed transmit timing and phase information and generates a coarse time adjust signal 2527. The coarse time adjust signal 2527 is coupled to the access node beacon signal generator 2529. The access node beacon signal generator 2529 generates the access node beacon signal 2530 with embedded transmit timing information to be transmitted from the AN 515 to the end-to-end relay 503. As noted in the discussion above, the difference between the relay timing and phase information (embedded in the relay beacon signal) and the transmit time and phase information (embedded in the access node beacon signal) is used to adjust the transmit timing and phase information to synchronize the relayed transmit timing and phase information with the received relay timing and phase information. Coarse time is adjusted by the signal 2527 to the access node beacon signal generator 2529 and fine time is adjusted by the signal 2540 to the Tx time adjuster 2539. With the relayed transmit timing and phase information 2525 from the access node beacon signal demodulator 2519 synchronized with the received relay timing and phase information 2521, the access node beacon signal generator 2529 generates timestamps 2531 that assist in the synchronization of the access node beacon signal 2530 and the access node-specific forward signal from the CPS 505 that is transmitted. That is, data samples from the CPS 505 are received on input port 2423 together with timestamps 2535 that indicate when the associated data samples is desired to arrive at the end-to-end relay 503. A buffer, time align and sum module 2537 buffers the data samples coupled from the CPS 505 and sums them with the samples from the access node beacon signal generator 2529 based on the timestamps 2535, 2531. PN samples and communication data samples with identical times, as indicated by the time stamps, are summed together. In this example, the multiple beam signals $(x_k(n)*b_k)$ are summed together in the CPS 505 and the access node-specific forward signal comprising a composite of the multiple beam signals is sent to the AN by the CPS 505.

When aligned properly by the ANs, the data samples arrive at the end-to-end relay 503 at the desired time (e.g., at the same time that the same data samples from other ANs arrive). A transmit time adjuster 2539 performs fine time adjustments based on a fine time controller output signal 2540 from the time controller module 2523. A transmit phase adjuster 2541 performs phase adjustments to the signal in response to a phase control signal 2542 generated by the access node beacon signal demodulator 2519. Transmit time adjuster 2539 and transmit phase adjuster 2541 may illustrate, for example, aspects of the transmit timing and phase compensator 4020 of FIG. 38.

The output of the transmit phase adjuster 2541 is coupled to the input of a digital to analog converter (D/A) 2543. The quadrature analog output from the D/A 2543 is coupled to an up-converter (U/C) 2545 to be transmitted by the HPA 2433 (see FIG. 40) to the end-to-end relay 503. An amplitude control signal 2547 provided by the access node beacon signal demodulator 2519 provides amplitude feedback to the U/C 2545 to compensate for items such as uplink rain fades.

In some cases, the PN code used by each AN for the access node beacon signal 2530 is different from that used by every other AN. In some cases, the PN codes in the access node beacon signals are each different from the relay PN code used in the relay beacon signal. Accordingly, each AN 515 may be able to distinguish its own access node beacon signal from those of the other ANs 515. ANs 515 may distinguish their own access node beacon signals from the relay beacon signal.

As was previously described, the end-to-end gain from any point in the coverage area to any other point in the area is a multipath channel with L different paths that can result in very deep fades for some point to point channels. The transmit diversity (forward link) and receive diversity (return link) are very effective in mitigating the deep fades and enable the communications system to work. However for the access node beacon signals, the transmit and receive diversity is not present. As a result, the point-to-point link of a loopback signal, which is the transmission of the signal from an AN back to the same AN, can experience end-to-end gains that are much lower than the average. Values of 20 dB below the average can occur with a large number of receive/transmit signal paths (L). These few low end-to-end gains result in lower SNR for those ANs and can make link closure a challenge. Accordingly, in some cases, higher gain antennas are used at the ANs. Alternatively, referring to the example transponder of FIG. 16, a phase adjuster 418 may be included in each of the receive/transmit signal paths. The phase adjuster 418 may be individually adjusted by the phase shift controller 427 (for example, under control of a telemetry, tracking, and command (TT&C) link from an Earth-based control center). Adjusting the relative phases may be effective in increasing the end-to-end gains of the low-gain loopback paths. For example, an objective may be to choose phase shift settings to increase the value of the worst case loopback gain (gain from an AN back to itself). Note that the selection of phases generally does not change the distribution of the gains when evaluated for all points in the coverage area to all other points in the coverage area, but it can increase the gains of the low gain loopback paths.

To elaborate, consider the set of gains from each of M ANs 515 to all of the other ANs 515. There are $M^2$ gains, of which, only M of them are loopback paths. Consider two gain distributions, the first is the total distribution of all paths ($M^2$) which can be estimated by compiling a histogram of all $M^2$ paths. For ANs distributed evenly over the entire coverage area, this distribution may be representative of the distribution of the end-to-end gain from any point to any other point in the coverage area. The second distribution is the loopback gain distribution (loopback distribution) which can be estimated by compiling a histogram of just the M loopback paths. In many cases, custom selection of the receive/transmit signal path phase settings (and optionally gain settings) does not provide a significant change to the total distribution. This is especially the case with random or interleaved mappings of transmit to receive elements. However, in most cases, the loopback distribution can be improved with custom selection (as opposed to random values) of the phase (and optionally gain) settings. This is because the set of loopback gains consist of M paths (as opposed to $M^2$ total paths) and the number of degrees of freedom in the phase and gain adjustments is L. Often times L is on the same order as M which enables significant improvement in low loopback gains with custom phase selection. Another way of looking at this is that the custom phase selection is not necessarily eliminating low end-to-end gains, but rather moving them from the set of loopback gains (M members in the set) to the set of non-loopback gains ($M^2$-M members). For non-trivial values of M, the larger set is often much larger than the former.

Figure 40:
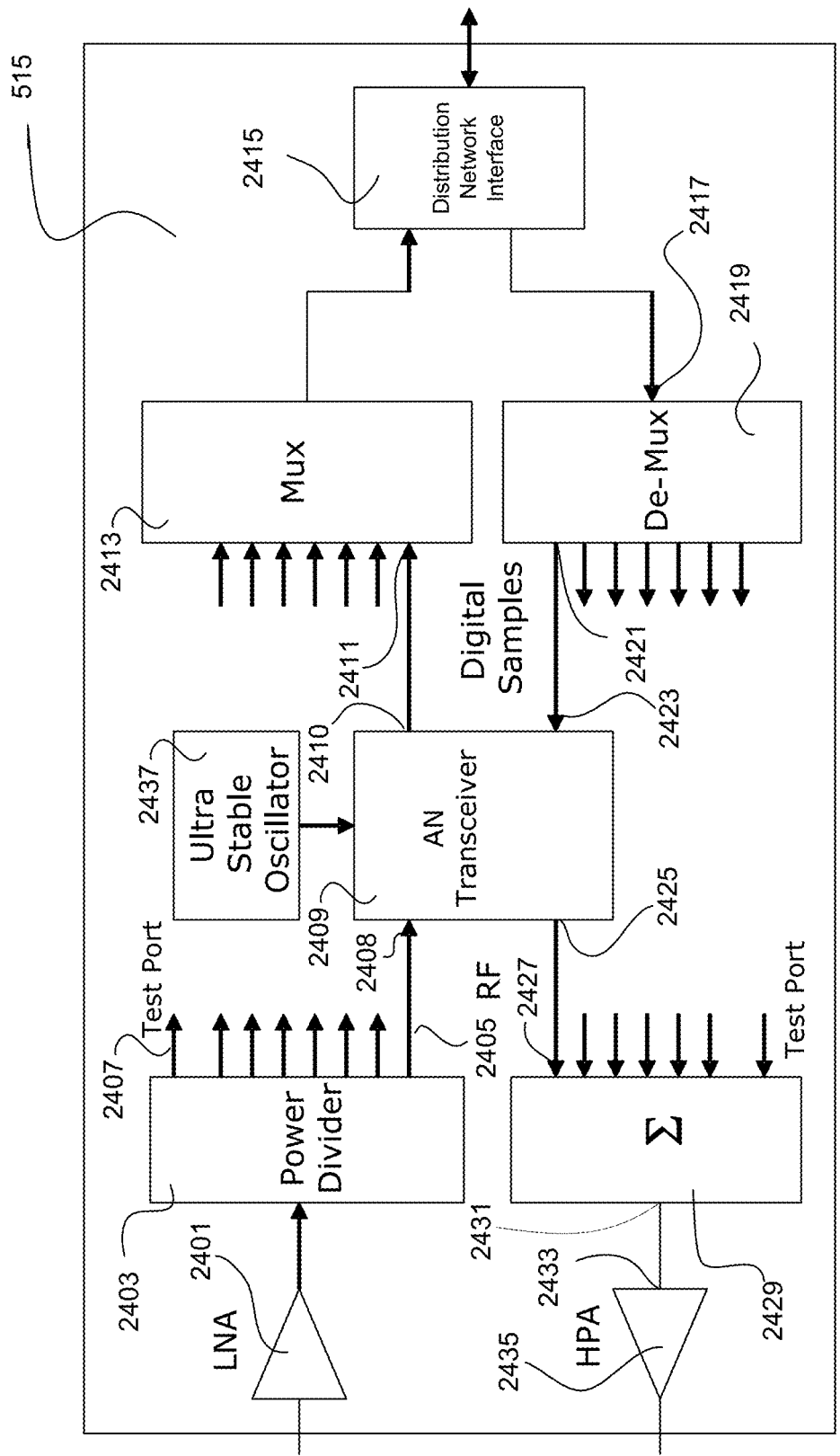
FIG. 40 is a block diagram of an example AN 515 in which multiple frequency sub-bands are processed separately.

An AN 515 may process one or more frequency sub-bands. FIG. 40 is a block diagram of an example AN 515 in which multiple frequency sub-bands are processed separately. On the end-to-end return link 523 (see FIG. 5), the AN 515 receives the return downlink signals 527 from the end-to-end relay 503 through an LNA 2401. The amplified signals are coupled from the LNA 2401 to a power divider 2403. The power divider 2403 splits the signal into multiple output signals. Each signal is output on one of the output ports 2405, 2407 of the power divider 2403. One of the output ports 2407 may be provided as a test port. The other ports 2405 are coupled to an input 2408 of a corresponding one of multiple AN transceivers 2409 (only one shown). The AN transceivers 2409 process the signals received on corresponding sub-bands. The AN transceiver 2409 performs several functions, discussed in detail above. The outputs 2410 of the AN transceivers 2409 are coupled to input ports 2411 of a sub-band multiplexer 2413. The outputs are combined in the sub-band multiplexer 2413 and output to a distribution network interface 2415. The interface 2415 provides an interface for data from/to AN 515 to/from the CPS 505 over the distribution network (see FIG. 5). Processing frequency sub-bands may be advantageous in reducing performance requirements on the RF components used to implement the end-to-end relay and AN. For example, by splitting up 3.5 GHz of bandwidth (e.g., as may be used in a Ka-band system) into seven sub-bands, each sub-band is only 500 MHz wide. That is, each of the access node-specific forward signals may include multiple sub-signals associated with the different sub-bands (e.g., associated with different subsets of the forward user beam coverage areas), and the AN transceivers 2409 may upconvert the sub-signals to different carrier frequencies. This bandwidth splitting may allow for lower tolerance components to be used since amplitude and phase variations between different sub-bands may be compensated by separate beamforming weights, calibration, etc. for the different sub-bands. Of course, other systems may use a different number of sub-bands and/or test ports. Some cases may use a single sub-band and may not include all the components shown here (e.g., omitting power divider 2403 and mux 2413).

On the end-to-end forward link 501, data is received from the CPS 505 by the interface 2415. The received data is coupled to an input 2417 of a sub-band de-multiplexer 2419. The sub-band de-multiplexer 2419 splits the data into multiple data signals. The data signals are coupled from output ports 2421 of the sub-band de-multiplexer 2419 to input ports 2423 of the AN transceivers 2409. Output ports 2425 of the AN transceivers 2409 are coupled to input ports 2427 of the summer module 2429. The summer module 2429 sums the signals output from the seven AN transceivers 2409. An output port 2431 of the summer module 2429 couples the output of the summer module 2429 to the input port 2433 of a high power amplifier (HPA) 2435. The output of the HPA 2435 is coupled to an antenna (not shown) that transmits the signals output to the end-to-end relay 503. In some cases, an ultra-stable oscillator 2437 is coupled to the AN transceivers 2409 to provide a stable reference frequency source.

Beam Weight Computation

Returning to FIG. 8 which is an example description of signals on the return link, a mathematical model of the end-to-end return link may be used to describe the link as:

$$y = Bret[CtE(Arx + n_{ul}) + n_{dl}] \quad \text{EQ. 1}$$
$$= Bret[Hretx + CtEn_{ul} + n_{dl}]$$

where, x is the K×1 column vector of the transmitted signal. In some cases, the magnitude squared of every element in x is defined to be unity (equal transmit power). In some cases, this may not always be the case.

y is the K×1 column vector of the received signal after beamforming.

Ar is the L×K return uplink radiation matrix. The element $\alpha_{lk}$ contains the gain and phase of the path from a reference location located in beam K to the $l^{th}$ (the letter "el") receive antenna element 406 in the Rx array. In some cases, the values of the return uplink radiation matrix are stored in the channel data store 941 (see FIG. 30).

E is the L×L payload matrix. The element $e_{ij}$ defines the gain and phase of the signal from the $j^{th}$ antenna element 406 in the receive array to an $i^{th}$ antenna element 409 in the transmit array. In some cases, aside from incidental crosstalk between the paths (resulting from the finite isolation of the electronics), the E matrix is a diagonal matrix. The matrix E can be normalized such that the sum of the magnitude squared of all elements in the matrix is L. In some cases, the values of the payload matrix are stored in the channel data store 941 (see FIG. 29).

Ct is the M×L return downlink radiation matrix. The element $c_{ml}$ contains the gain and phase of the path from $l^{th}$ (the letter "el") antenna element in the Tx array to an $m^{th}$ AN 515 from among the M ANs 515. In some cases, the values of the return downlink radiation matrix are stored in the channel data store 941 (see FIG. 29).

Hret is the M×K return channel matrix, which is equal to the product Ct×E×Ar.

$n_{ul}$ is an L×1 noise vector of complex Gaussian noise. The covariance of the uplink noise is $E|n_{ul}n_{ul}^H|=2\sigma_{ul}^2 I_L$. $I_L$ is the L×L identity matrix.

$\sigma^2$ is noise variance. $\sigma_{ul}^2$ is experienced on the uplink, while $\sigma_{dl}^2$ is experienced on the downlink.

$n_{dl}$ is an M×1 noise vector of complex Gaussian noise. The covariance of the downlink noise is $E|n_{dl}n_{dl}^H|=2\sigma_{dl}^2 I_M$. $I_M$ is the M×M identity matrix.

Bret is the K×M matrix of end-to-end return link beam weights.

Examples are generally described above (e.g., with reference to FIGS. 6-11) in a manner that assumes certain similarities between forward and return end-to-end multipath channels. For example, the forward and return channel matrices are described above with reference generally to M, K, E, and other models. However, such descriptions are intended only to simplify the description for added clarity, and are not intended to limit examples only to cases with identical configurations in the forward and return directions. For example, in some cases, the same transponders are used for both forward and return traffic, and the payload matrix E can be the same for both forward and return end-to-end beamforming (and corresponding beam weight computations), accordingly. In other cases, different transponders are used for forward and return traffic, and a different forward payload matrix (Efwd) and a return payload matrix (Eret)

can be used to model the corresponding end-to-end multipath channels and to compute corresponding beam weights. Similarly, in some cases, the same M ANs 515 and K user terminals 517 are considered part of both the forward and return end-to-end multipath channels. In other cases, M and K can refer to different subsets of ANs 515 and/or user terminals 517, and/or different numbers of ANs 515 and/or user terminals 517, in the forward and return directions.

Beam weights may be computed in many ways to satisfy system requirements. In some cases, they are computed after deployment of the end-to-end relay. In some cases, the payload matrix E is measured before deployment. In some cases, beam weights are computed with the objective to increase the signal to interference plus noise (SINR) of each beam and can be computed as follows:

$$Bret=(R^{-1}H)^H$$

$$R=2\sigma_{dl}^2 I_M + 2\sigma_{ul}^2 C_r EE^H C_t^H + HH^H \quad \text{EQ. 2, 3}$$

where R is the covariance of the received signal and $(*)^H$ is the conjugate transpose (Hermetian) operator.

The k, m element of the K×M return beam weight matrix Bret provides the weights to form the beam to the $m^{th}$ AN 515 from a user terminal in the $k^{th}$ user beam. Accordingly, in some cases, each of the return beam weights used to form return user beams are computed by estimating end-to-end return gains (i.e., elements of the channel matrix Hret) for each of the end-to-end multipath channels (e.g., each of the end-to-end return multipath channels).

EQ. 2 holds true where R is the covariance of the received signal as provided in EQ. 3. Therefore, when all of the matrices of EQ. 1, 2 and 3 are known, the beam weights used to form end-to-end beams may be directly determined.

This set of beam weights reduces the mean squared error between x and y. It also increases the end-to-end signal to noise plus interference ratio (SINR) for each of the K end-to-end return link signals 525 (originating from each of the K beams).

The first term $2\sigma_{dl}^2 I_M$ in EQ. 3 is the covariance of the downlink noise (which is uncorrelated). The second term $2\sigma_{dl}^2 C_r EE^H C_t^H$ in EQ. 3 is the covariance of the uplink noise (which is correlated at the ANs). The third term $HH^H$ in EQ. 3 is the covariance of the signal. Setting the variance of the uplink noise to zero and ignoring the last term ($HH^H$) results a set of weights that increases the signal to downlink noise ratio by phase-aligning the received signals on each of the M ANs 515. Setting the downlink noise variance to zero and ignoring the $3^{rd}$ term results in a set of weights that increases the uplink SINR. Setting both the uplink and downlink noise variances to zero results in a de-correlating receiver that increases the carrier to interference (C/I) ratio.

In some cases, the beam weights are normalized to make the sum of the magnitude squared of any row of Bret sum to unity.

In some cases, the solution to EQ. 2 is determined by a priori knowledge of the matrices Ar, Ct, and E as well as the variances of the noise vectors $n_{ul}$ and $n_{dl}$. Knowledge of the element values of the matrices can be obtained during measurements made during the manufacturing and testing of relevant components of the end-to-end relay. This may work well for systems where one does not expect the values in the matrices to change significantly during system operation. However, for some systems, especially ones operating in higher frequency bands, such expectations may not be present. In such cases, the matrices Ar, Ct, and E may be estimated subsequent to the deployment of a craft (such as a satellite) on which the end-to-end relay is disposed.

In some cases where a priori information is not used to set the weights, the solution to EQ. 2 may be determined by estimating the values of R and H. In some cases, designated user terminals 517 in the center of each user beam coverage area 519 transmit known signals x during calibration periods. The vector received at an AN 515 is:

$$u=Hx+CtEn_{ul}+n_{dl} \quad \text{EQ. 4}$$

In an example, the CPS 505 estimates the values of R and H based on the following relationships:

$$\hat{R}=\Sigma uu^H \quad \text{EQ. 5}$$

$$\hat{H}=[\hat{p}_1, \hat{p}_2, \ldots \hat{p}_K] \quad \text{EQ. 6}$$

$$\hat{p}_K = \sigma u \tilde{x}_k^* \quad \text{EQ. 7}$$

$\hat{R}$ is an estimate of the covariance matrix R, $\hat{H}$ is an estimate of channel matrix H and $\hat{p}_k$ is an estimate of the correlation vector, $\tilde{x}_k^*$ is the conjugate of the $k^{th}$ component of the transmitted vector with the frequency error introduced by the uplink transmission. In some cases, no return communication data is transmitted during the calibration period. That is, only calibration signals that are known to the ANs are transmitted on the end-to-end return link during the calibration period in order to allow the value of $\hat{p}_k$ to be determined from the received vector u using the equation above. This, in turn allows the value of $\hat{H}$ to be determined. Both the covariance matrix estimate $\hat{R}$ and the channel matrix estimate $\hat{H}$ are determined based on the signals received during the calibration period.

In some cases, the CPS 505 can estimate the covariance matrix $\hat{R}$ while communication data is present (e.g., even when x is unknown). This may be seen from the fact that $\hat{R}$ is determined based only on the received signal u. Nonetheless, the value of $\hat{H}$ is estimated based on signals received during a calibration period during which only calibration signals are transmitted on the return link.

In some cases, estimates of both the channel matrix $\hat{H}$ and the covariance matrix $\hat{R}$ are made while communication data is being transmitted on the return link. In this case, the covariance matrix $\hat{R}$ is estimated as noted above. However, the value of x is determined by demodulating the received signal. Once the value of x is known, the channel matrix may be estimated as noted above in EQ. 6 and EQ. 7.

The signal and interference components of the signal after beamforming are contained in the vector Bret H x. The signal and interference powers for each of the beams are contained in the K×K matrix Bret H. The power in the $k^{th}$ diagonal element of Bret H is the desired signal power from beam k. The sum of the magnitude squared of all elements in row k except the diagonal element is the interference power in beam k. Hence the C/I for beam k is:

$$\left(\frac{C}{I}\right)_k = \frac{|s_{kk}|^2}{\sum_{j \neq k} |s_{kj}|^2} \quad \text{EQ. 8}$$

where $s_{kj}$ are the elements of Bret H. The uplink noise is contained in the vector Bret Ct $En_{ul}$, which has a K×K covariance matrix of $2\sigma_{ul}^2$ Bret Ct E $E^H$ $Ct^H$ Bret$^H$. The $k^{th}$ diagonal element of the covariance matrix contains the uplink noise power in beam k. The uplink signal to noise ratio for beam k is then computed as:

$$\left(\frac{S}{N_{ul}}\right)_k = \frac{|s_{kk}|^2}{t_{kk}} \qquad \text{EQ. 9}$$

where $t_{kk}$ is the $k^{th}$ diagonal element of the uplink covariance matrix. The downlink noise is contained in the vector Bret $n_{dl}$, which has a covariance of $2\sigma_{dl}^2 I_K$ by virtue of the normalized beam weights. Hence the downlink signal to noise ratio is:

$$\left(\frac{S}{N_{dl}}\right)_k = \frac{|s_{kk}|^2}{2\sigma_{dl}^2} \qquad \text{EQ. 10}$$

The end-to-end SINR is the combination of EQ. 8-10:

$$SINR_k = \left[\left(\frac{C}{I}\right)_k^{-1} + \left(\frac{S}{N_{ul}}\right)_k^{-1} + \left(\frac{S}{N_{dl}}\right)_k^{-1}\right]^{-1} \qquad \text{EQ. 11}$$

The above equations describe how to calculate the end-to-end SINR given the payload matrix E. The payload matrix may be constructed by intelligent choice of the gain and phases of each of the elements of E. The gain and phase of the diagonal elements of E that optimize some utility metric (which is generally a function of the K beam SINR's as computed above) may be selected and implemented by setting the phase shifter 418 in each of the L transponders 411. Candidate utility functions include, but are not limited to, sum of $SINR_k$ (total SINR), sum of $Log(1+SINR_k)$ (proportional to total throughput) or total power in the channel matrix, H. In some cases, the improvement in the utility function by customizing the gains and phases is very small and insignificant. This is sometimes the case when random or interleaved mappings of antenna elements are used. In some cases, the utility function can be improved by a non-trivial amount by custom selection of the receive/transmit signal gain and phase.

Returning to FIG. 9, a mathematical model of the end-to-end forward link 501 may be used to describe the link 501 as:

$$y = AtE[CrBfwdx + n_{ul}] + n_{dl} \qquad \text{EQ. 12}$$
$$= HfwdBfwdx + AEn_{ul} + n_{dl}$$

where, x is the K×1 column vector of the transmitted signal. The magnitude squared of every element in x is defined to be unity (equal signal power). In some cases, unequal transmit power may be achieved by selection of the forward beam weights.

y is the K×1 column vector of the received signal.

Cr is the L×M forward uplink radiation matrix. The element $c_{lm}$ contains the gain and phase of the path 2002 from $m^{th}$ AN 515 to the $l^{th}$ (letter "el") receive antenna element 406 of the Rx array of antenna on the end-to-end relay 503. In some cases, the values of the forward uplink radiation matrix are stored in the channel data store 921 (see FIG. 29).

E is the L×L payload matrix. The element $e_{ij}$ defines the gain and phase of the signal from $j^{th}$ receive array antenna element to the $i^{th}$ antenna element of the transmit array. Aside from incidental crosstalk between the paths (resulting from the finite isolation of the electronics), the E matrix is a diagonal matrix. In some cases, the matrix E is normalized such that the sum of the magnitude squared of all elements in the matrix is L. In some cases, the values of the payload matrix are stored in the channel data store 921 (see FIG. 29).

At is the K×L forward downlink radiation matrix. The element $a_{kl}$ contains the gain and phase of the path from antenna element L (letter "el") in the Tx array of the end-to-end relay 503 to a reference location in user beam k. In some cases, the values of the forward downlink radiation matrix are stored in the channel data store 921 (see FIG. 29).

Hfwd is the K×M forward channel matrix, which is equal to the product $A_t E C_r$.

$n_{ul}$ is an L×1 noise vector of complex Gaussian noise. The covariance of the uplink noise is:

$$E[n_{ul}n_{ul}^H] = 2\sigma_{ul}^2 I_L,$$

where IL is the L×L identity matrix.

$n_{dl}$ is an K×1 noise vector of complex Gaussian noise. The covariance of the downlink noise is:

$$E[n_{dl}n_{dl}^H] = 2\sigma_{dl}^2 I_K,$$

where $I_K$ is the K×K identity matrix.

Bfwd is the M×K beam weight matrix of end-to-end forward link beam weights.

The beam weights for user beam k are the elements in column k of Bfwd. Unlike the return link, the C/I for beam k is not determined by the beam weights for beam k. The beam weights for beam k determine the uplink signal to noise ratio (SNR) and the downlink SNR, as well as the carrier (C) power in the C/I. However, the interference power in beam k is determined by the beam weights for all of the other beams, except for beam k. In some cases, the beam weight for beam k is selected to increase the SNR. Such beam weights also increase the C/I for beam k, since C is increased. However, interference may be generated to the other beams. Thus, unlike in the case of the return link, optimal beam weights are not computed on a beam-by-beam basis (independent of the other beams).

In some cases, beam weights (including the radiation and payload matrices used to compute them) are determined after deployment of the end-to-end relay. In some cases, the payload matrix E is measured before deployment. In some cases, one can compute a set of beam weights by using the interference created in the other beams by beam k and counting it as the interference in beam k. Although this approach may not compute optimum beam weights, it may be used to simplify weight computation. This allows a set of weights to be determined for each beam independent of all other beams. The resulting forward beam weights are then computed similar to the return beam weights:

$$Bfwd = H^H R^{-1}, \text{ where,} \qquad \text{EQ. 13}$$

$$R = 2\sigma_{dl}^2 I_K + 2\sigma_{ul}^2 AtEE^H At_t^H + HH^H \qquad \text{EQ. 14}$$

The first term $2\sigma_{dl}^2 I_K$ in EQ. 14 is the covariance of the downlink noise (uncorrelated). The second term $2\sigma_{ul}^2 AtEE^H At^H$ is the covariance of the uplink noise (which is correlated at the ANs). The third term $HH^H$ is the covariance of the signal. Setting the variance of the uplink noise to zero and ignoring the last term ($HH^H$) results in a set of weights that increases the signal to downlink noise ratio by phase aligning the received signals at the M ANs 515. Setting the downlink noise variance to zero and ignoring the $3^{rd}$ term results in a set of weights that increases the uplink SNR. Setting both the uplink and downlink noise variances to zero results in a de-correlating receiver that increases the C/I ratio. For the forward link, the downlink noise and interference generally dominate. Therefore, these terms are generally useful in the beam weight computation. In some cases, the second term in EQ. 14 (the uplink noise) is insignificant compared to the first term (the downlink noise). In such cases, the second term can be ignored in co-variance calculations, further simplifying the calculation while still yielding a set of beam weights that increases the end-to-end SINR.

As with the return link, the beam weights may be normalized. For transmitter beam weights with equal power allocated to all K forward link signals, each column of Bfwd may be scaled such that the sum of the magnitude squared of the elements in any column will sum to unity. Equal power sharing will give each of the signals the same fraction of total AN power (total power from all ANs allocated to signal $x_k$). In some cases, for forward links, an unequal power sharing between forward link signals is implemented. Accordingly, in some cases, some beam signals get more than an equal share of total AN power. This may be used to equalize the SINR in all beams or give more important beams larger SINR's than lesser important beams. To create the beam weights for unequal power sharing, the M×K equal power beam weight matrix, Bfwd, is post multiplied by a K×K diagonal matrix, P, thus the new Bfwd=Bfwd P. Let $$P = \text{diag}(\sqrt{p_k}),$$

then the squared valued of the $k^{th}$ diagonal element represents the power allocated to user signal $x_k$. The power sharing matrix P is normalized such that the sum or the square of the diagonal elements equals K (the non-diagonal elements are zero).

In some cases, the solution to EQ. 13 is determined by a priori knowledge of the matrices At, Cr, and E, as well as the variances of the noise vectors $n_{ul}$ and $n_{dl}$. In some cases, knowledge of the matrices can be obtained during measurements made during the manufacturing and testing of relevant components of the end-to-end relay. This can work well for systems where one does not expect the values in the matrices to change significantly from what was measured during system operation. However, for some systems, especially ones operating in higher frequency bands, this may not be the case.

In some cases where a priori information is not used to set the weights, the values of R and H for the forward link can be estimated to determine the solution to EQ. 13. In some cases, ANs transmit a channel sounding probe during calibration periods. The channel sounding probes can be many different types of signals. In one case, different, orthogonal and known PN sequences are transmitted by each AN. The channel sounding probes may be pre-corrected in time, frequency, and/or phase to remove the feeder link impairments (as discussed further below). All communication data may be turned off during the calibration interval to reduce the interference to the channel sounding probes. In some cases, the channel sounding probes can be the same signals as those used for feeder link impairment removal.

During the calibration interval, a terminal in the center of each beam may be designated to receive and process the channel sounding probes. The K×1 vector, u, of received signals during the calibration period is $u = H\ x + At\ E\ n_{ul} + n_{dl}$ where x is the M×1 vector of transmitted channel sounding probes. In some cases, each designated terminal first removes the incidental frequency error (resulting from Doppler shift and terminal oscillator error), and then correlates the resulting signal with each of the M known, orthogonal PN sequences. The results of these correlations are M complex numbers (amplitude and phase) for each terminal and these results are transmitted back to the CPS via the return link. The M complex numbers calculated by the terminal in the center of the $k^{th}$ beam can be used to form the $k^{th}$ row of the estimate of the channel matrix, $\hat{H}$. By using the measurements from all of K designated terminals, an estimate of the entire channel matrix is obtained. In many cases, it is useful to combine the measurement from multiple calibration intervals to improve the estimate of the channel matrix. Once the estimate of the channel matrix is determined, an estimate of the covariance matrix, $\hat{R}$, can be determined from EQ. 14 using a value of 0 for the second term. This may be a very accurate estimate of the covariance matrix if the uplink noise (the second term in EQ. 14) is negligible relative to the downlink noise (the first term in EQ. 14). The forward link beam weights may then be computed by using the estimates of the channel matrix and covariance matrix in EQ. 13. Accordingly, in some cases, the computation of beam weights comprises estimating end-to-end forward gains (i.e., the values of the elements of the channel matrix Hfwd) for each of the end-to-end forward multipath channels between an AN 515 and a reference location in a user beam coverage area. In other cases, computation of beam weights comprises estimating end-to-end forward gains for K×M end-to-end forward multipath channels from M ANs 515 to reference locations located within K user beam coverage areas.

The signal and interference components of the signal after beamforming are contained in the vector H Bfwd x (product of H, Bfwd, x). The signal and interference powers for each of the beams are contained in the K×K matrix H Bfwd. The power in the $k^{th}$ diagonal element of H Bfwd is the desired signal power intended for beam k. The sum of the magnitude squared of all elements in row k except the diagonal element is the interference power in beam k. Hence the C/I for beam k is:

$$\left(\frac{C}{I}\right)_k = \frac{|s_{kk}|^2}{\sum_{j \neq k} |s_{kj}|^2} \quad \text{EQ. 15}$$

where $s_{kj}$ are the elements of H B fwd. The uplink noise is contained in the vector $A_t E\ n_{ul}$, which has a K×K covariance matrix of $2\sigma_{ul}^2 At\ EE^H At^H$. The $k^{th}$ diagonal element of the covariance matrix contains the uplink noise power in beam k. The uplink signal to noise ratio for beam k is then computed as:

$$\left(\frac{S}{N_{ul}}\right)_k = \frac{|s_{kk}|^2}{t_{kk}} \quad \text{EQ. 16}$$

where $t_{kk}$ is the $k^{th}$ diagonal element of the uplink covariance matrix. The downlink noise is contained in the vector $n_{dl}$, which has a covariance of $2\sigma_{dl}^2 I_K$. Hence the downlink signal to noise ratio is:

$$\left(\frac{S}{N_{dl}}\right)_k = \frac{|s_{kk}|^2}{2\sigma_{dl}^2} \qquad \text{EQ. 17}$$

The end-to-end SINR is the combination of EQ. 15-EQ. 17:

$$SINR_k = \left[\left(\frac{C}{I}\right)_k^{-1} + \left(\frac{S}{N_{ul}}\right)_k^{-1} + \left(\frac{S}{N_{dl}}\right)_k^{-1}\right]^{-1} \qquad \text{EQ. 18}$$

The above equations describe how to calculate the end-to-end SINR given the payload matrix E. The payload matrix may be constructed by intelligent choice of the gain and phases of each of the elements of E. The gain and phase of the diagonal elements of E that optimize some utility metric (which is generally a function of the K beam SINR's as computed above) may be selected and implemented by setting the phase shifter 418 in each of the L transponders 411. Candidate utility functions include, but are not limited to, sum of $SINR_k$ (total SINR), sum of $Log(1+SINR_k)$ (proportional to total throughput) or total power in the channel matrix, H. In some cases, the improvement in the utility function by customizing the gains and phases is very small and insignificant. This is sometimes the case when random or interleaved mappings of antenna elements are used. In some cases, the utility function can be improved by a non-trivial amount by custom selection of the receive/transmit signal gain and phase.

Distinct Coverage Areas

Some examples described above assume that the end-to-end relay 503 is designed to service a single coverage area shared by both the user terminals 517 and the ANs 515. For example, some cases describe a satellite having an antenna subsystem that illuminates a satellite coverage area, and both the ANs 515 and the user terminals 517 are geographically distributed throughout the satellite coverage area (e.g., as in FIG. 27). The number of beams that can be formed in the satellite coverage area, and the sizes (beam coverage areas) of those beams can be affected by aspects of the antenna subsystem design, such as number and arrangement of antenna elements, reflector size, etc. For example, realizing a very large capacity can involve deploying a large number (e.g., hundreds) of ANs 515 with sufficient spacing between the ANs 515 to allow for end-to-end beamforming. For example, as noted above with reference to FIG. 28, increasing the number of ANs 515 can increase system capacity, although with diminishing returns as the number increases. When one antenna subsystem supports both the user terminals 517 and the ANs 515, achieving such a deployment with sufficient spacing between ANs 515 can force a very wide geographical distribution of the ANs 515 (e.g., across the entire satellite coverage area, as in FIG. 27). Practically, achieving such a distribution may involve placing ANs 515 in undesirable locations, such as in areas with poor access to a high-speed network (e.g., a poor fiber infrastructure back to the CPS 505), multiple legal jurisdictions, in expensive and/or highly populated areas, etc. Accordingly, AN 515 placement often involves various tradeoffs.

Some examples of the end-to-end relay 503 are designed with multiple antenna subsystems, thereby enabling separate servicing of two or more distinct coverage areas from a single end-to-end relay 503. As described below, the end-to-end relay 503 can include at least a first antenna subsystem that services an AN area 3450, and at least a second antenna subsystem that services a user coverage area 3460. Because the user coverage area 3460 and AN area 3450 may be serviced by different antenna subsystems, each antenna subsystem can be designed to meet different design parameters, and each coverage area can be at least partially distinct (e.g., in geography, in beam size and/or density, in frequency band, etc.). For example, using such a multi-antenna subsystem approach can enable user terminals 517 distributed over one or more relatively large geographic areas 3460 (e.g., the entire United States) to be serviced by a large number of ANs 515 distributed over one or more relatively small geographic areas (e.g., a portion of the Eastern United States). For example, the AN area 3450 can be a fraction (e.g., less than one half, less than one quarter, less than one fifth, less than one tenth) of the user coverage area 3460 in physical area.

Figure 41:
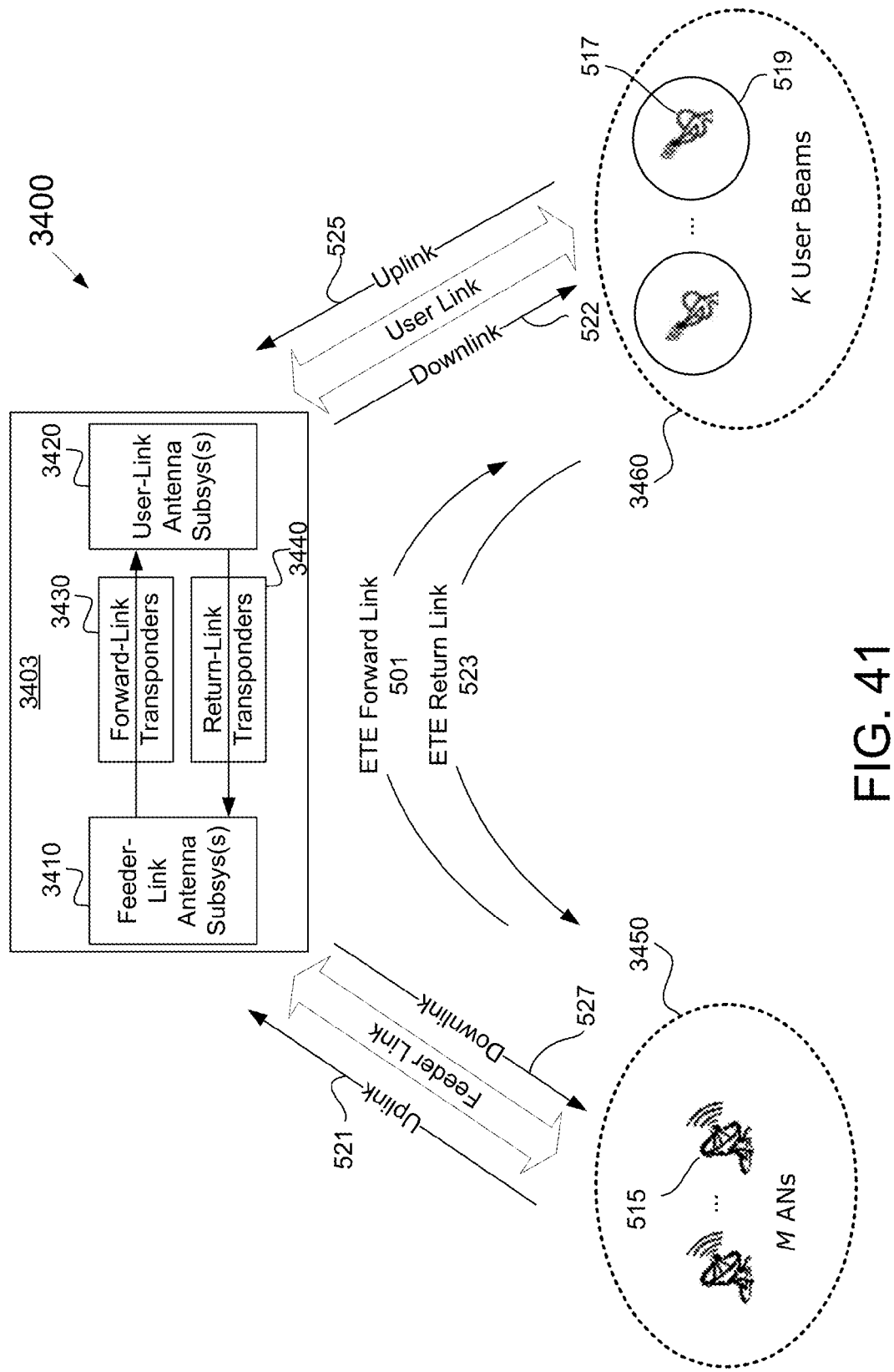
FIG. 41 is an illustration of an example end-to-end beamforming system for enabling distinct user-link and feeder-link coverage areas.

FIG. 41 is an illustration of an example end-to-end beamforming system 3400. The system 3400 is an end-to-end beamforming system that includes: a plurality of geographically distributed ANs 515; an end-to-end relay 3403; and a plurality of user terminals 517. The end-to-end relay 3403 can be an example of end-to-end relay 503 described herein. The ANs 515 are geographically distributed in an AN area 3450, the user terminals 517 are geographically distributed in a user coverage area 3460. The AN area 3450 and the user coverage area 3460 are both within the visible Earth coverage area of the end-to-end relay 3403, but the AN area 3450 is distinct from the user coverage area 3460. In other words, the AN area 3450 is not coextensive with the user coverage area 3460, but may overlap at least partially with the user coverage area 3460. However, the AN area 3450 may have a substantial (non-trivial) area (e.g., more than one-tenth, one-quarter, one-half, etc. of the AN area 3450) that does not overlap with the user coverage area 3460. For example, in some cases, at least half of the AN area 3450 does not overlap the user coverage area 3460. In some cases, the AN area 3450 and user coverage area 3460 may not overlap at all, as discussed with reference to FIG. 45C. As described above (e.g., in FIG. 5), the ANs 515 can exchange signals through a distribution network 518 with a CPS 505 within a ground segment 502, and the CPS 505 can be connected to a data source.

The end-to-end relay 3403 includes a separate feeder-link antenna subsystem 3410 and user-link antenna subsystem 3420. Each of the feeder-link antenna subsystem 3410 and the user-link antenna subsystem 3420 is capable of supporting end-to-end beamforming. For example, as described below, each antenna subsystem can have its own array(s) of cooperating antenna elements, its own reflector(s), etc. The feeder-link antenna subsystem 3410 can include an array 3415 of cooperating feeder-link constituent receive elements 3416 and an array 3415 of cooperating feeder-link constituent transmit elements 3419. The user-link antenna subsystem 3420 can include an array 3425 of cooperating user-link constituent receive elements 3426 and an array 3425 of cooperating user-link constituent transmit elements 3429. The constituent elements are "cooperating" in the sense that the array of such constituent elements has characteristics making its respective antenna subsystem suitable for use in a beamforming system. For example, a given user-link constituent receive element 3426 can receive a superposed composite of return uplink signals 525 from multiple (e.g., some or all) user beam coverage areas 519 in a manner that contributes to forming of return user beams. A given user-link constituent transmit element 3429 can transmit a forward downlink signal 522 in a manner that superposes with corresponding transmissions from other user-link constituent transmit elements 3429 to form some or all forward user beams. A given feeder-link constituent receive element 3416 can receive a superposed composite of forward uplink signals 521 from multiple (e.g., all) ANs 515 in a manner that contributes to forming of forward user beams (e.g., by inducing multipath at the end-to-end relay 3403). A given feeder-link constituent transmit element 3419 can transmit a return downlink signal 527 in a manner that superposes with corresponding transmissions from other feeder-link constituent transmit elements 3419 to contribute to forming of some or all return user beams (e.g., by enabling the ANs 515 to receive composite return signals that can be beam-weighted to form the return user beams).

The example end-to-end relay 3403 includes a plurality of forward-link transponders 3430 and a plurality of return-link transponders 3440. The transponders can be any suitable type of bent-pipe signal path between the antenna subsystems. Each forward-link transponder 3430 couples a respective one of the feeder-link constituent receive elements 3416 with a respective one of the user-link constituent transmit elements 3429. Each return-link transponder 3440 couples a respective one of the user-link constituent receive elements 3426 with a respective one of the feeder-link constituent transmit elements 3419. Some examples are described as having a one-to-one correspondence between each user-link constituent receive element 3426 and a respective feeder-link constituent transmit element 3419 (or vice versa), or that each user-link constituent receive element 3426 is coupled with "one and only one" feeder-link constituent transmit element 3419 (or vice versa), or the like. In some such cases, one side of each transponder is coupled with a single receive element, and the other side of the transponder is coupled with a single transmit element. In other such cases, one or both sides of a transponder can be selectively coupled (e.g., by a switch, splitter, combiner, or other means, as described below) with one of multiple elements. For example, the end-to-end relay 3403 can include one feeder-link antenna subsystem 3410 and two user-link antenna subsystems 3420; and each transponder can be coupled, on one side, to a single feeder-link element, and selectively coupled, on the other side, either to a single user-link element of the first user-link antenna subsystem 3420 or to a single user-link element of the second user-link antenna subsystem 3420. In such selectively coupled cases, each side of each transponder can still be considered at any given time (e.g., for a particular signal-related transaction) as being coupled with "one and only one" element, or the like.

For forward communications, transmissions from the ANs 515 can be received (via feeder uplinks 521) by the feeder-link constituent receive elements 3416, relayed by the forward-link transponders 3430 to the user-link constituent transmit elements 3429, and transmitted (via user downlinks 522) by the user-link constituent transmit elements 3429 to user terminals 517 in the user coverage area 3460. For return communications, transmissions from the user terminals 517 can be received (via user uplink signals 525) by user-link constituent receive elements, relayed by the return-link transponders 3440 to the feeder-link constituent transmit elements 3419, and transmitted by the feeder-link constituent transmit elements 3419 to ANs 515 in the AN area 3450 (via feeder downlink signals 527). The full signal path from an AN 515 to a user terminal 517 via the end-to-end relay 3403 is referred to as the end-to-end forward link 501; and the full signal path from a user terminal 517 to an AN 515 via the end-to-end relay 3403 is referred to as the end-to-end return link 523. As described herein, the end-to-end forward link 501 and the end-to-end return link 523 can each include multiple multipath channels for forward and return communications.

In some cases, each of the plurality of geographically distributed ANs 515 has an end-to-end beam-weighted forward uplink signal 521 output. The end-to-end relay 3403 comprises an array 3415 of cooperating feeder-link constituent receive elements 3416 in wireless communication with the distributed ANs 515, an array 3425 of cooperating user-link constituent transmit elements 3429 in wireless communication with the plurality of user terminals 517, and a plurality of forward-link transponders 3430. The forward-link transponders 3430 may be "bent-pipe" (or non-processing) transponders, so that each transponder outputs a signal that corresponds to the signal it receives with little or no processing. For example, each forward-link transponder 3430 can amplify and/or frequency translate its received signal, but may not perform more complex processing (e.g., there is no analog-to-digital conversion, demodulation and/or modulation, no on-board beamforming, etc.). In some cases, each forward-link transponder 3430 accepts an input at a first frequency range (e.g., 30 GHz LHCP) and outputs at a second frequency range (e.g., 20 GHz RHCP), and each return-link transponder 3440 accepts an input at the first frequency range (e.g., 30 GHz RHCP) and outputs at the second frequency range (e.g., 20 GHz LHCP). Any suitable combination of frequency and/or polarization can be used, and the user-link and feeder-link can use the same or different frequency ranges. As used herein, a frequency range refers to a set of frequencies used for signal transmission/reception and may be a contiguous range or include multiple non-contiguous ranges (e.g., such that a given frequency range may contain frequencies from more than one frequency band, a given frequency band may contain multiple frequency ranges, etc.). Each forward-link transponder 3430 is coupled between a respective one of the feeder-link constituent receive elements 3416 and a respective one of the user-link constituent transmit elements 3419 (e.g., with a one-to-one correspondence). The forward-link transponders 3430 convert superpositions of a plurality of beam-weighted forward uplink signals 521 received via the feeder-link constituent receive elements 3416 into forward downlink signals 522. Transmission of the forward downlink signals 522 by the user-link constituent transmit elements 3429 contributes to forming a forward user beam servicing at least some of the plurality of user terminals 517 (e.g., which may be grouped into one or more user beam coverage areas 519 for transmissions via corresponding beamformed forward user beams). As described herein, the forward uplink signals 521 can be end-to-end beam-weighted and synchronized (e.g., phase-synchronized, and, if desired, time-synchronized) prior to transmission from the ANs 515, which can enable the desired superposition of those signals 521 at the feeder-link constituent receive elements 3416.

The transmission of the forward uplink signals 521 contributes to forming the forward user beam in the sense that the beamforming is end-to-end, as described herein; the beamforming is a result of multiple steps, including computing and applying appropriate weights to the forward uplink signals 521 prior to transmission to the relay from the ANs 515, inducing multipath reception by the multiple forward-link transponders 3430 of the end-to-end relay 3403, and transmitting the forward downlink signals 522 from multiple user-link constituent transmit elements 3429. Still, for the sake of simplicity, some descriptions can refer to the forward beam as being formed by superposition of the transmitted forward downlink signals 522. In some cases, each of the plurality of user terminals 517 is in wireless communication with the array 3425 of cooperating user-link constituent transmit elements 3429 to receive a composite (e.g., a superposition) of the transmitted forward downlink signals 522.

In some cases, the end-to-end relay 3403 further includes an array 3425 of user-link constituent receive elements 3426 in wireless communication with the user terminals 517, an array 3415 of cooperating feeder-link constituent transmit elements 3419 in wireless communication with the distributed ANs 515, and a plurality of return-link transponders 3440. The return-link transponders 3440 can be similar or identical to the forward-link transponders 3430 (e.g., bent-pipe transponders), except that each is coupled between a respective one of the user-link constituent receive elements 3426 and a respective one of the feeder-link constituent transmit elements 3419. Receipt of return uplink signals 525 via the array of cooperating user-link constituent receive element 3426 allows the formation of return downlink signals 527 in the return-link transponders 3440. In some cases, each return downlink signal 527 is a respective superposition of return uplink signals 525 received by a user-link constituent receive element 3426 from multiple user terminals 517 (e.g., from one or more user beam coverage areas 519). In some such cases, each of the plurality of user terminals 517 is in wireless communication with the array of cooperating user-link constituent receive elements 3426 to transmit a respective return uplink signal 525 to multiple of the user-link constituent receive elements 3426.

In some cases, the return downlink signals 527 are transmitted by the feeder-link constituent transmit elements 3419 to the geographically distributed ANs 515. As described herein, each AN 515 can receive a superposed composite of the return downlink signals 527 transmitted from the feeder-link constituent transmit elements 3419. The superposed composite may be an example of superposition 1706 described with reference to FIG. 6. The received return downlink signals 527 (which may be referred to as composite return signals) can be coupled to a return beamformer 531, which can combine, synchronize, beam weight, and perform any other suitable processing. For example, the return beamformer 531 can weight the received superpositions 1706 of the return downlink signals 527 (i.e., apply return beam weights to the composite return signals) prior to combining the signals. The return beamformer 531 can also synchronize the composite return signals 1706 prior to combining the signals to account at least for respective path delay differences between the end-to-end relay 3403 and the ANs 515. In some cases, the synchronizing can be according to a received beacon signal (received by one or more, or all, of the ANs 515).

Because of the end-to-end nature of the beamforming, proper application of return beam weights by the return beamformer 531 enables formation of the return user beams, even though the return beamformer 531 may be coupled to the feeder-link side of the end-to-end multipath channels, and the user beams may be formed at the user-link side of the end-to-end multipath channels. Accordingly, the return beamformer 531 can be referred to as contributing to the forming of the return user beams (a number of other aspects of the system 3400 also contribute to the end-to-end return beamforming, such as the inducement of multipath by the return-link transponders 3440 of the end-to-end relay 3403). Still, the return beamformer 531 can be referred to as forming the return user beams for the sake of simplicity.

In some cases, the end-to-end relay 3403 further includes a feeder-link antenna subsystem 3410 to illuminate an AN area 3450 within which the ANs 515 are distributed. The feeder-link antenna subsystem 3410 comprises the array 3415 of cooperating feeder-link constituent receive elements 3416. In some cases, the end-to-end relay 3403 also includes a user-link antenna subsystem 3420 to illuminate a user coverage area 3460 within which the plurality of user terminals 517 is geographically distributed (e.g., in a plurality of user beam coverage areas 519). The user-link antenna subsystem 3420 comprises the array 3425 of cooperating user-link constituent transmit elements 3429. In some cases, the user-link antenna subsystem 3420 includes a user-link receive array and a user-link transmit array (e.g., separate, half-duplex arrays of cooperating user-link constituent elements). The user-link receive array and the user-link transmit array can be spatially interleaved (e.g., to point to a same reflector), spatially separated (e.g., to point at receive and transmit reflectors, respectively), or arranged in any other suitable manner (e.g., as discussed with reference to FIG. 62). In other cases, the user-link antenna subsystem 3420 includes full-duplex elements (e.g., each user-link constituent transmit element 3429 shares radiating structure with a respective user-link constituent receive element 3426). Similarly, in some cases, the feeder-link antenna subsystem 3410 includes a feeder-link receive array and a feeder-link transmit array, which may be spatially related in any suitable manner and may directly radiate, point to a single reflector, point to separate transmit and receive reflectors, etc. In other cases, the feeder-link antenna subsystem 3410 includes full-duplex elements. The feeder-link antenna subsystem 3410 and the user-link antenna subsystem 3420 can have the same or different aperture sizes. In some cases, the feeder-link antenna subsystem 3410 and the user-link antenna subsystem 3420 operate in a same frequency range (e.g., a frequency range within the K/Ka band, etc.). In some cases, the feeder-link antenna subsystem 3410 and the user-link antenna subsystem 3420 operate in different frequency ranges (e.g., feeder-link uses V/W band, the user-link uses K/Ka band, etc.). In some cases, the feeder-link antenna subsystem 3410 and/or the user-link antenna subsystem 3420 may operate in multiple frequency ranges (e.g., feeder-link uses V/W band and K/Ka-band, as described below with reference to FIG. 64A, 64B, 65A or 65B).

In examples, such as those illustrated by FIG. 41, the AN area 3450 is distinct from the user coverage area 3460. The AN area 3450 can be a single, contiguous coverage area, or multiple disjoint coverage areas. Similarly (and independently of whether the AN area 3450 is single or multiple), the user coverage area 3460 can be a single, contiguous coverage area, or multiple disjoint coverage areas. In some cases, the AN area 3450 is a subset of the user coverage area 3460. In some cases, at least half of the user coverage area 3460 does not overlap the AN area 3450. As described below, in some cases, the feeder-link antenna subsystem 3410 further comprises one or more feeder-link reflectors, and the user-link antenna subsystem 3420 further comprises one or more user-link reflectors. In some cases, the feeder-link reflector is significantly larger (e.g., at least twice the physical area, at least five times, ten times, fifty times, eighty times, etc.) than the user-link reflector. In some cases, the feeder-link reflector is approximately the same physical area (e.g., within 5%, 10%, 25%) as the user-link reflector.

In some cases, the system 3400 operates in the context of ground network functions, as described with reference to FIG. 5. For example, the end-to-end relay 3403 communicates with ANs 515, which communicate with a CPS 505 via a distribution network 518. In some cases, the CPS 505 includes a forward beamformer 529 and/or a return beamformer 531, for example, as described with reference to FIG. 29. As described above, the forward beamformer 529 can participate in forming forward end-to-end beams by applying computed forward beam weights (e.g., supplied by a forward beam weight generator 918) to forward uplink signals 521; and the return beamformer 531 can participate in forming return end-to-end beams by applying computed return beam weights (e.g., supplied by a return beam weight generator 935) to return downlink signals 527. As described above, the end-to-end forward beam weights and/or the set of end-to-end return beam weights can be computed according to estimated end-to-end gains for end-to-end multipath channels, each end-to-end multipath channel communicatively coupling a respective one of the distributed ANs 515 with a respective location in the user coverage area 3460 (e.g., a user terminal 517 or any suitable reference location) via a respective plurality of the forward-link bent-pipe transponders 3430 and/or via a respective plurality of the return-link bent-pipe transponders 3440. In some cases, though not shown, the end-to-end relay 3403 includes a beacon signal transmitter. The beacon signal transmitter can be implemented as described above with reference to the beacon signal generator and calibration support module 424 of FIG. 15. In some cases, the generated beacon signal can be used so that the plurality of distributed ANs 515 is in time-synchronized wireless communication with the end-to-end relay 3403 (e.g., with the plurality of feeder-link constituent receive elements 3416 according to the beacon signal).

In some cases, the system 3400 includes a system for forming a plurality of forward user beams using end-to-end beamforming. Such cases include means for transmitting a plurality of forward uplink signals 521 from a plurality of geographically distributed locations, wherein the plurality of forward uplink signals 521 is formed from a weighted combination of a plurality of user beam signals, and wherein each user beam signal corresponds to one and only one user beam. For example, the plurality of geographically distributed locations can include a plurality of ANs 515, and the means for transmitting the plurality of forward uplink signals 521 can include some or all of a forward beamformer 529, a distribution network 518, and the geographically distributed ANs 515 (in communication with the end-to-end relay 3403). Such cases can also include means for relaying the plurality of forward uplink signals 521 to form a plurality of forward downlink signals 522. Each forward downlink signal 522 is created by amplifying a unique superposition of the plurality of forward uplink signals 521, and the plurality of forward downlink signals 522 superpose to form the plurality of user beams, wherein each user beam signal is dominant within the corresponding user beam coverage area 519. For example, the means for relaying the plurality of forward uplink signals 521 to form the plurality of forward downlink signals 522 can include the end-to-end relay 3403 (in communication with one or more user terminals 517 in user beam coverage areas 519) with its collocated plurality of signal paths, which can include forward-link transponders 3430 and return-link transponders 3440.

Some such cases include first means for receiving a first superposition of the plurality of forward downlink signals 522 and recovering a first one of the plurality of user beam signals. Such first means can include a user terminal 517 (e.g., including a user terminal antenna, and a modem or other components for recovering user beam signals from the forward downlink signals). Some such cases also include second means (e.g., including a second user terminal 517) for receiving a second superposition of the plurality of forward downlink signals 522 and recovering a second one of the plurality of user beam signals. For example, the first means for receiving is located within a first user beam coverage area 519, and the second means for receiving is located within a second user beam coverage area 519.

Figure 42:
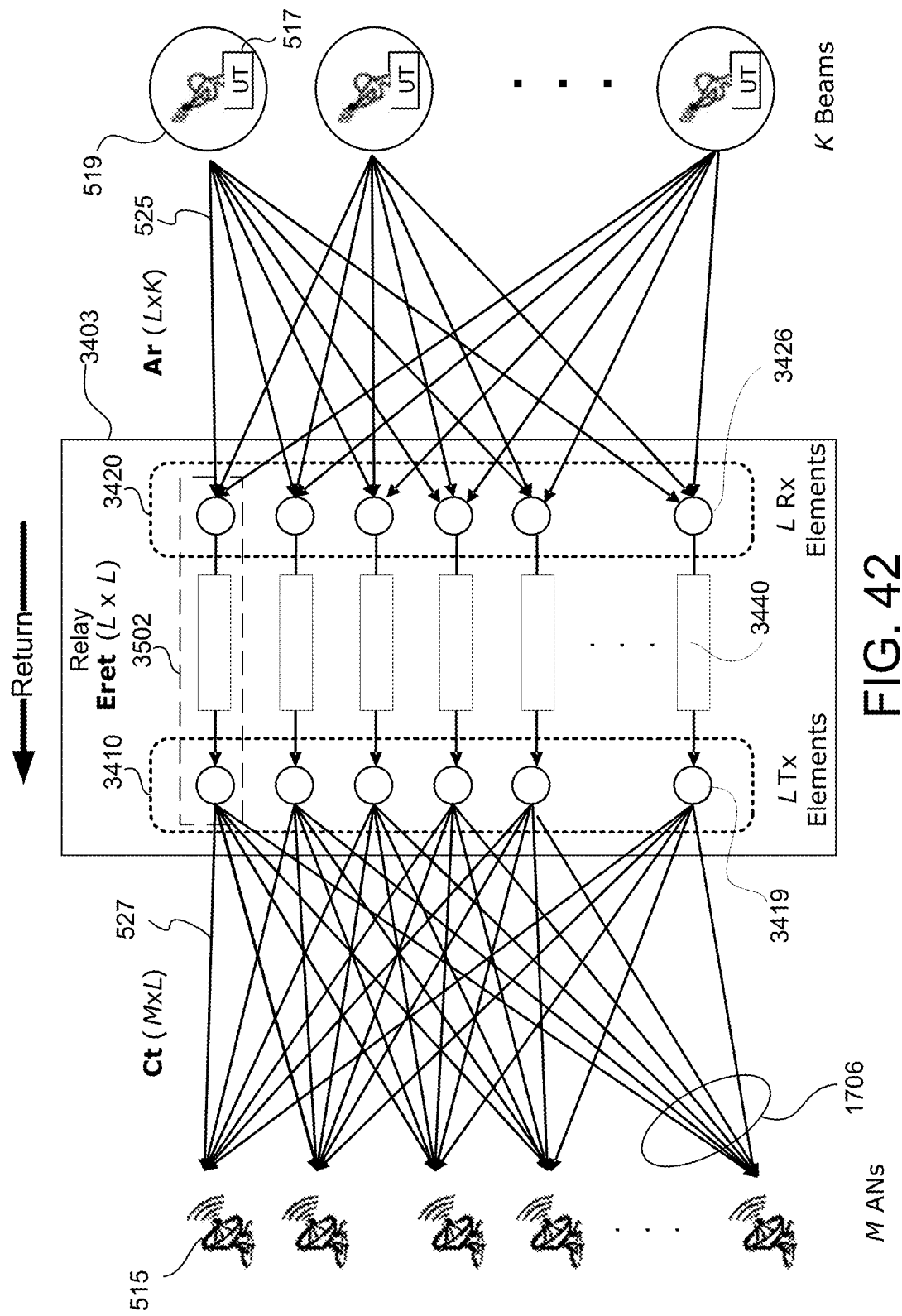
FIG. 42 is an illustration of an example model of signal paths for signals carrying return data on the end-to-end return link.

FIG. 42 is an illustration of an example model of signal paths for signals carrying return data on the end-to-end return link 523. The example model can operate similarly to the model described with reference to FIGS. 6-8, except that the end-to-end relay 3403 includes return-link signal paths 3502 dedicated for return-link communications. Each return-link signal path 3502 can include a return-link transponder 3440 coupled (e.g., selectively coupled) between a user-link constituent receive element 3426 and a feeder-link constituent transmit element 3419. Signals originating with user terminals 517 in K user beam coverage areas 519 are transmitted (as return uplink signals 525) to the end-to-end relay 3403, received by an array of L user-link constituent receive elements 3426, communicated through L return-link signal paths 3502 (e.g., via L return-link transponders 3440) to L corresponding feeder-link constituent transmit elements 3419, and transmitted by each of the L feeder-link constituent transmit elements 3419 to some or all of the M ANs 515 (similar to what is shown in FIG. 7). In this way, the multiple return-link signal paths 3502 (e.g., the return-link transponders 3440) induce multipath in the return-link communications. For example, the output of each return-link signal path 3502 is a return downlink signal 527 corresponding to a received composite of the return uplink signals 525 transmitted from multiple of the user beam coverage areas 519, and each return downlink signal 527 is transmitted to some or all of the M ANs 515 (e.g., geographically distributed over an AN area 3450). Accordingly, each AN 515 may receive a superposition 1706 of some or all of the return downlink signals 527, which may then be communicated to a return beamformer 531. As described above, there are L (or up to L) different ways for a signal to get from a user terminal 517 located in a user beam coverage area 519 to a particular AN 515. The end-to-end relay 3403 thereby creates L paths between a user terminal 517 and an AN 515, referred to collectively as an end-to-end return multipath channel 1908 (e.g., similar to FIG. 8).

The end-to-end return multipath channels can be modeled in the same manner described above. For example, Ar is the L×K return uplink radiation matrix, Ct is the M×L return downlink radiation matrix, and Eret is the L×L return payload matrix for the paths from the user-link constituent receive elements 3426 to the feeder-link constituent transmit elements 3419. As described above, the end-to-end return multipath channel from a user terminal 517 in a particular user beam coverage area 519 to a particular AN 515 is the net effect of the L different signal paths induced by L unique return-link signal paths 3502 through the end-to-end relay 3403. With K user beam coverage areas 519 and M ANs 515, there can be M×K induced end-to-end return multipath channels in the end-to-end return link 523 (via the end-to-end relay 3403), and each can be individually modeled to compute a corresponding element of an M×K return channel matrix Hret (C_r×Eret×Ar). As noted above (e.g., with reference to FIGS. 6-8), not all ANs 515, user beam coverage areas 519, and/or return-link transponders 3440 have to participate in the end-to-end return multipath channels. In some cases, the number of user beams K is greater than the number of transponders L in the signal path of the end-to-end return multipath channel; and/or the number of ANs 515 M is greater than the number of return-link transponders 3440 L in the signal path of the end-to-end return multipath channel. As described with reference to FIG. 5, the CPS 505 can enable forming of return user beams by applying return beam weights to the received downlink return signals 527 (the received signals, after reception by the AN 515 are referred to as composite return signals 907, as explained further below). The return beam weights can be computed based on the model of the M×K signal paths for each end-to-end return multipath channel that couples the user terminals 517 in one user beam coverage area 519 with one of the plurality of ANs 515.

Figure 43:
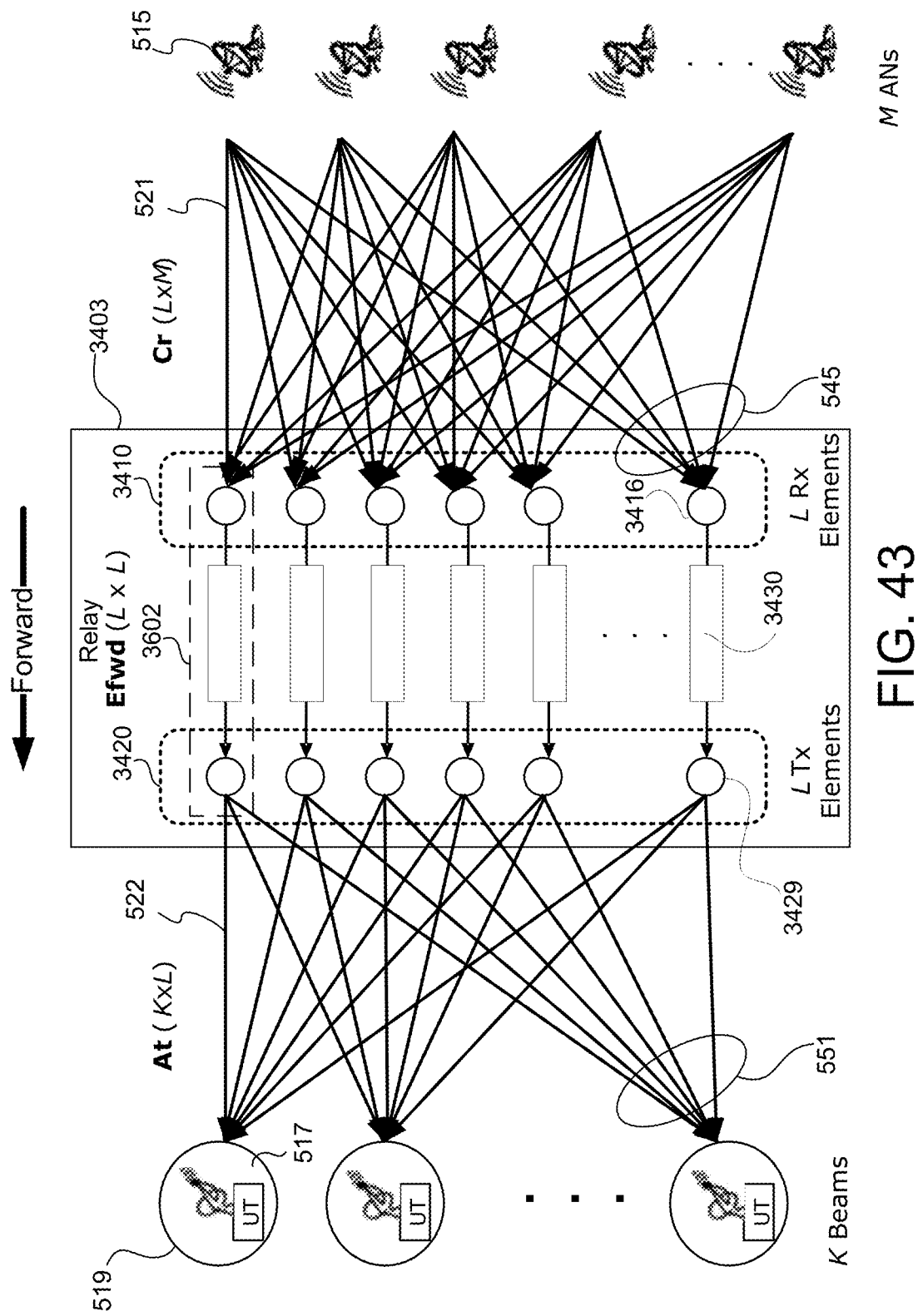
FIG. 43 is an illustration of an example model of signal paths for signals carrying forward data on the end-to-end forward link.

FIG. 43 is an illustration of an example model of signal paths for signals carrying forward data on the end-to-end forward link 501. The example model can operate similarly to the model described with reference to FIGS. 9-11, except that the end-to-end relay 3403 includes forward-link signal paths 3602 dedicated for forward-link communications. Each forward-link signal path 3602 can include a forward-link transponder 3430 coupled between a feeder-link constituent receive element 3416 and a user-link constituent transmit element 3429. As described above, each forward uplink signal 521 is beam weighted (e.g., at a forward beamformer 529 in the CPS 505 of the ground segment 502) prior to transmission from an AN 515. Each AN 515 receives a unique forward uplink signal 521 and transmits the unique forward uplink signal 521 via one of M uplinks (e.g., in a time-synchronized manner). The forward uplink signals 521 are received from geographically distributed locations (e.g., from the ANs 515) by some or all of the forward-link transponders 3430 in a superposed manner that creates composite input forward signals 545. The forward-link transponders 3430 concurrently receive respective composite input forward signals 545, though with slightly different timing due to differences in the locations of each receiving feeder-link constituent receive element 3416 associated with each forward-link transponder 3430. For example, even though each feeder-link constituent receive element 3416 can receive a composite of the same plurality of forward uplink signals 521, the received composite input forward signals 545 can be slightly different. The composite input forward signals 545 are received by L forward-link transponders 3430 via respective feeder-link constituent receive elements 3416, communicated through the L forward-link transponders 3430 to L corresponding user-link constituent transmit elements 3429, and transmitted by the L user-link constituent transmit elements 3429 to one or more of the K user beam coverage areas 519 (e.g., as forward downlink signals 522, each corresponding to a respective one of the received composite input forward signals 545). In this way, the multiple forward-link signal paths 3602 (e.g., forward-link transponders 3430) induce multipath in the forward-link communications. As described above, there are L (or up to L) different ways for a signal to get from an AN 515 to a particular user terminal 517 in a user beam coverage area 519. The end-to-end relay 3403 thereby induces multiple (e.g., up to L) signal paths 3602 between one AN 515 and one user terminal 517 (or one user beam coverage area 519), which may be referred to collectively as an end-to-end forward multipath channel 2208 (e.g., similar to FIG. 10).

The end-to-end forward multipath channels 2208 can be modeled in the same manner described above. For example, Cr is the L×M forward uplink radiation matrix, At is the K×L forward downlink radiation matrix, and Efwd is the L×L forward payload matrix for the paths from the feeder-link constituent receive elements 3416 to the user-link constituent transmit elements 3429. In some cases, the forward payload matrix Efwd and return payload matrix Eret may be different to reflect differences between the forward-link signal paths 3602 and the return-link signal paths 3502. As described above, the end-to-end forward multipath channel from a particular AN 515 to a user terminal 517 in a particular user beam coverage area 519 is the net effect of the L different signal paths induced by L unique forward-link signal paths 3602 through the end-to-end relay 3403. With K user beam coverage areas 519 and M ANs 515, there can be M×K induced end-to-end forward multipath channels in the end-to-end forward link 501, and each can be individually modeled to compute a corresponding element of an M×K forward channel matrix Hfwd (At×Efwd×Cr). As noted with reference to the return direction, not all ANs 515, user beam coverage areas 519, and/or forward-link transponders 3430 have to participate in the end-to-end forward multipath channels. In some cases, the number of user beams K is greater than the number of forward-link transponders 3430 L in the signal path of the end-to-end forward multipath channel; and/or the number of ANs 515 M is greater than the number of forward-link transponders 3430 L in the signal path of the end-to-end forward multipath channel. As described with reference to FIG. 5, an appropriate beam weight may be computed for each of the plurality of end-to-end forward multipath channels by the CPS 505 to form the forward user beams. Using multiple transmitters (ANs 515) to a single receiver (user terminal 517) can provide transmit path diversity to enable the successful transmission of information to any user terminal 517 in the presence of the intentionally induced multipath channel.

Figure 44A:
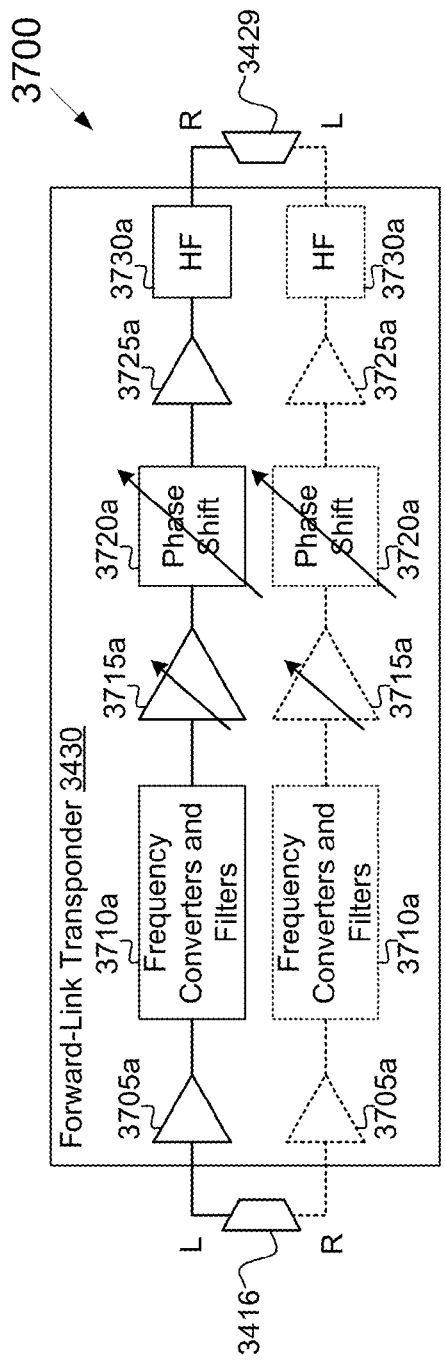
FIGS. 44A and 44B are an illustration of an example forward signal path and return signal path, respectively.
Figure 44B:
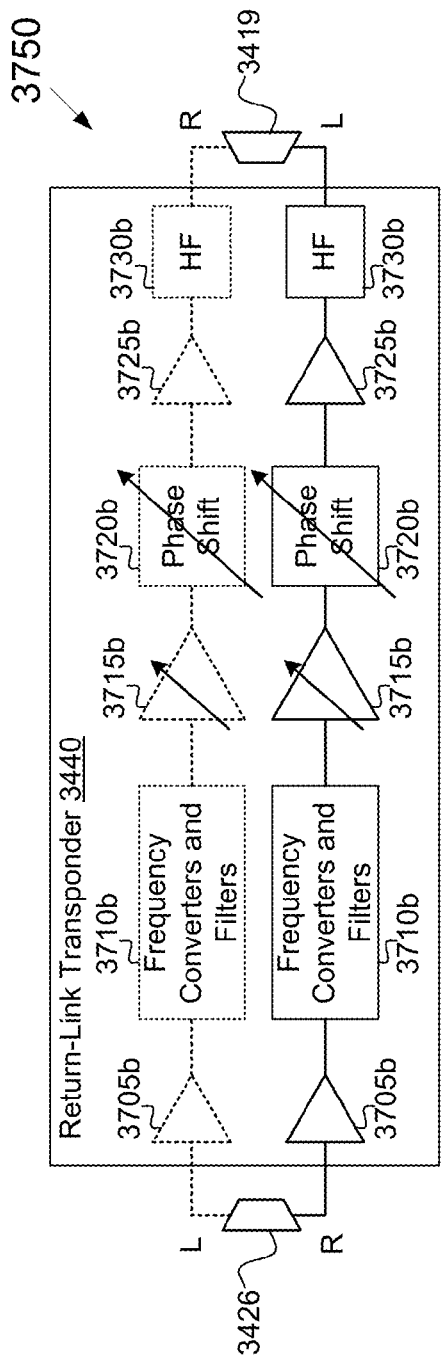

FIGS. 41-43 describe end-to-end relays 3403 implemented with separate forward-link transponders 3430 and return-link transponders 3440. FIGS. 44A and 44B show an illustration of an example forward signal path 3700 (like the forward signal path 3602 of FIG. 43) and return signal path 3750 (like the return signal path 3502 of FIG. 42), respectively. As described above, the forward signal path 3700 includes a forward-link transponder 3430 coupled between a feeder-link constituent receive element 3416 and a user-link constituent transmit element 3429. The return signal path 3750 includes a return-link transponder 3440 coupled between a user-link constituent receive element 3426 and a feeder-link constituent transmit element 3419. In some cases, each forward-link transponder 3430 and each return-link transponder 3440 is a cross-pole transponder.

Figure 63A:
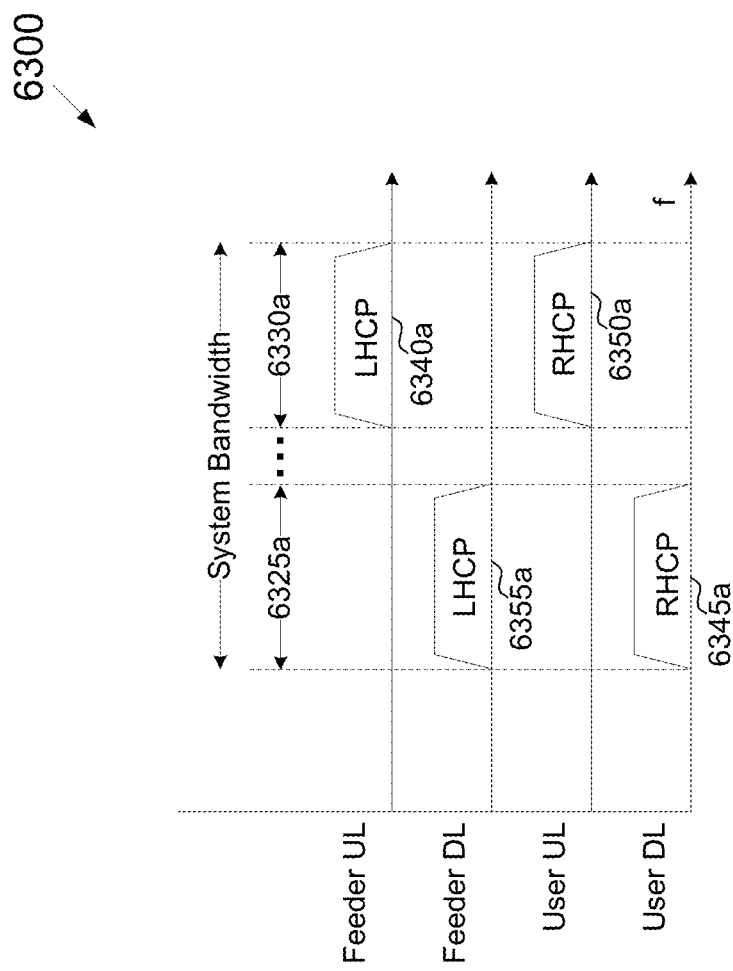
FIGS. 63A and 63B are illustrations of example frequency allocations.

FIG. 63A illustrates an example frequency spectrum allocation 6300 in accordance with various embodiments of the present disclosure. Example frequency spectrum allocation 6300 of FIG. 63A illustrates two frequency ranges 6325*a* and 6330*a*. Though illustrated as being separated, frequency ranges 6325*a* and 6330*a* may alternatively be adjacent (e.g., one contiguous range). As illustrated in FIG. 63A, the forward-link transponder 3430 receives a forward uplink signal 6340*a* (e.g., which may be an example of forward uplink signal 521 of FIG. 41) at an uplink frequency range 6330*a* with left-hand circular polarization (LHCP) and outputs a forward downlink signal 6345*a* (e.g., which may be an example of forward downlink signal 522 of FIG. 41) at a downlink frequency range 6325*a* with right-hand circular polarization (RHCP); and each return-link transponder 3440 receives a return uplink signal 6350a (e.g., which may be an example of return uplink signal 525 of FIG. 41) at the uplink frequency range 6330a with right-hand circular polarization (RHCP) and outputs a return downlink signal 6355a (e.g., which may be an example of return downlink signal 527 of FIG. 41) at the downlink frequency range 6325a with left-hand circular polarization (LHCP). One such case (i.e., following the polarizations described in the preceding example) is illustrated by following only the solid lines of FIGS. 44A and 44B, and another such case (i.e., following opposite polarizations from those described in the preceding example) is illustrated by following only the dashed lines of FIGS. 44A and 44B.

In other cases, some or all transponders can provide a dual-pole signal path pair. For example, following both the solid and dashed lines of FIGS. 44A and 44B, the forward-link transponders 3430 and the return-link transponders 3440 can receive forward uplink signals 521 at the same or different uplink frequency with both polarizations (LHCP and RHCP) and can both output forward downlink signals 522 at the same or different downlink frequency with both polarizations (RHCP and LHCP). Such cases can use any suitable type of interference mitigation techniques (e.g., using time division, frequency division, spatial separation, etc.) and can enable multiple systems to operate in parallel. One such frequency-division implementation is shown in the example frequency allocation 6301 of FIG. 63B. In example frequency allocation 6301, each forward-link transponder 3430 receives a forward uplink signal 6340b over a first portion of uplink frequency range 6330b (e.g., using both polarizations) and outputs a forward downlink signal 6345b over a first portion of a downlink frequency range 6325b (e.g., using both polarizations); and each return-link transponder 3440 receives a return uplink signal 6350b over a second portion of the uplink frequency range 6330b (e.g., using both polarizations) and outputs a return downlink signal 6355a over a second portion of the downlink frequency range 6325b (e.g., using both polarizations). In some cases, the bandwidths of the first portions and second portions of the frequency ranges 6330b and 6325b may be equal. In other examples, the bandwidths of the first portions and second portions may be different. As an example, when traffic flows through end-to-end relay 3403 predominantly in the forward direction (represented by ETE forward link 501 in FIG. 41), the bandwidths of the first portions of frequency ranges 6330b and 6325b used for forward link communications may be larger (e.g., significantly larger) than the bandwidths of the second portions used for return link communications.

In some cases, the end-to-end relay 3403 includes a large number of transponders, such as 512 forward-link transponders 3430 and 512 return-link transponders 3440 (e.g., 1,024 transponders total). Other implementations can include smaller numbers of transponders, such as 10, or any other suitable number. In some cases, the antenna elements are implemented as full-duplex structures, so that each receive antenna element shares structure with a respective transmit antenna element. For example, each illustrated antenna element can be implemented as two of four waveguide ports of a radiating structure adapted for both transmission and reception of signals. In some cases, only the feeder-link elements, or only the user-link elements, are full duplex. Other implementations can use different types of polarization. For example, in some implementations, the transponders can be coupled between a receive antenna element and transmit antenna element of the same polarity.

Both the example forward-link transponder 3430 and return-link transponder 3440 can include some or all of LNAs 3705, frequency converters and associated filters 3710, channel amplifiers 3715, phase shifters 3720, power amplifiers 3725 (e.g., traveling wave tube amplifiers (TWTAs), solid state power amplifiers (SSPAs), etc.) and harmonic filters 3730. In dual-pole implementations, as shown, each pole has its own signal path with its own set of transponder components. Some implementations can have more or fewer components. For example, the frequency converters and associated filters 3710 can be useful in cases where the uplink and downlink frequencies are different. As one example, each forward-link transponder 3430 can accept an input at a first frequency range and can output at a second frequency range; and each return-link transponder 3440 can accept an input at the first frequency range and can output at the second frequency range.

In some cases, multiple sub-bands are used (e.g., seven 500 MHz sub-bands, as described above). For example, in some cases, transponders can be provided that operate over the same sub-bands as used in a multiple sub-band implementation of the ground network, effectively to enable multiple independent and parallel end-to-end beamforming systems through a single end-to-end relay (each end-to-end beamforming system operating in a different sub-band). In such cases, each transponder can include multiple frequency converters and associated filters 3710, and/or other components, dedicated to handling one or more of the sub-bands. The use of multiple frequency sub-bands may allow relaxed requirements on the amplitude and phase response of the transponder, as the ground network may separately determine beam weights used in each of the sub-bands, effectively calibrating out passband amplitude and phase variation of the transponders. For example, with separate forward and return transponders, and using 7 sub-bands, a total of 14 different beam weights may be used for each beam (i.e., 7 sub-bands*2 directions (forward and return)). In other cases, a wide bandwidth end-to-end beamforming system may use multiple sub-bands in the ground network, but pass one or more (or all) sub-bands through wideband transponders (e.g., passing 7 sub-bands, each 500 MHz wide, through a 3.5 GHz bandwidth transponders). In some cases, each transponder path includes only a LNA 3705, a channel amplifier 3715, and a power amplifier 3725. Some implementations of the end-to-end relay 3403 include phase shift controllers and/or other controllers that can individually set the phases and/or other characteristics of each transponder as described above.

The antenna elements can transmit and/or receive signals in any suitable manner. In some cases, the end-to-end relay 3403 has one or more array fed reflectors. For example, the feeder-link antenna subsystem 3410 can have a feeder-link reflector for both transmit and receive, or a separate feeder-link transmit reflector and feeder-link receive reflector. In some cases, the feeder-link antenna subsystem 3410 can have multiple feeder-link reflectors for transmission or reception, or both. Similarly, the user-link antenna subsystem 3420 can have a user-link reflector for both transmit and receive, or a separate user-link transmit reflector and user-link receive reflector. In some cases, the user-link antenna subsystem 3420 can have multiple user-link reflectors for transmission or reception, or both. In one example case, the feeder-link antenna subsystem 3410 comprises an array of radiating structures, and each radiating structure includes a feeder-link constituent receive element 3416 and a feeder-link constituent transmit element 3419. In such a case, the feeder-link antenna subsystem 3410 can also include a feeder-link reflector that illuminates the feeder-link constituent receive elements 3416 and is illuminated by the feeder-link constituent transmit elements 3419. In some cases, the reflector is implemented as multiple reflectors, which may be of different shapes, sizes, orientations, etc. In other cases, the feeder-link antenna subsystem 3410 and/or the user-link antenna subsystem 3420 is implemented without reflectors, for example, as a direct radiating array.

As discussed above, achieving a relatively uniform distribution of ANs 515 across a given user coverage area 3460 may involve placing ANs 515 in undesirable locations. Thus, the present disclosure describes techniques to enable the ANs 515 to be geographically distributed within an AN area 3450 that is smaller (sometimes significantly) than the user coverage area 3460. For example, in some cases the AN area 3450 may be less than half, less than one quarter, less than one-fifth, or less than one-tenth the physical area of the user coverage area 3460. In addition, multiple AN areas 3450 may be used concurrently or may be activated for use at different times. As discussed herein, these techniques include the use of different sized reflectors, compound reflector(s), selectively coupled transponders, different user link and feeder link antenna subsystems, etc.

As noted above, separating the feeder-link antenna subsystem 3410 and the user-link antenna subsystem 3420 can enable servicing of one or more AN areas 3450 that are distinct from one or more user coverage areas 3460. For example, the feeder-link antenna subsystem 3410 can be implemented with a reflector having an appreciably larger physical area than the reflector of the user coverage area 3460. The larger reflector can permit a large number of ANs 515 to be geographically distributed in an appreciably smaller AN area 3450, such as in a small subset of the user coverage area 3460. Some examples are shown in FIGS. 45A-45G. Alternatively, an AN area 3450 that is a subset of the user coverage area may be deployed using a single antenna subsystem for both the feeder-link and user-link by using different frequency ranges for the feeder-link and user-links. For example, an AN area 3450 that is one-quarter the area of a user coverage area 3460 may be deployed using a feeder-link carrier frequency that is approximately double the user-link carrier frequency. In one example, the user-link may use a frequency range (or ranges) in the K/Ka bands (e.g., around 30 GHz) while the feeder-link uses frequency range(s) in the V/W bands (e.g., around 60 GHz). In this case, the AN area 3450 will be concentric with the user coverage area 3460.

Figure 45A:
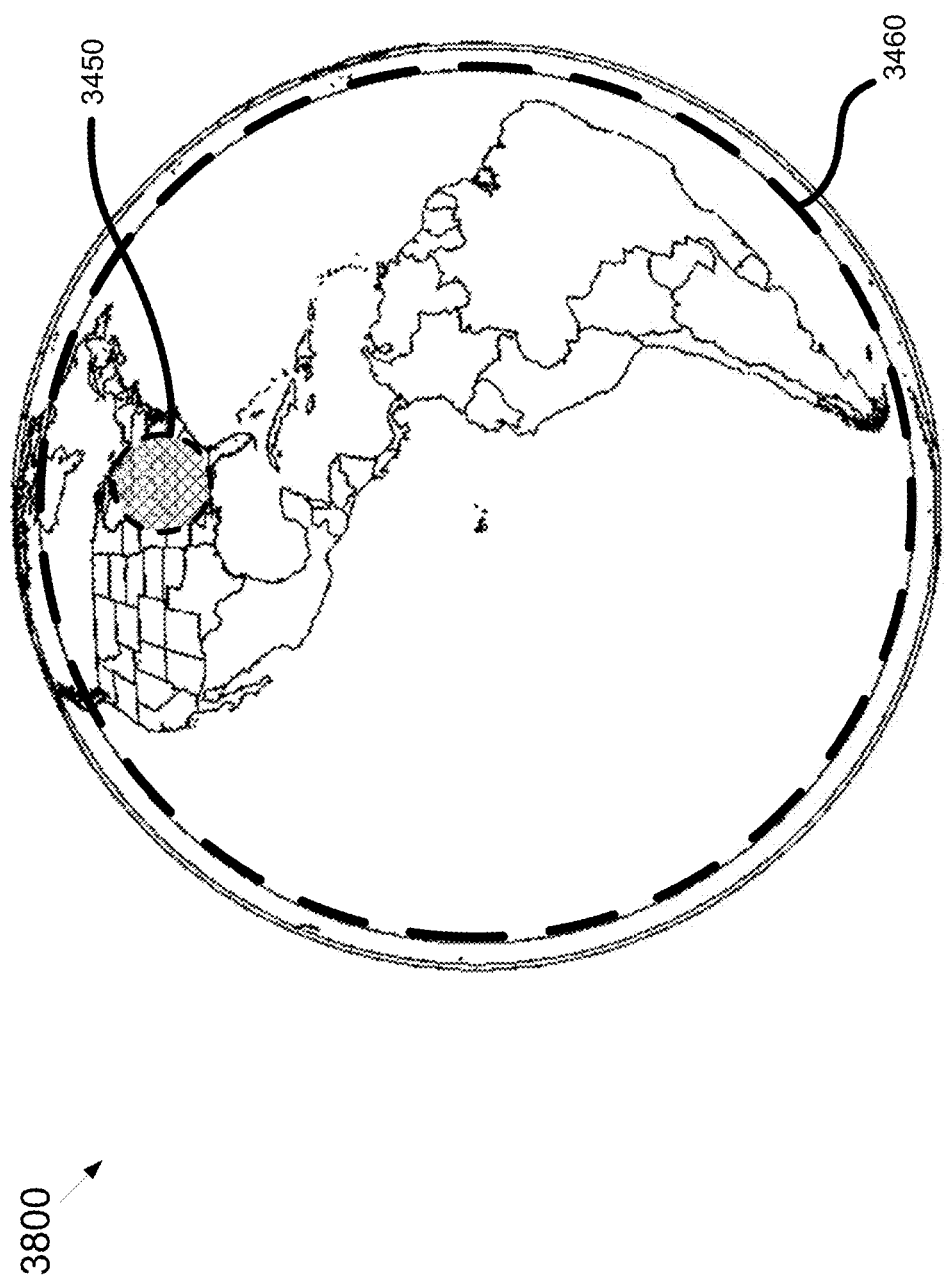

FIG. 45A shows an example of an end-to-end relay 3403 (e.g., a satellite) visible Earth coverage area 3800. In the example end-to-end relay 3403, the feeder-link antenna subsystem 3410 includes an 18-meter feeder-link reflector, and the user-link antenna subsystem 3420 includes a 2-meter user-link reflector (e.g., the feeder-link reflector area is about eighty times larger than the user-link reflector area). Each antenna subsystem also includes an array of 512 cooperating constituent receive/transmit elements. The example end-to-end relay 3403 can include 512 forward-link transponders 3430 (e.g., forming 512 forward signal paths 3700 as shown in FIG. 44A) and 512 return-link transponders 3440 (e.g., forming 512 return signal paths 3750 as shown in FIG. 44B). From a geostationary orbital position of the end-to-end relay 3403, the user-link antenna subsystem 3420 illuminates user coverage area 3460 that extends substantially over the visible Earth coverage area 3800 while the feeder-link reflector illuminates AN area 3450 that is a fraction of the user coverage area 3460. Although the AN area 3450 is a small subset of the large user coverage area 3460, a large system capacity including a large number of user beams can be supported using end-to-end beamforming with a large number of ANs 515 in the AN area 3450 (e.g., used cooperatively in an AN cluster). For example, hundreds of cooperating ANs 515 may be geographically distributed within AN area 3450 shown in FIG. 45A as a shaded region in the eastern United States. In one example, 597 ANs 515 are geographically distributed within AN area 3450.

FIG. 46A shows the visible earth coverage with end-to-end beamforming applied between the ANs 515 in the AN area 3450 and the user coverage area 3460. The user coverage area 3460 includes 625 user beam coverage areas 519 providing service to user terminals 517 within the visible Earth coverage area 3800.

Figure 45B:
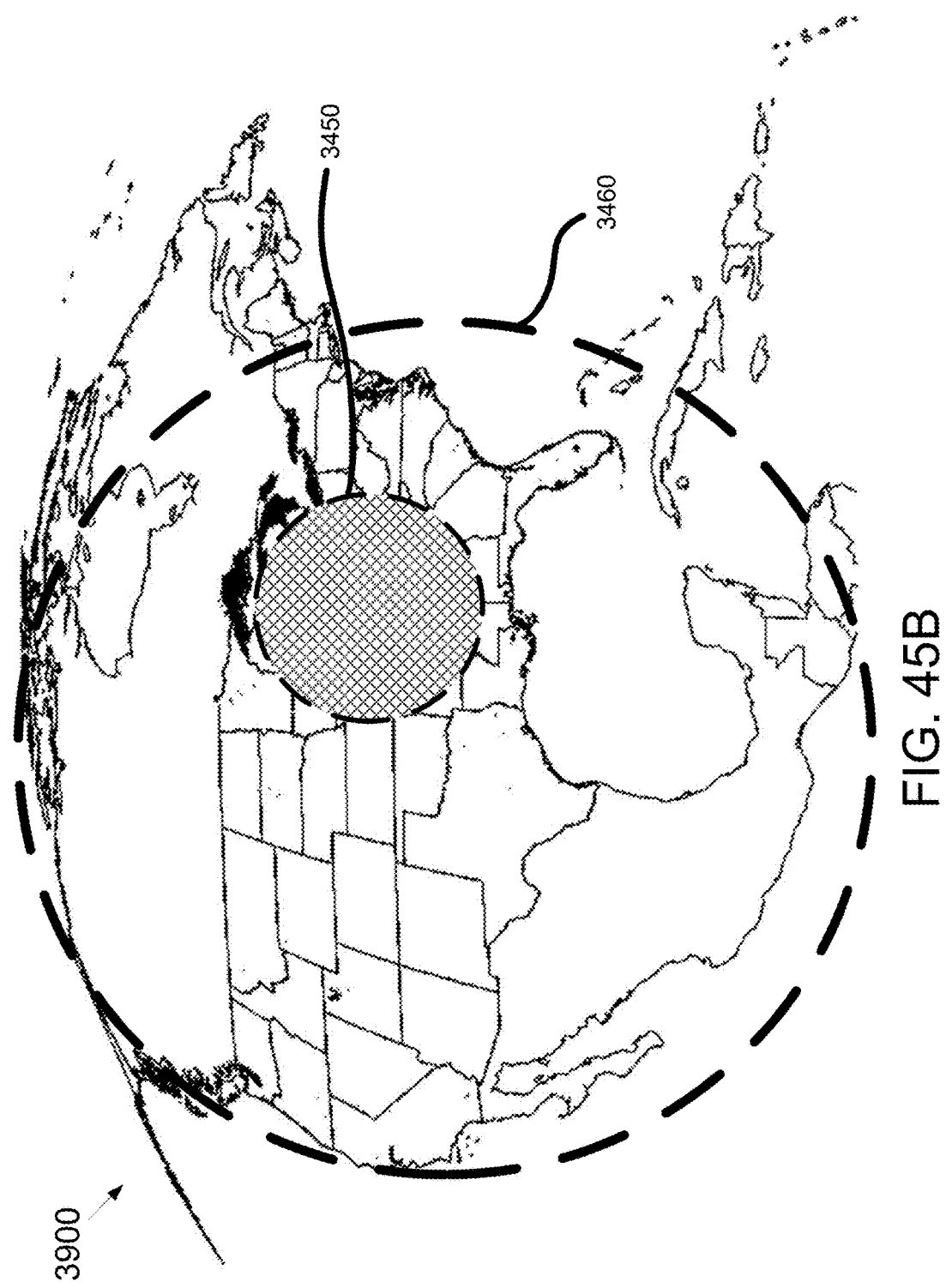

FIG. 45B shows an example of an end-to-end relay 3403 (e.g., a satellite) Continental United States (CONUS) coverage area 3900. The example end-to-end relay 3403 is similar to the example shown in FIG. 45A, except that the feeder-link antenna subsystem 3410 uses an 18-meter feeder-link reflector while the user-link antenna subsystem 3420 includes a 5-meter user-link reflector (e.g., the area of the feeder-link reflector is about thirteen times larger than the area of the user-link reflector). The AN area 3450 (e.g., the area containing the cooperating AN cluster) is the same as that of FIG. 45A: a region that is a small subset of the user coverage area 3460 in the eastern United States having e.g., 597 ANs 515 distributed therein.

Figure 46B:
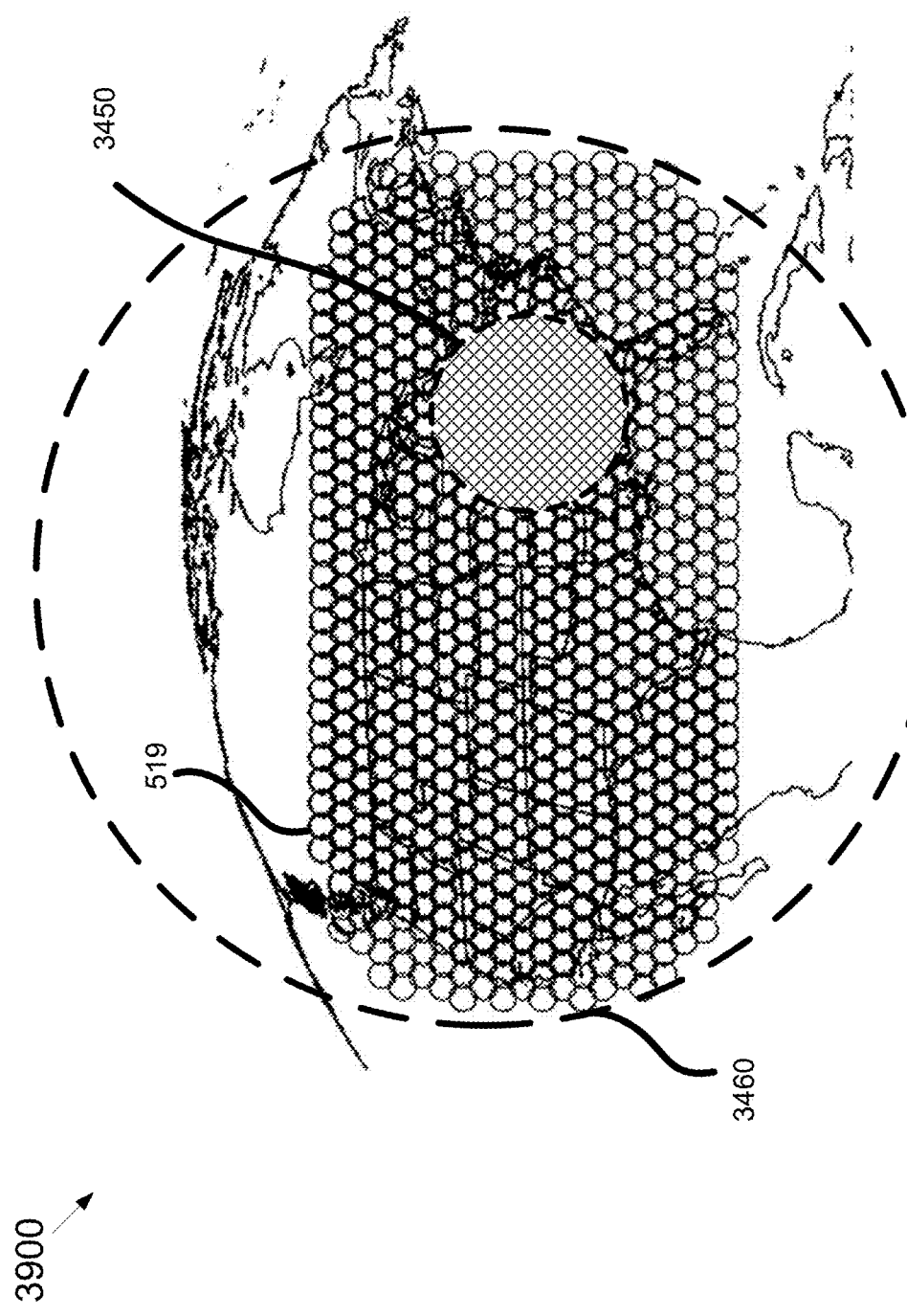

FIG. 46B shows the CONUS coverage area 3900 with end-to-end beamforming applied between the ANs 515 in the AN area 3450 and the user coverage area 3460. The user coverage area 3460 includes 523 user beam coverage areas 519 providing service to user terminals 517 within the CONUS coverage area.

Various geographical and relative locations of the AN cluster are supported by the present disclosure. As described herein, an end-to-end relay 3403 like those illustrated in FIGS. 49A and 49B can provide communications service between one or more user coverage areas 3460 and ANs 515 located in one or more AN areas 3450. In some examples, such as the example illustrated in FIG. 45B, the AN area 3450 may overlap or be located entirely within the user coverage area 3460. Additionally or alternatively, an AN area 3450 may be non-overlapping with a user coverage area 3460 as illustrated in FIG. 45C. In some cases, such an arrangement may require the use of a special loopback mechanism, which is discussed below with reference to FIGS. 55A-55C.

Figure 45D:
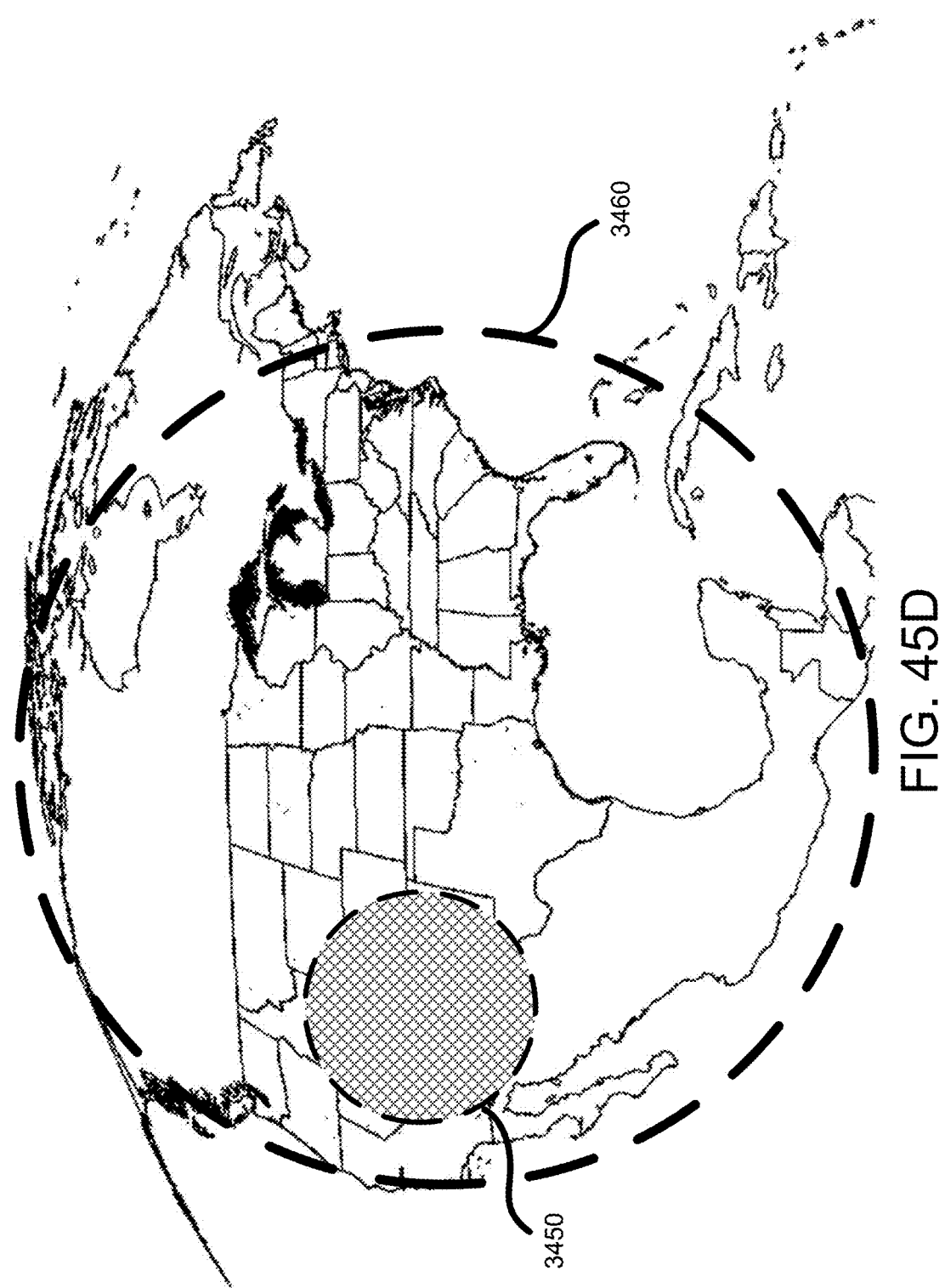

As another example of a possible geographic arrangement, the AN cluster (e.g., the AN area 3450) may at least partially overlap with a low demand area of the user coverage area 3460. An example is shown in FIG. 45D, where the AN area 3450 is located in a low demand area of user coverage area 3460. In some cases, a low demand area may be determined based on the demand for the communication service being below a demand threshold. For example, the low demand area may have an average demand that is less than a fraction (e.g., one-half, one-quarter, etc.) of the average demand across other served areas of user coverage area 3460. Such a deployment may support increased system capacity in higher demand areas (e.g., by allowing portions of the frequency spectrum associated with feeder-link communications in the low demand area to be used for user beams in the higher demand areas). That is, a given system bandwidth (which may be a contiguous or multiple non-contiguous frequency ranges) may be mostly or fully utilized for serving user beams in areas outside the low demand area, and may be allocated mostly to feeder-link communications within the low demand area, with the user beams in the low demand area being allocated a smaller portion (e.g., less than half) of the system bandwidth. Thus, in some cases, the user-link communications in higher demand areas may use at least a portion of the same frequency bandwidth used for feeder-link communications in a low demand area in which the access node area 3450 is located. In this example, the AN area 3450 is contained completely within user coverage area 3460, although the two may only partially overlap in some cases.

Figure 45E:
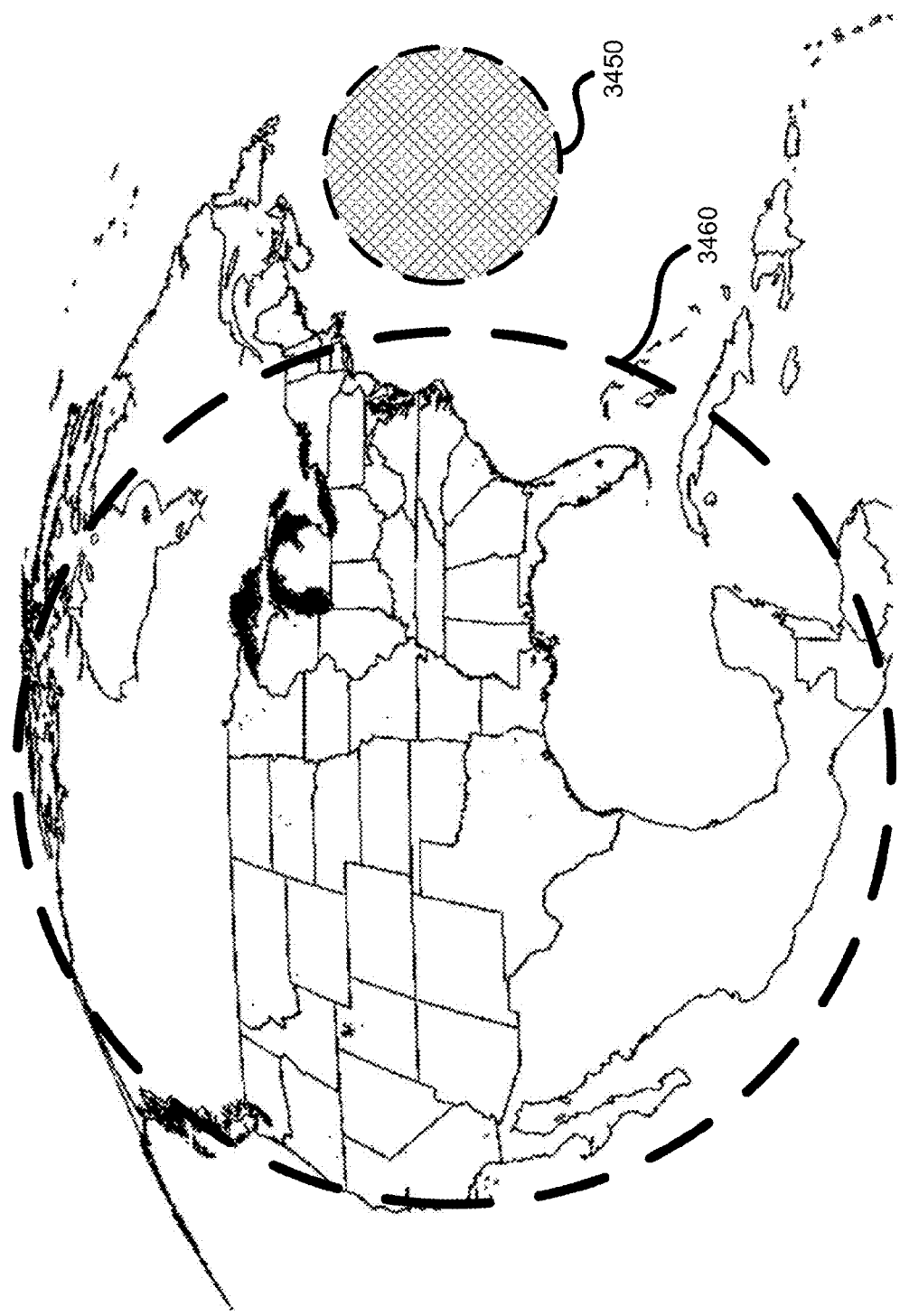

In some cases, the AN cluster may be located within (e.g., on the surface of) an aquatic body (e.g., a lake, sea, or ocean). An example is shown in FIG. 45E, which shows a user coverage area 3460 including the United States and an AN area 3450 located off the eastern coast of the United States. In some cases, the AN area may at least partially overlap with a landmass (e.g., some ANs 515 may not be located within the aquatic body). Thus, the example discussed with respect to FIG. 45E includes a scenario in which only one AN 515 is located within the aquatic body, all ANs 515 are located within the aquatic body, or some intermediate number of ANs 515 are located within the aquatic body. Benefits of locating parts or all of an AN cluster on an aquatic body include availability of large areas for the AN cluster in proximity to land masses where user coverage is desired, flexibility in placement of ANs 515 within the AN area 3450, and reduced competition for spectrum rights. For example, regulatory considerations such as interference and band-sharing with other services may be reduced when an AN cluster is not located over a particular country or landmass.

Figure 58:
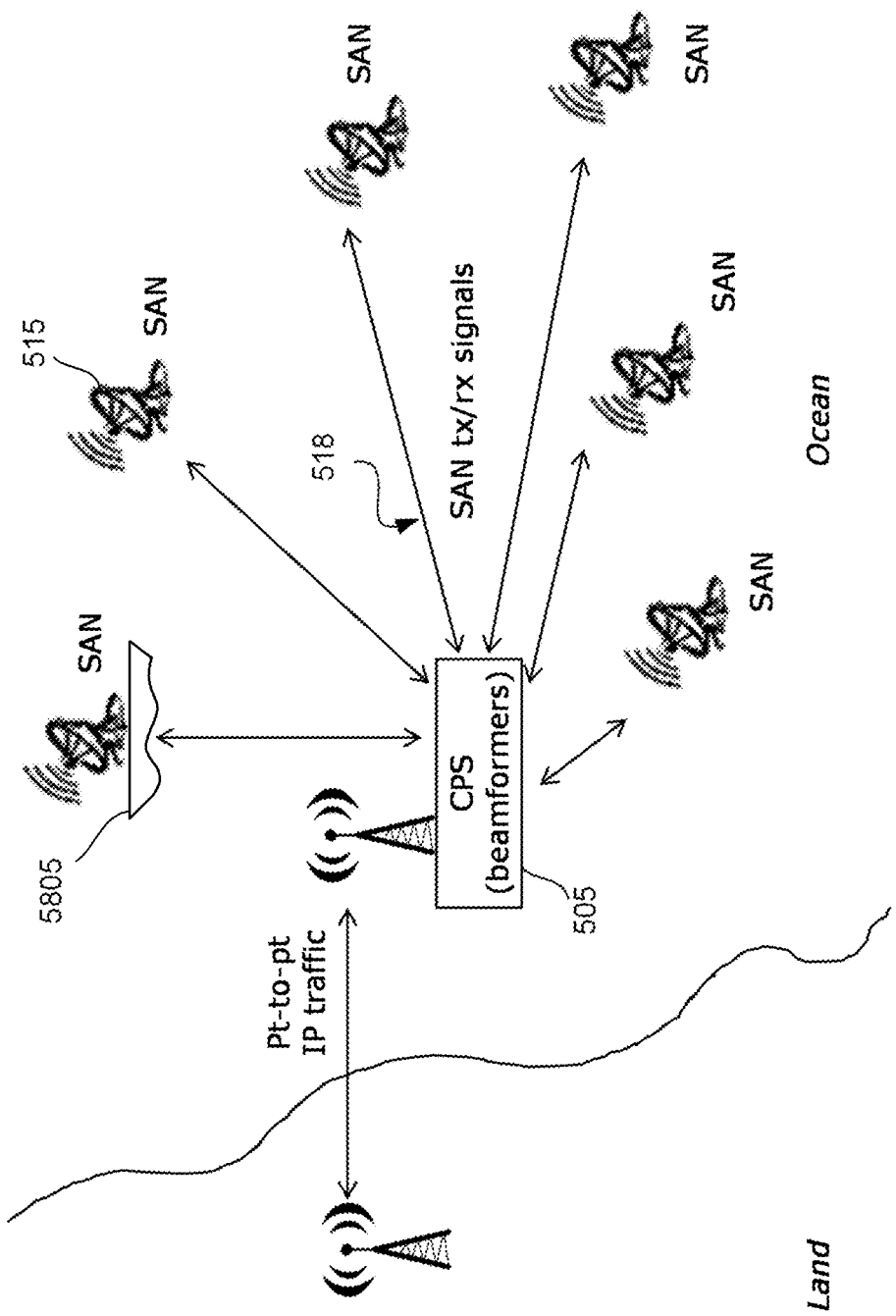
FIG. 58 shows an end-to-end relay system with portions disposed on one or more offshore (e.g., fixed or floating) platforms.

ANs 515 located within the aquatic body may be located on fixed or floating platforms. Examples of fixed platforms used for ANs 515 include fixed oil platforms, fixed offshore wind turbines, or other platforms installed on pilings. Examples of floating platforms include barges, buoys, offshore oil platforms, floating offshore wind turbines, and the like. Some fixed or floating platforms may already have power sources, while other fixed or floating platforms dedicated for use in an AN cluster may be configured with power generation (e.g., a generator, solar power generation, wind turbine, etc.). Distribution of access node specific forward signals 521 from a beamformer 529 to the ANs 515 and composite return signals 1706 from the ANs 515 to the beamformer 531 may be provided via a distribution network 518 that includes wired or wireless links between the beamformer(s) or a distribution platform and the ANs 515. In some cases, the distribution network 518 may include a submarine cable coupled with the beamformer(s) and ANs 515 distributed within the aquatic body as discussed with reference to FIG. 45G. The submarine cable may also provide a power source. The distribution network may additionally or alternatively include wireless RF links (e.g., microwave backhaul links) or free space optical links. In some examples, the beamformer(s), a distribution point for the beamformer(s), or the distribution network 518 as a whole may be located within the aquatic body. For example, FIG. 58 shows a CPS 505 disposed on an offshore (e.g., fixed or floating) platform 5805 that communicates traffic to a terrestrial network node and is coupled to ANs 515 in the aquatic body via distribution network 518.

In some cases, at least some ANs 515 in the AN cluster may be mobile (e.g., may be located on moveable platforms). For example, ANs 515 within an aquatic body may be located on boats or barges that may be controlled to relocate position as illustrated by floating platform 5805 in FIG. 58. Similarly, terrestrial ANs 515 may be located on vehicular platforms while airborne ANs 515 may be located on mobile platforms such as aircraft, balloons, drones, and the like. In some examples, mobile ANs 515 may be used to optimize distribution of ANs 515 within the AN area 3450. For example, ANs 515 may be relocated for better geographic distribution within the AN area 3450, or ANs 515 may be relocated upon failure of one or more ANs 515 (e.g., to redistribute the available ANs 515). The beamforming weights may be recalculated for the new positions and the ANs 515 may resynchronize transmit timing and phase to adjust to the new positions, as described above.

In some examples, the AN area 3450 may be relocated using mobile ANs 515 (e.g., one or more ANs 515 in the AN cluster may be located on mobile platforms). An example is shown in FIG. 45F, which shows an initial AN area 3450a including multiple ANs 515 geographically distributed within the AN area 3450a. For various reasons, the AN cluster may be relocated to be within new AN area 3450b. For example, a mobile AN cluster may be used to adapt to changes in position of the end-to-end relay 3403. In one example, an orbital position or orientation of a satellite end-to-end relay 3403 changes due to a change in deployment to a new orbital slot or because of orbital drift or alignment, and the change in AN area 3450 adapts to the new orbital position or orientation. The mobile ANs 515 may move to new positions within the new AN area 3450b. Additionally, while the mobile AN cluster is displayed as being located within an aquatic body, some or all of the ANs 515 may be located on land (e.g., mobile ANs 515 need not be located in an aquatic body). In some cases, one or more of the ANs 515 may be located on an airborne craft (e.g., a plane, a balloon, a drone, etc.). Also, while the current example describes first and second AN areas 3450a and 3450b that are similar in size at different locations, the AN areas 3450 at the different locations may be (e.g., significantly) different (e.g., due to a difference in slant range or adaptation of an antenna assembly on the end-to-end relay). As an example, the first and second AN areas 3450a and 3450b may have the same (or similar) center points but significantly different physical sizes (e.g., through a combination of orbit slot shift and repointing of the end-to-end relay antenna).

As an example, the AN cluster may initially be located at a first location 3450a. While at the first location 3450a, each AN 515 of the AN cluster may receive an access node-specific forward signal for transmission via end-to-end relay 3403 to one or more of the user terminals in user coverage area 3460. In aspects, the access node-specific forward signal may be received from a forward beamformer 529 via a distribution network 518, which may be a free space optical link or any other suitable link. As discussed above, the access node-specific forward signals may be appropriately weighted by the forward beamformer 529 before reception at the AN 515. While at the first location 3450a, each AN 515 may synchronize a forward uplink signal 521 for reception at the end-to-end relay 3403 so that the forward uplink signal 521 is time and phase aligned with other forward uplink signals 521 from other ANs 515 in the AN cluster. Synchronization may be accomplished using any of the techniques described herein (e.g., using relay beacons).

Subsequently, the AN cluster (or portions thereof) may move to a second location 3450b. The movement may be in response to some stimulus (e.g., a change in location of the end-to-end relay, weather patterns, etc.). At the second location 3450b, the ANs 515 of the AN cluster may obtain weighted access node-specific forward signals (e.g., generated using an updated beam weight matrix determined based on the new locations of the ANs 515 within the new AN area 3450*b*), synchronize transmissions, and transmit forward uplink signals 521 to end-to-end relay 3403. While described as being performed at the second location, one or more of these steps may be performed prior to reaching the second location.

Figure 45G:
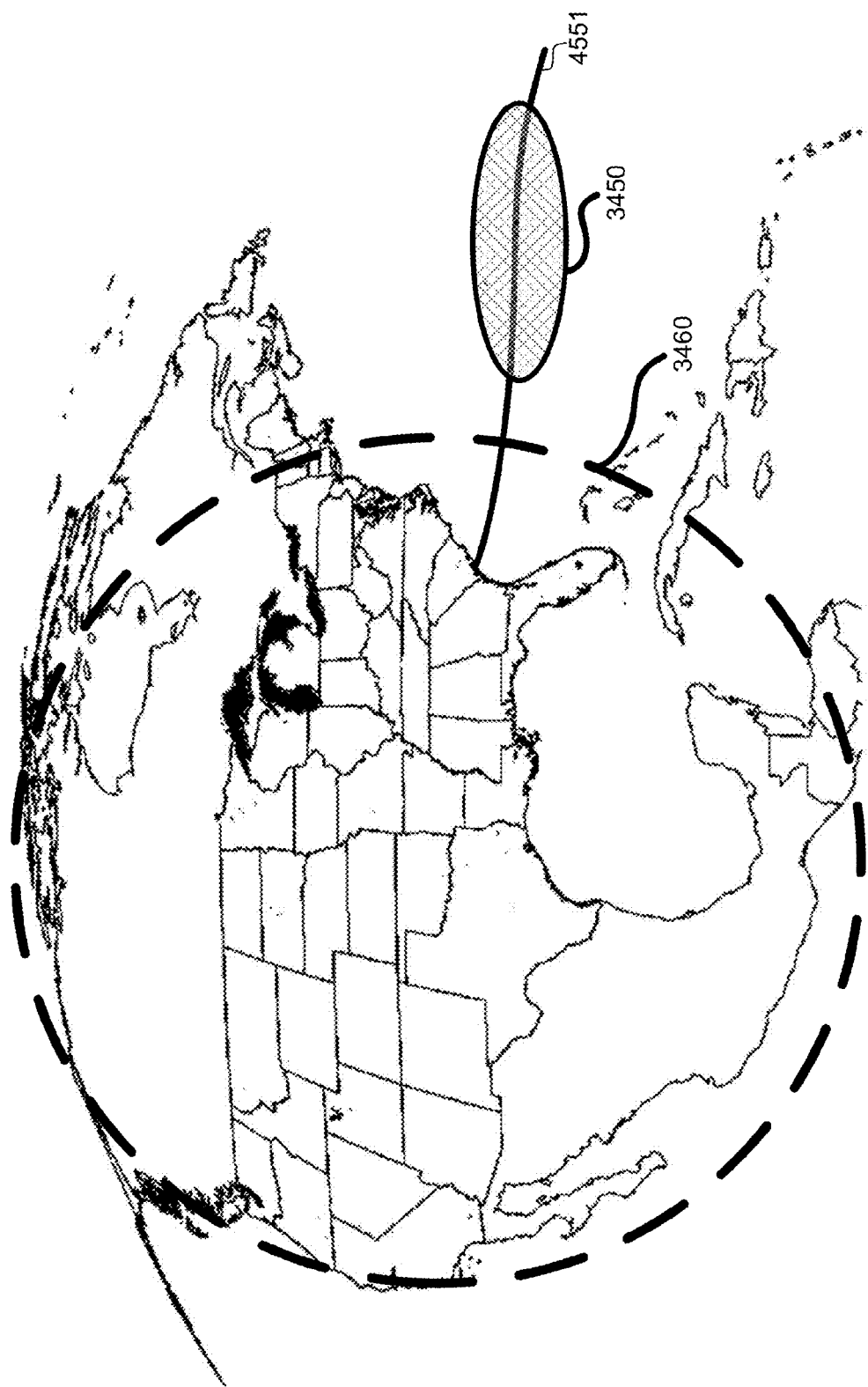

In some cases, the location and shape of the AN cluster may be configured to take advantage of existing network infrastructure. For example, as shown in FIG. 45G, the AN area 3450 may be located near an existing submarine cable 4551 (e.g., fiber-optic cable used in Internet backbone communications, etc.). The submarine cable 4551 may also provide a power source. The distribution network 518 (e.g., between ANs) may additionally or alternatively include wireless RF links (e.g., microwave backhaul links) or free space optical links. In some examples, the beamformer(s), a distribution point for the beamformer, or the distribution network 518 as a whole may be located within the aquatic body. As shown in FIG. 45G, one or more of the AN areas 3450 may be shaped (e.g., using an appropriately shaped reflector, etc.) so as to minimize the total distance between the ANs 515 and the submarine cable 4551. The example of FIG. 45G shows an elliptically shaped AN area 3450, though any suitable shape may be used. Further, while only one AN area 3450 is displayed in FIG. 45G, multiple AN areas 3450 may exist (e.g., located along the same submarine cable 4551 or different submarine cables 4551). The multiple AN areas 3450 may be disjoint or overlap at least partially.

Multiple Coverage Areas

In the example end-to-end relays 3403 described above, the user-link antenna subsystem 3420 is described as a single antenna subsystem (e.g., with a single user-link reflector), and the feeder-link antenna subsystem 3410 is described as a single antenna subsystem (e.g., with a single feeder-link reflector). In some cases, the user-link antenna subsystem 3420 can include one or more antenna subsystems (e.g., two or more sub-arrays of constituent antenna elements) associated with one or more user-link reflectors, and the feeder-link antenna subsystem 3410 can include one or more antenna subsystems associated with one or more feeder-link reflectors. For example, some end-to-end relays 3403 can have a user-link antenna subsystem 3420 that includes a first set of user-link constituent receive/transmit elements associated with a first user-link reflector (e.g., each element is arranged to illuminate, and/or be illuminated by, the first user-link reflector) and a second set of user-link constituent receive/transmit elements associated with a second user-link reflector. In some cases, the two user-link reflectors are approximately the same physical area (e.g., within 5%, 10%, 25%, etc.) of each other. In some cases, one user-link reflector is significantly larger (e.g., 50% larger, at least twice the physical area, etc.) than the other. Each set of the user-link constituent receive/transmit elements, and its associated user-link reflector, can illuminate a corresponding, distinct user coverage area 3460. For example, the multiple user coverage areas can be non-overlapping, partially overlapping, fully overlapping (e.g., a smaller user coverage could be contained within a larger user coverage area), etc. In some cases, the multiple user coverage areas can be active (illuminated) at the same time. Other cases, as described below, can enable selective activation of the different portions of user-link constituent receive/transmit elements, thereby activating different user coverage areas at different times. Similarly, selective activation of different portions of feeder-link constituent receive/transmit elements can activate different AN areas 3450 at different times. Switching between multiple coverage areas may be coordinated with the CPS 505. For example, beamforming calibration, beam weight calculation and beam weight application may occur in two parallel beamformers, one for each of two different coverage areas. The usage of appropriate weights in the beamformers can be timed to correspond to the operation of the end-to-end relay. For example, switching between multiple coverage areas may be coordinated to occur at a time-slice boundary if time-slice beamformers are employed.

Figure 47A:
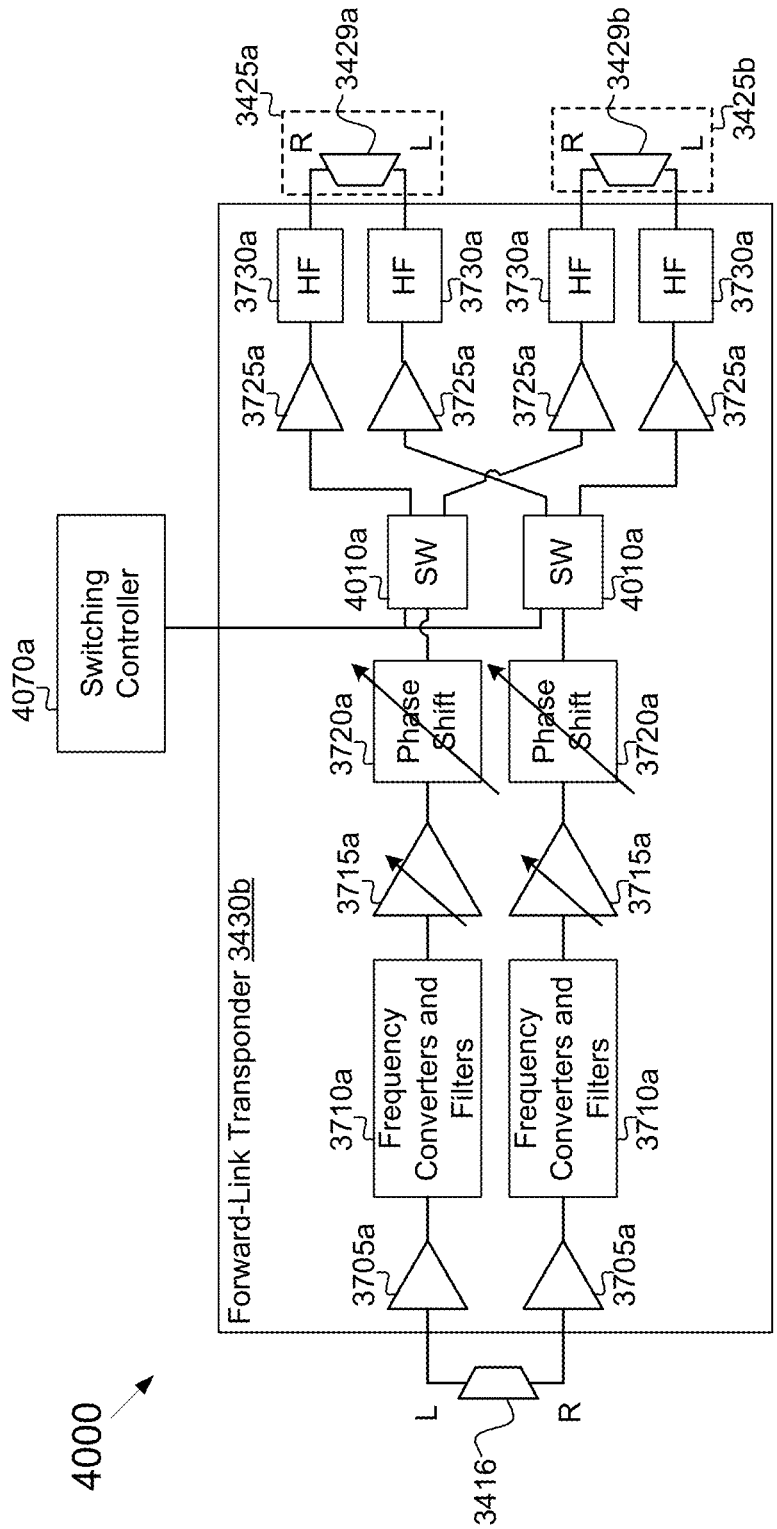
FIGS. 47A and 47B are block diagrams of an example forward signal path and return signal path, respectively, each having selective activation of multiple user-link antenna subsystems.
Figure 47B:
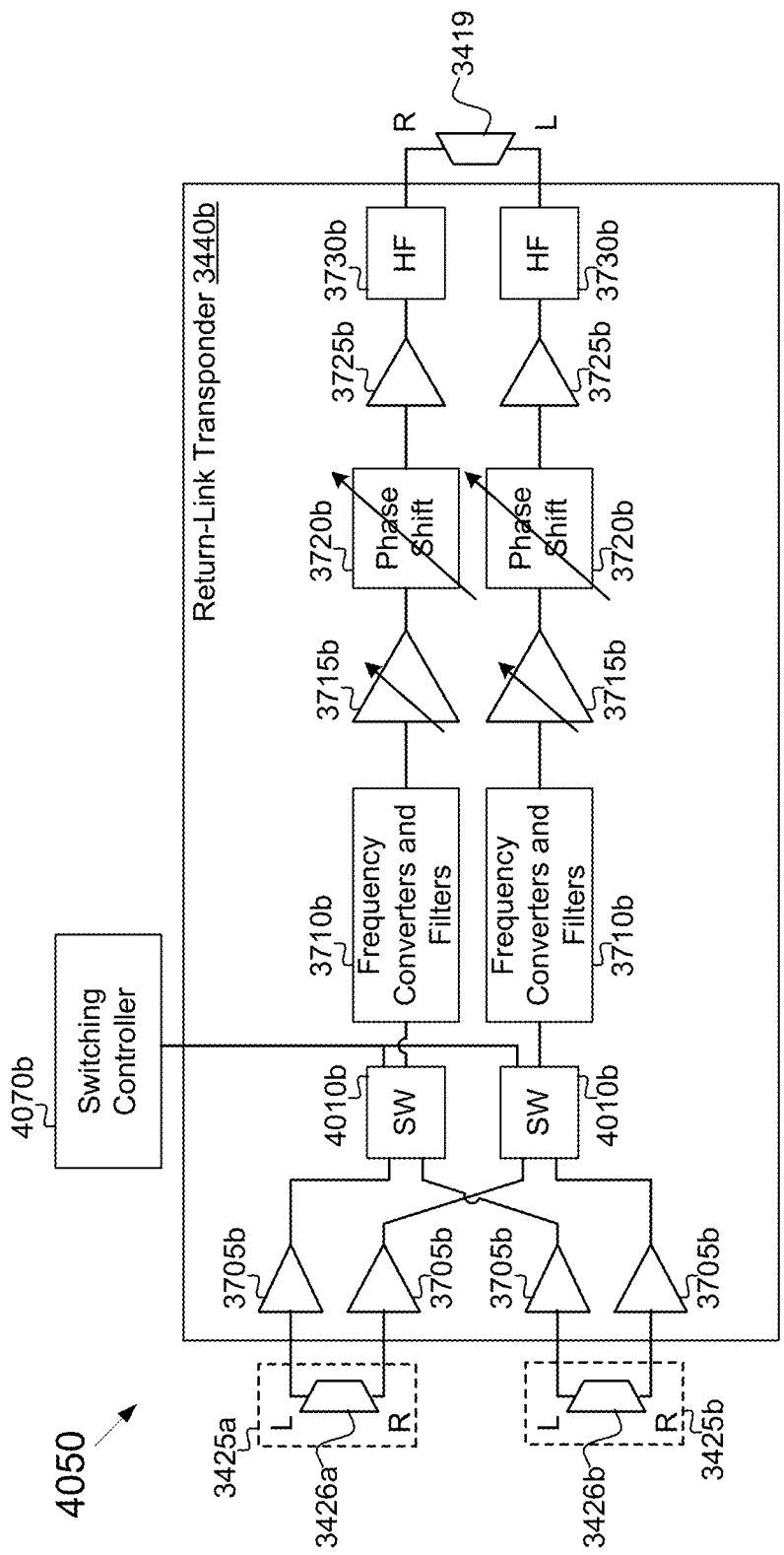

FIGS. 47A and 47B show an example forward signal path 4000 and return signal path 4050, respectively, each having selective activation of multiple user-link antenna subsystems 3420. Forward signal path 4000 (and other forward signal paths described herein) may be an example of forward signal path 3602 described with reference to FIG. 43. Return signal path 4050 (and other return signal paths described herein) may be an example of return signal path 3502 described with reference to FIG. 42. For example, each forward signal path 4000 may have a transponder 3430 coupled between constituent antenna elements. In FIG. 47A, the forward-link transponder 3430*b* is similar to the one described with reference to FIG. 44A, except that the output side of the forward-link transponder 3430*b* is selectively coupled to one of two user-link constituent transmit elements 3429, each part of a separate user-link antenna subsystem 3420 (e.g., each part of a separate array 3425 of cooperating user-link constituent transmit elements 3429). As described above, the forward-link transponder 3430*b* can include some or all of LNAs 3705*a*, frequency converters and associated filters 3710*a*, channel amplifiers 3715*a*, phase shifters 3720*a*, power amplifiers 3725*a*, and harmonic filters 3730*a*.

The forward-link transponder 3430*b* of FIG. 47A further includes switches 4010*a* (forward-link switches) that selectively couple the transponder either to a first user-link constituent transmit element 3429*a* (of a first user-link antenna element array 3425*a*) via a first set of power amplifiers 3725*a* and harmonic filters 3730*a*, or to a second user-link constituent transmit element 3429*b* (of a second user-link antenna element array 3425*b*) via a second set of power amplifiers 3725*a* and harmonic filters 3730*a*. For example, in a first switch mode, the forward-link transponder 3430*b* effectively forms a signal path between a feeder-link constituent receive element 3416 and a first user-link constituent transmit element 3429*a*; and in a second switch mode, the forward-link transponder 3430*b* effectively forms a signal path between the same feeder-link constituent receive element 3416 and a second user-link constituent transmit element 3429*b*. The switches 4010*a* can be implemented using any suitable switching means, such as an electromechanical switch, a relay, a transistor, etc. Though shown as switches 4010*a*, other implementations can use any other suitable means for selectively coupling the input of the forward-link transponder 3430 to multiple outputs. For example, the power amplifiers 3725*a* can be used as switches (e.g., providing high gain when "on," and zero gain (or loss) when "off"). Switches 4010*a* may be examples of switches that selectively couple one input to one of two or more outputs.

In FIG. 47B, the return-link transponder 3440*b* functionally mirrors the forward-link transponder 3430 of FIG. 47A. Rather than selectively coupling the output side of the transponder, as in the forward-link case of FIG. 47A, the input side of the return-link transponder 3440*b* is selectively coupled to one of two user-link constituent receive elements 3426. Again, each user-link constituent receive element 3426 can be part of a separate array of cooperating user-link constituent receive elements 3426, which may be part of the same user-link antenna subsystem 3420, or different user-link antenna subsystems 3420). As described above (e.g., in FIG. 44B), the return-link transponder 3440 can include some or all of LNAs 3705b, frequency converters and associated filters 3710b, channel amplifiers 3715b, phase shifters 3720b, power amplifiers 3725b, and harmonic filters 3730b.

The return-link transponder 3440b of FIG. 47B further includes switches 4010b (return-link switches) that selectively couple the transponder either to a first user-link constituent receive element 3426a (of a first user-link antenna element array 3425a) via a first set of LNAs 3705b, or to a second user-link constituent receive element 3426b (of a second user-link antenna element array 3425b) via a second set of LNAs 3705b. For example, in a first switch mode, the return-link transponder 3440b effectively forms a signal path between a first user-link constituent receive element 3426a and a feeder-link constituent transmit element 3419; and in a second switch mode, the return-link transponder 3440b effectively forms a signal path between a second user-link constituent receive element 3426b and the same feeder-link constituent transmit element 3419. The switches 4010b can be implemented using any suitable switching means, such as an electromechanical switch, a relay, a transistor, etc. Though shown as switches 4010b, other implementations can use any other suitable means for selectively coupling the output of the forward-link transponder 3440b to multiple inputs. For example, the power amplifiers 3705b can be used as switches (e.g., providing high gain when "on," and zero gain (or loss) when "off"). Switches 4010b may be examples of switches that selectively couple one of two or more inputs to a single output.

Examples of the end-to-end relay 3403 can include a switch controller 4070 to selectively switch some or all of the switches 4010 (or other suitable selective coupling means) according to a switching schedule. For example, the switching schedule can be stored in a storage device onboard the end-to-end relay 3403. In some cases, the switching schedule effectively selects which user-link antenna element array 3425 to activate (e.g., which set of user beams to illuminate) in each of a plurality of time intervals (e.g., timeslots). In some cases, the switching allocates equal time to the multiple user-link antenna element arrays 3425 (e.g., each of two arrays is activated for about half the time). In other cases, the switching can be used to realize capacity-sharing goals. For example, one user-link antenna element array 3425 can be associated with higher-demand users and can be allocated a greater portion of time in the schedule, while another user-link antenna element array 3425 can be associated with lower-demand users and can be allocated a smaller portion of time in the schedule.

Figure 48A:
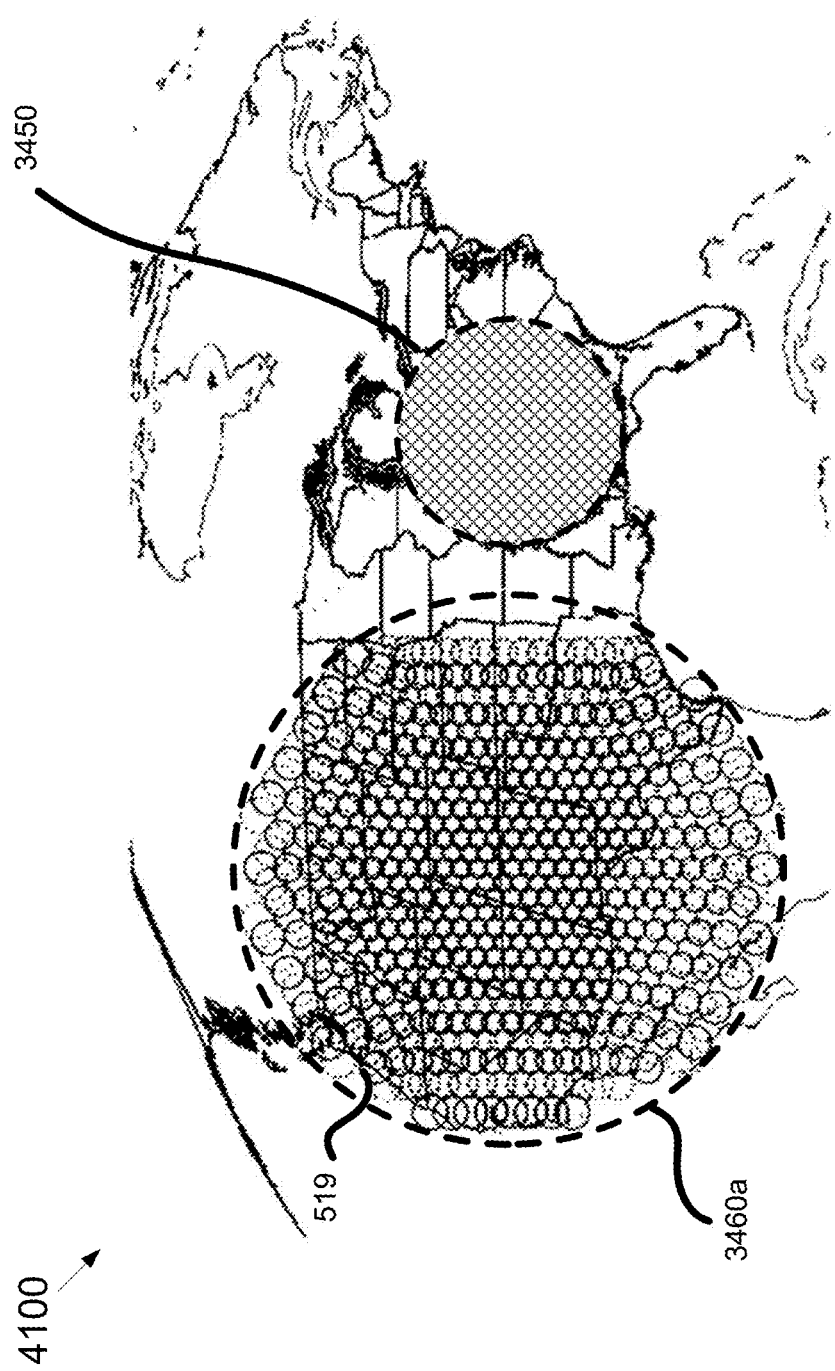
FIGS. 48A and 48B are an illustration of an example of an end-to-end relay coverage area that includes multiple, selectively activated user coverage areas.
Figure 48B:
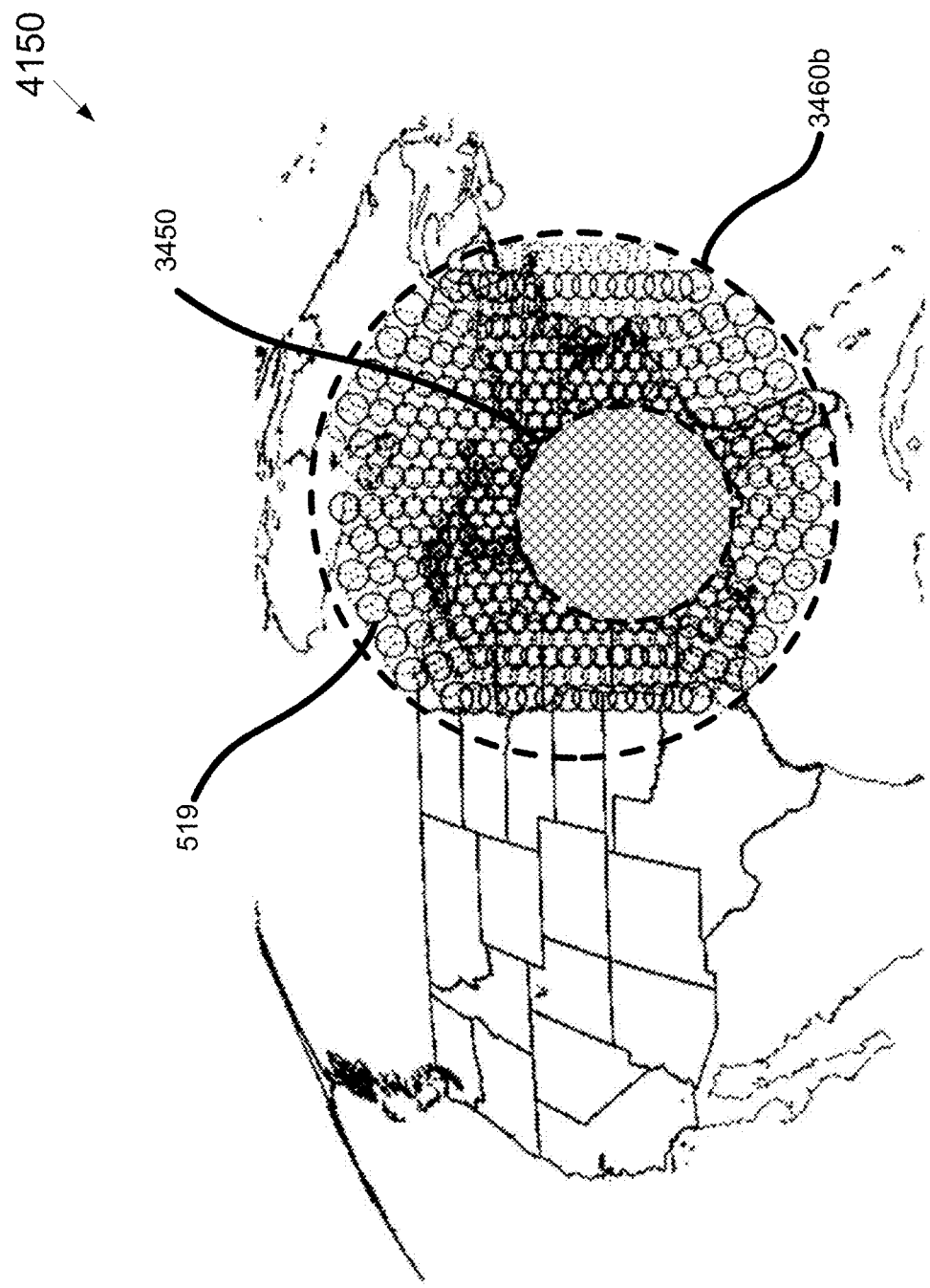

FIGS. 48A and 48B show an example of end-to-end relay 3403 coverage areas 4100 and 4150 that include multiple, selectively activated user coverage areas 3460a and 3460b, respectively. The example end-to-end relay 3403 is similar to the relay in FIGS. 38 and 39 except for the presence of different antenna subsystems. In this example, the user-link antenna subsystem 3420 includes two 9-meter user-link reflectors, and the transponders are configured to selectively activate only half of the user beam coverage areas 519 at any given time (e.g., the transponders are implemented as in FIGS. 47A and 47B). For example, during a first time interval, as shown in FIG. 48A, the user coverage area 3460a includes 590 active user beam coverage areas 519. The active user beam coverage areas 519 effectively cover the western half of the United States. The AN area 3450 (the AN cluster) is the same as that of FIGS. 38 and 39: a region in the eastern United States having e.g., 597 ANs 515 distributed therein. During the first time interval, the AN area 3450 does not overlap with the active user coverage area 3460a. During a second time interval, as shown in FIG. 48B, the user coverage area 3460b includes another 590 active user beam coverage areas 519. The active user beam coverage areas 519 in the second time interval effectively cover the eastern half of the United States. The AN area 3450 does not change. However, during the second time interval, the AN area 3450 is fully overlapped by (is a subset of) the active user coverage area 3460b. Capacity may be flexibly allocated to various regions (e.g., between eastern and western user coverage areas 3460) by dynamically adjusting the ratio of time allocated to the corresponding user-link antenna sub-systems 3420.

While the previous example illustrates two similarly sized user coverage areas 3460, other numbers of user coverage areas 3460 can be provided (e.g., three or more) and can be of differing sizes (e.g., earth coverage, continental U.S. only, U.S. only, regional only, etc.). In cases with multiple user coverage areas 3460, the user coverage areas 3460 can have any suitable geographic relationship. In some cases, first and second user coverage areas 3460 partially overlap (e.g., as shown in FIGS. 48A and 48B). In other cases, a second user coverage area 3460 can be a subset of a first user coverage area 3460 (e.g., as shown in FIGS. 46A and 46B). In other cases, the first and second user coverage areas 3460 do not overlap (e.g., are disjoint).

Figure 49A:
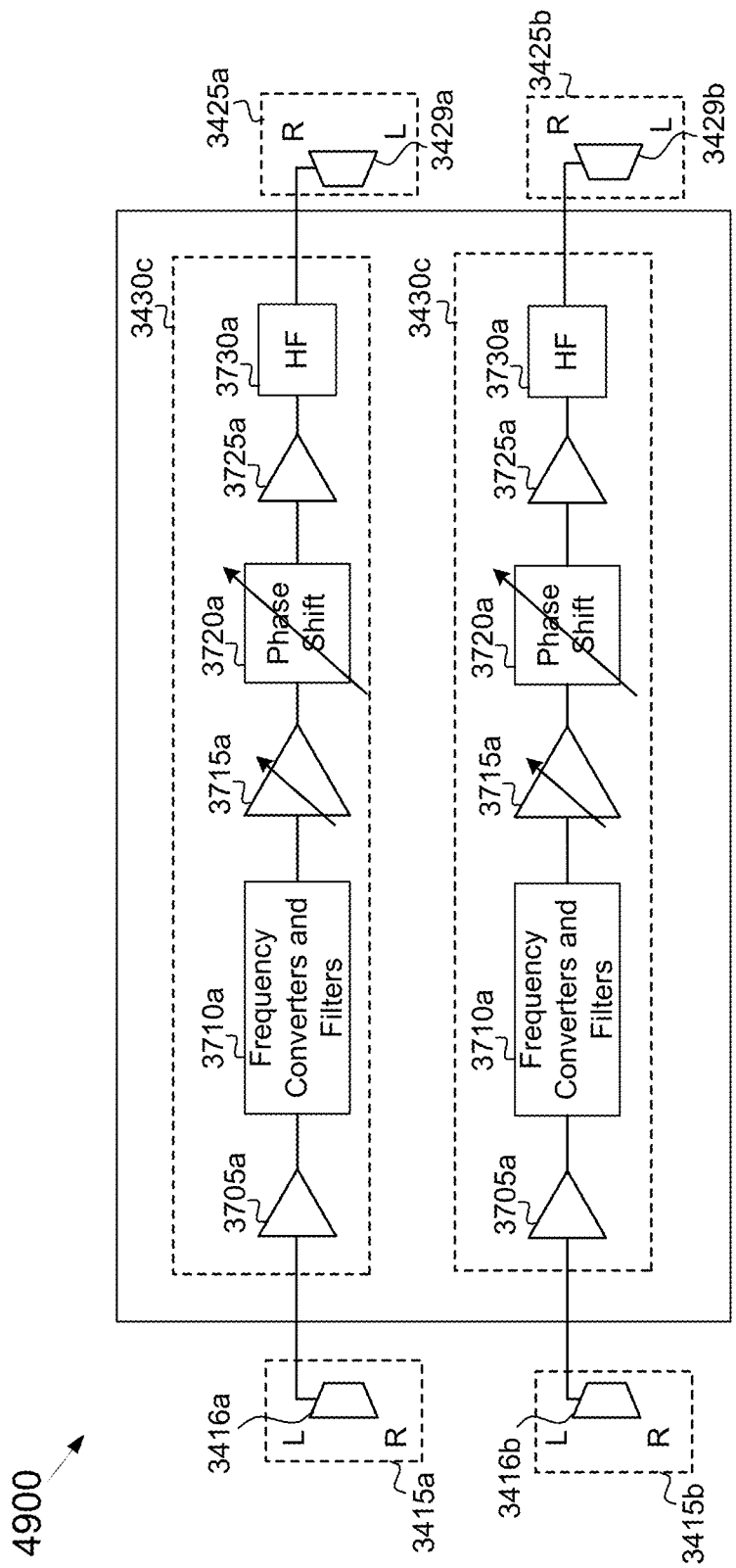
FIGS. 49A and 49B are block diagrams of example forward and return signal paths, respectively, each having selective activation of multiple user-link antenna subsystems and multiple feeder-link antenna subsystem.
Figure 49B:
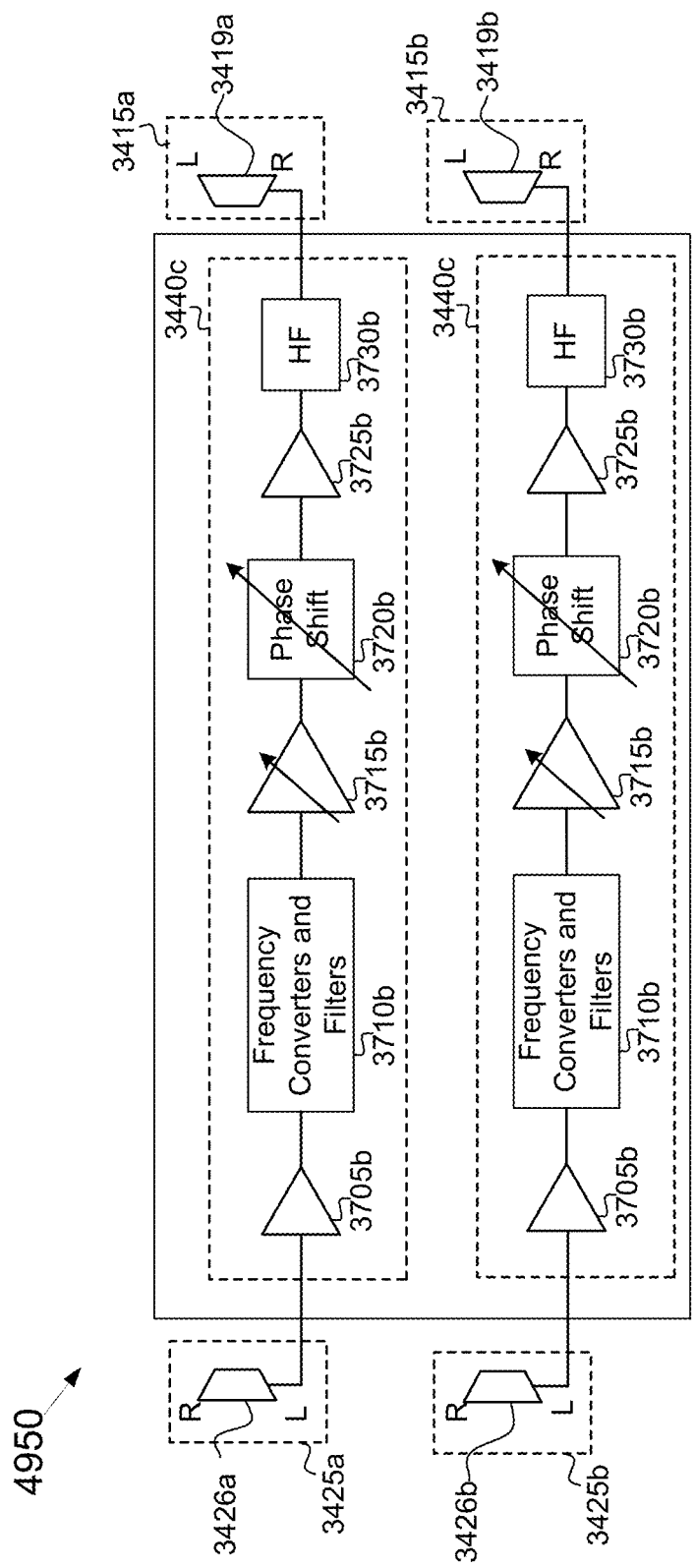
Figure 50A:
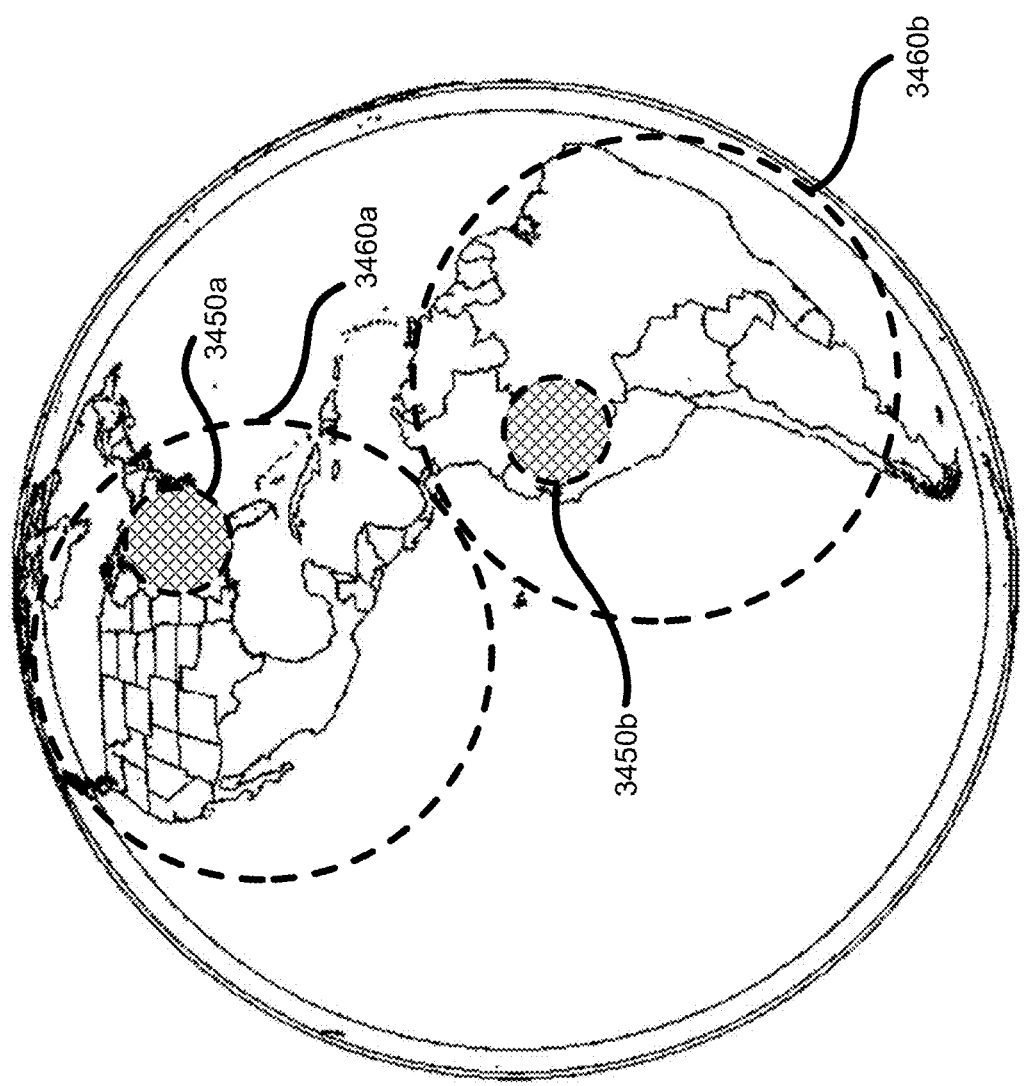
FIGS. 50A, 50B, and 50C illustrate examples of one or more user coverage areas with multiple access node areas.
Figure 63B:
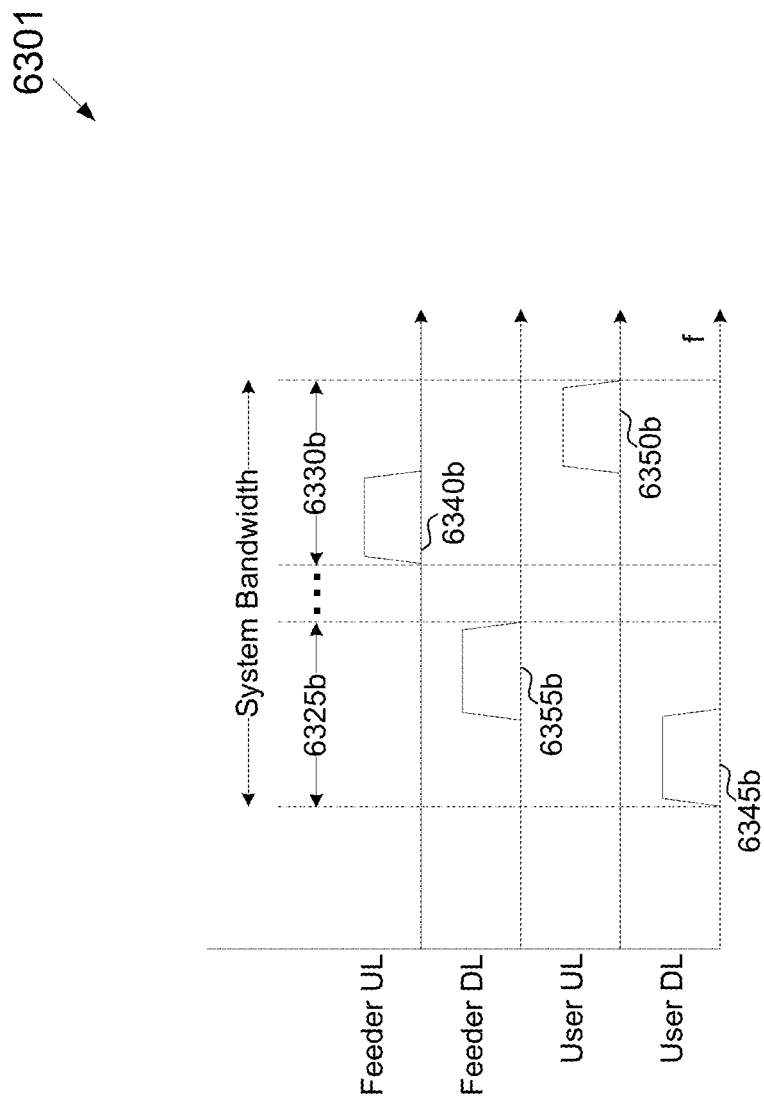

In some cases, it can be desirable for traffic of particular geographic regions to terminate in their respective regions. FIG. 50A illustrates a first AN area 3450a in North America used to provide communications service to a first user coverage area 3460a in North America, and a second AN area 3450b to provide communications service to a second user coverage area 3460b in South America. In some cases, the ANs within the first AN area 3450a exchange signals with a first CPS (e.g., located within or proximate to AN area 3450a), and the ANs within the second AN area 3450b exchange signals with a second CPS (e.g., located within or proximate to AN area 3450b) that is separate and distinct from the first CPS. For example, the first AN The end-to-end relay 3403 as shown in FIGS. 49A and 49B may support multiple user coverage areas with multiple AN areas as illustrated in FIG. 50A. Each combination of AN area and user coverage area may employ frequency allocations 6300 or 6301 as shown in FIG. 63A or 63B.

FIG. 49A shows an example forward signal path 4900 of an end-to-end relay 3403 for supporting multiple user coverage areas with multiple AN areas 3450. The example forward signal path 4900 has a first forward-link transponder 3430c coupled between a first feeder-link constituent receive element 3416a of a first feeder-link antenna element array 3415a and a first user-link constituent transmit element 3429a of a first user-link antenna element array 3425a. In addition, the example forward signal path 4900 has a second forward-link transponder 3430c coupled between a second feeder-link constituent receive element 3416b of a second feeder-link antenna element array 3415b and a second user-link constituent transmit element 3429b of a second user-link antenna element array 3425b. As described above, each of the forward-link transponders 3430 can include some or all of LNAs 3705a, frequency converters and associated filters 3710a, channel amplifiers 3715a, phase shifters 3720a, power amplifiers 3725a, and harmonic filters 3730a.

FIG. 49B shows an example return signal path 4950 of an end-to-end relay 3403 for supporting multiple user coverage areas with multiple AN areas 3450. The example return signal path 4950 has a first return-link transponder 3440c coupled between a first user-link constituent receive element 3426a of a first user-link antenna element array 3425a and a first feeder-link constituent transmit element 3419a of a first feeder-link antenna element array 3415a. In addition, the example return signal path 4950 has a second return-link transponder 3440c coupled between a second user-link constituent receive element 3426b of a second user-link antenna element array 3425b and a second feeder-link constituent transmit element 3419b of a second feeder-link antenna element array 3415b. As described above, each of the return-link transponders 3440 can include some or all of LNAs 3705b, frequency converters and associated filters 3710b, channel amplifiers 3715b, phase shifters 3720b, power amplifiers 3725b, and harmonic filters 3730b.

In some cases, feeder-link antenna element arrays 3415a and 3415b are part of separate feeder-link antenna subsystems 3410. Alternatively, a single feeder-link antenna subsystem 3410 may include both feeder-link antenna element arrays 3415a and 3415b (e.g., via use of a single reflector as described in more detail below with reference to FIGS. 56A and 56B). Similarly, user-link antenna element arrays 3425a and 3425b may be part of the same or separate user-link antenna subsystems 3420. The forward signal path 4900 and return signal path 4950 of FIGS. 49A and 49B may be used to support multiple independent end-to-end beamforming systems using a single end-to-end relay payload. For example, end-to-end beamforming between the first AN area 3450a and the first user coverage area 3460a shown in FIG. 50A may be supported by one beamformer and distribution system, while a separate and independent beamformer and distribution system supports end-to-end beamforming between the second AN area 3450b and the second user coverage area 3460b. FIGS. 49A and 49B illustrate examples where the constituent receive elements may be the same as the constituent transmit elements, and therefore only show one polarization in each direction. However, other examples may employ different constituent receive elements and constituent transmit elements, and may use multiple polarizations in each direction.

Figure 51A:
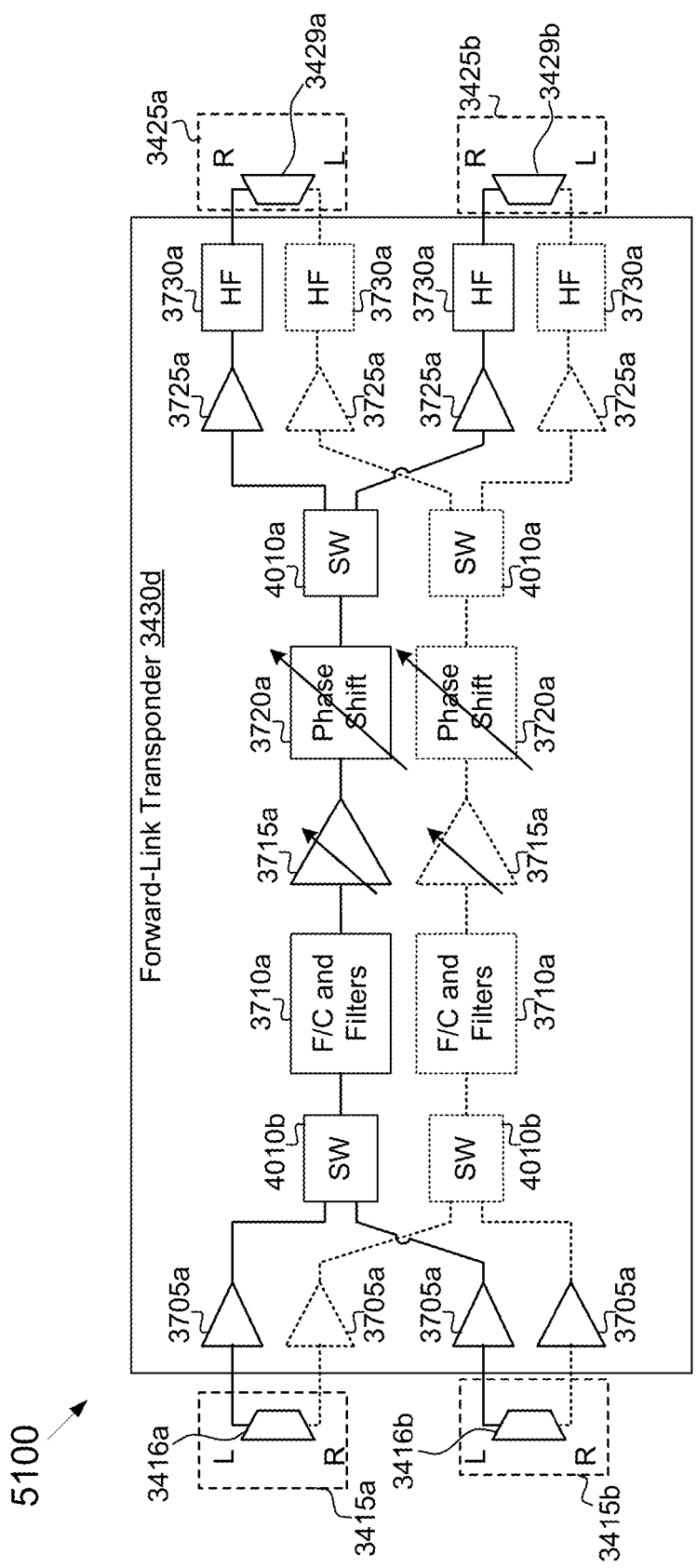
FIGS. 51A and 51B show example forward and return signal paths, respectively, each having selective activation of multiple user-link antenna element arrays and multiple feeder-link antenna element arrays.

FIGS. 47A and 47B describe signal path selection on the user-link side. However, some cases alternatively or additionally include signal path switching on the feeder-link side. FIG. 51A shows an example forward signal path 5100 having selective activation of multiple user-link antenna element arrays 3425 (which may be part of the same or different user-link antenna subsystems 3420) and multiple feeder-link antenna element arrays 3415 (which may be part of the same or different feeder-link antenna subsystems 3410). The signal path has a forward-link transponder 3430d coupled between constituent antenna elements. As described above, the forward-link transponder 3430d can include some or all of LNAs 3705a, frequency converters and associated filters 3710a, channel amplifiers 3715a, phase shifters 3720a, power amplifiers 3725a, and harmonic filters 3730a. The input side of the forward-link transponder 3430d is selectively coupled to one of two feeder-link constituent receive elements 3416 (e.g., using switches 4010b or any other suitable path selection means). Each feeder-link constituent receive element 3416 can be part of a separate feeder-link antenna element array 3415 (e.g., each part of a separate array of cooperating feeder-link constituent receive elements 3416). The output side of the forward-link transponder 3430d is selectively coupled to one of two user-link constituent transmit elements 3429 (e.g., using switches 4010a or any other suitable path selection means). Each user-link constituent transmit element 3429 can be part of a separate user-link antenna element array 3425 (e.g., each part of a separate array of cooperating user-link constituent transmit elements 3429). One or more switching controllers 4070 (not shown) can be included in the end-to-end relay 3403 for selecting between some or all of the four possible signal paths enabled by the forward-link transponder 3430d. For example, the switching controller 4070 may operate the forward link transponder 3430d according to one of several switch modes, which may be determined according to which AN areas 3450 are used to support user coverage areas 3460. In one example, the switching controller 4070 applies a first switch mode for switches 4010 to couple the forward link transponders 3430d between the first feeder-link antenna element array 3415a and the first user-link antenna element array 3425a, and applies second switch mode for switches 4010 to couple the forward link transponders 3430d between the second feeder-link antenna element array 3415b and the second user-link antenna element array 3425b. Alternatively, a first switch mode for switches 4010 may couple the forward link transponders 3430d between the first feeder-link antenna element array 3415a and the second user-link antenna element array 3425b, and a second switch mode for switches 4010 may couple the forward link transponders 3430d between the second feeder-link antenna element array 3415b and the first user-link antenna element array 3425a.

Figure 51B:
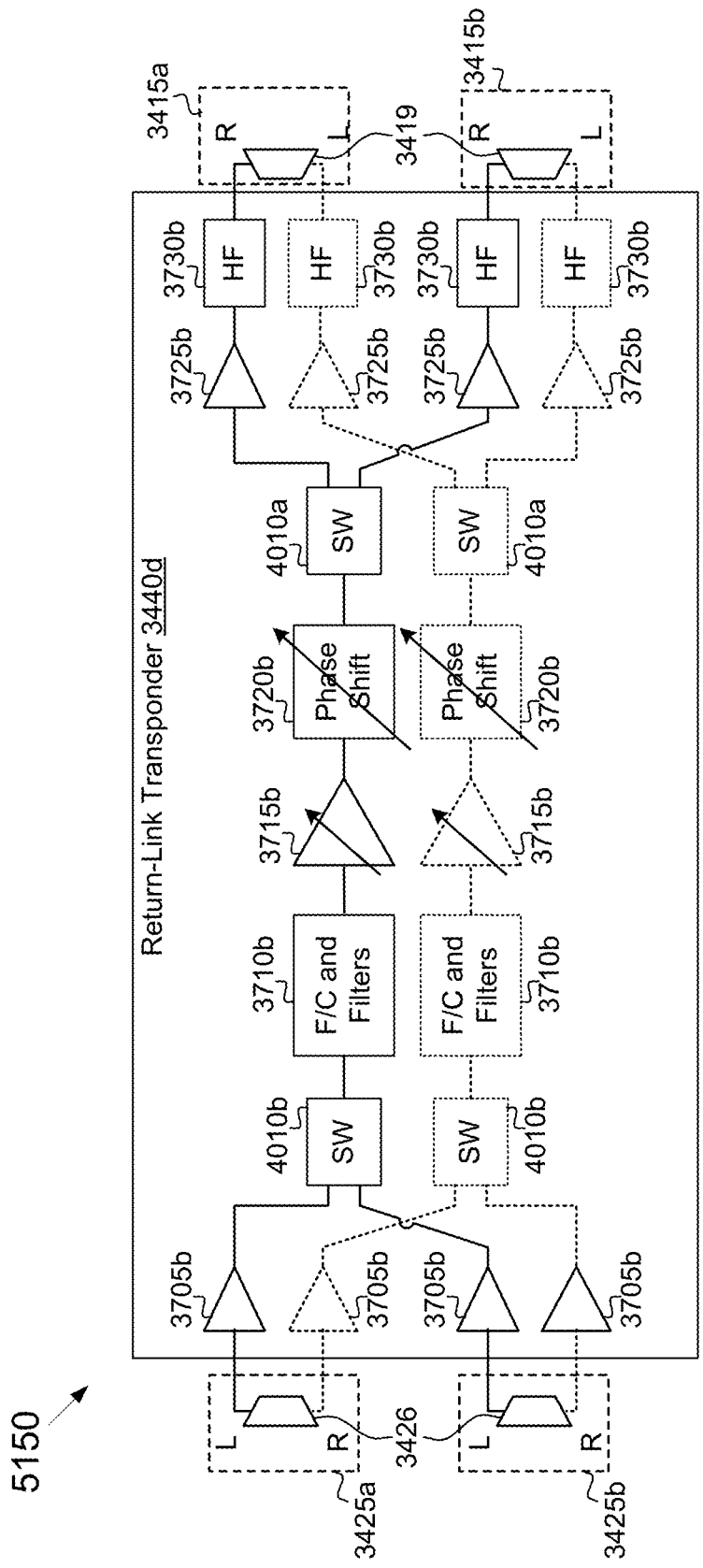

FIG. 51B shows an example return signal path 5150 having selective activation of multiple user-link antenna element arrays 3425 (e.g., which may be part of the same or different user-link antenna subsystems 3420) and multiple feeder-link antenna element arrays 3415 (e.g., which may be part of the same or different feeder-link antenna subsystems 3410). The signal path has a return-link transponder 3440d coupled between constituent antenna elements. As described above, the return-link transponder 3440d can include some or all of LNAs 3705b, frequency converters and associated filters 3710b, channel amplifiers 3715b, phase shifters 3720b, power amplifiers 3725b, and harmonic filters 3730b. The input side of the return-link transponder 3440d is selectively coupled to one of two user-link constituent receive elements 3426a, 3426b (e.g., using switches 4010b or any other suitable path selection means). Each user-link constituent receive element 3426a, 3426b can be part of a separate user-link antenna element array 3425a, 3425b (e.g., each part of a separate array of cooperating user-link constituent receive elements 3426). The output side of the return-link transponder 3440d is selectively coupled to one of two feeder-link constituent transmit elements 3419a or 3419b (e.g., using switches 4010a or any other suitable path selection means). Each feeder-link constituent transmit element 3419a or 3419b can be part of a separate feeder-link antenna element array 3415a or 3415b (e.g., each part of a separate array of cooperating feeder-link constituent transmit elements 3419). One or more switching controllers 4070 (not shown) can be included in the end-to-end relay 3403 for selecting between some or all of the four possible signal paths enabled by the return-link transponder 3440d. For example, the switching controller 4070 may operate the return-link transponder 3440d according to one of several switch modes, which may be determined according to which AN areas 3450 are used to support user coverage areas 3460. In one example, the switching controller 4070 applies a first switch mode for switches 4010 to couple the return-link transponders 3440d between the first user-link antenna element array 3425a and the first feeder-link antenna element array 3415*a*, and applies second switch mode for switches 4010 to couple the return-link transponders 3440*d* between the second user-link antenna element array 3425*b* and the second feeder-link antenna element array 3415*b*. Alternatively, a first switch mode for switches 4010 may couple the return-link transponders 3440*d* between the first user-link antenna element array 3425*a* and the second feeder-link antenna element array 3415*b*, and a second switch mode for switches 4010 may couple the return-link transponders 3440*d* between the second user-link antenna element array 3425*b* and the first feeder-link antenna element array 3415*a*.

The transponders of FIGS. 47A, 47B, 51A, and 51B are intended only to illustrate a few of many possible cases of end-to-end relays 3403 employing path selection. Further, some cases can include path selection between more than two user-link antenna element arrays 3425 or user-link antenna subsystems 3420 and/or more than two feeder-link antenna element arrays 3415 or feeder-link antenna subsystems 3410.

The end-to-end relay 3403 as shown in FIGS. 51A and 51B may support multiple user coverage areas 3460 with multiple AN areas 3450. As discussed above, it can be desirable for traffic of particular geographic regions to terminate in their respective regions. For example, an end-to-end relay 3403 with or without paired transponders like those illustrated in FIGS. 51A and 51B can utilize a first AN area 3450*a* in North America to provide communications service to a first user coverage area 3460*a* in North America, and utilize a second AN area 3450*b* to provide communications service to a second user coverage area 3460*b* in South America as illustrated in FIG. 50A. Using path selection (e.g., switching) in the transponders, a single end-to-end relay 3403 (e.g., a single satellite) can service traffic associated with the North American user coverage area 3460*a* using ANs 515 in the North American AN area 3450*a* (or using ANs 515 in the South American AN area 3450*b*), and service traffic associated with the South American user coverage area 3460*b* using ANs 515 in the South American AN area 3450*b* (or using ANs 515 in the North American AN area 3450*a*). Capacity may be flexibly allocated to various regions (e.g., between North and South American user coverage areas 3460) by dynamically adjusting the ratio of time allocated to the corresponding antenna sub-systems.

Figure 50B:
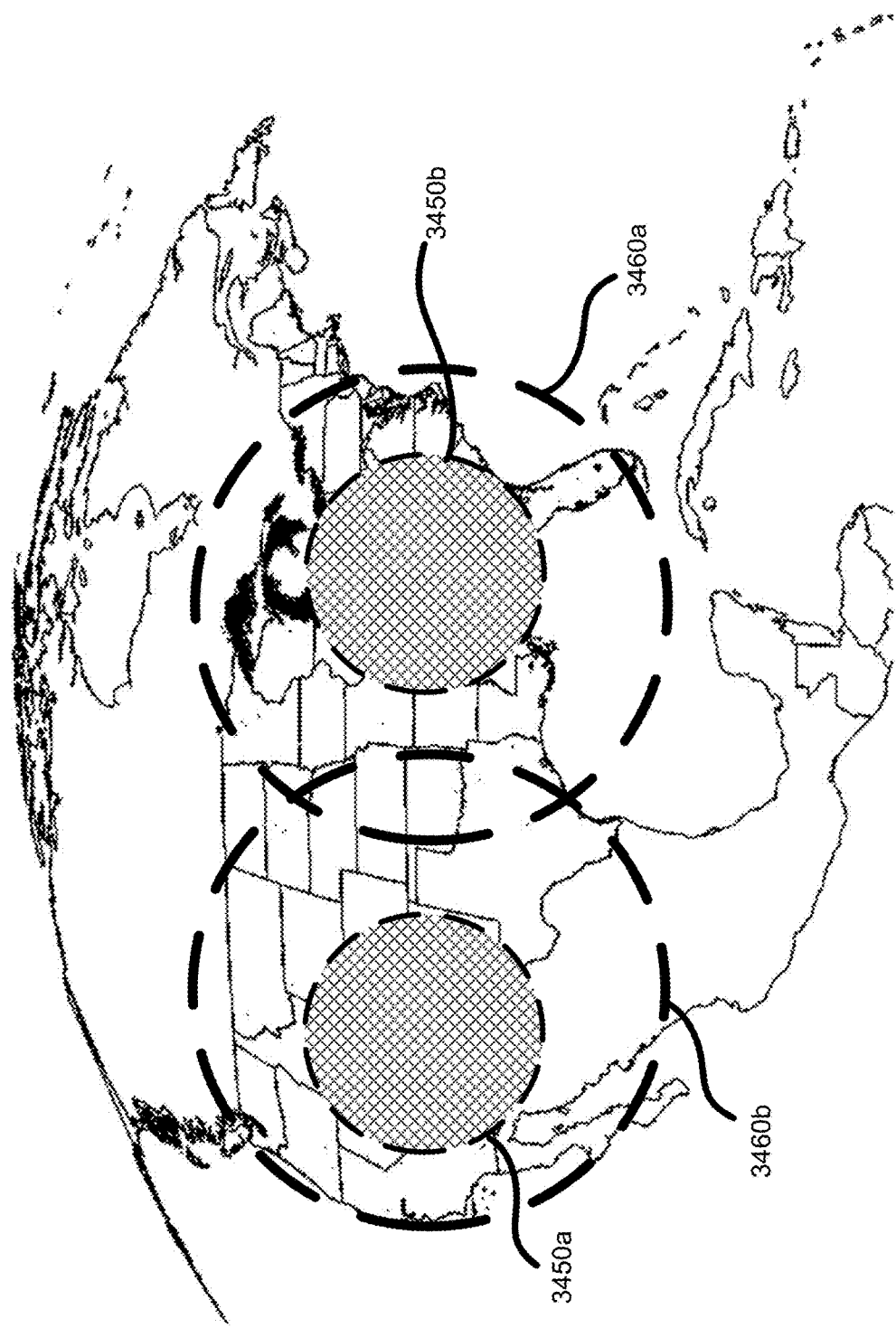

FIG. 50B illustrates a second possible deployment having multiple AN areas 3450 and multiple user coverage areas 3460. For example, the deployment shown in FIG. 50B may be supported by the end-to-end relay 3403 illustrated by FIGS. 51A and 51B. As shown in FIG. 50B, an end-to-end relay 3403 with path selection in the transponders services traffic in a first user coverage area 3460*a* with a first AN area 3450*a* and services traffic in a second user coverage area 3460*b* with a second AN area 3450*b*. Because the first AN area 3450*a* does not overlap with the first user coverage area 3460*a*, the same or overlapping portions of bandwidth may be used for uplink or downlink communications between the end-to-end relay 3403 and user terminals or ANs. Additionally, in the present example, because AN area 3450*a* or 3450*b* and its corresponding user coverage area 3460*a* or 3460*b*, respectively, do not overlap, a special loopback mechanism may be employed to synchronize transmissions from the ANs 515. Example loopback mechanisms in the form of loopback transponders are discussed with reference to FIGS. 55A, 55B, and 55C. Referring to FIG. 63A for example, a system may have a total of 3.5 GHz of uplink bandwidth 6330*a* and 3.5 GHz of downlink bandwidth 6325*a* available. In a first switch configuration, the full 3.5 GHz uplink bandwidth (e.g., using both of two orthogonal polarizations) may be used concurrently for return uplink transmissions 525 from the first user coverage area 3460*a* and forward uplink transmissions 521 from the AN area 3450*a*. Similarly, the full 3.5 GHz downlink bandwidth (e.g., using both of two orthogonal polarizations) may be used concurrently for forward downlink transmissions 522 to the first user coverage area 3460*a* and return downlink transmissions 527 to the first AN area 3450*a*. The full uplink and downlink bandwidth may also be used in a second switching configuration for the second user coverage area 3460*b* and second AN area 3450*b*. While the case of two AN areas 3450 and two user coverage areas 3460 is discussed with respect to FIG. 50B for the sake of simplicity, any suitable number of AN areas 3450 and user coverage areas 3460 may be possible. Further, aspects discussed above with respect to a single AN cluster (e.g., mobility, location in an aquatic body, etc.) may be applicable to one or both of the AN clusters in the present example.

The above example describes AN area 3450*a* as servicing a non-overlapping user coverage area 3460*a*. As an alternative example, AN area 3450*a* may service user coverage area 3460*b* (e.g., a user coverage area 3460 may contain its associated AN area 3450 or some portion thereof). A similar example is generally discussed with reference to FIG. 50A in the context of a first AN area 3450*a* located in North America (e.g., which may correspond to AN area 3450*a* of FIG. 50B) servicing a user coverage area 3460*a* located in North America while a second AN area 3450*b* located in South America services a user coverage area 3460*b* located in South America. However, FIG. 50B shows that user coverage areas 3460 served by different AN areas 3450 may also overlap to provide an aggregate user coverage area for a particular region. In this instance, the user coverage areas 3460 may be used in different time intervals using the switching transponders illustrated by FIGS. 51A and 51B. Alternatively, the user coverage areas 3460*a* and 3460*b* may be serviced concurrently by access node areas 3450*a* and 3450*b* (either with access node area 3450*a* servicing user coverage area 3460*a* while access node area 3450*b* services user coverage area 3460*b* or with access node area 3450*b* servicing user coverage area 3460*a* while access node area 3450*a* services user coverage area 3460*b*) using the multiple transponder paths shown in FIGS. 49A and 49B. In this case, the uplink and downlink resources used for user beams in user coverage areas 3460*a* and 3460*b* may be orthogonal (different frequency resources, different polarizations, etc.), or user beams in user coverage areas 3460*a* and 3460*b* may use the same resources (the same frequency range and polarization), with interference mitigated using interference mitigation techniques such as adaptive coding and modulation (ACM), interference cancellation, space-time coding, and the like.

As a third example, in some cases AN areas 3450*a* and 3450*b* combine to service user coverage area 3460*b* (or user coverage area 3460*a*). In this case, a special loopback mechanism may not be necessary since a subset of the ANs 515 are contained within the user coverage area 3460. In some cases, the ANs 515 of AN areas 3450*a* and 3450*b* may be considered cooperating in the sense that forward uplink signals 521 from each of the AN areas 3450 may combine to service a single user beam coverage area 519. Alternatively, the ANs 515 of AN area 3450*a* may service a first subset of the user beam coverage areas 519 of user coverage area 3460*b* while the ANs 515 of AN area 3450*b* may service a second subset of the user beam coverage areas 519 of user coverage area 3460*b*. In some cases of this example, there may be some overlap between the first and second subsets of user beam coverage areas 519 (e.g., such that the AN areas 3450 may be considered cooperating in some user beam coverage areas 519 and non-cooperating in others). As a further example, AN area 3450a may service user coverage area 3460b at a first time interval (or set of time intervals) and AN area 3450b may service user coverage area 3460b at a second time interval (or set of time intervals). In some examples, the AN areas 3450a and 3450b may cooperate to serve user coverage area 3460b during the first time interval(s) and may cooperate to serve user coverage area 3460a during the second time interval(s).

In general, features of the end-to-end relay 3403 described in FIG. 41 enable servicing of at least one user beam coverage area 3460 using ANs 515 geographically distributed within at least one AN area 3450 that is a different physical area than the user beam coverage area 3460. In some cases, AN cluster(s) can provide high capacity to a large user coverage area 3460. FIGS. 45A-45F, 46A, 46B, 48A, 48B, 50A, and 50B show various examples of such AN cluster implementations. Deploying large numbers of ANs 515 in a relatively small geographic area can provide a number of benefits. For example, it can be easier to ensure that more (or even all) of the ANs 515 are deployed closer to a high-speed network (e.g., in a region with good fiber connectivity back to the CPS 505), within borders of a single country or region, on accessible areas, etc., with less deviation from an ideal AN 515 distribution. Implementing distinct coverage area servicing with path selection (e.g., as in FIGS. 47A and 47B) can provide additional features. For example, as described above, a single AN cluster (and a single end-to-end relay 3403) can be used to selectively service multiple user coverage areas 3460. Similarly, a single end-to-end relay 3403 can be used to distinguish and service traffic by region.

In some cases, the distinct coverage area servicing with path selection can enable various interference management and/or capacity management features. For example, turning back to FIGS. 48A and 48B, four categories of communications links can be considered: forward-link communications from the AN cluster to the western active user coverage area 3460a ("Link A"); forward-link communications from the AN cluster to the eastern active user coverage area 3460b ("Link B"); return-link communications from the western active user coverage area 3460a to the AN cluster ("Link C"); and return-link communications from the eastern active user coverage area 3460b to the AN cluster ("Link D"). In a first time interval, the eastern user coverage area 3460b is active, so that communications are over Link B and Link D. Because there is full overlap between the AN area 3450 and the eastern user coverage area 3460b, Links B and D potentially interfere. Accordingly, during the first time interval, Link B can be allocated a first portion of the bandwidth (e.g., 2 GHz), and Link D can be allocated a second portion of the bandwidth (e.g., 1.5 GHz). In a second time interval, the western user coverage area 3460a is active, so that communications are over Link A and Link C. Because there is no overlap between the AN area 3450 and the western user coverage area 3460a, Link A and Link C can use the full bandwidth (e.g., 3.5 GHz) of the end-to-end relay 3403 during the second time interval. For example, during the first time interval, the forward uplink signals 521 can be received using a first frequency range, and the return uplink signals 525 can be received using a second frequency range different from the first frequency range; and during the second time interval, the forward uplink signals 521 and the return uplink signals 525 can be received using a same frequency range (e.g., the first, second, or other frequency range). In some cases, there can be frequency reuse during both the first and second time intervals, with other interference mitigation techniques used during the first time interval. In some cases, the path selection timing can be selected to compensate for such a difference in bandwidth allocation during different time intervals. For example, the first time interval can be longer than the second time interval, so that Links B and D are allocated less bandwidth for more time to at least partially compensate for allocating Links A and C more bandwidth for a shorter time. Other alternative frequency allocations are discussed below.

In some cases, first return uplink signals 525 are received during the first time interval by the plurality of cooperating user-link constituent receive elements 3426a from a first portion of the plurality of user terminals 517 geographically distributed over some or all of a first user coverage area 3460 (e.g., the eastern user coverage area 3460b), and second return uplink signals 525 are received during the second time interval by the plurality of cooperating user-link constituent receive elements 3426b from a second portion of the plurality of user terminals 517 geographically distributed over some or all of a second user coverage area 3460 (e.g., the western user coverage area 3460a). When the AN area 3450 (the AN cluster) is a subset of the first user coverage area 3460b (e.g., as illustrated in FIG. 48B), the AN 515 timing can be calibrated with the end-to-end relay 3403 during the first time frame (e.g., when there is overlap between the user coverage area 3460b and the AN area 3450).

As described above, some cases can include determining a respective relative timing adjustment for each of the plurality of ANs 515, such that associated transmissions from the plurality of ANs 515 reach the end-to-end relay 3403 in synchrony (e.g., with sufficiently coordinated timing relative to the symbol duration, which is typically a fraction of the symbol duration such as 10%, 5%, 2% or other suitable value). In such cases, the forward uplink signals 521 are transmitted by the plurality of ANs 515 according to the respective relative timing adjustments. In some such cases, a synchronization beacon signal (e.g., a PN signal generated by a beacon signal generator, as described above) is received by at least some of the plurality of ANs 515 from the end-to-end relay 3403, and the respective relative timing adjustments are determined according to the synchronization beacon signal. In other such cases, some or all of the ANs 515 can receive loopback transmissions from the end-to-end relay 3403, and the respective relative timing adjustments are determined according to the loopback transmissions. The various approaches to calibrating the ANs 515 can depend on the ability of the ANs 515 to communicate with the end-to-end relay 3403. Accordingly, some cases can calibrate the ANs 515 only during time intervals during which appropriate coverage areas are illuminated. For example, loopback transmissions via the user-link antenna subsystem 3420 can only be used in time intervals during which there is some overlap between the AN area 3450 and the user coverage area 3460 (e.g., the ANs 515 communicate over a loopback beam which can use both a feeder-link antenna subsystem 3410 and a user-link antenna subsystem 3420 of the end-to-end relay 3403). In some cases, proper calibration can further rely on some overlap between the feeder downlink frequency range and the user downlink frequency range.

As discussed above, an end-to-end relay 3403 with or without selectively coupled transponders like those illustrated in FIGS. 49A, 49B, 51A and 51B can service user terminals within a first user coverage area 3460 using ANs 515 within a first AN area 3450 that is overlapping with the first user coverage area 3460 (e.g., both in North America), and service user terminals within a second user coverage area 3460 using ANs 515 within a second AN area 3450 that is overlapping with the second user coverage area 3460 (e.g., both in South America). Alternatively, an end-to-end relay 3403 like that of FIGS. 51A and 51B can service user terminals within a first user coverage area 3460 using ANs 515 within a first AN area 3450 that is non-overlapping with the first user coverage area 3460 and service user terminals within a second user coverage area 3460 using ANs 515 within a second AN area 3450 that is non-overlapping with the second user coverage area 3460, as shown in FIG. 50B. As also shown in FIG. 50B, the first and second user coverage areas 3460 may be configured to at least partially overlap with each other to provide contiguous coverage to a given region (e.g., CONUS region, visible Earth coverage region, etc.). Other similar implementations are also possible.

The system discussed with reference to FIG. 50B may, for example, include a forward beamformer 529 that generates access node-specific forward signal for each of the pluralities of ANs 515 within AN areas 3450. Each of the plurality of ANs 515 within a given AN area 3450 may obtain an access node-specific forward signal from the forward beamformer 529 (e.g., via a distribution network 518) during a time window in which the given AN cluster is active, and transmit a corresponding forward uplink signal 521 to the end-to-end relay 3403. The time window in which the given AN cluster is active may include one or more time-slices, if a time-slice beamformer architecture is employed as described above.

As described above, the system may include a means for pre-correcting the forward uplink signals 521 to compensate for, e.g., path delays, phase shifts, etc. between the respective ANs and the end-to-end relay 3403. In some cases, the pre-correction may be performed by the forward beamformer 529. Additionally or alternatively, the pre-correction may be performed by the ANs 515 themselves. As an example, each of the ANs 515 may transmit an access node beacon signal to end-to-end relay 3403 and receive signaling from end-to-end relay 3403 including a relay beacon signal and the relayed access node beacon signal (e.g., relayed from end-to-end relay 3403). In this example, each AN 515 may adjust its respective forward uplink signal 521 (e.g., may adjust timing and/or phase information associated with the signal transmission) based on the relayed access node beacon signal. As an example, the AN 515 may adjust the forward uplink signal 521 to time and phase align the relayed access node beacon signal with the received relay beacon signal. In some cases, the signaling described in this example (e.g., the access node beacon signal, the relay beacon signal, and the relayed access node beacon signal) may be received or transmitted via a feeder-link antenna subsystem 3410, as described above. Thus, in some cases, though not shown, the end-to-end relay 3403 includes a beacon signal transmitter. The beacon signal transmitter can be implemented as described above with reference to the beacon signal generator and calibration support module 424 of FIG. 15.

While portions of the above description have discussed techniques for end-to-end beamforming between a single active AN area 3450 (e.g., selected between two or more AN areas 3450) and a single active user coverage area 3460 (e.g., selected between two or more user coverage areas 3460), in some cases it may be desirable to have multiple distinct AN areas 3450 concurrently (e.g., cooperatively) used to provide service to a single user coverage area 3460. An example of such a system is displayed with respect to FIG. 50C, which includes AN areas 3450a and 3450b as well as user coverage area 3460.

Figure 50C:
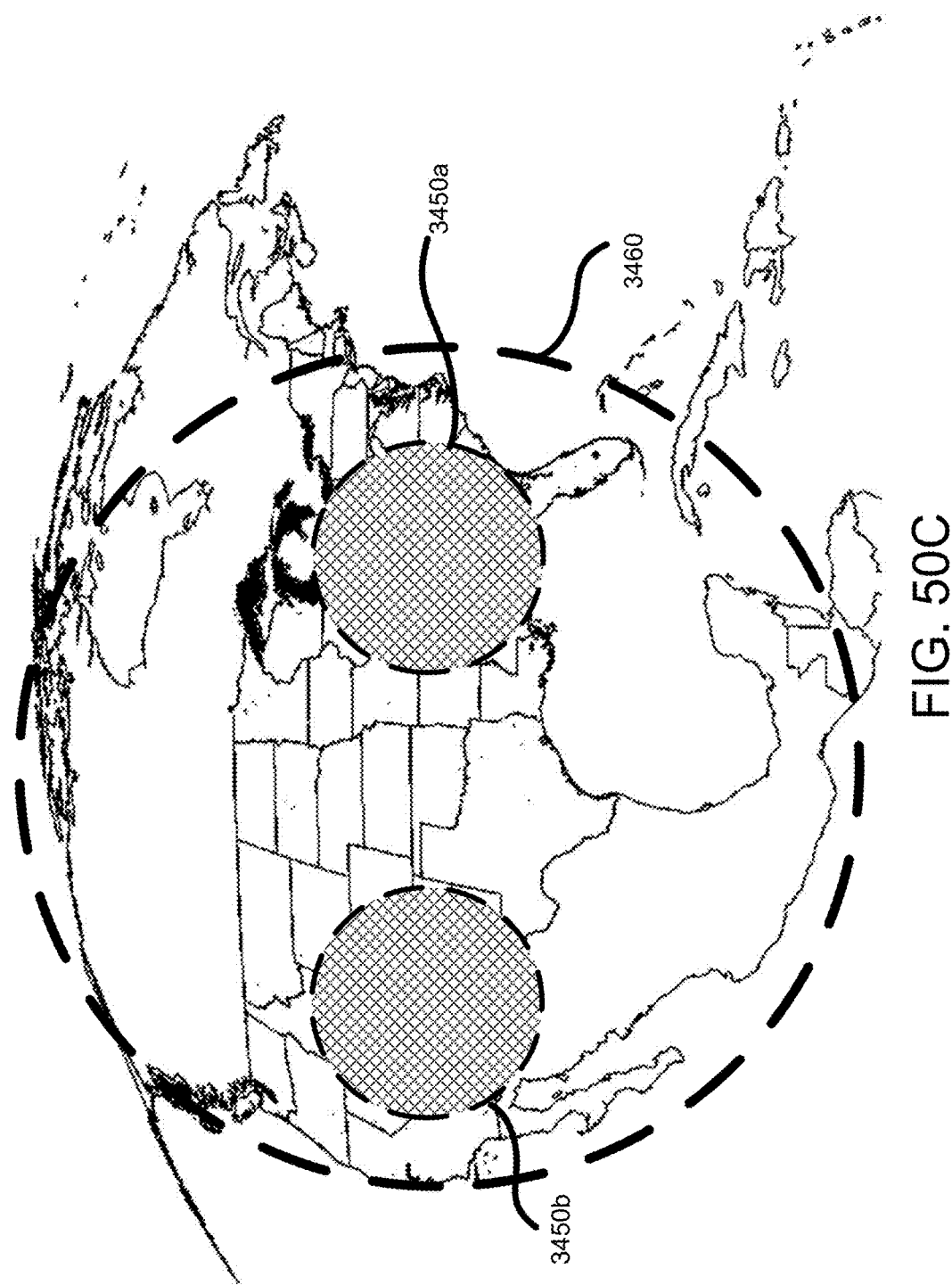

With reference to FIG. 50C, an example system may include multiple AN clusters (e.g., two relatively dense AN clusters). Each AN cluster may contain multiple ANs 515 geographically distributed within the respective AN area 3450, where each AN 515 is operable to transmit a respective pre-corrected forward uplink signal 521 to the end-to-end relay 3403. The multiple AN clusters may be used cooperatively for providing service to user terminals 517 within the user coverage area 3460. Multiple AN clusters may be employed cooperatively using a variety of techniques. In one example, an end-to-end relay 3403 may employ a feeder-link antenna subsystem 3410 having a single feeder-link antenna element array 3415 and a compound reflector that illuminates the multiple AN clusters.

FIG. 57 illustrates a feeder-link antenna subsystem 3410c having a single feeder-link antenna element array 3415 and a compound reflector 5721. Each of multiple regions of the compound reflector 5721 may have a focal point 1523 (which may be the same or a different distance from the compound reflector). A first example is illustrated in FIG. 57 in which the compound reflector 5721 has a single focal point (or region) 1523a. The feeder-link antenna element array 3415 may be positioned at a defocused point of the compound reflector. As illustrated, the feeder-link antenna element array 3415 is located inside the focal point 1523a (i.e., is closer to the compound reflector 5721 than the focal point 1523a). Alternatively, the feeder-link antenna element array 3415 may be located outside the focal point 1523a (i.e., the feeder-link antenna element array 3415 may be farther from the compound reflector 5721 than the focal point 1523a). A second example is illustrated in FIG. 57 in which the compound reflector 5721 has two focal points (or regions) 1523b and 1523c. In the present example, the feeder-link antenna element array 3415 is illustrated as being located inside the focal points 1523b and 1523c. Alternatively, the feeder-link antenna element array 3415 may be located outside the focal points 1523b and 1523c. In yet another embodiment, the feeder-link antenna element array 3415 may be located inside one focal point (e.g. focal point 1523b) and outside another focal point (e.g., focal point 1523c). In some cases, focal point 1523b may be associated with a top portion of the compound reflector 5721 while focal point 1523c is associated with a bottom portion of the compound reflector 5721. Alternatively, focal point 1523b may be associated with a bottom portion of the compound reflector 5721 while focal point 1523c is associated with a top portion of the compound reflector 5721. The feeder-link antenna element array 3415 may include feeder-link constituent transmit elements 3419 and feeder-link constituent receive elements 3416, which in some cases may be the same antenna elements (e.g., with different polarizations or frequencies used for transmitting and receiving, etc.).

In the transmit direction, the output of the feeder-link constituent transmit elements 3419 may reflect from the reflector 5721 to form a first beam group 5705a that illuminates a first AN area 3450 (e.g., AN area 3450a of FIG. 50C) and a second beam group 5705b that reflects a second AN area 3450 (e.g., AN area 3450b of FIG. 50C). Although not shown, in a receive direction signals from a first AN area 3450a and from a second AN area 3450b may be reflected to feeder-link constituent receive elements 3416 of the feeder-link antenna element array 3415 using compound reflector 5721.

Returning to FIG. 50C, the multiple AN areas 3450 may be used independently or together (e.g., cooperatively). For example, ANs of only one of AN areas 3450a or 3450b may be activated at a given time, and beamforming coefficients may be generated for forming user beam coverage areas 519 within user coverage area 3460 from the ANs 515 of the active AN cluster. Alternatively, beamforming coefficients may be generated for forming user beams within user coverage area 3460 using both AN clusters concurrently (e.g., cooperatively). In the forward direction, a forward beamformer 529 may apply the beamforming coefficients (e.g., by a matrix product between forward beam signals and a forward beam weight matrix) to obtain a plurality of access-node specific forward signals for ANs 515 within both clusters to generate the desired forward user beams. In the return direction, the return beamformer 531 may obtain the composite return signals from ANs 515 within both clusters and apply a return beam weight matrix to form the return beam signals associated with the return user beams.

In some cases, AN areas 3450a and 3450b may be non-overlapping (e.g., disjoint). Alternatively, AN areas 3450a and 3450b may be (e.g., at least partially) overlapping. Further, at least one of AN areas 3450a and 3450b may be at least partially overlapping with user coverage area 3460. Alternatively, at least one of the AN areas 3450a and 3450b may be non-overlapping (e.g., disjoint) with user coverage area 3460. As discussed above, in some cases at least one of the ANs 515 in one or both of AN areas 3450a or 3450b may be disposed on a mobile platform and/or located in an aquatic body.

Figure 56A:
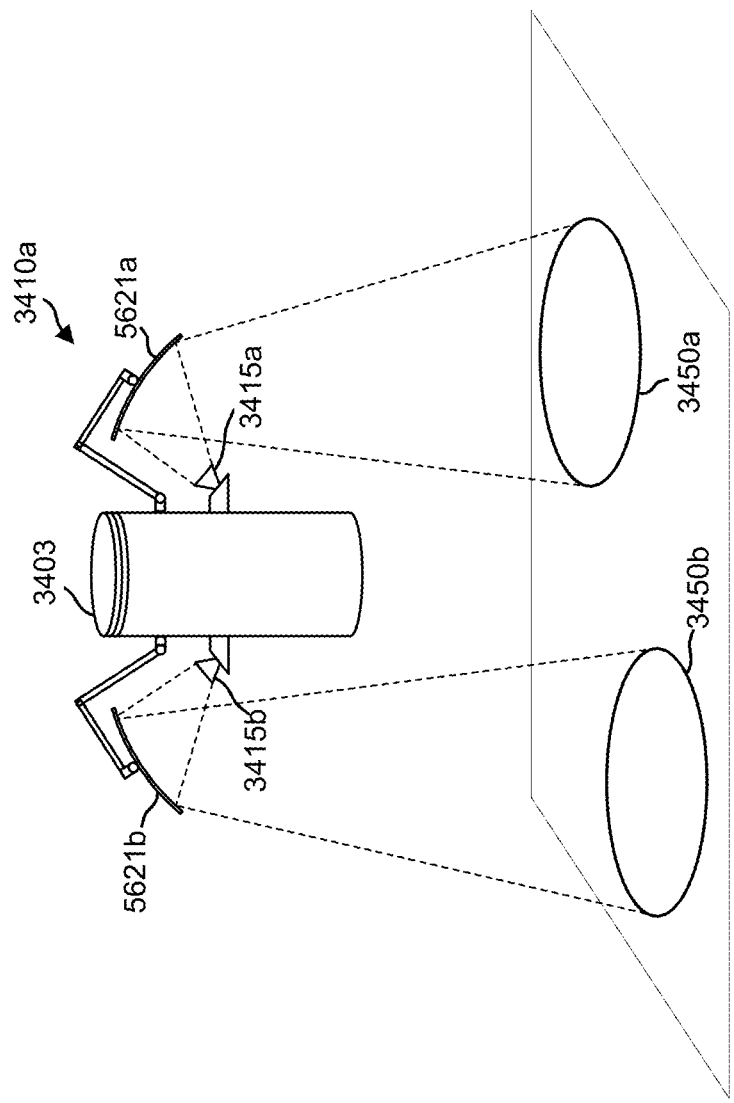
FIG. 56A illustrates an end-to-end relay that includes one or more reflectors.
Figure 56B:
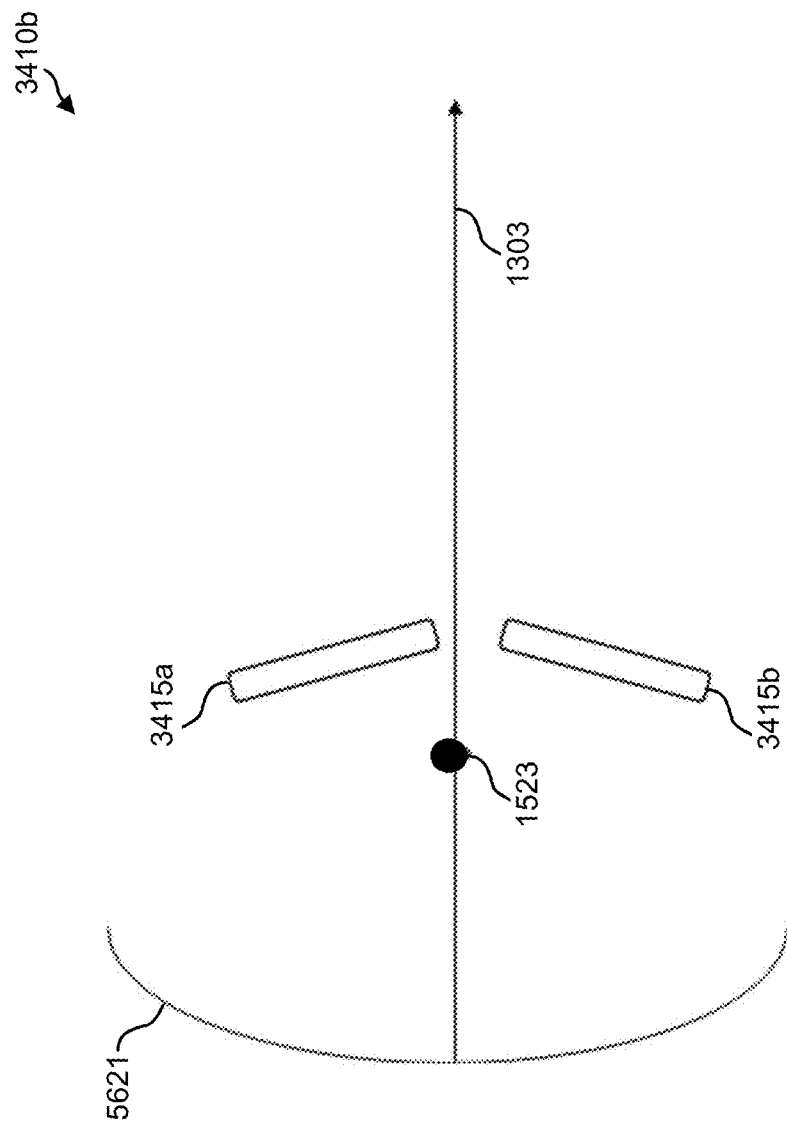
FIG. 56B illustrates an antenna subsystem with multiple feed clusters.

Referring to FIG. 50B or 50C, each of multiple AN areas 3450 may be illuminated using a separate feeder-link antenna element array 3415. In some cases, the separate feeder-link antenna element arrays 3415 may be used concurrently (e.g., multiple AN areas 3450 may be used cooperatively) to support service provided to a single user coverage area 3460. With reference again to FIG. 50C, an end-to-end relay 3403 may have separate feeder-link antenna element arrays 3415 illuminating each of AN areas 3450a and 3450b. In some examples, the end-to-end relay 3403 may have separate feeder-link antenna subsystems 3410, where each feeder-link antenna subsystem 3410 includes a feeder-link antenna element array 3415 and a reflector. FIG. 56A shows an end-to-end relay 3403 having a feeder-link antenna subsystem 3410a that includes a first feeder-link antenna element array 3415a that illuminates the first AN area 3450a via a first reflector 5621a and a second feeder-link antenna element array 3415b that illuminates the second AN area 3450b via a second reflector 5621b. The first and second feeder-link antenna element arrays 3415a and 3415b may each include feeder-link constituent receive elements 3416 and feeder-link constituent transmit elements 3419. FIG. 56B shows a feeder-link antenna subsystem 3410b that includes a first feeder-link antenna element array 3415a and a second feeder-link antenna element array 3415b that illuminate corresponding AN areas 3450 via a single reflector 5621. As illustrated in FIG. 56B, the feeder-link element arrays 3415 may be located in defocused positions in relation to the focal point 1523 of reflector 5621. Although the feeder-link element arrays 3415 are displayed as being located beyond the focal point 1523 of reflector 5621, they may alternatively be located closer to the reflector 5621 than the focal point 1523.

Similarly, multiple user coverage areas 3460 may be implemented using separate user-link antenna element arrays 3425 with either separate reflectors (similar to FIG. 56A) or a single reflector (similar to FIG. 56B). Thus, the multiple AN areas 3450 and multiple user coverage areas 3460 in FIG. 50B may be deployed using any combination of a single feeder-link reflector or multiple feeder-link reflectors and a single user-link reflector or multiple user-link reflectors. In another example, a deployment similar to that shown in FIG. 50B may be achieved with reflectors shared between feeder-links and user-links using different feeder-link and user-link frequency bands. For example, a single antenna element array may have feeder-link constituent elements and user-link constituent elements (e.g., in an interleaved pattern such as that shown in FIG. 62). The feeder-link may use a frequency range that is higher (e.g., more than 1.5 or 2 times higher) to provide a higher gain with a common reflector. In one example, the user-link may use a frequency range (or ranges) in the K/Ka bands (e.g., around 30 GHz) while the feeder-link uses frequency range(s) in the V/W bands (e.g., around 60 GHz). Because of the narrower beamwidth at higher frequencies, the AN area 3450 sharing the common antenna element array (and thus reflector) will be a smaller area (and concentric with) the user coverage area. Thus, one antenna subsystem including a single antenna element array and reflector may be used to illuminate user coverage area 3450a and AN area 3450b while a second antenna subsystem including a single antenna element array and reflector may be used to illuminate user coverage area 3450b and AN area 3450a. In yet another example for a deployment similar to FIG. 50B, a single antenna subsystem may include a single reflector and two antenna element arrays as shown in FIG. 56B, where each antenna element array includes feeder-link constituent elements and user-link constituent elements.

Referring again to FIG. 56B, in some cases, the first feeder-link antenna element array 3415a may be coupled with a first subset of the multiple receive/transmit signal paths associated with the end-to-end relay 3403 while the second feeder-link antenna element array 3415b may be coupled with a second subset of the multiple receive/transmit signal paths. Thus, a first set of forward uplink signals 521 from the AN cluster having AN area 3450a may be carried via a first subset of the multiple receive/transmit signal paths associated with the end-to-end relay 3403. Additionally, a second set of forward uplink signals 521 from the AN cluster having AN area 3450b may be carried via a second subset of the multiple receive/transmit signal paths. In some cases, the first and second sets of forward uplink signals may both contribute to forming a forward user beam associated with at least one of the multiple forward user beam coverage areas 519 in user coverage area 3460.

Figure 52A:
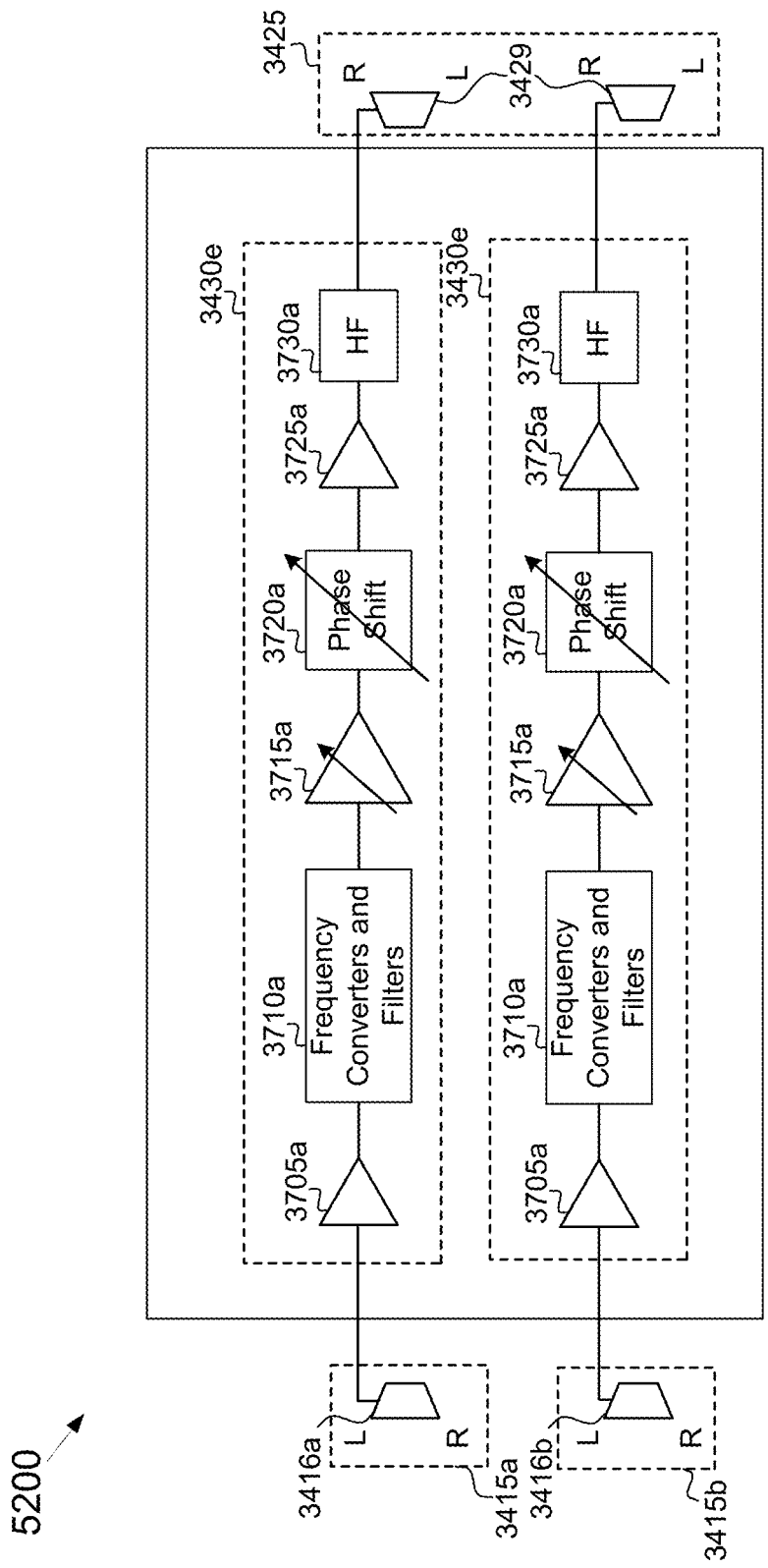
FIGS. 52A and 52B show example forward and return receive/transmit signal paths for concurrent use of multiple AN clusters, respectively.
Figure 52B:
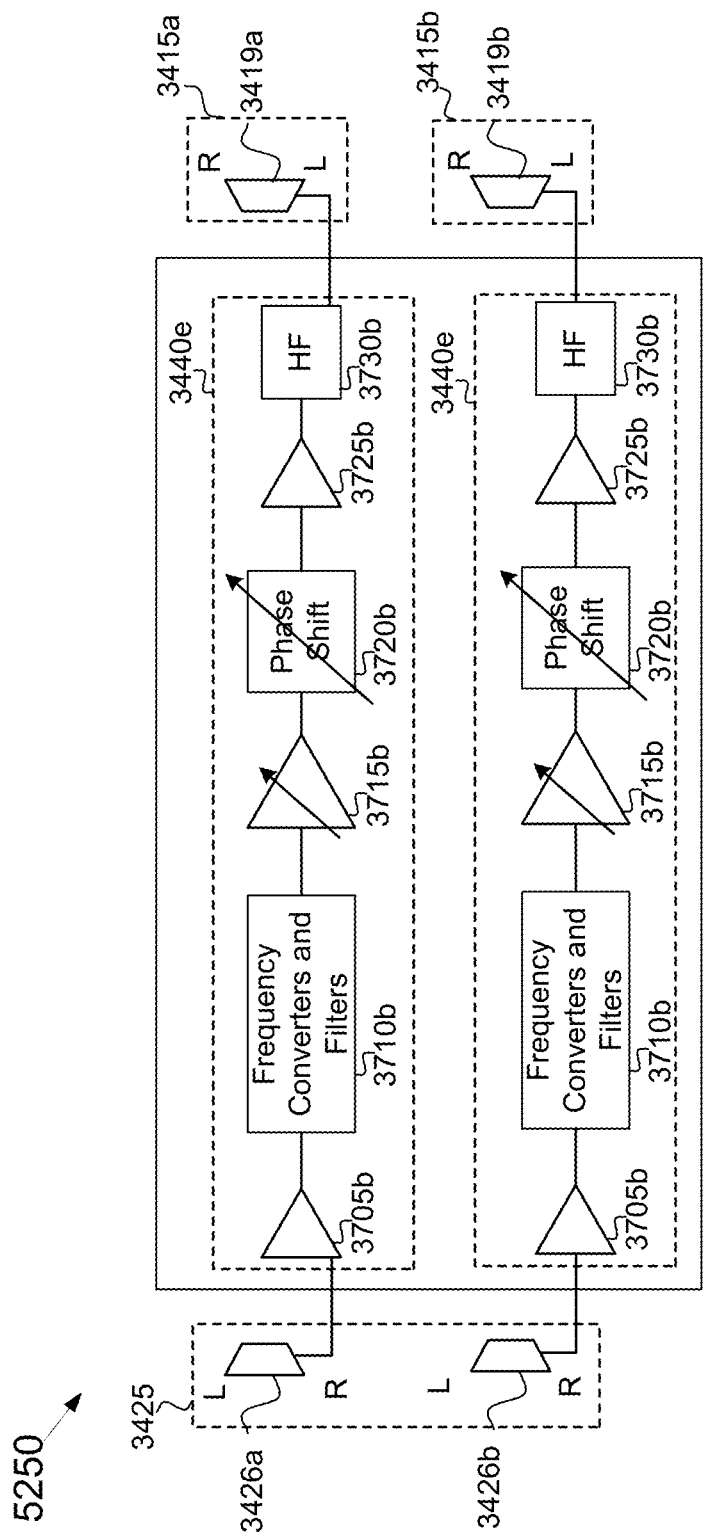

FIGS. 52A and 52B show example forward and return receive/transmit signal paths for cooperative use of multiple AN clusters, where each AN cluster is associated with a separate feeder-link antenna element array 3415. Referring first to FIG. 52A, an example forward signal path 5200 is shown. Forward signal path 5200 includes a first forward link transponder 3430e coupled between a feeder-link constituent receive element 3416a of a first feeder-link antenna element array 3415a and a first user-link constituent transmit element 3429 of a user-link antenna element array 3425 and a second forward link transponder 3430e coupled between a feeder-link constituent receive element 3416b of a second feeder-link antenna element array 3415b and a second user-link constituent transmit element 3429 of the same user-link antenna element array 3425. An end-to-end relay 3403 may have a first set of forward link transponders 3420 coupled as shown by the first forward link transponder 3430e and a second set of forward link transponders 3430 coupled as shown by the second forward link transponder 3430e. Thus, the feeder-link constituent receive elements 3416a of the first feeder-link antenna element array 3415a may be coupled via a first set of forward link transponders 3430e to a first subset of user-link constituent transmit elements 3429 of a user-link antenna element array 3425 while the feeder-link constituent receive elements 3416b of the second feeder-link antenna element array 3415b may be coupled via a second set of forward link transponders 3430e to a second subset of user-link constituent transmit elements 3429 of the same user-link antenna element array 3425. The first and second sets of user-link constituent transmit elements 3429 may be spatially interleaved (e.g., alternated in rows and/or columns, etc.) within the user-link antenna element array 3425 (e.g., as shown in FIG. 62).

FIG. 52B illustrates an example return signal path 5250. Return signal path 5250 includes a first return link transponder 3440e coupled between a user-link constituent receive element 3426a of a user-link antenna element array 3425 and a first feeder-link constituent transmit element 3419a of a first feeder-link antenna element array 3415a. Return signal path 5250 also includes a second return link transponder 3440e coupled between a user-link constituent receive element 3426b of the same user-link antenna element array 3425 and a second feeder-link constituent transmit element 3419b of a second feeder-link antenna element array 3415b. An end-to-end relay 3403 may have a first set of return link transponders 3440 coupled as shown by the first return link transponder 3440e and a second set of return link transponders 3440 coupled as shown by the second return link transponder 3440e. Thus, a first subset of the user-link constituent receive elements 3426a of the user-link antenna element array 3425 may be coupled via a first set of return link transponders 3440e to feeder-link constituent transmit element 3419a of a first feeder-link antenna element array 3415a while a second subset of the user-link constituent receive elements 3426b of the same user-link antenna element array 3425 may be coupled via a second set of return link transponders 3440e to feeder-link constituent transmit element 3419b of a second feeder-link antenna element array 3415b. As discussed above, the user-link constituent receive elements 3426 and user-link constituent transmit elements 3429 may be the same physical antenna elements. Similarly, the feeder-link constituent receive elements 3416 and feeder-link constituent transmit elements 3419 of a given feeder-link antenna element array 3415 may be the same physical antenna elements.

The first and second sets of user-link constituent receive elements 3426 may be spatially interleaved (e.g., alternated in rows and/or columns, etc.) within the user-link antenna element array 3425. FIG. 62 shows an example antenna element array 6200 with spatially interleaved subsets of constituent antenna elements 6205. Although each constituent antenna element 6205 is shown as a circular antenna element and the interleaved subsets are shown as being arranged in alternating rows, the constituent antenna elements 6205 may be any shape (e.g., square, hexagonal, etc.) and arranged in any suitable pattern (e.g., alternating rows or columns, a checkerboard, etc.). Each constituent antenna element 6205 may be an example of a user-link constituent receive element 3416 or a user-link constituent transmit element 3419, or both (e.g., an element used for both transmit and receive).

Figure 62:
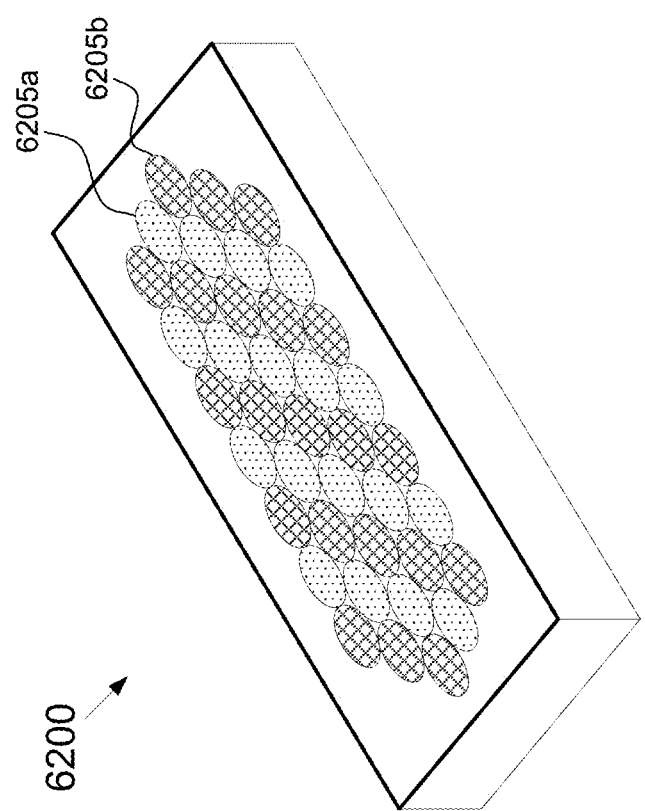
FIG. 62 shows an example antenna element array with spatially interleaved subsets of constituent antenna elements.

With reference to FIGS. 52A and 52B where the user-link antenna element array 3425 is implemented as the antenna element array 6200 of FIG. 62, the first set of forward link transponders 3430e may each have its output coupled with one the first set of user-link antenna elements 6205a while the second set of forward link transponders 3430e may each have its output coupled with one of the second set of user-link antenna elements 6205b. In addition, the first set of return link transponders 3440e may each have its input coupled with one the first set of user-link antenna elements 6205a while the second set of return link transponders 3440e may each have its input coupled with one of the second set of user-link antenna elements 6205b.

In some cases, the end-to-end relay 3403 includes a large number of transponders, such as 512 forward-link transponders 3430 and 512 return-link transponders 3440 (e.g., 1,024 transponders total). Thus, the first set of forward link transponders 3430e of FIG. 52A may include 256 transponders and the second set of forward link transponders 3430e may include 256 transponders.

In some cases, support for the use of multiple AN clusters is provided through characteristics of the transponders associated with the end-to-end relay 3403. Additionally or alternatively, support for the use of multiple AN clusters may be provided using one or more appropriately designed reflectors. Some example transponders are described above (e.g., with respect to FIGS. 49A, 49B, 51A, 51B, 52A and 52B), Further examples of transponder designs are discussed below. It should be understood that techniques described with reference to any one the example forward link transponders 3430 and return link transponders 3440 may in some cases be applicable to any other example transponder. Further, the components of the transponders may be rearranged in any suitable fashion without deviating from the scope of the disclosure.

Only a single polarization of the receive/transmit paths (e.g., a cross-pole transponder) is shown in FIGS. 49A, 49B, 52A and 52B for clarity. For example, the forward-link transponder 3430 receives a forward uplink signal 521 at an uplink frequency with left-hand circular polarization (LHCP) and outputs a forward downlink signal 522 at a downlink frequency with right-hand circular polarization (RHCP); and each return-link transponder 3440 receives a return uplink signal 525 at the uplink frequency with right-hand circular polarization (RHCP) and outputs a return downlink signal 527 at the downlink frequency with left-hand circular polarization (LHCP). In other cases, some or all transponders can provide a dual-pole signal path pair. For example, the forward-link transponders 3430 and the return-link transponders 3440 can receive uplink signals at the same or different uplink frequency with both polarizations (LHCP and RHCP) and can both output downlink signals at the same or different downlink frequency with both polarizations (RHCP and LHCP). For example, such cases can enable multiple systems to operate in parallel using any suitable type of interference mitigation techniques (e.g., using time division, frequency division, etc.). In some cases, the end-to-end relay 3403 includes a large number of transponders, such as 512 forward-link transponders 3430 and 512 return-link transponders 3440 (e.g., 1,024 transponders total). Other implementations can include smaller numbers of transponders, such as 10, or any other suitable number. In some cases, the antenna elements are implemented as full-duplex structures, so that each receive antenna element shares structure with a respective transmit antenna element. For example, each illustrated antenna element can be implemented as two of four waveguide ports of a radiating structure adapted for both transmission and reception of signals. In some cases, only the feeder-link elements, or only the user-link elements, are full duplex. Other implementations can use different types of polarization. For example, in some implementations, the transponders can be coupled between a receive antenna element and transmit antenna element of the same polarity.

Both the example forward-link transponder 3430 and return-link transponder 3440 can include some or all of LNAs 3705, frequency converters and associated filters 3710, channel amplifiers 3715, phase shifters 3720, power amplifiers 3725 (e.g., TWTAs, SSPAs, etc.) and harmonic filters 3730. In dual-pole implementations, as shown, each pole has its own signal path with its own set of transponder components. Some implementations can have more or fewer components. For example, the frequency converters and associated filters 3710 can be useful in cases where the uplink and downlink frequencies are different. As one example, each forward-link transponder 3430 can accept an input at a first frequency range and can output at a second frequency range; and each return-link transponder 3440 can accept an input at the first frequency range and can output at the second frequency band. Additionally or alternatively, each forward-link transponder 3430 can accept an input at a first frequency range and can output at a second frequency range; and each return-link transponder 3440 can accept an input at the second frequency range and can output at the first frequency range.

As an example, the transponders of FIGS. 52A and 52B may be implemented in a system similar to that of FIG. 50C. In this example, some or all of the ANs 515 in AN area 3450a may transmit forward uplink signals 521 in coordination with some or all of the ANs 515 in AN area 3450b. The forward uplink signals from the two AN clusters may thus combine to serve user terminals in user coverage area 3460. In this example, some AN clusters may affect only some user link antenna elements (e.g., some AN clusters may be associated with a subset of feeder link constituent receive elements 3416 which may be coupled to a corresponding subset of user link constituent transmit elements 3429). Although the above example discusses the use of two clusters, other embodiments using more clusters are also possible.

Figure 53A:
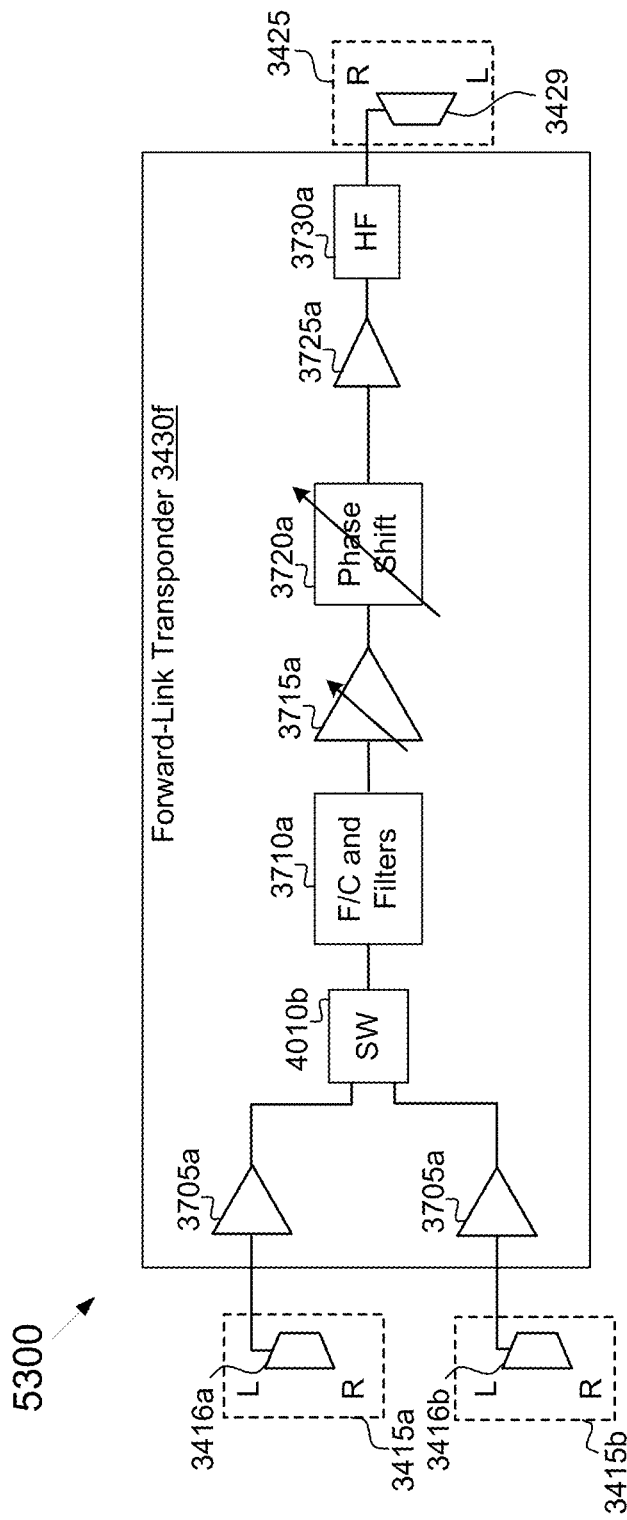
FIGS. 53A and 53B illustrate example transponders allowing selective coupling between multiple feeder-link constituent elements and a single user-link constituent element.

Another example forward signal path 5300 is shown in FIG. 53A. Forward signal path 5300 may include some combination of LNAs 3705a, frequency converters and associated filters 3710a, channel amplifiers 3715a, phase shifters 3720a, power amplifiers 3725a (e.g., TWTAs, SSPAs, etc.) and harmonic filters 3730a. The input side of the forward-link transponder 3430f is selectively coupled to one of feeder-link constituent receive elements 3416a or 3416b (e.g., using a switch 4010b, or any other suitable path selection means). Each feeder-link constituent receive element 3416a or 3416b can be part of a separate feeder-link antenna element array 3415 (e.g., each part of a separate array 3415 of cooperating feeder-link constituent receive elements 3416). The output side of the forward-link transponder 3430f is coupled to a user-link constituent transmit element 3429 of a user-link antenna element array 3425 (e.g., which is part of a user-link antenna element subsystem 3420). One or more switching controllers 4070 (not shown) can be included in the end-to-end relay 3403 for selecting between some or all of the possible signal paths enabled by the forward-link transponder 3430f Thus, where the example transponder 3430b of FIG. 47A allows, for example, selective coupling between a single feeder-link constituent receive element 3416 and multiple user-link constituent transmit elements 3429, the example transponder 3430f of FIG. 53A allows, for example, selective coupling between multiple feeder-link constituent receive elements 3416a, 3416b and a single user-link constituent transmit element 3429.

Figure 53B:
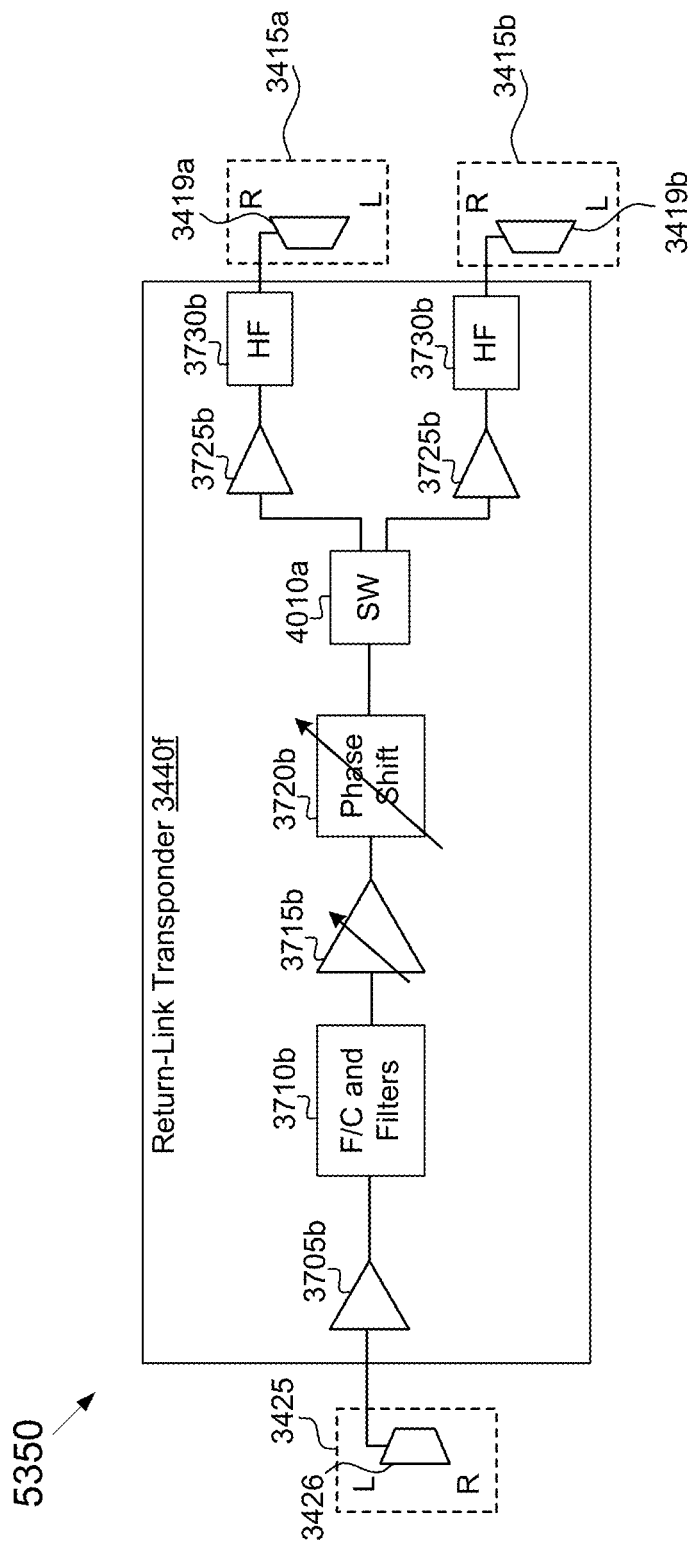

An example return signal path 5350 is shown in FIG. 53B. Return signal path 5350 may include some combination of LNAs 3705b, frequency converters and associated filters 3710b, channel amplifiers 3715b, phase shifters 3720b, power amplifiers 3725b (e.g., TWTAs, SSPAs, etc.) and harmonic filters 3730b. The output side of the return-link transponder 3440f is selectively coupled to one of feeder-link constituent transmit elements 3419a or 3419b (e.g., using a switch 4010a, or any other suitable path selection means). Each feeder-link constituent transmit element 3419a or 3419b can be part of a separate feeder-link antenna element array 3415 (e.g., each part of a separate array 3415 of cooperating feeder-link constituent transmit elements 3419). The input side of the return-link transponder 3440f is coupled to a user-link constituent receive element 3426 of a user-link antenna element array 3425 (e.g., which is part of a user-link antenna element subsystem 3420). One or more switching controllers 4070 (not shown) can be included in the end-to-end relay 3403 for selecting between some or all of the possible signal paths enabled by the return-link transponder 3440f Thus, where the example return link transponder 3440b of FIG. 47B allows, for example, selective coupling between a single feeder-link constituent transmit element 3419 and multiple user-link constituent receive elements 3426, the example transponder 3440f of FIG. 53B allows, for example, selective coupling between a single user-link constituent receive element 3426 and multiple feeder-link constituent transmit elements 3419.

As an example, the forward link transponder 3430f of FIG. 53A may be implemented in a system similar to that of FIG. 50C. In this example, some or all of the ANs 515 in AN area 3450a may transmit forward uplink signals 521 during a first time interval. Some or all of the ANs 515 in AN area 3450b may transmit forward uplink signals 521 during a second time interval. Using some appropriate path selection means (e.g., a switch), the forward link transponder 3430f can receive input from AN area 3450a (e.g., via the first array of cooperating feeder-link constituent receive elements 3416a) during the first time interval and from AN area 3450b (e.g., via the second array of cooperating feeder-link constituent receive elements 3416b) during the second time interval. In some such scenarios, each AN area 3450 may include a full complement of ANs 515 (e.g., such that each AN area 3450 can provide appropriate beamforming over the entire user coverage area 3460).

As an example, the return-link transponder 3440f of FIG. 53B may be implemented in a system similar to that of FIG. 50C. In this example, some or all of the ANs 515 in AN area 3450a may receive return downlink signals 527 during a first time interval. Some or all of the ANs 515 in AN area 3450b may receive return downlink signals 527 during a second time interval. Using some appropriate path selection means (e.g., a switch), the return link transponder 3440f can output to AN area 3450a (e.g., via the first array of cooperating feeder-link constituent transmit elements 3419a) during the first time interval and to AN area 3450b (e.g., via the second array of cooperating feeder-link constituent transmit elements 3419b) during the second time interval. In some such scenarios, each AN area 3450 may include a full complement of ANs 515 (e.g., such that the single AN area 3450 can provide appropriate beamforming over the entire user coverage area 3460).

Figure 54A:
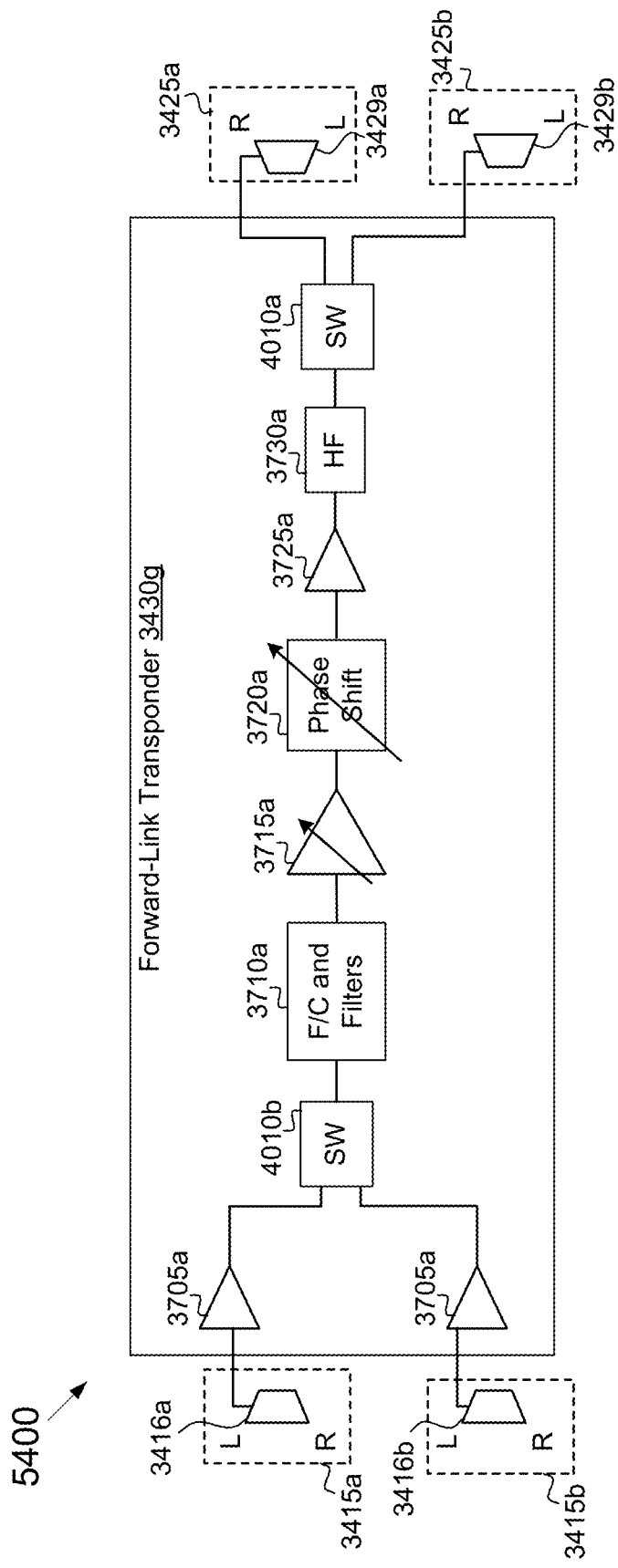
FIGS. 54A and 54B illustrate forward and return link transponders, respectively.
Figure 54B:
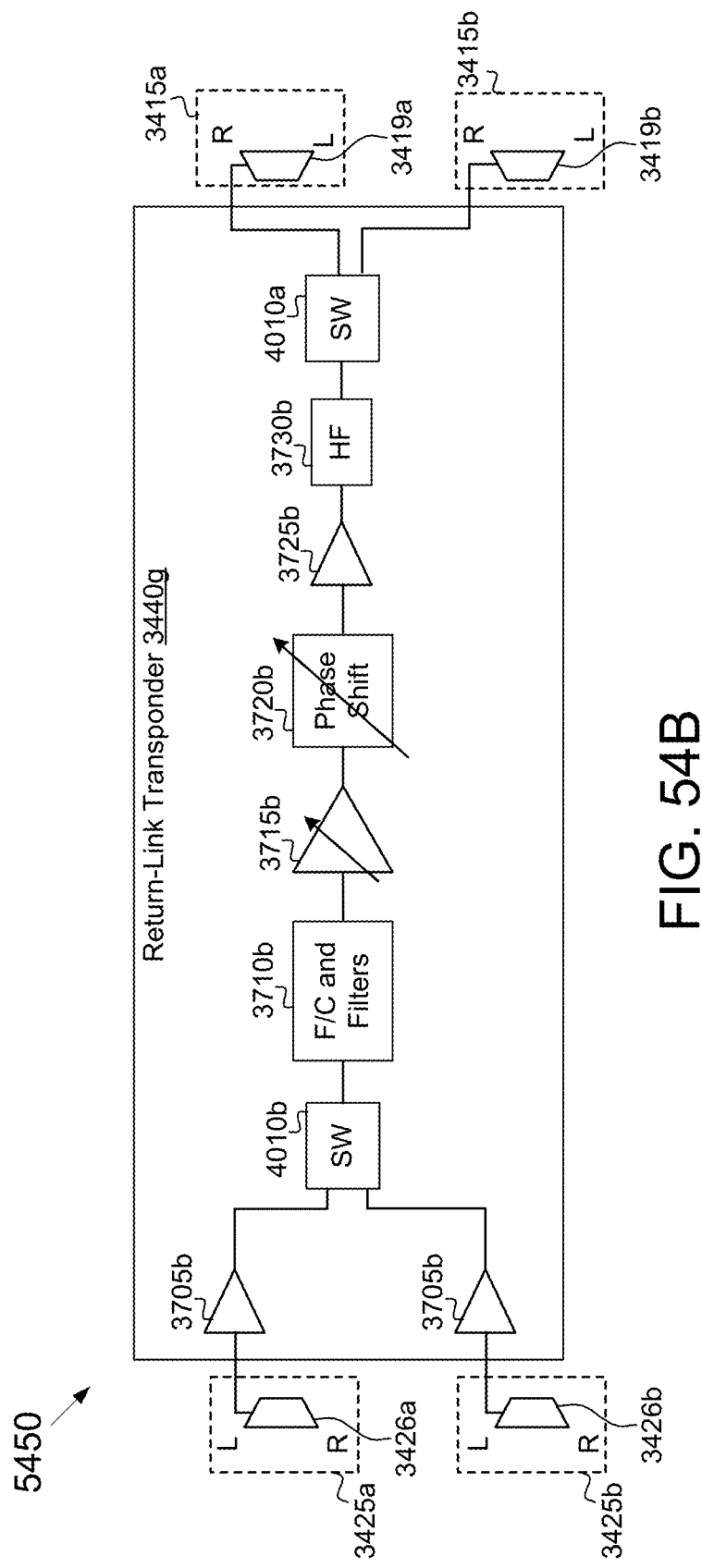

FIGS. 54A and 54B illustrate forward and return link transponders 3430g and 3440g, respectively. These transponders are similar to those of FIGS. 51A and 51B except that the components have been rearranged such that the switch 4010a follows the harmonic filter(s) 3730. As discussed above, other rearrangements of components may be possible. In some cases, this example arrangement may require fewer power amplifiers 3725 and/or harmonic filters 3730. Similarly to FIGS. 51A and 51B, such an arrangement may enable selective association between AN clusters and user coverage areas 3460. This selective association may allow flexible allocation of capacity between two (or more) user coverage areas 3460 as well as frequency reuse between user and feeder links (e.g., which may increase the capacity of the system).

As discussed above with reference to FIG. 46B, in some cases there may not be overlap between the AN area 3450 and the user coverage area 3460, which may require the use of a separate loopback mechanism from that discussed above. In some cases, the separate loopback mechanism may include the use of a loopback transponder 5450, such as that shown in FIG. 55A, 55B, or 55C. In some embodiments, the loopback transponder 5450 may receive AN loopback beacons (e.g., AN loopback beacons transmitted from each AN), which may be examples of the access node beacon signals 2530 discussed with reference to FIG. 38. The loopback transponder 5450 may retransmit the access node beacon signals 2530 and transmit a satellite beacon (e.g., which may be generated using a relay beacon generator 426 as described above). In some of the following examples, the input side of the loopback transponder 5450 is coupled to a feeder-link antenna element. Alternatively, the input side of the loopback transponder 5450 may be coupled to a loopback antenna element that is separate and distinct from the feeder-link antenna element array(s). Similarly, in some of the following examples, the output side of the loopback transponder 5450 is coupled to a feeder-link antenna element or a user-link antenna element. Alternatively, the output side of the loopback transponder 5450 may be coupled to a loopback antenna element distinct from the feeder-link antenna element array(s) and the user-link antenna element array(s), which may the same or different than the loopback antenna element coupled to the input side of the loopback transponder 5450.

Figure 55A:
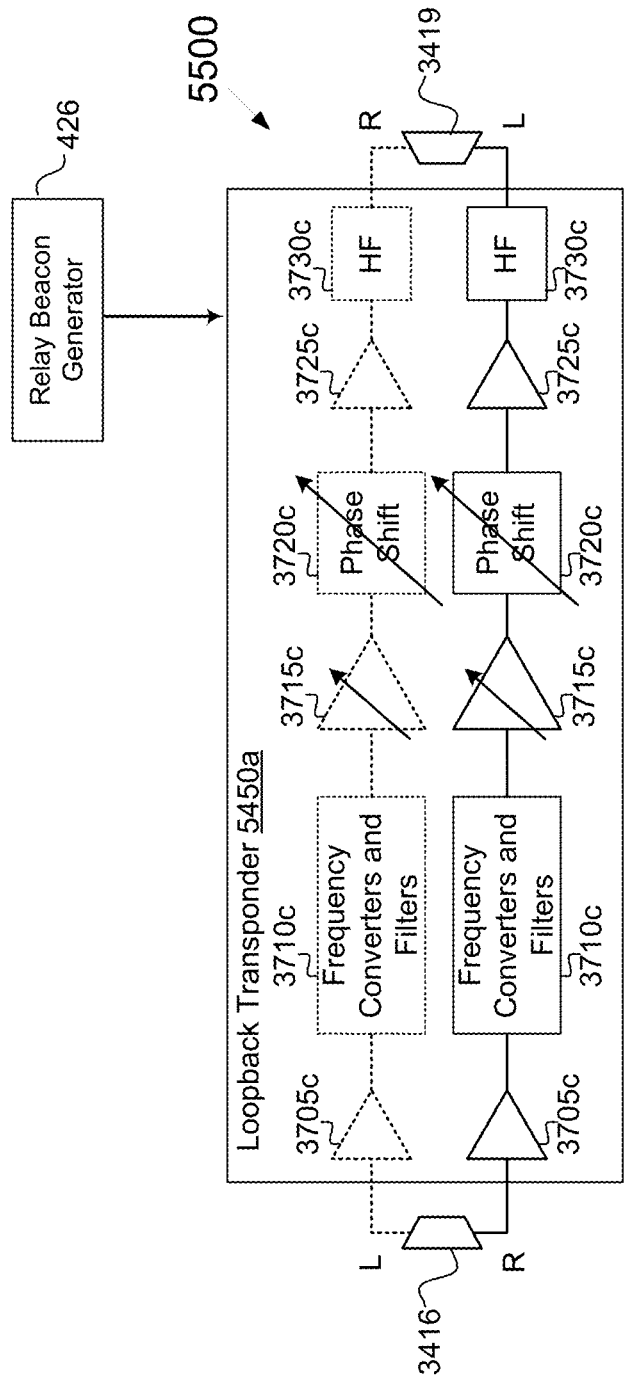
FIGS. 55A, 55B, and 55C illustrate example loopback transponders.
Figure 55B:
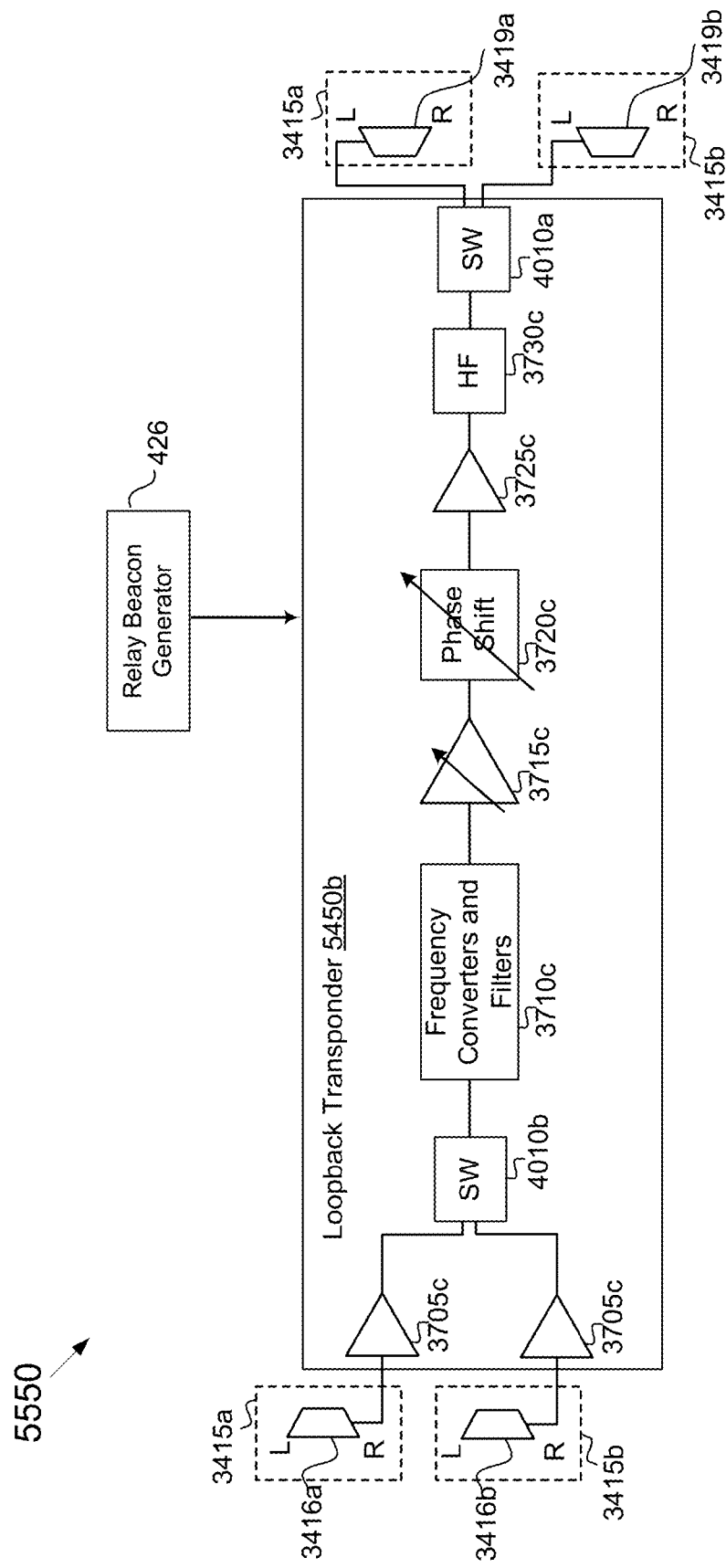

Referring to FIG. 55A, loopback transponder 5450a may include some combination of LNAs 3705c, frequency converters and associated filters 3710c, channel amplifiers 3715c, phase shifters 3720c, power amplifiers 3725c (e.g., TWTAs, SSPAs, etc.) and harmonic filters 3730c. Further, as illustrated in FIG. 55B, in the case where an end-to-end relay 3403 has multiple feeder-link antenna element arrays 3415, the input side of the loopback transponder 5450 may be selectively coupled to one of a first feeder-link constituent receive element 3416a of a first feeder-link antenna element array 3415a or a second feeder-link constituent receive element 3416b of a second feeder-link antenna element array 3415b (e.g., using a switch 4010b, or any other suitable path selection means). FIG. 55A shows the output side of example loopback transponder 5450a coupled to a feeder-link constituent transmit element 3419. FIG. 55B shows the output side of example loopback transponder 5450b selectively coupled (e.g., using a switch 4010a, or any other suitable path selection means) to either feeder-link constituent transmit element 3419a or feeder-link constituent transmit element 3419b, which may be components of a same feeder-link antenna element array 3415 or different feeder-link antenna element arrays. That is, feeder-link constituent transmit element 3419b may be a component of the same antenna element array 3415 as feeder-link constituent transmit element 3419a and/or feeder-link constituent receive element 3416b. As illustrated, feeder-link constituent transmit element 3419b is part of the same antenna element array 3415b as feeder-link constituent receive element 3416b. Similarly, the input side of loopback transponder 5450b may be selectively coupled (e.g., using a switch 4010b, or any other suitable path selection means) to either feeder-link constituent receive element 3416a or 3416b, which may be components of a same or different feeder-link antenna element arrays 3415. The loopback transponder 5450b of FIG. 55B may be employed in cases where the end-to-end relay 3403 supports the selective use of one of multiple access node areas 3450 (e.g., as discussed in some examples illustrated by FIG. 50B). Thus, switch 4010a may be set to a first position to provide the output of loopback transponder 5450b to feeder-link constituent transmit element 3419a when a first access node area 3450 is active and to a second position to provide the output of loopback transponder 5450b to the feeder-link constituent transmit element 3419b when a second access node area 3450 is active. In some cases, there may be two or more feeder-link constituent transmit elements 3419, and each can be part of a separate feeder-link antenna element array 3415 (e.g., for support of selective use of one access node area 3450 from two or more access node areas 3450). Referring to FIG. 55B, one or more switching controllers 4070 (not shown) can be included in the end-to-end relay 3403 for selecting between some or all of the possible signal paths enabled by the loopback transponder 5450b. In some cases, a feeder-link constituent receive element 3416 and a feeder-link constituent transmit element 3419 may be associated with the same physical structures, as described above. In some cases, the ANs 515 may be able to synchronize transmissions based on a comparison of the retransmitted access node beacon signals 2530 and the satellite beacon (e.g., the transmissions from ANs 515 within one or more AN clusters may be time and phase aligned based on the comparison).

In some cases, the feeder-link frequency range may be different from the user-link frequency range. When the feeder-link downlink frequency range is non-overlapping with the user-link downlink frequency range, the transponders that translate from the feeder-link uplink frequency range to the user-link downlink frequency range (e.g., using a frequency converter 3710) cannot be used to relay the access node beacon signals (e.g., because the ANs cannot receive and process the user-link downlink frequency range). In such cases, the loopback transponder 5450 may solve the issue by translating the access node beam signals from the feeder-link uplink frequency range to the feeder-link downlink frequency range. For example, feeder-link communications (e.g., forward uplink signals 521 and return downlink signals 527) may be in a first frequency range (e.g., a frequency range within V/W band), and user-link communications (e.g., forward downlink signals 522 and return uplink signals 525) may be in a second frequency range (e.g., a frequency range within K/Ka band). Thus, even where the AN area 3450 overlaps the user coverage area 3460, the ANs 515 may not be able to receive AN loopback signals relayed via the receive/transmit signal paths (e.g., forward transponders 3430 and/or return transponders 3440) of the end-to-end relay 3403.

Figure 55C:
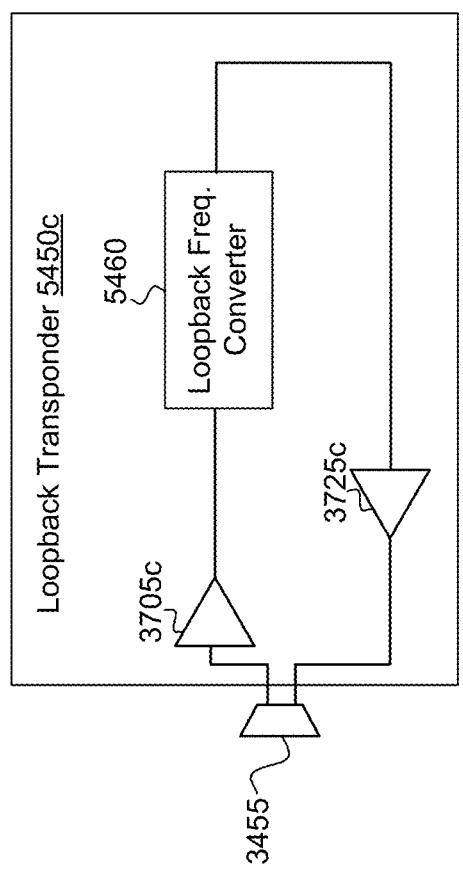

FIG. 55C shows an example loopback transponder 5450c that receives all AN loopback signals in the feeder-link uplink frequency range and relays the AN loopback signals in the feeder-link downlink frequency range. Loopback transponder 5450c may be used in any of the above access node cluster deployments where the access node area 3450 does not overlap with the user coverage area 3460 (e.g., at least some of the deployments discussed with FIG. 45C, 45E, 45F, 45G or 50B). The feeder-link uplink frequency range and the feeder-link downlink frequency range may be part of the same band (e.g., K/Ka band, V band, etc.) or different bands. The AN loopback signals may be received via antenna element 3455, which may be part of a feeder-link antenna element array 3415, or may be a separate loopback antenna element. The relayed AN loopback signals may be transmitted via the same antenna element 3455 as shown, or a different antenna element, in some cases. The loopback transponder 5450c includes loopback frequency converter 5460, which may convert the AN loopback signals from one carrier frequency within the feeder-link uplink frequency range to a different carrier frequency within the feeder-link downlink frequency range. Loopback transponder 5450c may additionally contain one or more of LNAs 3705c, channel amplifiers 3715 (not illustrated), phase shifters 3720 (not illustrated), power amplifiers 3725c, and harmonic filters (not illustrated).

Figure 59A:
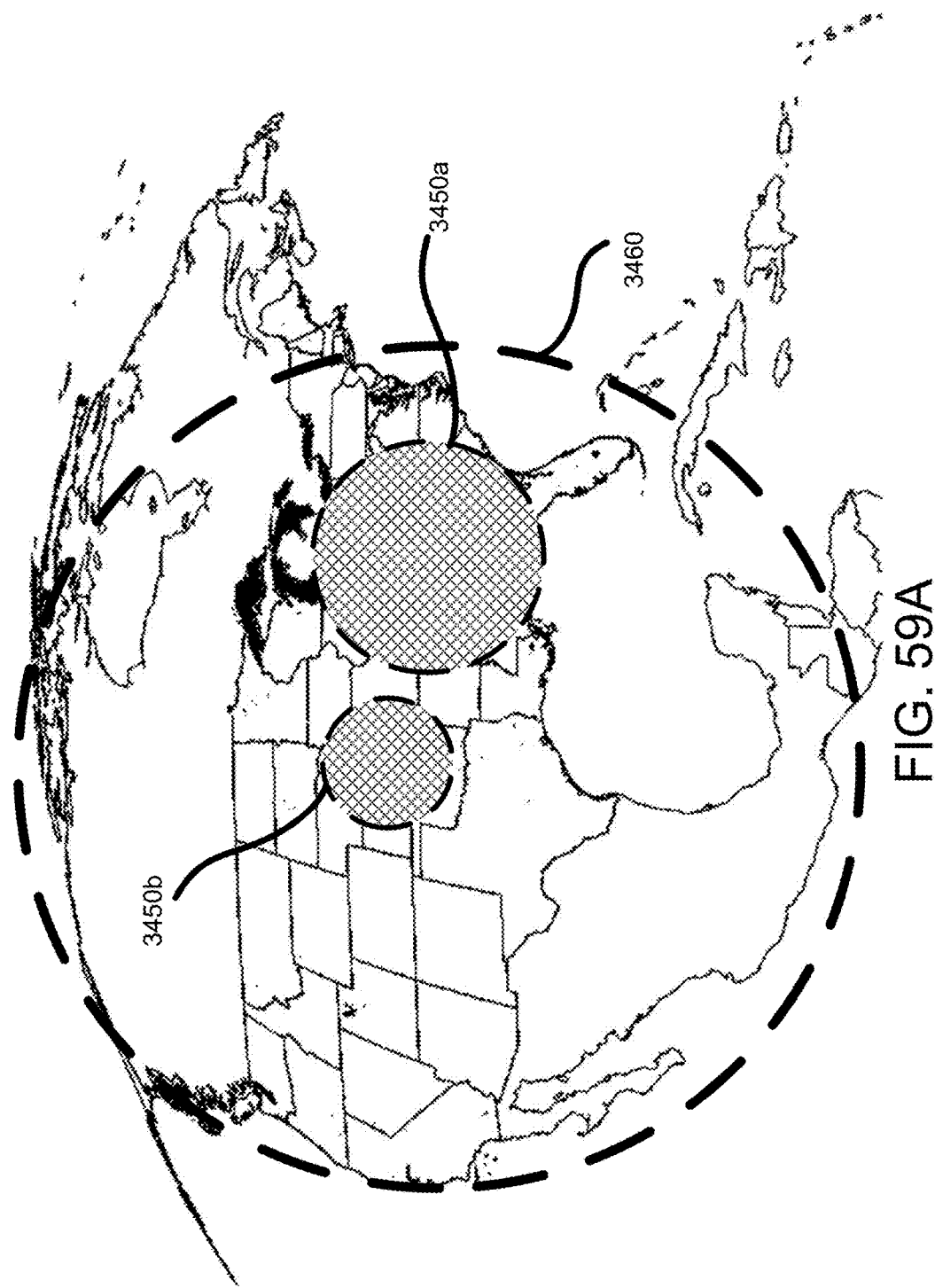
FIGS. 59A and 59B are illustrations of examples of end-to-end relay visible coverage areas supporting distinct frequency ranges.
Figure 59B:
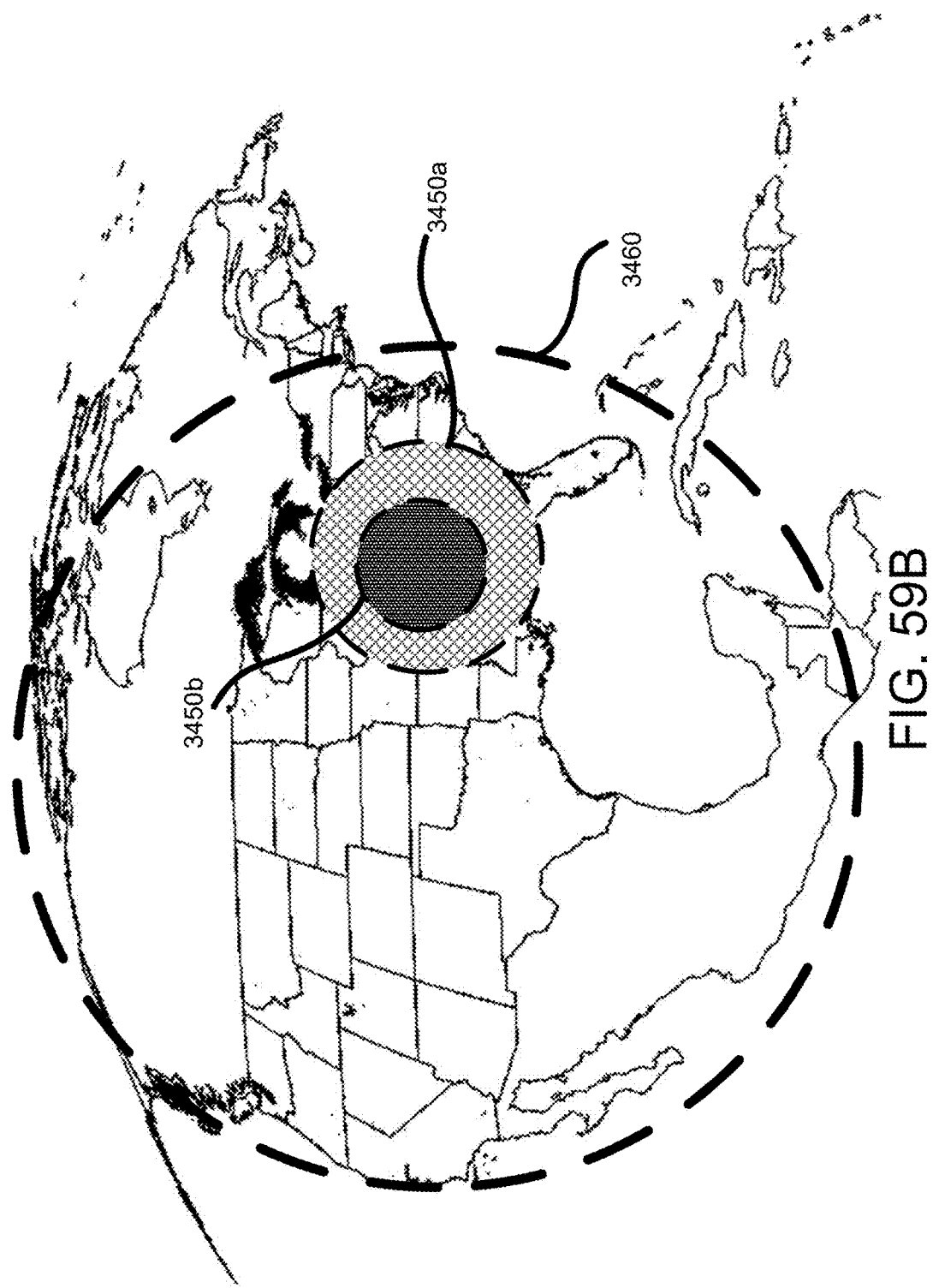

Referring again to the example end-to-end beamforming system 3400 of FIG. 41, aspects of system 3400 may be modified to support cooperative operation of multiple AN clusters that use different frequency ranges. FIGS. 59A and 59B illustrate examples of possible geographic coverage areas for multiple access node areas 3450, each operating over a different frequency range, to be used cooperatively in end-to-end beamforming for a user coverage area 3460. In the example illustrated in FIG. 59A, AN area 3450a may be associated with Ka-band transmissions while AN area 3450b may be associated with V-band transmissions. As shown in FIG. 59A, AN areas 3450a and 3450b may be disjoint. In some cases, the AN area 3450b associated with V-band transmissions may be smaller (e.g., may cover a smaller geographic area) than the AN area 3450a associated with Ka-band transmissions. In some cases AN area 3450a and AN area 3450b may be illuminated by separate feeder-link antenna element arrays 3415. For example, AN area 3450a may be illuminated by the first feeder-link antenna element array 3415a and AN area 3450b may be illuminated by the second feeder-link antenna element array 3415b of the feeder-link antenna subsystem 3410b shown in FIG. 56B. As with the example of the first AN cluster in access node area 3450a operating in Ka-band while the second AN cluster in access node area 3450b is operating in V-band, the access node area 3450b may be sized according to the difference in gain provided by the single reflector (e.g., which may be an example of the reflector 5621 of FIG. 56B) in the different frequency ranges. Alternatively, the separate feeder-link antenna element arrays 3415 illuminating AN area 3450a and AN area 3450b may be illuminated by separate reflectors (e.g., which may be examples of reflectors 5621 discussed with reference to FIG. 56A) which may be the same or different sizes. Alternatively, AN area 3450a and AN area 3450b may be illuminated by the same feeder-link antenna element array 3415 having multiple sets of feeder-link antenna elements 3416, 3419 with a compound reflector 5721 as shown in FIG. 57. The different frequency ranges for different AN clusters may provide higher isolation of different subsets of feeder link elements within a single feeder-link antenna element array, which may result in higher system capacity than multiple AN clusters operating in the same frequency range.

FIG. 59B illustrates an alternative arrangement of multiple AN clusters using separate frequency ranges used cooperatively. As illustrated in FIG. 59B the two AN clusters may at least partially overlap (or one may be completely contained within the other as shown). FIG. 59B may illustrate examples where a single feeder-link antenna element array 3415 may illuminate AN area 3450a and AN area 3450b (e.g., simultaneously receive or transmit signals to both coverage areas over different frequency ranges). In some cases, a given AN 515 (e.g., one located within AN area 3450b) may be associated with multiple AN clusters and communicate over feeder links in multiple frequency ranges (e.g., which may be contained in different frequency bands).

Figure 60A:
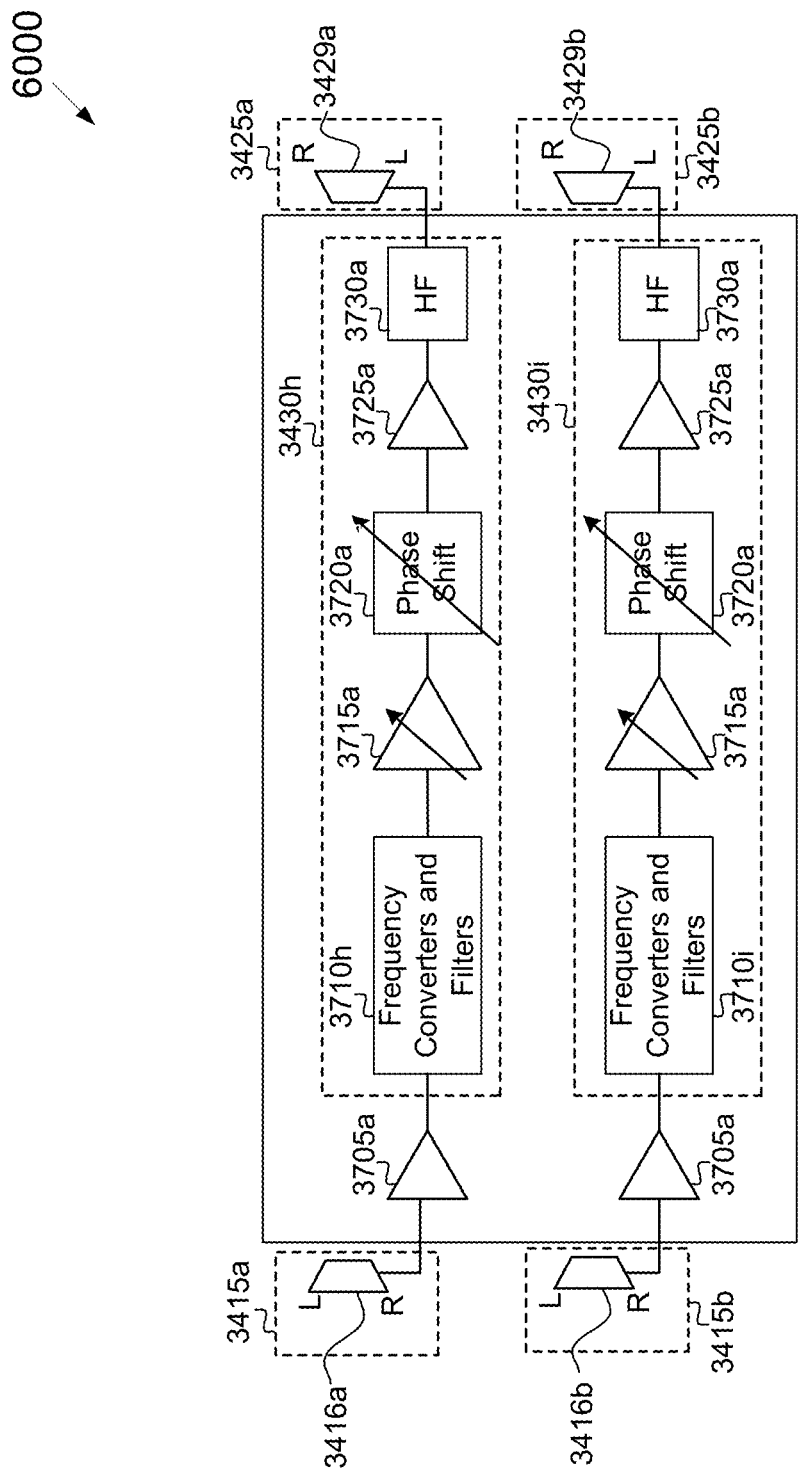
FIGS. 60A and 60B show example forward/return receive/transmit signal paths supporting multiple frequency bands.
Figure 60B:
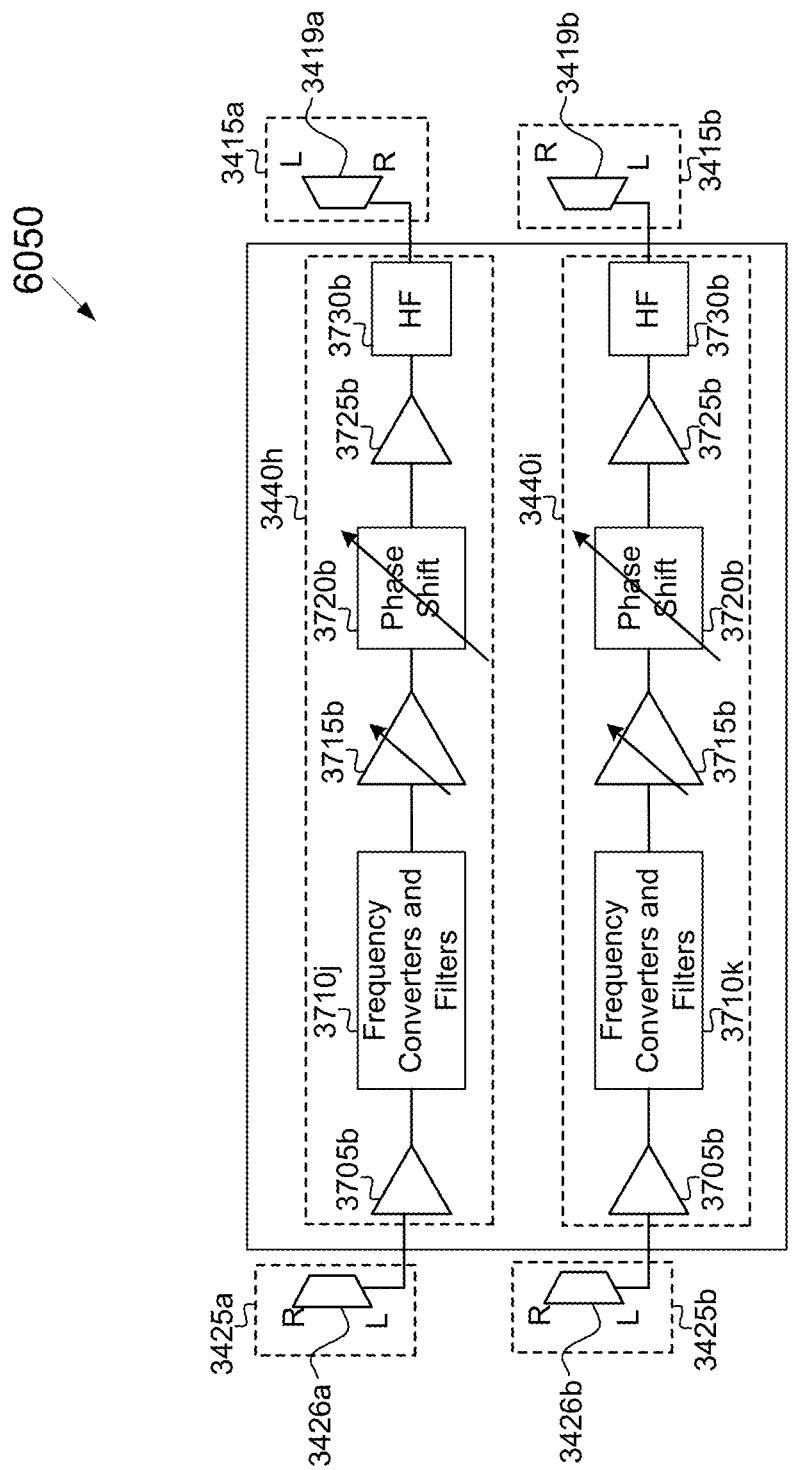

FIGS. 60A and 60B illustrate example receive/transmit signal paths supporting cooperating AN clusters operating in different frequency ranges in accordance with aspects of the present disclosure. Forward receive/transmit signal path 6000 of FIG. 60A includes forward-link transponders 3430h coupled between feeder-link constituent receive elements 3416a and user-link constituent transmit elements 3429a and forward-link transponders 3430i coupled between feeder-link constituent receive elements 3416b and user-link constituent transmit elements 3429b. As described above, the various user-link antenna elements may be part of different user-link antenna element arrays 3425, which may be positioned to provide for non-overlapping access node areas 3450 as shown in FIG. 59A or overlapping access node areas 3450 as shown in FIG. 59B. Alternatively, the various user-link antenna elements may be part of the same feeder-link antenna element array 3415, in which case the access node areas 3450 will overlap as shown in FIG. 59B. The feeder-link constituent receive elements 3416a and feeder-link constituent receive elements 3416b may be interleaved within the same feeder-link antenna element array 3415 as illustrated in FIG. 62.

As described above, the forward-link transponder 3430h can include some or all of LNAs 3705a, frequency converters and associated filters 3710h, channel amplifiers 3715a, phase shifters 3720a, power amplifiers 3725a, and harmonic filters 3730a. Similarly, forward-link transponder 3430i can include some or all of LNAs 3705a, frequency converters and associated filters 3710i, channel amplifiers 3715a, phase shifters 3720a, power amplifiers 3725a, and harmonic filters 3730a. In some cases, frequency converter 3710h may be operable to convert signals from a first feeder-link uplink frequency range to a user-link downlink frequency range while frequency converter 3710i is operable to convert signals from a second feeder-link uplink frequency range to the same user-link downlink frequency range.

Return receive/transmit signal path 6050 of FIG. 60B includes return-link transponder 3440h coupled between a user-link constituent receive element 3426a and a corresponding feeder-link constituent transmit element 3419a and return-link transponder 3440i coupled between a user-link constituent receive element 3426b and a corresponding feeder-link constituent transmit element 3419b. As described above, the return-link transponder 3440h can include some or all of LNAs 3705b, frequency converters and associated filters 3710j, channel amplifiers 3715b, phase shifters 3720b, power amplifiers 3725b, and harmonic filters 3730b. Similarly, return-link transponder 3440i can include some or all of LNAs 3705b frequency converters and associated filters 3710k, channel amplifiers 3715b, phase shifters 3720b, power amplifiers 3725b, and harmonic filters 3730b. In some cases, frequency converter 3710j may be operable to convert signals from a user-link uplink frequency range to a first feeder-link downlink frequency range (e.g., which may be the same range as the first feeder-link uplink frequency range described with reference to FIG. 60A) while frequency converter 3710*k* is operable to convert signals from the user-link uplink frequency range to a second feeder-link downlink frequency range (e.g., which may be the same range as the second feeder-link uplink frequency range described with reference to FIG. 60A).

As described above, the various user-link antenna elements may be part of the same or different user-link antenna element arrays 3425 and the various feeder-link antenna elements may be part of the same or different feeder-link antenna element arrays 3415. The feeder-link constituent transmit elements 3419*a* and feeder-link constituent transmit elements 3419*b* may be interleaved within the same feeder-link antenna element array 3415 as illustrated in FIG. 62. Where the frequencies supported for the feeder links by the forward-link transponders 3430*h* and 3430*i* and return-link transponders 3440*h* and 3440*i* are substantially different (e.g., one being different by more than 1.5× from the other, etc.), the different subsets of elements 6205*a*, 6205*b* of the antenna element array 6200 may be sized appropriately for the different supported frequency ranges (e.g., constituent antenna elements 6205*b* supporting a higher frequency range than constituent antenna elements 6205*a* may have smaller waveguides/horns, etc.).

Figure 64A:
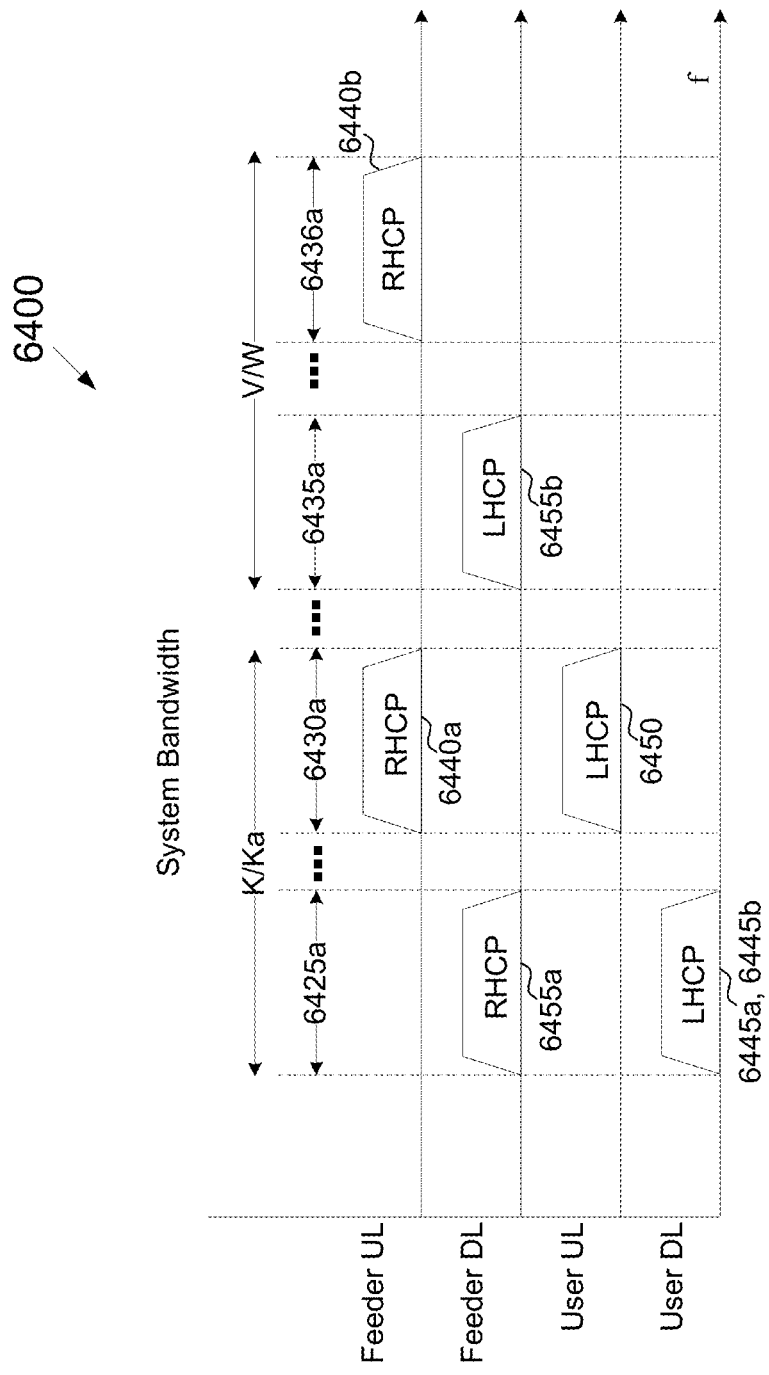
FIGS. 64A and 64B are illustrations of example frequency allocations.

FIG. 64A illustrates an example frequency spectrum allocation 6400 with four frequency ranges displayed (frequency ranges 6425*a*, 6430*a*, 6435*a*, and 6436*a*). In the illustrated example, frequency ranges 6425*a* and 6430*a* are frequency ranges within the K/Ka-bands (e.g., between 17 GHz and 40 GHz) while frequency ranges 6435*a* and 6436*a* are within the V/W bands (e.g., between 40 GHz and 110 GHz). FIG. 64A may illustrate operation of multiple AN clusters operating over different frequency ranges as shown in FIGS. 59A and 59B.

As one example, frequency spectrum allocation 6400 may be used in the scenario illustrated in FIG. 59A using an end-to-end relay 3403 having forward and return receive/transmit signal paths 6000 and 6050 as shown in FIGS. 60A and 60B. In this example, forward uplink signals 6440*a* from AN area 3450*a* may be transmitted over frequency range 6430*a* (e.g., using RHCP) while forward uplink signals 6440*b* from AN area 3450*b* may be transmitted over frequency range 6436*a* (e.g., using RHCP). The first set of forward uplink signals 6440*a* may be received by feeder-link constituent receive elements 3416*a* while the second set of forward uplink signals 6440*b* may be received by feeder-link constituent receive elements 3416*b*. For the sake of simplicity, signals may be illustrated by their span over portions or all of a frequency range (e.g., forward uplink signal 6440*a* shows the frequency span of an example of forward uplink signal 521 within frequency range 6430*a*). In some cases, a given signal may span one or more frequency ranges. As discussed with reference to FIG. 60A, the two sets of forward uplink signals 6440 are frequency converted by forward link transponders 3430*h* and 3430*i* (e.g., they are downconverted to the same frequency range 6425*a* in the Ka-band). Subsequently, the outputs of the forward-link transponders 3430*h* are transmitted by user-link constituent transmit elements 3429*a* as a first set of forward downlink signals 6445*a* while the outputs of the forward-link transponders 3430*i* are transmitted by user-link constituent transmit elements 3429*b* as a second set of forward downlink signals 6445*b*. In the present example, these user-link constituent transmit elements 3429*a*, 3429*b* belong to the same user-link antenna element array 3425 and illuminate the same user coverage area 3460. Accordingly, the ANs 515 in access node areas 3450*a* and 3450*b* may be referred to as cooperating in that some fraction of ANs 515 in each area combine to serve the same user coverage area 3460. That is, at least one beamformed forward user beam providing service to user terminals 517 within the corresponding user beam coverage area 519 is formed from forward uplink signals 6440*a* from at least a subset of the ANs 515 in the first access node area 3450*a* and from forward uplink signals 6440*b* from at least a subset of the ANs 515 in the second access node area 3450*b*.

Frequency spectrum allocation 6400 also illustrates an example of frequency allocation for return-link transmissions for the scenario illustrated in FIG. 59A using an end-to-end relay 3403 having forward and return receive/transmit signal paths 6000 and 6050 as shown in FIGS. 60A and 60B. Return uplink signals 6450 (e.g., LHCP signals) originating from user terminals 517 distributed throughout the user coverage area 3460 may be transmitted over frequency range 6430*a* (e.g., using LHCP) and received by user-link constituent receive elements 3426*a* and 3426*b* of FIG. 60B, where the user-link constituent receive elements 3426*a* and 3426*b* belong to the same user-link antenna element array 3425. As described with reference to FIG. 60B, the return uplink signals 6450 may be fed to return-link transponders 3440*h* and 3440*i* and frequency converted to appropriate frequency ranges 6425*a* (e.g., using RHCP) and 6435*a* (e.g., using LHCP), respectively. The frequency converted signals 6455*a* and 6455*b* may then be transmitted by feeder-link constituent transmit elements 3419*a* and 3419*b* (e.g., which belong to separate feeder-link antenna element arrays 3415*a* and 3415*b*, respectively) to ANs 515 in access node areas 3450*b* and 3450*a*, respectively. It should be understood that the frequency allocation 6400 is one example and various other frequency allocations may be used. For example, the return uplink signals 6450 may be in a different frequency range (e.g., a different frequency range within the K/Ka band) from the forward uplink signals 6440*a* and the forward downlink signals 6445 may be in a different frequency range (e.g., a different frequency range within the K/Ka band) from return downlink signals 6455*a*. This may, for example, allow the use of dual-pole transponders in the forward and return receive/transmit signal paths 6000 and 6050. Additionally or alternatively, the forward uplink signals 6440*b* may be allocated within a different frequency range (e.g., a different frequency range within the V band) from the return downlink signals 6455*b*, as illustrated. Other arrangements of the forward uplink/downlink and return/uplink downlink signals within the different frequency ranges may also be considered. For example, the return uplink signals may be allocated within the same frequency range as the forward downlink signals (e.g., using an orthogonal polarization). Additionally or alternatively, the forward uplink signals 6440*a* from the ANs in the first access node area 3450*a* may be allocated within the same frequency range as the return downlink signals 6455*a* (e.g., using an orthogonal polarization). Coupling of forward and return receive/transmit signal paths 6000 and 6050 to the various user-link and feeder-link constituent transmit/receive elements may be selected according to the desired frequency range allocation.

Figure 61A:
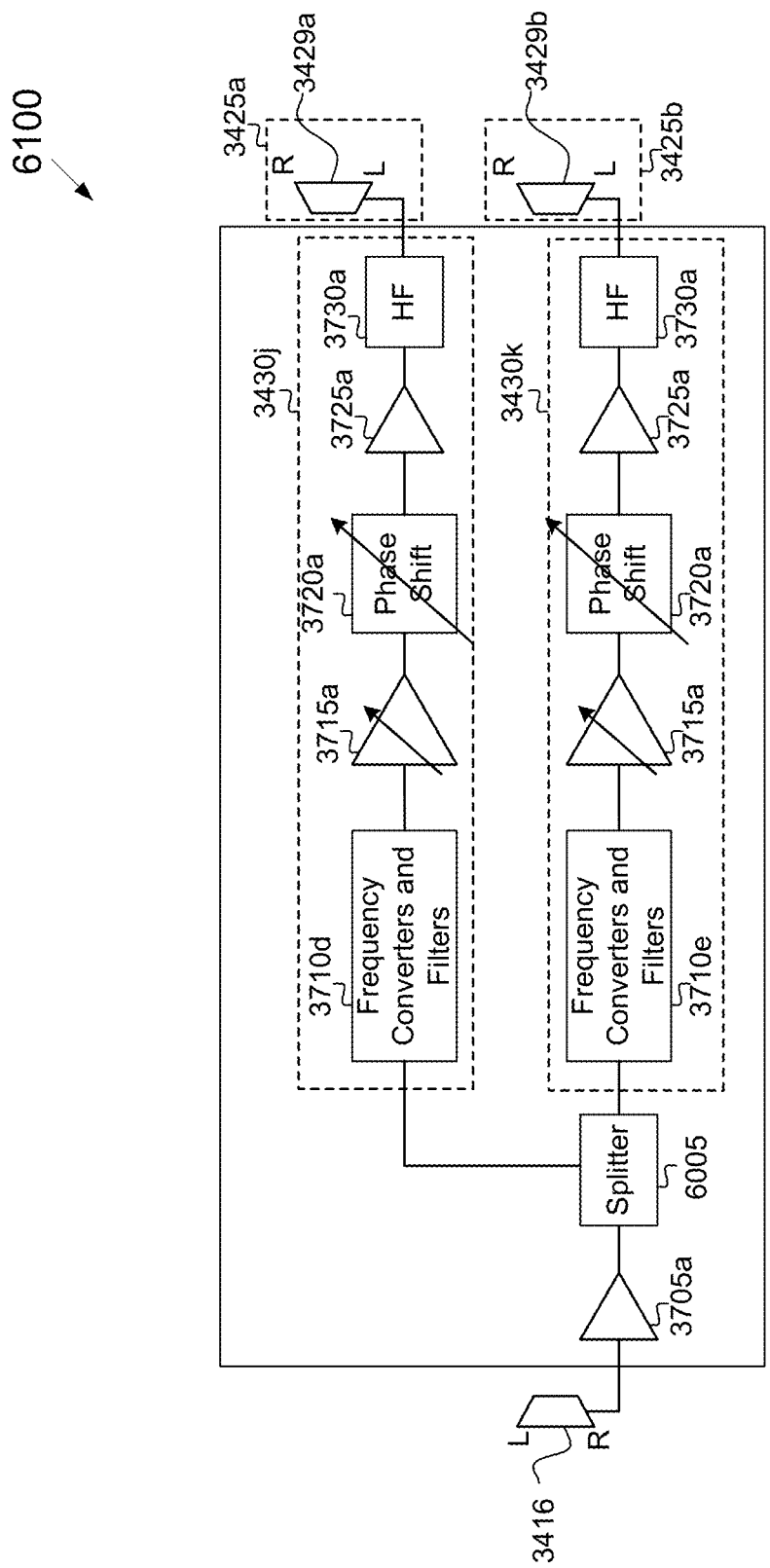
FIGS. 61A and 61B show example forward/return receive/transmit signal paths supporting multiple frequency bands.
Figure 61B:
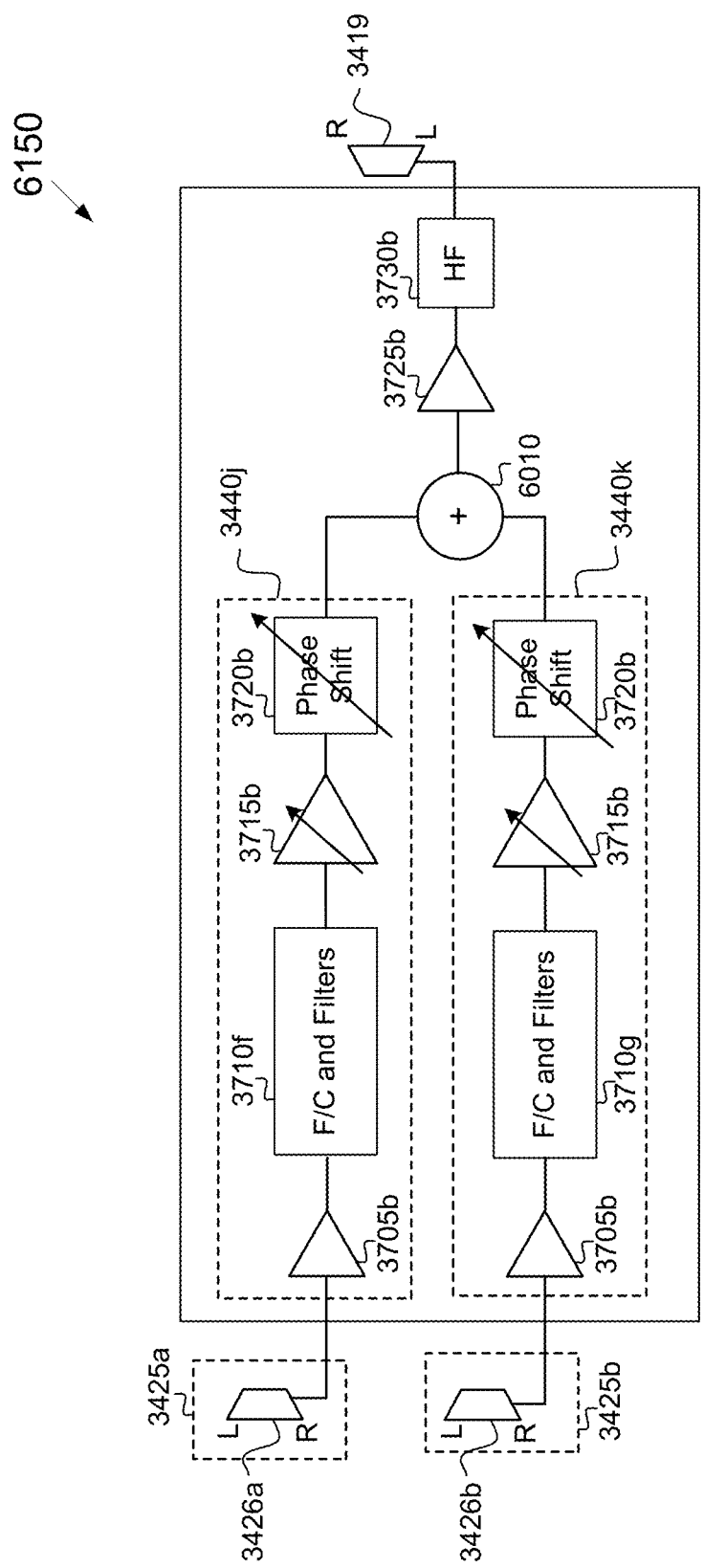

In some examples of a single feeder-link antenna element array 3415 supporting multiple AN clusters such as the multiple AN clusters illustrated in FIG. 59B, each feeder-link constituent receive element 3416 and feeder-link constituent transmit element 3419 may be coupled with multiple forward link transponders 3430. FIGS. 61A and 61B illustrate example receive/transmit signal paths supporting cooperating AN clusters operating in different frequency ranges in accordance with aspects of the present disclosure. Forward receive/transmit signal path 6100 of FIG. 61A include multiple forward-link transponders 3430 coupled between a feeder-link constituent receive element 3416 and multiple user-link constituent transmit elements 3429. In some examples, a feeder-link constituent receive element 3416 receives a composite of forward uplink signals 521 from ANs 515 in multiple AN areas 3450. Following receipt by a feeder-link constituent receive element 3416, the forward uplink signals may be split (e.g., using a splitter 6005) and the split signals may serve as inputs to forward-link transponders 3430*j* and 3430*k*. In some examples, the splitter 6005 splits signals based on frequency ranges (e.g., such that received forward uplink signals occupying a first frequency range are fed to forward-link transponder 3430*j* and received forward uplink signals occupying a second frequency range are fed to forward-link transponder 3430*k*). In such a scenario, the splitter 6005 may alternatively be an example of a filter. Accordingly, frequency converters 3710*d* and 3710*e* may be operable to accept inputs at different frequency ranges and output signals at the same frequency range for superposition in the user downlink signals 522.

A return receive/transmit signal path 6150 is shown in FIG. 61B in which return-link transponders 3440 couple multiple user-link constituent receive elements 3426*a* and 3426*b* to a single user-link constituent transmit element 3419. User-link constituent receive elements 3426*a* and 3426*b* may be parts of the same user-link antenna element array 3425 or separate user-link antenna element arrays 3425*a* and 3425*b* (as shown). User-link constituent receive element 3426*a* may act as input to return-link transponder 3440*j* while user-link constituent receive element 3426*b* may act as input to return-link transponder 3440*k*. The outputs of the return-link transponders 3440 may be fed to signal combiner 6010 before being transmitted by feeder-link constituent transmit element 3419 to ANs 515 in the AN areas 3450. In some cases, components of receive/transmit signal paths 6000 and 6050 may be rearranged (or omitted) e.g., such that signal combiner 6010 may follow harmonic filters 3430*b*, splitter 6005 may precede LNAs 3705*a*, etc.

Figure 64B:
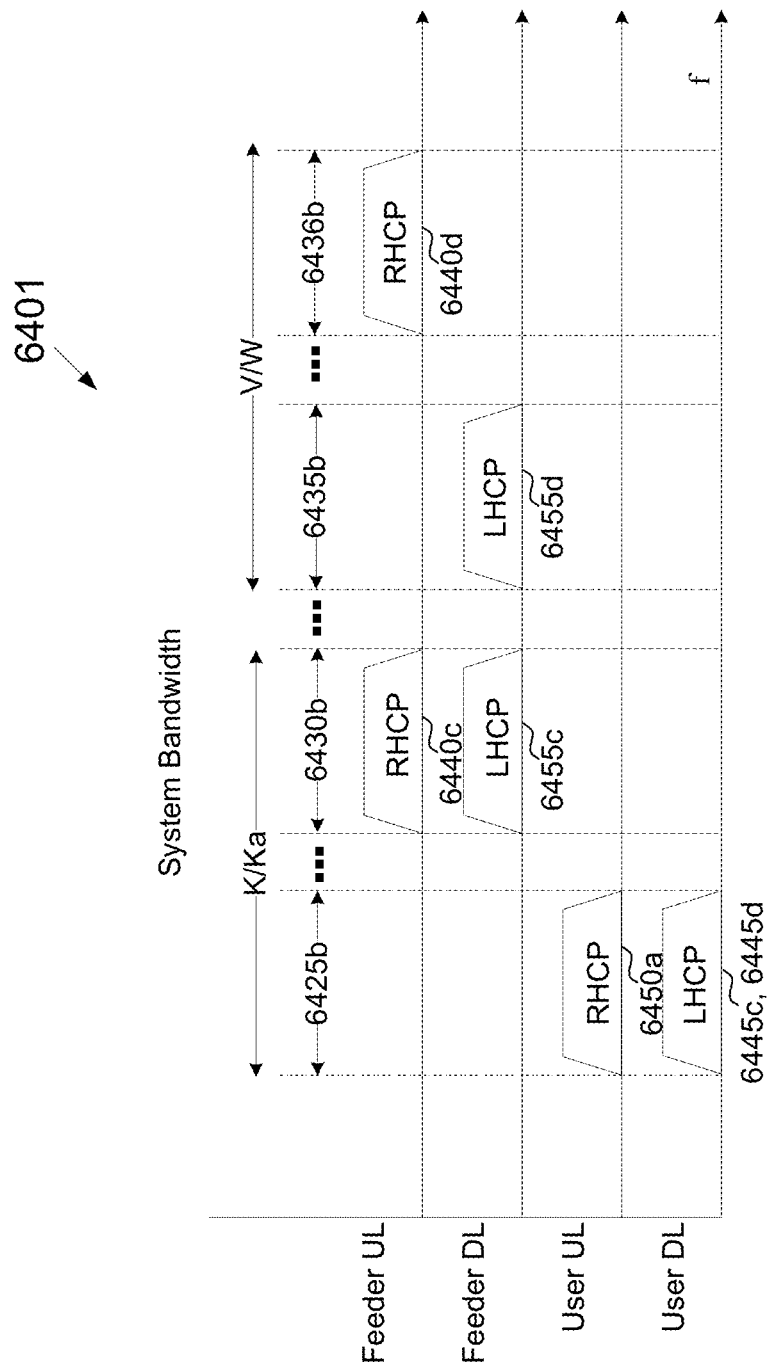

FIG. 64B illustrates an example frequency spectrum allocation 6401 with four frequency ranges displayed (frequency ranges 6425*b*, 6430*b*, 6435*b*, and 6436*b*). In the illustrated example, frequency ranges 6425*b* and 6430*b* are frequency ranges within the K/Ka-bands (e.g., between 17 GHz and 40 GHz) while frequency ranges 6435*b* and 6436*b* are within the V/W bands (e.g., between 40 GHz and 110 GHz). For example, frequency ranges 6425*b*, 6430*b*, 6435*b*, and 6436*b* may be the same as frequency ranges 6425*a*, 6430*a*, 6435*a*, and 6436*a* illustrated in FIG. 64A. FIG. 64B may illustrate operation of multiple AN clusters operating over different frequency ranges as shown in FIG. 59A or 59B.

As one example, frequency spectrum allocation 6401 may be used in the scenario illustrated in FIG. 59B using an end-to-end relay 3403 having forward and return receive/transmit signal paths 6100 and 6150 as shown in FIGS. 61A and 61B. In this example, forward uplink signals 6440*c* from AN area 3450*a* may be transmitted over frequency range 6430*b* (e.g., using RHCP) while forward uplink signals 6440*d* from AN area 3450*b* may be transmitted over frequency range 6436*b* (e.g., using RHCP). The first set of forward uplink signals 6440*c* may be received by feeder-link constituent receive elements 3416*a* while the second set of forward uplink signals 6440*d* may be received by feeder-link constituent receive elements 3416*b* of forward receive/transmit signal paths 6100. As discussed with reference to FIG. 61A, the two sets of forward uplink signals 6440 are frequency converted by forward link transponders 3430*j* and 3430*k* (e.g., they are downconverted to the same frequency range 6425*b* in the Ka-band). Subsequently, the outputs of the forward-link transponders 3430*j* are transmitted by user-link constituent transmit elements 3429*a* as a first set of forward downlink signals 6445*c* while the outputs of the forward-link transponders 3430*k* are transmitted by user-link constituent transmit elements 3429*b* as a second set of forward downlink signals 6445*d*. In the present example, these user-link constituent transmit elements 3429*a*, 3429*b* belong to the same user-link antenna element array 3425 and illuminate the same user coverage area 3460. Accordingly, the ANs 515 in access node areas 3450*a* and 3450*b* may be referred to as cooperating in that some fraction of ANs 515 in each area combine to serve the same user coverage area 3460. That is, at least one beamformed forward user beam providing service to user terminals 517 within the corresponding user beam coverage area 519 is formed from forward uplink signals 6440*c* from at least a subset of the ANs 515 in the first access node area 3450*a* and from forward uplink signals 6440*d* from at least a subset of the ANs 515 in the second access node area 3450*b*.

Frequency spectrum allocation 6401 also illustrates an example of frequency allocation for return-link transmissions for the scenario illustrated in FIG. 59B using an end-to-end relay 3403 having forward and return receive/transmit signal paths 6100 and 6150 as shown in FIGS. 61A and 61B. Return uplink signals 6450*a* originating from user terminals 517 distributed throughout the user coverage area 3460 may be transmitted over frequency range 6425*b* (e.g., using RHCP) and received by user-link constituent receive elements 3426*a* and 3426*b* of FIG. 61B, where the user-link constituent receive elements 3426*a* and 3426*b* belong to the same user-link antenna element array 3425. As described with reference to FIG. 61B, the return uplink signals 6450 may be fed to return-link transponders 3440*j* and 3440*k* and frequency converted to appropriate frequency ranges 6430*b* (e.g., using LHCP) and 6435*b* (e.g., using LHCP), respectively. The frequency converted signals may then be combined (e.g., summed, etc.) by signal combiner 6010 and transmitted by feeder-link constituent transmit elements 3419 to ANs 515 in access node areas 3450*a* and 3450*b*. It should be understood that the frequency allocation 6401 is one example and various other frequency allocations may be used. For example, the return uplink signals 6450*a* may be in a different frequency range (e.g., a different frequency range within the K/Ka band) than the forward downlink signals 6445*c* and 6445*d*. Similarly, the forward uplink signals 6440*c* may be in a different frequency range (e.g., a different frequency range within the K/Ka band) than return downlink signals 6455*a* and the forward uplink signals 6440*d* may be allocated within a different frequency range (e.g., a different frequency range within the V/W bands as illustrated) than the return downlink signals 6455*d*. This may, for example, allow the use of dual-pole transponders in the forward and return receive/transmit signal paths 6100 and 6150. Coupling of forward and return receive/transmit signal paths 6100 and 6150 to the various user-link and feeder-link constituent transmit/receive elements may be selected according to the desired frequency range allocation.

In some cases, the available bandwidths in a given band (e.g., K band, Ka band, etc.) for feeder-link transmissions and user-link transmissions may be unequal (e.g., significantly different). Additionally or alternatively, the available bandwidths for uplink and downlink transmissions within a given band may be (e.g., significantly) unequal. As an example, a regulatory body may specify what portions of a frequency spectrum are available for various types of transmissions.

Figure 65A:
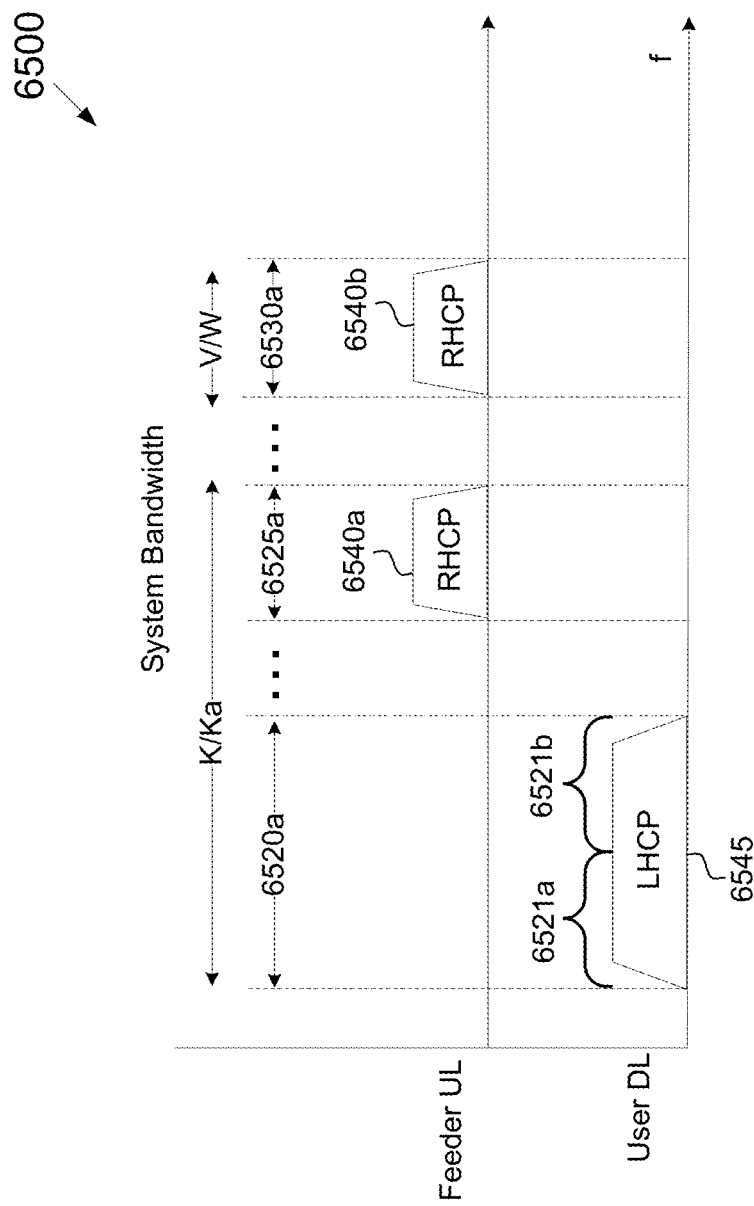
FIGS. 65A and 65B are illustrations of example frequency allocations.
Figure 65B:
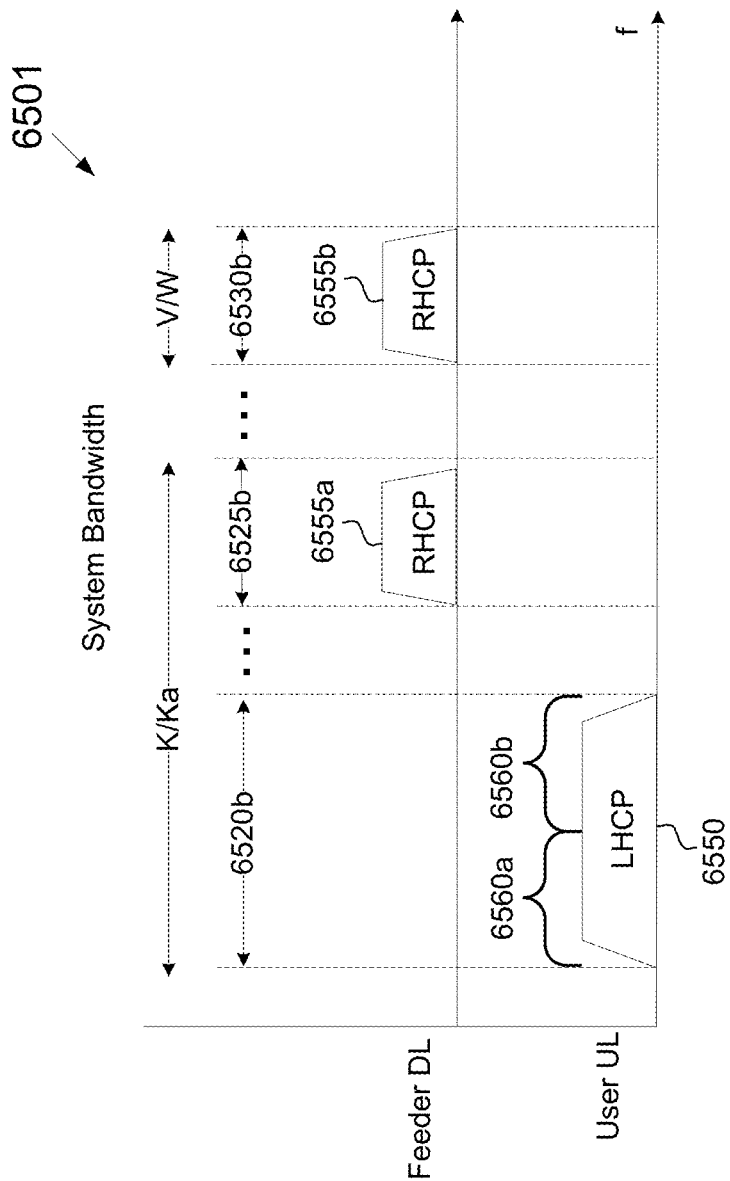

FIGS. 65A and 65B show example frequency spectrum allocations 6500 and 6501 with three frequency ranges (frequency ranges 6520a, 6525a, and 6530a) used for the forward link and three frequency ranges (frequency ranges 6520b, 6525b, and 6530b) used for the return link. In the illustrated example, frequency ranges 6520a, 6520b, 6525a, and 6525b are frequency ranges within the K/Ka-bands (e.g., between 17 GHz and 40 GHz) while frequency ranges 6530a and 6530b are within the V/W bands (e.g., between 40 GHz and 110 GHz). FIGS. 65A and 65B may illustrate operation of multiple AN clusters operating over different frequency ranges as shown in FIG. 59A or 59B.

Referring to FIG. 65A, forward uplink signals 6540a from AN area 3450a may be transmitted over frequency range 6525a (e.g., using RHCP) while forward uplink signals 6540b from AN area 3450b may be transmitted over frequency range 6530a (e.g., using RHCP). As discussed with reference to FIG. 60A or 61A, the two sets of forward uplink signals 6540 are frequency converted by forward link transponders 3430 to the frequency range 6520a. In the example illustrated in FIG. 65A, the combined bandwidth of frequency ranges 6525a and 6530a equals the bandwidth of frequency range 6520a. Thus, forward uplink signals 6540a are frequency converted (e.g., via frequency converters in the forward link transponders of forward receive/transmit signal paths 6000 or 6100) to forward downlink signals 6545 spanning a first portion 6521a of frequency range 6520a while forward uplink signals 6540b are frequency converted (e.g., via frequency converters in the forward link transponders of forward receive/transmit signal paths 6000 or 6100) to forward downlink signals 6545 spanning a second portion 6521b of frequency range 6520a. A given beamformed user beam in the user coverage area 3460 may span all of frequency range 6520a, in which case the user beam is formed from both forward uplink signals 6540a and 6540b. Where each user beam formed by forward downlink signals 6545 uses a subset of frequency range 6520a, some user beams may be formed by first portion 6521a of frequency range 6520a and some user beams may be formed by second portion 6521b of frequency range 6520a. Additionally or alternatively, in some cases some user beams may be formed by cooperative superposition of forward downlink signals 6545 associated with frequency range 6521a and forward downlink signals 6545 associated with frequency range 6521b (e.g., frequency ranges 6521a and 6521b may partially overlap to enable cooperatively forming user beams in user coverage area 3460 with forward uplink signals 6540 from different AN clusters). In another example, one or both of frequency ranges 6525a or 6530a may have the same bandwidth as frequency range 6520a (e.g., or the combined bandwidth of frequency ranges 6525a and 6530a may exceed the bandwidth of frequency range 6520a), and thus up to all forward user beams may be formed by cooperative superposition of forward downlink signals associated with frequency ranges 6521a and 6521b.

FIG. 65B shows example return link allocations where at least one access node area 3450 utilizes frequency ranges within a different band than is used for the user coverage area 3460. Specifically, the user terminals 517 may transmit return uplink signals 6550 over a frequency range 6520b (e.g., within K/Ka bands), which may be received via two sets of user-link constituent receive elements 3416 as shown in either FIG. 60B or 61B, and frequency converted (e.g., via frequency converters in the return link transponders 3440 of return receive/transmit signal paths 6050 or 6150) to a first set of return downlink signals 6555a in frequency range 6525b and a second set of return downlink signals 6555b in frequency range 6530b. The first and second sets of return downlink signals 6555a, 6555b may be transmitted from the same feeder-link constituent transmit element 3419 (as shown in FIG. 61B), or from different feeder-link constituent transmit elements 3419 (as shown in FIG. 60B). As with FIG. 65A, the combined bandwidths of frequency ranges 6525b and 6530b are illustrated to be equal to the bandwidth of frequency range 6520b. Thus, a first portion 6560a of return uplink signals 6550 may be frequency converted and transmitted by a first set of return link transponders 3440 as return downlink signals 6555a while a second portion 6560b (which may or may not overlap with the first portion 6560a) may be frequency converted and transmitted by a second set of return link transponders 3440 as return downlink signals 6555b. Thus, some return user beams may be formed by performing return link beamforming processing on portions of return downlink signals 6555a and some return user beams may be formed by performing return link beamforming processing on portions of return downlink signals 6555b. Additionally or alternatively, some return user beams may be formed by performing return link beamforming processing on portions of return downlink signals 6555a and return downlink signals 6555b (e.g., some portions of return downlink signals 6555a and 6555b may cooperate to form a single return user beam). In some cases, one or both of frequency ranges 6525b or 6530b may have the same bandwidth as frequency range 6520b (e.g., or the combined bandwidth of frequency ranges 6525b and 6530b may exceed the bandwidth of frequency range 6520b), and thus up to all return user beams may be formed by cooperative superposition of return downlink signals 6555a and 6555b.

Figure 66A:
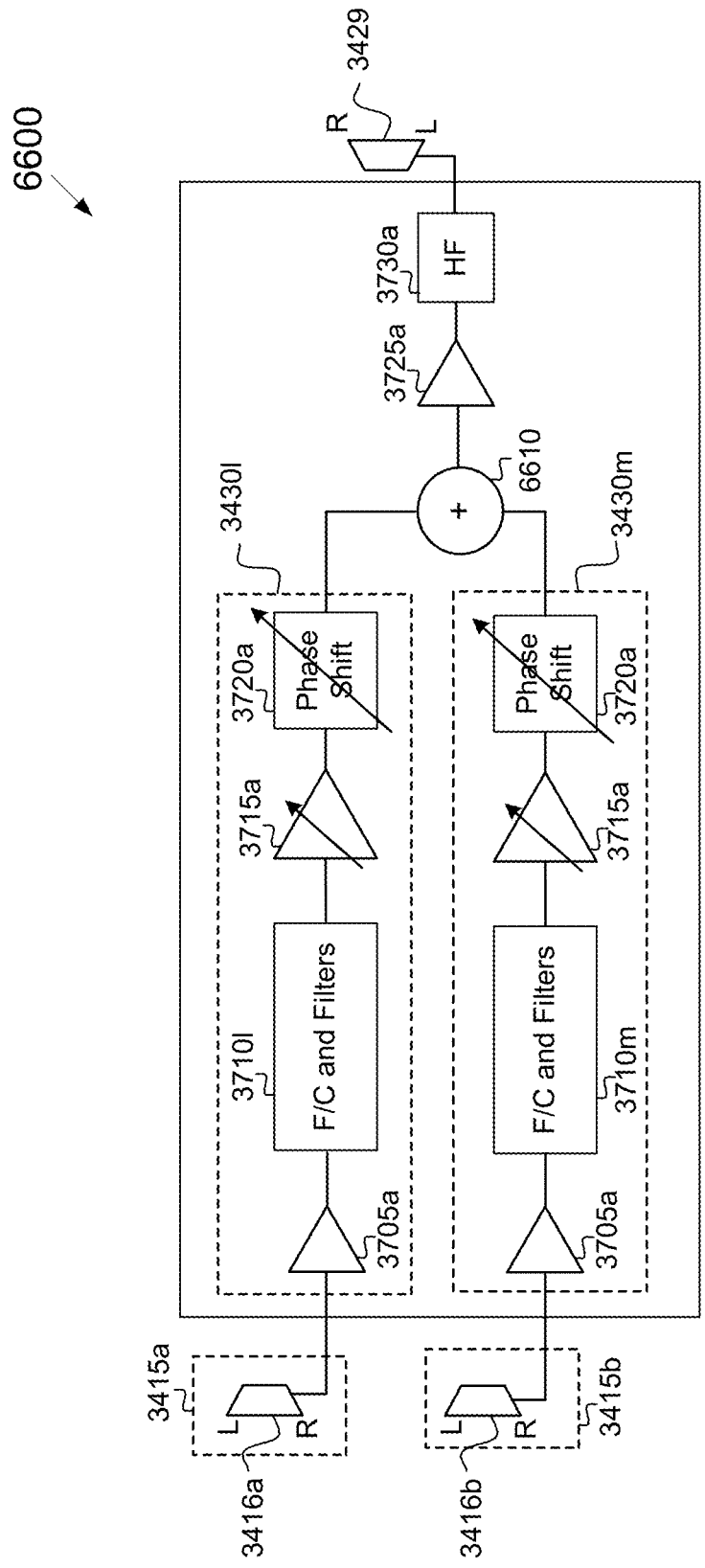
FIGS. 66A and 66B show example forward/return receive/transmit signal paths.
Figure 66B:
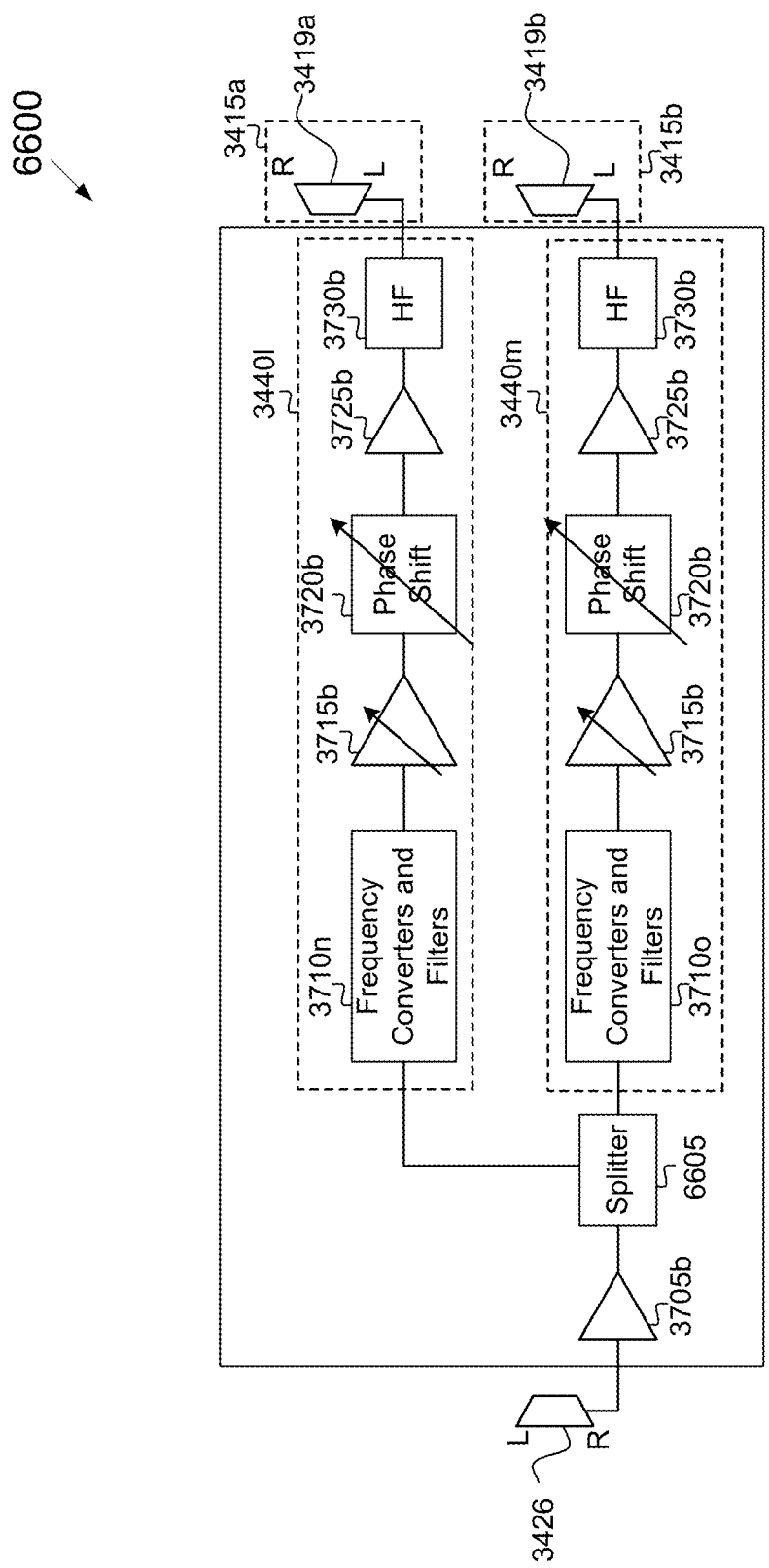

FIGS. 66A and 66B illustrate example receive/transmit signal paths supporting cooperating AN clusters operating in different frequency ranges in accordance with aspects of the present disclosure. Forward receive/transmit signal path 6600 of FIG. 66A includes forward-link transponders 3430l coupled between feeder-link constituent receive elements 3416a and user-link constituent transmit elements 3429 and forward-link transponders 3430m coupled between feeder-link constituent receive elements 3416b and user-link constituent transmit elements 3429. As described above, the forward-link transponder 3430l can include some or all of LNAs 3705a, frequency converters and associated filters 3710l, channel amplifiers 3715a, phase shifters 3720a, power amplifiers 3725a, and harmonic filters 3730a. Similarly, forward-link transponder 3430m can include some or all of LNAs 3705a, frequency converters and associated filters 3710m, channel amplifiers 3715a, phase shifters 3720a, power amplifiers 3725a, and harmonic filters 3730a. In some cases, frequency converter 3710l may be operable to convert signals from a first feeder-link uplink frequency range (e.g., frequency range 6525a of FIG. 65A) to a first portion of a user-link downlink frequency range (e.g., frequency range 6521a of FIG. 65A) while frequency converter 3710m is operable to convert signals from a second feeder-link uplink frequency range (e.g., frequency range 6530a of FIG. 65A) to a second portion of the same user-link downlink frequency range (e.g., frequency range 6521b of FIG. 65A). The forward-link transponders 3430 couple multiple feeder-link constituent receive elements 3416a and 3416b to a single user-link constituent transmit element 3429. Feeder-link constituent receive elements 3416a and 3416b may be parts of the same feeder-link antenna element array 3415 or separate feeder-link antenna element arrays 3415a and 3415b (as shown). Feeder-link constituent receive element 3416a may act as input to forward-link transponder 3430l while feeder-link constituent receive element 3416b may act as input to forward-link transponder 3430m. The outputs of the forward-link transponders 3430 may be fed to signal combiner 6610 before being transmitted by user-link constituent transmit element 3429 to user terminals 517 in the user coverage areas 3460. In some cases, components of receive/transmit signal paths 6600 and 6650 may be rearranged (or omitted) e.g., such that signal combiner 6610 may follow harmonic filters 3430b, splitter 6605 may precede LNAs 3705a, etc.

Return receive/transmit signal path 6650 of FIG. 66B includes return-link transponder 3440l coupled between a user-link constituent receive element 3426 and a corresponding feeder-link constituent transmit element 3419a and return-link transponder 3440m coupled between a user-link constituent receive element 3426 and a corresponding feeder-link constituent transmit element 3419b. As described above, the return-link transponder 3440l can include some or all of LNAs 3705b, frequency converters and associated filters 3710n, channel amplifiers 3715b, phase shifters 3720b, power amplifiers 3725b, and harmonic filters 3730b. Similarly, return-link transponder 3440m can include some or all of LNAs 3705b frequency converters and associated filters 3710o, channel amplifiers 3715b, phase shifters 3720b, power amplifiers 3725b, and harmonic filters 3730b. In some cases, frequency converter 3710n may be operable to convert signals from a first portion of a user-link uplink frequency range (e.g., frequency range 6560a of FIG. 65B) to a first feeder-link downlink frequency range (e.g., frequency range 6525b of FIG. 65B, which may be the same range as the first feeder-link uplink frequency range described with reference to FIG. 66A) while frequency converter 3710o is operable to convert signals from a second portion of the user-link uplink frequency range (e.g., frequency range 6560b of FIG. 65B) to a second feeder-link downlink frequency range (e.g., frequency range 6530b of FIG. 65B, which may be the same range as the second feeder-link uplink frequency range described with reference to FIG. 66A). Following receipt by a user-link constituent receive element 3426, the return uplink signals may be split (e.g., using a splitter 6605) and the split signals may serve as inputs to return-link transponders 3440l and 3440m. In some examples, the splitter 6605 splits signals based on frequency ranges (e.g., such that received return uplink signals occupying a first frequency range are fed to forward-link transponder 3430l and received return uplink signals occupying a second frequency range are fed to forward-link transponder 3430m). In such a scenario, the splitter 6605 may be an example of one or more filters. Accordingly, frequency converters 3710n and 3710o may be operable to accept inputs at different frequency ranges or portions of a frequency range and output signals in different frequency ranges in feeder downlink signals 522.

As described above, the various feeder-link antenna elements may be part of the same or different feeder-link antenna element arrays 3415. The feeder-link constituent transmit elements 3419a and feeder-link constituent transmit elements 3419b may be interleaved within the same feeder-link antenna element array 3415 as illustrated in FIG. 62. Where the frequencies supported for the feeder links by the forward-link transponders 3430l and 3430m and return-link transponders 3440l and 3440m are substantially different (e.g., one being different by more than 1.5× from the other, etc.), the different subsets of elements 6205a, 6205b of the antenna element array 6200 may be sized appropriately for the different supported frequency ranges (e.g., constituent antenna elements 6205b supporting a higher frequency range than constituent antenna elements 6205a may have smaller waveguides/horns, etc.).

Access Nodes Supporting Multiple Independent Feeder Link Signals

In some examples, one or more ANs 515 may support multiple feeder links (e.g., transmission of multiple forward uplink signals and/or reception of multiple return downlink signals). In some cases, ANs 515 supporting multiple feeder links may be used to reduce the number of ANs. For example, instead of having M ANs 515 where each AN 515 supports one feeder link, the system may have M/2 ANs 515, where each AN 515 supports two feeder links. While having M/2 ANs 515 reduces spatial diversity of the ANs 515, signals between the ANs 515 and the end-to-end relay at different frequencies will experience different channels, which also results in channel diversity between the two feeder links. Each AN 515 may receive multiple access node-specific forward signals 516, where each access node-specific forward signal 516 is weighted according to beamforming coefficients that are determined based on a channel matrix associated with the corresponding transmit frequency range. Thus, where each AN 515 supports two feeder links, each AN 515 may be provided a first access node-specific forward signal determined based in part on a first forward uplink channel matrix for forward uplink channels between the ANs 515 and the end-to-end relay 3403 over a first frequency range and a second access node-specific forward signal determined based in part on a second forward uplink channel matrix for the forward uplink channels between the ANs 515 and the end-to-end relay 3403 over a second frequency range. Similarly, on the return link, each AN 515 may obtain a first composite return signal based on a first return downlink signal in a third frequency range (which may be the same frequency range or in the same band as the first frequency range) and a second composite return signal based on a second return downlink signal in a fourth frequency range (which may be the same frequency range or in the same band as the second frequency range). Each AN 515 may provide the respective first and second composite return signals to the return beamformer 513, which may apply beamforming coefficients to the first composite return signals determined based in part on a first return downlink channel matrix for the return downlink channels between the end-to-end relay 3403 and the ANs 515 over the third frequency range and apply beamforming coefficients to the second composite return signals determined based in part on a second return downlink channel matrix for the return downlink channels over the fourth frequency range.

Systems employing M/2 ANs 515 may have reduced system capacity when compared to having M ANs 515, but the system cost reduction (e.g., including set up and maintenance costs) may be substantial while still providing acceptable performance. Additionally, a number of ANs 515 other than M/2 may be used, such as 0.75·M, which may provide similar or greater performance at reduced cost when compared to M ANs 515 each supporting only one feeder link. Generally, where M ANs 515 would be used each supporting a single feeder link (e.g., a single feeder uplink frequency range and a single feeder downlink frequency range), X·M ANs 515 may be used where each AN 515 supports multiple feeder links, where X is in the range of 0.5 to 1.0.

Returning to FIGS. 45A and 45B, the X·M ANs 515 may be distributed within the access node area 3450 and may service user terminals 517 within user coverage area 3460 via beamformed user beams, where one or more user beams are beamformed using multiple feeder link signals from at least one AN 515. The multiple feeder links may be supported via a single set of feeder-link constituent antenna elements (e.g., a single feeder-link antenna element array 3415), or separate feeder-link constituent antenna elements (separate feeder-link antenna element arrays 3415 for each feeder link).

A single feeder-link antenna element array 3415 and a single reflector may be used to support multiple feeder links for each AN 515 using either the forward and return receive/transmit signal paths 6000, 6050 of FIGS. 60A and 60B (e.g., separate subsets of feeder-link constituent antenna elements within the same feeder-link antenna element array 3415), or the forward and return receive/transmit signal paths 6100, 6150 of FIGS. 61A and 61B (e.g., splitters and combiners used to multiplex the multiple feeder links using the same set of feeder-link constituent antenna elements). Where the difference in frequency ranges between the multiple feeder links is substantial (which may be desirable to increase channel diversity), the dimensions of the access node area 3450 may depend on the higher frequency feeder link. For example, where a first feeder link is supported in a frequency range around 30 GHz while a second feeder link is supported in a frequency range around 60 GHz, the access node area is limited to the area illuminated by the single feeder-link antenna element array 3415 via the single reflector. Thus, some path diversity for the lower frequency range may be lost. Alternatively, a first feeder-link antenna element array 3415a may be used to support a first frequency range while a second feeder-link antenna element array 3415b is used to support a second frequency range. In this case, separate reflectors may be used, and may be sized appropriately to provide coverage of a same access node area 3450 at the different frequencies. For example, where a first feeder link is supported by a first feeder-link antenna element array 3415a and a first reflector in a frequency range around 30 GHz while a second feeder link is supported by a second feeder-link antenna element array 3415b and a second reflector in a frequency range around 60 GHz, the first reflector may be larger (e.g., having twice the reflector area) than the second reflector to account for the difference in antenna gain at the different frequencies.

Frequency allocation for the different feeder links may be performed in various ways including that shown in FIG. 64A, 64B, 65A, or 65B. That is, a first feeder link may use carrier frequencies within frequency ranges 6425a and 6430a (e.g., in K/Ka bands) while a second feeder link uses frequency range 6435a (e.g., in V/W bands) as shown in FIG. 64A. Alternatively, the first feeder link may use carrier frequencies within frequency ranges 6430b (e.g., in K/Ka bands) while a second feeder link uses frequency range 6435b (e.g., in V/W bands) as shown in FIG. 64B. In yet another alternative, the first and second feeder links may both use frequencies different from the user links as shown in FIGS. 65A and 65B where a first feeder link uses frequency ranges 6525a and 6525b (e.g., in V/W bands) while a second feeder link uses frequency ranges 6530a and 6530b (e.g., in V/W bands). In some examples, the first feeder link and second feeder link may use frequency ranges that are substantially different (e.g., the lowest frequency in one frequency range may be greater than 1.5 or 2 times the lowest frequency in the other frequency range). As discussed above, the bandwidth for each feeder link frequency range may be less than the bandwidth for the user link frequency range, or one or more of the feeder link frequency ranges may have the same bandwidth as the user link frequency range. In some cases, the correlation of the signals associated with the first and second feeder links may be inversely proportional to the bandwidth separation between the two signals (e.g., such that two signals whose frequency ranges are adjacent within the Ka-band are more correlated than a Ka-band signal and a V-band signal or two signals with non-adjacent frequency ranges within the Ka-band). This effect is a result of the signals with adjacent frequency ranges experiencing similar atmospheric effects, whereas signals with a greater degree of bandwidth separation will experience different atmospheric effects, which contributes to the induced multipath.

CONCLUSION

Although the disclosed method and apparatus is described above in terms of various examples, cases and implementations, it will be understood that the particular features, aspects, and functionality described in one or more of the individual examples can be applied to other examples. Thus, the breadth and scope of the claimed invention is not to be limited by any of the examples provided above but is rather defined by the claims.

Terms and phrases used in this document, and variations thereof, unless otherwise expressly stated, are to be construed as open ended as opposed to limiting. As examples of the foregoing: the term "including" is used to mean "including, without limitation" or the like; the term "example" is used to provide examples of instances of the item in discussion, not an exhaustive or limiting list thereof; the terms "a" or "an" mean "at least one," "one or more" or the like.

Throughout the specification, the term "couple" or "coupled" is used to refer broadly to either physical or electrical (including wireless) connection between components. In some cases, a first component may be coupled to a second component through an intermediate third component disposed between the first and second component. For example, components may be coupled through direct connections, impedance matching networks, amplifiers, attenuators, filters, direct current blocks, alternating current blocks, etc.

A group of items linked with the conjunction "and" means that not each and every one of those items is required to be present in the grouping, but rather includes all or any subset of all unless expressly stated otherwise. Similarly, a group of items linked with the conjunction "or" does not require mutual exclusivity among that group, but rather includes all or any subset of all unless expressly stated otherwise. Furthermore, although items, elements, or components of the disclosed method and apparatus may be described or claimed in the singular, the plural is contemplated to be within the scope thereof unless limitation to the singular is explicitly stated.

The presence of broadening words and phrases such as "one or more," "at least," or other like phrases in some instances does not mean that the narrower case is intended or required in instances where such broadening phrases may be absent. Additionally, the terms "multiple" and "plurality" may be used synonymously herein.

While reference signs may be included in the claims, these are provided for the sole function of making the claims easier to understand, and the inclusion (or omission) of reference signs is not to be seen as limiting the extent of the matter protected by the claims.

What is claimed is:

1. A system for providing a communication service to user terminals geographically distributed over a user coverage area comprising multiple forward user beam coverage areas via an end-to-end relay comprising multiple forward receive/transmit signal paths, comprising:
- a plurality of access nodes geographically distributed within an access node area having a physical area that is smaller than a physical area of the user coverage area, the plurality of access nodes transmitting respective access node-specific forward signals to the end-to-end relay, each of the respective access node-specific forward signals comprising a composite of respective forward beam signals weighted by respective forward beamforming weights of a forward beam weight matrix for end-to-end beamforming of transmissions from the plurality of access nodes to the multiple forward user beam coverage areas via the end-to-end relay, each access node of the plurality of access nodes comprising:
    - a network interface that obtains one of the respective access node-specific forward signals;
    - a transmitter that transmits a forward uplink signal comprising the one of the respective access node-specific forward signals to the end-to-end relay;
    - a controller that pre-corrects the forward uplink signal to compensate for a path delay and a phase shift introduced between the access node and the end-to-end relay;
    - a receiver that receives a return downlink signal from the end-to-end relay, the return downlink signal comprising a relay beacon signal and return uplink signals from a plurality of the user terminals relayed by the end-to-end relay, to form a composite return signal;
    - a relay beacon signal demodulator that demodulates the relay beacon signal to obtain relay timing information; and
    - a multiplexer that multiplexes the composite return signal with the relay timing information to obtain a multiplexed composite return signal,
- wherein the network interface sends the multiplexed composite return signal to a return beamformer.

2. The system of claim 1, wherein the access node area at least partially overlaps with a low demand area of the user coverage area.

3. The system of claim 2, wherein the low demand area of the user coverage area comprises an area in which the demand for the communication service is below a demand threshold.

4. The system of claim 1, further comprising a distribution network that distributes the plurality of access node-specific forward signals.

5. The system of claim 1, wherein the access node area is contained within the user coverage area.

6. The system of claim 1, wherein the physical area of the access node area is less than one half of the physical area of the user coverage area.

7. The system of claim 1, wherein the physical area of the access node area is less than one-fifth of the physical area of the user coverage area.

8. The system of claim 1, wherein the physical area of the access node area is less than one-tenth of the physical area of the user coverage area.

9. The system of claim 1, wherein the access node area is a single contiguous coverage area.

10. A system for providing a communication service to user terminals geographically distributed over a user coverage area via an end-to-end relay comprising multiple forward receive/transmit signal paths, comprising:
- a forward beamformer that obtains multiple forward beam signals comprising forward user data streams for transmission to the user terminals grouped by multiple forward user beam coverage areas and generates a plurality of access-node specific forward signals based on a matrix product of a forward beam weight matrix for end-to-end beamforming of transmissions from an access node area that is at least partially overlapping with an aquatic body to the multiple forward user beam coverage areas via the end-to-end relay and a vector of the forward beam signals;
- a plurality of access nodes geographically distributed within the access node area, wherein each of the plurality of access nodes obtains a respective one of the plurality of access node-specific forward signals, and wherein each of the plurality of access nodes comprises a transmitter that transmits a respective forward uplink signal to the end-to-end relay based on the respective access node-specific forward signal, and wherein the respective forward uplink signals are pre-corrected to compensate for respective path delays and phase shifts introduced between the plurality of access nodes and the end-to-end relay, and wherein at least one of the plurality of access nodes is located within the aquatic body; and
- a beam weight generator that generates the forward beam weight matrix as a first forward beam weight matrix for end-to-end beamforming of transmissions from the plurality of access nodes disposed at first locations within the access node area, and generates the forward beam weight matrix as a second forward beam weight matrix for end-to-end beamforming of transmissions from the plurality of access nodes disposed at second locations within the access node area in response to a change in location of at least one of the plurality of access nodes.

11. The system of claim 10, wherein the at least one of the plurality of access nodes is located on a floating platform in the aquatic body.

12. The system of claim 10, further comprising a distribution network that distributes the plurality of access node-specific forward signals.

13. The system of claim 12, wherein the distribution network comprises a submarine cable coupled with the forward beamformer and the at least one of the plurality of access nodes.

14. The system of claim 12, wherein the distribution network comprises a free space optical link that couples the forward beamformer and the at least one of the plurality of access nodes.

15. The system of claim 12, wherein the forward beamformer or the distribution network are located within the aquatic body.

16. The system of claim 10, wherein the aquatic body comprises an ocean.

17. The system of claim 10, wherein the user coverage area comprises a terrestrial land mass.

18. The system of claim 10, wherein the access node area is at least partially overlapping with the user coverage area.

19. A system for providing a communication service to user terminals geographically distributed over a user coverage area comprising multiple forward user beam coverage areas via an end-to-end relay comprising multiple forward receive/transmit signal paths, comprising:
  a plurality of access nodes disposed on respective mobile platforms within a first access node area having a physical area that is smaller than a physical area of the user coverage area, the plurality of access nodes transmitting respective access node-specific forward signals to the end-to-end relay, each of the respective access node-specific forward signals comprising a composite of respective forward beam signals weighted by respective forward beamforming weights of a first forward beam weight matrix for end-to-end beamforming of transmissions from the plurality of access nodes disposed at first locations within the first access node area to the multiple forward user beam coverage areas via the end-to-end relay, each access node of the plurality of access nodes comprising:
    a network interface that obtains one of the respective access node-specific forward signals;
    a transmitter that transmits a forward uplink signal comprising the one of the respective access node-specific forward signals to the end-to-end relay; and
    a controller that pre-corrects the forward uplink signal to compensate for a path delay and a phase shift introduced between the access node and the end-to-end relay;
  a beam signal interface that obtains multiple forward beam signals comprising forward user data streams for transmission to the user terminals grouped by multiple forward user beam coverage areas;
  a beam weight generator that generates the first forward beam weight matrix for end-to-end beamforming from the first locations within the first access node area to the multiple forward user beam coverage areas via the end-to-end relay; and
  a beamformer coupled with the beam signal interface and the beam weight generator, the beamformer comprising a forward matrix multiplier that obtains the respective access-node specific forward signals based on a matrix product of the first forward beam weight matrix and a vector of the forward beam signals,
  wherein the beam weight generator generates a second forward beam weight matrix for end-to-end beamforming from second locations of the plurality of access nodes within the first access node area in response to a change in location of at least one of the plurality of access nodes.

20. The system of claim 19, wherein:
at least a subset of the plurality of access nodes change locations such that locations of the plurality of access nodes define a second access node area that is different than the first access node area.

21. The system of claim 20, wherein the change in location of the at least the subset of the plurality of access nodes is in response to a change in location of the end-to-end relay.

22. The system of claim 19, wherein the beamformer is disposed on a mobile processing platform located proximate to the first access node area.

23. The system of claim 19, further comprising:
  a distribution network that distributes the plurality of access node-specific forward signals to the plurality of access nodes on the respective mobile platforms.

24. A method of communication at an access node of a communication system comprising a plurality of access nodes at geographically distributed locations providing a communication service to user terminals geographically distributed over multiple forward user beam coverage areas via an end-to-end relay comprising multiple forward receive/transmit signal paths, the method comprising:
  obtaining, while the access node is at a first location, a first access node-specific forward signal for transmission via the end-to-end relay to a plurality of the user terminals grouped by the multiple forward user beam coverage areas, the first access node-specific forward signal comprising a composite of first forward beam signals corresponding to a plurality of the multiple forward user beam coverage areas, the first forward beam signals weighted by respective beam weights of a first beam weight vector associated with the first location;
  synchronizing a first forward uplink signal for reception at the end-to-end relay time and phase aligned with a first group of other forward uplink signals from other access nodes of the plurality of access nodes;
  transmitting the first forward uplink signal comprising the first access node-specific forward signal to the end-to-end relay;
  changing from the first location to a second location;
  obtaining, while the access node is at the second location, a second access node-specific forward signal for transmission via the end-to-end relay to the plurality of the user terminals grouped by the multiple forward user beam coverage areas, the second access node-specific forward signal comprising a composite of second forward beam signals corresponding to the plurality of the multiple forward user beam coverage areas, the second forward beam signals weighted by respective beam weights of a second beam weight vector associated with the second location;
  synchronizing a second forward uplink signal for reception at the end-to-end relay time and phase aligned with a second group of other forward uplink signals from the other access nodes of the plurality of access nodes; and
  transmitting the second forward uplink signal comprising the second access node-specific forward signal to the end-to-end relay.

25. The method of claim 24, wherein the synchronizing comprises:
  identifying forward uplink signal transmit timing information indicating transmission timing in the respective access node-specific forward signal;
  transmitting an access node beacon signal to the end-to-end relay;
  receiving signaling from the end-to-end relay comprising a loopback beacon signal; and
  adjusting the forward uplink signal transmit timing information to time and phase align the respective forward uplink signal with the respective group of other forward uplink signals.

26. The method of claim 24, wherein the changing from the first location to the second location is in response to a change in location of the end-to-end relay.

27. The method of claim 24, wherein first and second access node-specific forward signals are obtained from a forward beamformer via a free space optical link.

* * * * *